United States Patent [19]
Danco et al.

[11] 3,969,722
[45] July 13, 1976

[54] METHOD AND APPARATUS FOR OPERATOR INTERROGATION OF SIMULATED CONTROL CIRCUITS

[75] Inventors: William J. Danco; Arthur P. Given, both of Roanoke, Va.

[73] Assignee: General Electric Company, Salem, Va.

[22] Filed: July 3, 1974

[21] Appl. No.: 485,765

[52] U.S. Cl. .............................................. 340/172.5
[51] Int. Cl.² .............................................. G06F 3/00
[58] Field of Search .................. 340/172.5; 235/152

[56] References Cited
UNITED STATES PATENTS

| | | | |
|---|---|---|---|
| 3,686,639 | 8/1972 | Fletcher | 340/172.5 |
| 3,806,714 | 4/1974 | Otsuka et al. | 235/152 |
| 3,832,696 | 8/1974 | Nakao et al. | 340/172.5 |

*Primary Examiner*—Raulfe B. Zache
*Attorney, Agent, or Firm*—Robert E. Brunson; Arnold E. Renner

[57] ABSTRACT

A programmable data processor or controller serving as the main control in a control system contains an executive program for controlling the transfer of information between the processor and system equipment, updating that information during on-line control of the equipment and modifying the executive program to change operating parameters of the system while the data processor is controlling the system equipment. Modification of the executive program and displaying of system parameters related to the executive program and the system equipment is accomplished through the use of an operator's console which communicates with the data processor and system equipment as a result of operator intervention.

19 Claims, 72 Drawing Figures

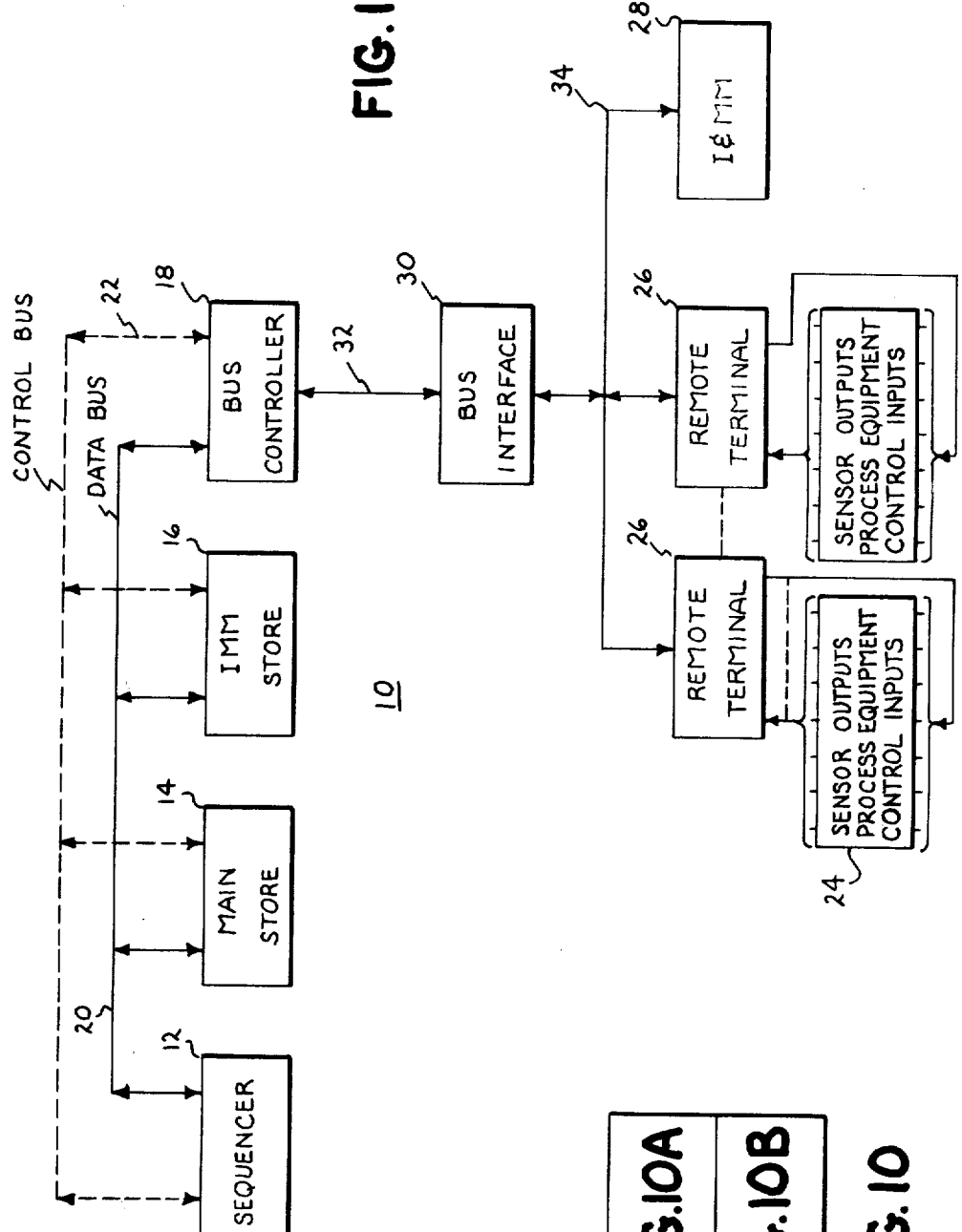

| | | |
|---|---|---|
| | @0 | P-PLACE COUNTER REGISTER |
| | @1 | Bp-BASE REGISTER (PROCEDURE REFERENCE) |
| | @2 | Bd-BASE REGISTER (DATA REFERENCE) |
| | @3 | Bb-BASE REGISTER (BIT REFERENCE) |
| | @4 | Xp-INDEX REGISTER (PROCEDURE REFERENCE) |
| | @5 | Xd-INDEX REGISTER (DATA & BIT REFERENCE) |
| | @6 | SAVE LOCATION FOR P |
| | @7 | SAVE LOCATION FOR Bp |
| | @8 | |
| | @F | |
| INST | @10 | INPUT REGION STATUS/CONDITIONS |
| INSP | @3F | |
| OTST | @40 | OUTPUT REGION STATUS/CONDITIONS |
| OTSP | @60 | |
| ISST | @61 | INTERMEDIATE REGION STATES/CONDITIONS |
| ISSP | @70 | |
| | | TIMER/COUNTER REGION (CURRENT VALUES) |
| ENCLB | @7F | |
| CTOS | @80 | TIMER/COUNTER REGION (FINAL VALUES) |
| CTOF | @9E | |
| | | RESERVED AREA |
| ENCNB | @AF | |
| SSSCS | @B0 | ISSP SCRATCH AREA |
| | @CF | |
| | | RESERVED AREA |
| SINIT | @400 | ISSP PROCEDURE SEGMENT |
| STCNP | @500 | PERMANENT CONSTANTS FOR ISSP |
| | @52F | |
| STAPP | @530 | APPLICATION PROGRAM (SIMULATED ELECTRICAL/LOGIC CONDITIONS) |
| FPGE | | |
| ACTUAL END OF APPLICATION PROGRAM | | JIS -(STSTP) TO EPAPP |
| | | EXPANSION AREA FOR APPLICATION PROGRAM |
| ENAPP | @7FF | |

Right-side annotations:
- STCLB @40
- CLEARED ON INITIALIZATION
- ENCLB @7F
- STCNB @80
- PRESET ON INITIALIZATION
- ENCNB @AF
- INITA

FIG.2

REGISTER CONTROL EQUATIONS

LOAD R0 = $\overline{ADB1} \cdot \overline{ADB2} \cdot$ FSTB
LOAD R3 = ADB1 $\cdot$ FSTB
LOAD R4 = ADB2 $\cdot$ FSTB + LOAD R4IF
SET ROF = FSDL $\cdot \overline{ROB} \cdot \overline{ADB1} \cdot \overline{ADB2}$ + ADB2 $\cdot$
$\overline{ROB} \cdot$ FCBD + ROB $\cdot$ ADB2 $\cdot$ FSTB

ADDRESS COMPARATOR AND LATCH EQUATIONS

COMP. = REG ADD $\cdot \overline{CBC} \cdot \overline{CBD}$ (CBA $\oplus$ CBB)
ADB1, ADB2 = REG ADD $\cdot$ FCBC

READ/WRITE DECODE EQUATIONS

READ = $\overline{CBA} \cdot$ CBB $\cdot$ FCBC
WRITE = CBA $\cdot \overline{CBB} \cdot$ FCBC $\cdot \overline{FSDL}$
IDLE = $\overline{CBA} \cdot \overline{CBB} \cdot$ FCBC

I/O TIMING AND CONTROL EQUATIONS

LOAD R4IF = ROF $\cdot \overline{ROB} \cdot$ CTR9
TAF = ROF (CTR = 1-4)
TIF = ROF $\cdot \overline{ROB}$ (CTR = 6-9)
TOF = ROF $\cdot$ ROB (CTR = 6-9)
CLOCK = ROE (CTR3 + CTR8)
ENABLE IF = ROF $\cdot$ ROB

FIG. 14

| F E D C B | A | 9 8 7 6 5 4 3 | 2 1 0 |
|---|---|---|---|
| OP. CODE | X B | WORD ADDRESS Y | BIT ADDRESS y |

TYPE I INSTRUCTION

| F E D C B | A | 9 8 7 6 5 4 3 2 1 0 |
|---|---|---|
| OP. CODE | X | WORD ADDRESS Y |

TYPE II INSTRUCTION

| F E D C B | A | 9 8 7 6 5 4 | 3 2 1 0 | |
|---|---|---|---|---|
| OP. CODE | X B | WORD ADDRESS Y | BIT ADDRESS Y | FIRST WORD |
| MICRO- CODE | B X | WORD ADDRESS Y | | SECOND WORD |

TYPE III INSTRUCTION

FIG. 3

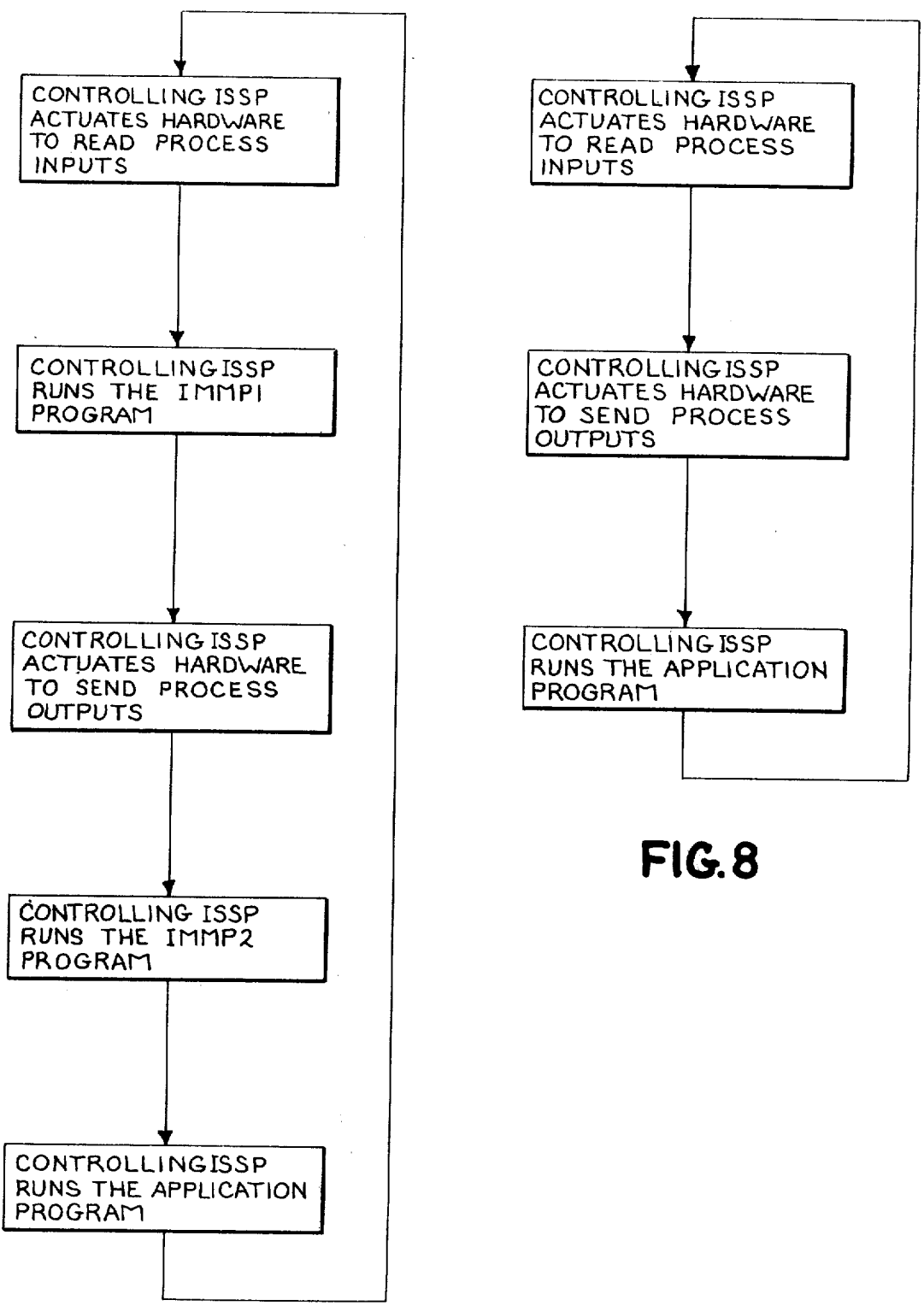

WORD FORMAT FOR EITHER REG. ADD., INPUT DATA OR OUTPUT DATA

WORD FORMAT FOR EXTERNAL ADDRESS TO REMOTE TERMINALS AND IØMM

ROB = 1 = OUTPUT DATA TRANSFER SEQUENCE
ROB = 0 = INPUT DATA TRANSFER SEQUENCE

ROE = 1 = ENABLE CLOCK
ROE = 0 = DISABLE CLOCK

ROF = 1 = BUS CONTROLLER BUSY
ROF = 0 = BUS CONTROLLER $\overline{\text{BUSY}}$

WORD FORMAT FOR CONTROL/STATUS WORD IN RO

OUTPUT DATA TRANSFER SEQUENCE

NOTE:
SEE FIG.16 FOR INPUT
DATA TRANSFER
TIMING.

INPUT DATA TRANSFER SEQUENCE

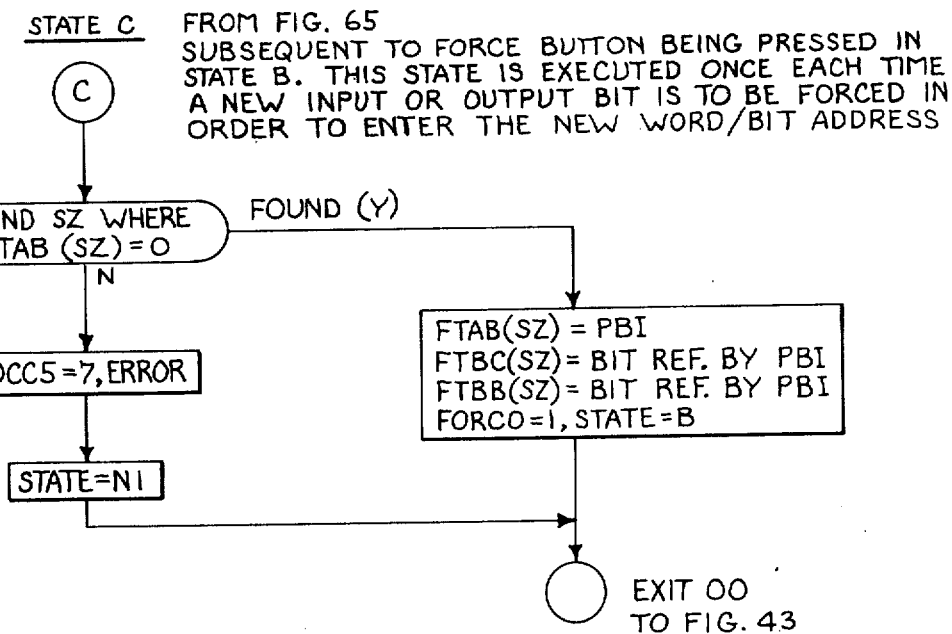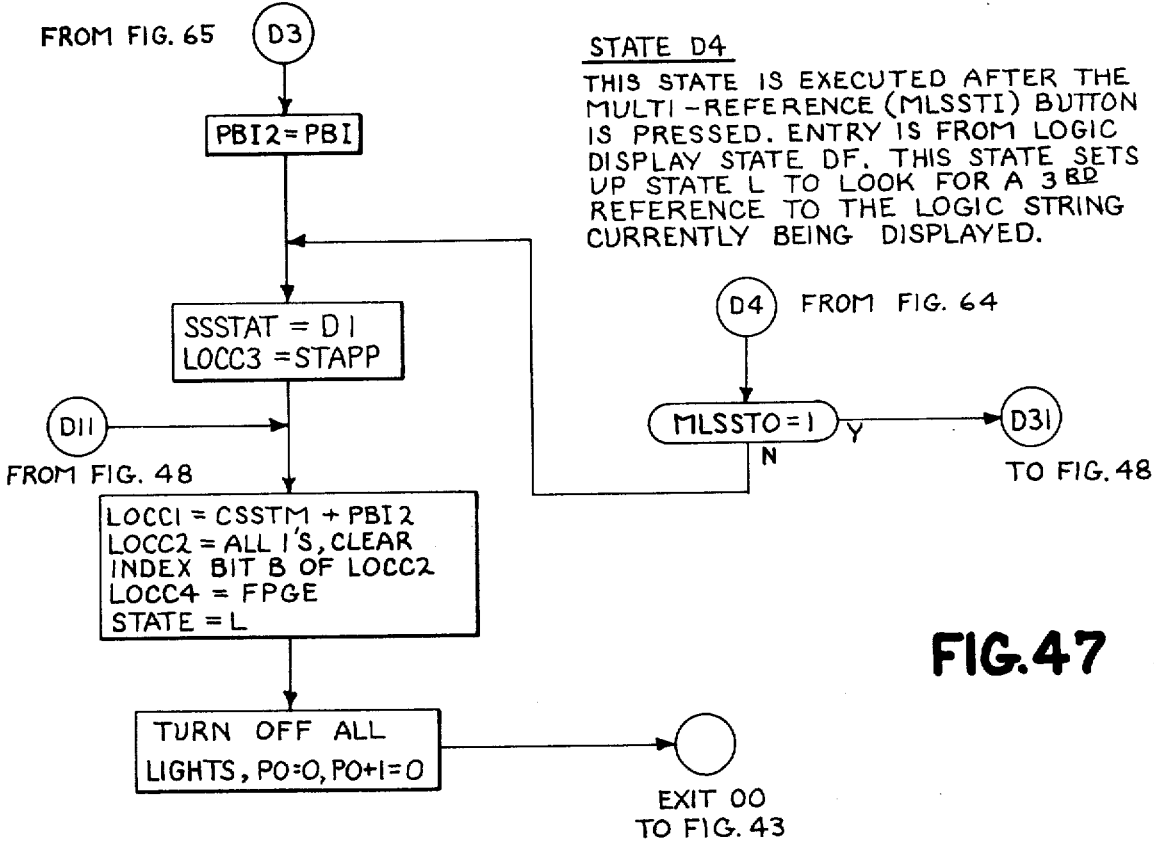

STATE D1 SUBSEQUENT TO SEARCH ROUTINE (STATE L) LOOKING FOR FIRST SST REFERENCE OR MULTI-REFERENCE (MLSSTI) BUTTON PRESSED FROM STATE DF

STATE N1 ERROR/INFORMATION STATE

THIS STATE DISPLAYS APPROPRIATE ERROR CODES AND IS REPEATEDLY EXECUTED UNTIL THE ERROR BUTTON IS PRESSED TO CLEAR THE ERROR.

METHOD AND APPARATUS FOR OPERATOR INTERROGATION OF SIMULATED CONTROL CIRCUITS

BACKGROUND OF THE INVENTION

1. Field of the Invention

This invention relates generally to programming consoles for computers and programmable controllers and more particularly to a programming console for communication with a computer or controller to locate and display control program related information and data.

2. Description of the Prior Art

In programmable computers of the type which are programmed to simulate electrical circuits comprised of control elements it is desirable to be able to locate and display these elements rapidly with a minimum amount of switch manipulation on a programming console. It is well known in the art that most all programming consoles provide, in one form or another, switches to address specified locations in a computer memory and to display the contents of that location. To the best of the inventor's knowledge, in all prior art consoles, it is necessary to place a new address into the address switches each time it is desirable to locate a new control element. This is time consuming, and frequently results in the console operator placing the wrong address into the switches which results in the display of unwanted data. It is, therefore, desirable to provide a programming console for a computer or the like which allows an operator to easily and quickly address a computer memory for the display of information stored therein related to simulated control elements with a minimum amount of address switch manipulation.

SUMMARY OF THE INVENTION

It is a primary object of the invention to provide a programming console for a programmable controller having enhanced operating capabilities.

It is another object to provide a computer programming console capable of directing a computer to display program information and stored data on the console related to types and the conditions of simulated control elements.

A still further object is to provide a control system including a computer and programming console capable of displaying information related to simulated control circuit elements in a manner without having to readdress the computer for each element displayed.

Yet another object is to provide a programming console for dislaying program simulated electrical elements stored in a computer to an operator of the console in a form which allows the operator to communicate with the computer in an easier and more error free manner than heretofore possible with other programming consoles.

In accordance with the present invention, the preceding objects are achieved in a control system of the type including a computer or the like which commonly controls equipment in communication therewith. An operator console communicates with the computer as if it were a piece of equipment in the system.

An executive program is stored in the memory of the computer. The program directs all communications between the console and the computer and also simulates a control circuit for controlling the equipment. The simulated control circuit, when drawn as a schematic, typifies logic strings comprised of control elements connected between left and right buses defining the boundaries of each logic string. Each string includes at least one switch element of an identifiable type and condition. Additionally, each string includes a continuity status means, such as a relay, having a conducting condition controlled by the condition of the switch elements in its associated string.

Further, the executive program directs the storage of data relative to the condition of each of the control elements in the control circuit. This data is that which controls the conditions of the logic string control elements.

The console, in communication with the computer, provides a means and method of selectively accessing each of the control elements of the simulated control circuit for display of information on the console relative to each of those elements. A selection or address means is included on the console for initially specifying to the computer a logic string and a control element in that string and directing the computer to communicate information to the console relative to the control element of the initially specified logic string. A display means on the console displays this relative information in the form of indicia representative of the identity, tape and condition of the control element of the specified logic string.

Additionally, the console includes a manually operable means including indication means for communicating indexing signals to the computer to selectively step in either direction across the logic string while identifying each of the control elements in a specified logic string whereby information relative to each newly identified control element is displayed on the console without having to specifically address or identify each element. The indication means provides indication to an operator of the console (1) that a control element exists to the right, left or both of a currently specified control element of a logic string, and (2) that a logic string boundary, either right or left, has been reached. A right or left indication results when a control element adjacent its associated boundary is stepped to as determined by the manually operable means.

BRIEF DESCRIPTION OF THE DRAWINGS

While the novel features of this invention are set forth with particularly in the appended claims the invention both as to organization and content will be better understood and appreciated along with other objects and features thereof from the following detailed description taken in conjunction with the drawings in which:

FIG. 1 is a major block diagram of a programmable data processor control system of the type disclosed herein.

FIG. 2 is a memory map drawing showing the organization of programs and data as they reside in the memory of the data processor of FIG. 1.

FIG. 3 illustrates the format of the various instructions of which the data processor of FIG. 1 is capable of executing.

FIGS. 8 and 9 are high level flow charts depicting typical operating cycles of the system of FIG. 1.

FIG. 10 is a legendary drawing showing the relationships between FIGS. 10A and 10B.

FIG. 14 is a listing of equations defining the functional logic structure within the various blocks of the block diagram of FIGS. 10A and 10B.

FIGS. 39 through 67 are flow charts describing the operation of various subroutines comprising a part of the executive program to effect communications between the computer and the operator's console of FIG. 1.

DESCRIPTION OF THE PREFERRED EMBODIMENT

Figure 4:
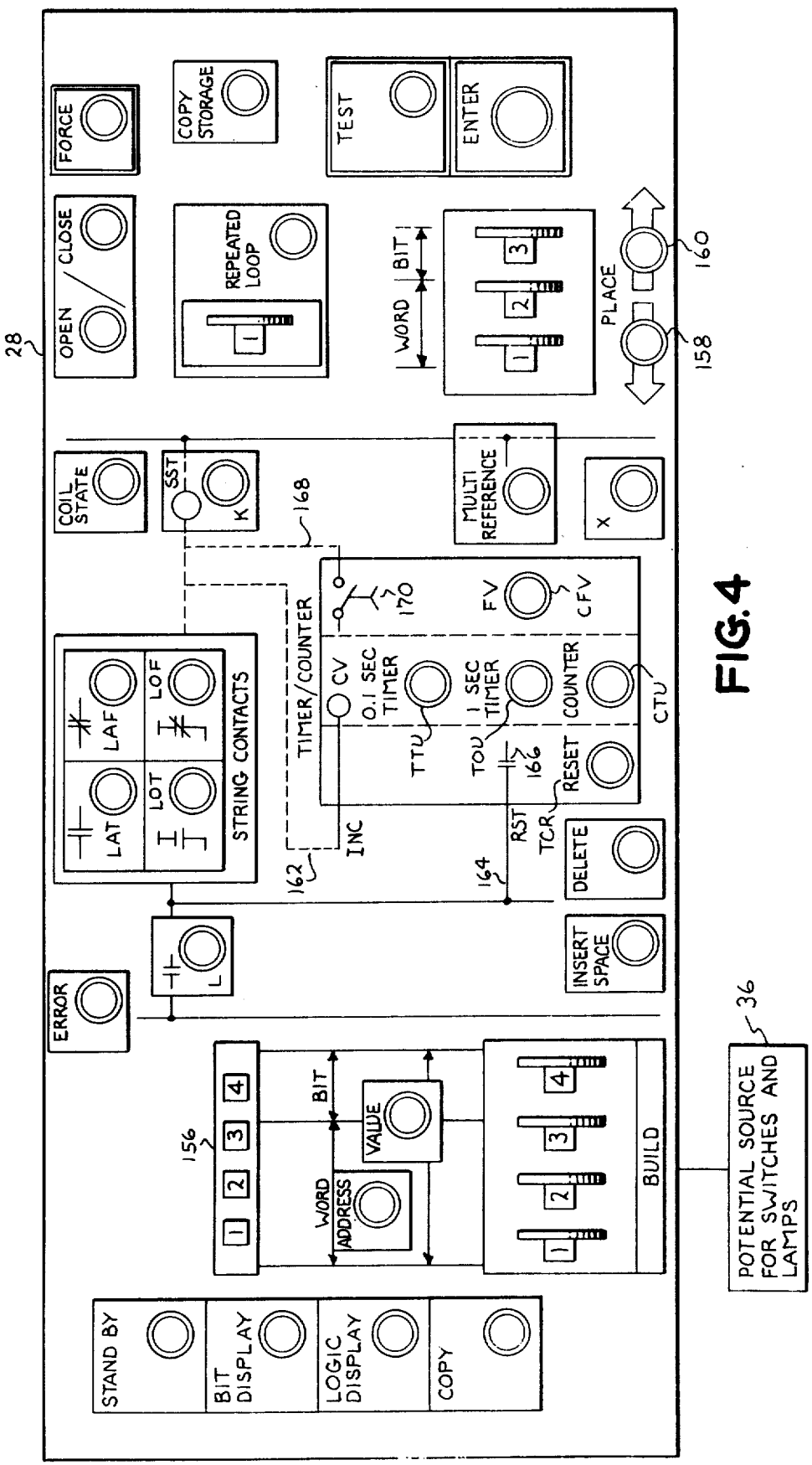
FIG. 4 shows a front panel view of an operator's console, shown as an I&MM of FIG. 1.

Reference is now made to FIG. 1 which shows a process control system generally designated 10. The control system includes a programmable data processor including units shown as a sequencer 12, a main store 14, an installation and maintenance module store 16 (I&MM store) and a digital bus controller 18. Each of these units connects in a modularized fashion to a common bi-directional data bus 20. The sequencer 12 exercises primary control over the entire system by controlling the proper execution of instructions and the transference of data over the data bus 20. Functioning as an active element or module in the system, the sequencer provides virtual memory address signals and data to the main and I&MM stores and to the bus controller. It also receives data from these latter units. The two stores and the bus controller each operate as passive elements or modules by responding to read/write control signals from the sequencer over a control bus 22 to transfer data over bus 20.

The bus controller functions as an interface control unit to control the flow of information between the data processor and a plurality process equipments 24. In response to instruction words from the sequencer the controller provides addressing and control signals to a plurality of addressable units shown as remote terminals 26 and an I&MM (Installation and Maintenance Module) 28 to control the transferring of data between the data processor and those units. All addressing, control and data signals are transferred between the bus controller 18 and the addressable 26 units via a bus interface 30 through interconnecting input/output buses 32 and 34. The data processor may be any one of several types of general purpose digital computers or programmable logic controllers, sometimes referred to as "mini-computers". Exemplary of these types of controllers or computers are the models PDP-8/L and the PDP-11 manufactured by Digital Equipment Corporation. Also the Directo-matic[R] logic controller manufactured by the General Electric Company. The sequencer 12 comprises the main portion of the processor and contains well known computer hardware. It is comprised of an instruction address register a K register or counter, an arithmetic logic unit, an A register, and suitable control or gating logic for controlling register operations and the flow of information within and external to the sequencer.

The instruction address register (hereinafter called the IAR) is controllable to receive information from the arithmetic logic unit and from the control or gating logic. Also, the IAR is controllable to serve as a memory address register (MAR) for writing information to and retrieving information from either the main store, the I&MM store or the bus controller. Further, the contents of the IAR can be written into either the main store or the I&MM store or loaded from these units in accordance with address information specified by either the IAR or the gating logic within the sequencer.

The K register serves as a BCD counter for timing functions and for counting the number of shifts performed by the sequencer during the execution of shift-type instructions. Additionally, the K register can be loaded from either the main store or the arithmetic logic unit. Dependent upon the type of instruction being executed by the sequencer, the contents of the K register are representative of either instruction addresses, shift-count information, or a BCD number.

The arithmetic logic unit (subsequently referred to as the ALU) contains logic making it selectively controllable to receive information from the IAR and K register to perform arithmetic operations and register to register transfers.

The A register is basically an arithmetic register. It is controllable to be shifted a number of bit positions during the execution of shift instructions by the sequencer. Also, the A register is controllable to communicate with either the main store, the I&MM store, or the bus controller during store (memory) read and write operations. Thus, the contents of the A register may be stored into or loaded with information from specified locations in either the main store or the I&MM store or from addressable registers in the bus controller. The output of the ALU is also gated into the A register during the execution of certain sequencer instructions. Information transfer between the sequencer and the main store, the I&MM store and the bus controller is via the data bus 20. This information transfer is effected by control signals which flow between the sequencer and each of these units over the control bus 20.

Like all programmable data processors or controllers, the sequencer of the present invention is capable of executing a variety of instructions. Many of the instructions of which the sequencer is capable of executing are generic to the several types of previously cited programmable data processors or controllers. Additionally however, the present sequencer contemplates the incorporation of logic for the execution of bit addressable type instructions. This special logic is shown and described in U.S. Pat. No. 3,921,146 entitled "Programmable Data Processor and Controller System", to William J. Danco and assigned to the assignee of the present invention which is a continuation-in-part of abandoned patent application Ser. No. 321,260, filed Jan. 5, 1973. This application being incorporated specifically herein by reference.

In that application there is disclosed a programmable controller having means to sequentially accumulate the status of a plurality of logic operations performed by a controller to generate a final result representative of the conducting status of a conductor in a ladder-type diagram whereby the final result is utilized to provide a control signal to external equipment to control a process. The programmable controller includes a store, such as the main store of the present application, for containing a program representative of a logic configuration or circuit to be simulated. A logic configuration having the format of an electrical ladder-type diagram is stored in the computer store. Each conductor in the electrical ladder-type diagram may comprise a variable number of electrical elements such as switches or relay contacts of an unrestricted number. A logic operation or first type of control word is utilized to specify a particular type of logic operation to be performed and a condition of the electrical element represented by the type of logic operation. The control words are sequentially placed in the store and collectively represent the number of switches or relay contacts in a single string of contacts associated with one of the conductors in the electrical ladder-type diagram. The termination of any given string of switch contacts or a conductor is identified in the program by a second type control word. This latter control word effects the storing of a status condition representative of the conducting status of the conductor to a location in the store as specified by that control word.

Each of the first type control words also specifies a location in the store to retrieve a status condition, the state of which controls the conduction of the relay contact represented by that instruction.

The programmable controller of the previously referenced application also includes means for sequentially addressing the store to retrieve the control words. Each control word is placed in an instruction register which generates output signals representative of an operation code and an address. The address is used to retrieve a status condition from the store. This status condition is combined with the operation code signals in suitable logic (defined as R-logic in the application) of the controller wherein a logic operation is performed to effect the accumulation of a status condition in an accumulator designated $F_R$. The accumulator provides a final output status condition representative of the result of a plurality of logic operations performed by the R-logic. This final status condition has a state representative of the conducting status of one of the conductors. This final status condition is then stored by the execution of the second type of instruction, the state of which serves to develop a control signal to be provided by the controller to external equipment.

The previously mentioned application also discloses means for placing a simulated permissive logic element or switch in a bus which is common to a plurality of conductors in the electrical ladder diagram. By the execution of a particular command, inserted at the beginning of any string of logic in the control program, the status of this permissive contact is stored in a storage means identified as $F_L$. The storage means communicates with the R-logic as one input variable and serves in the determining of the accumulated status for the accumulator $F_R$.

The sequencer of the present invention executes instructions utilizing the R-logic, the accumulator ($F_R$) and the storage mans ($F_L$) just described in connection with the aforementioned patent application. Reference is therefore made to that patent application for specific details regarding the aspect of the operation of the sequencer 12 of the present invention.

The sequencer, like many present-day data processors is capable of performing the functions of base addressing and address modification through indexing. Also, the sequencer contains a P register, or place counter, for keeping track of instructions presently under execution. These functions are performed by the sequencer by a plurality of registers residing in dedicated locations in the main store as shown in FIG. 2.

Referring to the top portion of FIG. 2 there are listed several locations identifying various registers residing in a scratch (read/write) area of the store. The first location contains the P register, or place counter which always contains the address of the current instruction under execution. A $B_p$ base register (procedure reference) at location @ 1 is utilized to contain an address referencing a store location during execution of programs to access various sub routines within procedure segments of the various programs. The third location @ 2 designated $B_d$ base register (data reference) always contains an address referencing some data base location in the store.

As previously mentioned, the sequencer is capable of bit addressing. Location @ 3 designated $B_b$ base register (bit reference) always contains a bit address in a word at a location specified by register $B_d$. Location @ 4 of index register (reference reference) $X_p$ always contains an address which is added to the contents of $B_p$ during the execution of certain instructions to effect instruction address indexing of the base register $B_p$. Additionally, location @ 5 contains $X_d$ an index register data and bit reference which always contains an address which is added to the contents of registers $B_d$ and $B_b$ during the execution of certain instructions.

Like most all data processors, the sequencer also requires registers for saving the contents of the P register and the base register during the execution of certain types of branch instructions. These registers reside in locations @ 6 and @ 7 as the SAVE location for P and the SAVE location for $B_p$ respectively.

Reference is now made to FIG. 3 which shows three instructions formats of types 1, 2 and 3 which the sequencer is capable of executing. The sequencer utilizes a 16 bit word with hexidecimal notations identifying each of the bits in the words. Type 1 instructions are those which address a specified bit in a store location addressed by that instruction. Bits 0 through 3 of the type 1 instructions specify a bit address y and bits 4 through 9 specify a word address Y. When a type 1 instruction is executed, the contents of the word address field Y addresses a location containing a data word and the bit address field y specifies a particular bit in that data word. Bit B of the type 1 instructions contains the designation X for indexing. The contents of bit B are examined during instruction execution to see if the address field of that instruction is to be index address modified. Similarly the contents of bit A are examined to see if that instruction is to be address base modified (B for basing). Bits C through F comprise the OP code field of the instruction, the contents of which identify the particular instruction.

Reference is now made to the type 2 instruction. Bits 0 through 9 contain a word address Y for addressing specified locations in the main store, the I&MM store and also for addressing the bus controller during the execution of a program. The type 2 instruction is utilized when bit addressing is not necessary (full 16 bit word). Bit A in the type 2 instruction serves the same purpose as Bit B in the type 1 instruction. The only difference between the op code field in the type 1 instructions and the type 2 instructions is that the OP code field in the type 2 instructions comprises bits B through F.

The sequencer is programmed to execute the type III instructions when it is desirable to perform counter and timing functions in response to signals derived from the operation of switches and frequency generators. Type III instructions are two word instructions. The first word of these types of instructions contains word (Y) and bit(y) address fields like the Type 1 instructions. Bits A and B also serve the same purpose as described for the Type I instructions. The OP code field (Bits C–F) identifies the first word as a counter/timer unit instruction for initializing a counter/timer in store.

The word address field Y of the second word specifies a word location in store like the Type II instructions. Bits A and B are used for address indexing and basing however reversed compared to the Type I instructions. Bits C–F of the second word contains a micro-code which specifies whether a counter or timer is being simulated in store to effect incrementation thereof in accordance with the contents of the microcode.

To provide a complete understanding of the operation of the invention, the instruction repertoire of the sequencer will now be described. In the following description of these instructions, the following nomenclature will be used.

A Represents the A register (accumulator)

Y Represents the value in the operand field (normally the word address)

y Represents the value in the bit address portion of the operand field.

K Represents the K register (used for BCD counting and shift count operations).

Y/y Bit y word Y.

$R_s$ Reset control flag loaded during the execution of the first word of Type III instructions.

( ) Contents of

CV Location in store of a word (current value) in BCD form representing the current state (count) of a counter or timer.

$B_i$ Represents a base register; i represents the base register location (such as $B_p$, $B_d$, $B_b$)

$X_i$ Represents an index register and i represents the index register location (such as $X_p$ or $X_d$).

I Represents the instruction address register IAR $(B_i).I_j$ This term represents the contents of the indicated base register such as $B_b$ if Bit J of the instruction address register (I) is a binary 1. (Example $I_A$, where A represents Bit A of the instruction address register. If $I_j$ is a binary zero then the next address is taken from the "P"- place counter register.

$(X_i).I_j$ This term represents the contents of the indicated index register such as $X_d$ if Bit J of the instruction address register (I) is a binary 1. If $I_j$ is a binary zero the next instruction is taken from the "P" place counter register.

Z Represents the value resulting from address computation.

z Represents a bit in value Z resulting from the address computation.

Z/z This term represents an effective memory address, Bit Z of value z.

R Represents the result bit of the $F_R$ flip-flop as described in aforementioned patent application.

L Represents the $F_L$ or left bus bit as described in the aforementioned patent application.

Each of the sequencer's instructions is listed by type below. Each instruction is listed by a descriptive name which is followed by the mnemonic code which identifies that instruction.

Type 1 Instructions

Load L Register (LDL)
  Function: This instruction copies the contents of the indicated (addressed) bit to the L register $F_L$.
  Effective Address: $Z/z = [(Y/y) + (X_d) I_B)] + (B_b.I_A)$
  Definition: (Z/z) into L Logic or False (LOF)
Logic or True (LOT)
Logic and False (LAF)
Logic and True (LAT)
  Function: These instructions each logically operate on the $(R)_r$ result bit, the (L), left bus bit, and the indicated (addressed) status bit, with the results of the logical operation going into R.
  Effective Address: $Z/z = [(Y/y +) X_d.I_B)] + (B_b.I_A)$
  Definition:
    LOF: (R)+[(Z/z).(L)] into R
    LOT: (R)+[(Z/z).(L)] into R
    LAF: (R).[(Z/z).(L)] into R
    LAT: (R).[(Z/z).(L)] into R Store Status (SST)
  Function: This instruction stores the contents of R into the indicated (addressed) bit location.
  Effective Address: $Z/z = [Y/y + (X_d).I_B )] + (B_b).I_A$
  Definition: (R) into Z/z Type 2 Instructions:

Load A Normal (LAN)
  Function: This instruction copies the indicated (addressed) word to A register.
  Effective Address: $Z = Y + (X_d).I_A$
  Definition: (Z) into A Load from Data (LAD)
  Function: This instruction copies the indicated (addressed) data word to the A register.
  Effective Address: $Z = Y + (X_d).I_A + (B_d)$
  Definition: (Z) into A Load A from Procedure (LAP)
  Function: This instruction copies the indicated (addressed) procedure word to the A register.
  Effective Address: $Z = Y (X_p).I_A + (B_p)$
  Definition: (Z) into A Store A Normal (SAN)
  Function: This instruction copies the A register to the indicated (addressed) location.
  Effective Address: $Z = Y + (X_d).I_A$ Definition: (A) into Z Store A to Data (SAD)
 Function: This instruction copies the A register to the indicated (addressed) data word location.
 Effective Address: $Z = Y + (X_d).I_A + (B_d)$
 Definition: (A) into Z Add to A Register (ADD)
 Function: This instruction adds the indicated (addressed) data word to the A register with the result going into the A register.
 Effective Address: $Z = Y + (X_d).I_A + (B_d)$
 Definition: (A)+(Z) into A, with carry into R Substract from A Register (SUB)

Compare Final Value (CFV)
 Function: Both of these instructions perform the same function. Substract the indicated data word from the A register, with the result going into the A register.
 Effective Address: $Z = Y + (X_d).I_A+(B_D)$
 Definition: (A) − (Z) into A, carry into R And to a Register (ANA)
 Function: This instruction performs a logic AND of the indicated (addressed) data word with the contents of the A register, with the result going into the A register.
 Effective Address: $Z = Y + (X_d).I_A+(B_d)$
 Definition: (A) AND (Z) into A Exclusive OR to A Register (ERA)
 Function: This instruction performs a logic exclusive OR of the indicated (addressed) data word with the A register, with the result going into the A register.
 Effective Address: $Z = Y + (X_d).I_A+(B_d)$
 Definition: (A) EXCLUSIVE-OR (Z) into A Decrement Memory and Establish R (DMR)
 Function: This instruction decrements the indicated (addressed) word and clears R if the value of the decremented word goes from 0 to −1. If not R is set.
 Effective Address: $Z = Y + (X_d).I_A$
 Definition: (Z) −1 into Z, with a carry to R
 Note: A DMR instruction to location @ 0 (P counter) will halt or stall the sequencer.

Shift Right Circular (SRC)
 Function: This instruction shifts the A register to right the indicated number of places or bits as specified by the number in the operand field. The bits shifted out of one end of the register are shifted back into the other end of the register, i.e. bits shifted from the right are shifted back into the left.
 Effective Operand: $Z = Y + (X_d).I_A$
 Definition: Shift N places, wherein N is equal to or less than 16.

Shift Right According to R (SRR)
 Function: The A register is shifted right the number of places specified by the number in the operand field of the instruction. The bits shifted out of the right of the register are lost, and the state of R is copied into the left of the register.
 Effective Operand: $Z = Y + (X_d).I_A$
 Definition: Shift N places wherein N is equal to or less than 16.

Branch if R Clear (BRC)
 Function: This instruction takes the next instruction from the indicated (addressed) procedure word if R = O, otherwise the next instruction in sequence is taken.
 Effective Address: $Z = Y + (X_p).I_A+(B_p)$
 Definition: Z into P, if R = O, otherwise do nothing.

Branch if R set (BRS)
 Function: This instruction takes the next instruction from the indicated (addressed) procedure word if R = 1, otherwise the next instruction in sequence is taken.
 Effective Address: $Z = Y + (X_p).I_A + (B_p)$
 Definition: Z into P, if R = 1, otherwise do nothing.

Branch Unconditionally (BRU)
 Function: This instruction takes the next instruction from the indicated (addressed) procedure word.
 Effective Address: $Z = Y + (X_p).I_A + B_p)$
 Definition: Z into P Jump Indirect and SAVE (JIS)
 Function: This instruction effects taking the next instruction indirectly from the indicated (addressed) word and correspondingly setting P and $B_P$ and saving the current contents of P and $B_P$ in the save locations for P (@ 6) and $B_P$ (@ 7) respectively.
 Effective Address: $Z = Y + (X_P).I_A$
 Definition:
  (P) into Save Location for P (@ 6)
  ($B_P$) into Save Location for $B_P$ (@ 7)
  (Z) into P and $B_P$ (@ 0 and @ 1 respectively)

Jump Indirect and Restore (JIR)
 Function: This instruction effects taking the next instruction indirectly from the indicated (addressed) word and restoring $B_P$ from the indicated (addressed) word incremented by one.
 Effective Address: $Z = Y + (X_p).I_A$
 Definition:
  (Z) into P
  (Z + 1) into $B_P$ Mask to Set R (MSR)
 Function: R is set if any one bits in the operand match corresponding status bits which are set.
 Effective Operand: $Z = Y +(X_d).I_A$
 Definition: (Z) AND (S); R is set if any resulting one bits, otherwise R is cleared.

No Operation (NOP)
 Function: This instruction is completely ignored and the next instruction is taken.

Delete (DEL)
 Function: This instruction is completely ignored and the next instruction is taken.

Reference is now made back to FIG. 1 to the remote terminals 26 and the I&MM 28. The terminals 26 and the I&MM 28 each contain the same interface logic which allows them to operate as similar units in response to the address and control signals generated by the bus controller 18. The remote terminals transfer information from sensor outputs of the process equipment to the bus controller and from the latter to control inputs of the process equipment for control purposes. The I&MM contains a control panel with indicators for displaying information received from the bus controller and switches which when operated, effect changes in information transferred from the I&MM to the bus controller. The I&MM control panel is shown in FIG. 4. The indicators and switches on the I&MM are the counterparts of the control inputs and the sensor outputs respectively of the process equipment.

For detailed description of the operation of the logic contained in the remote terminals and the I&MM in a control system of the type described by the present invention, reference is made to U.S. Pat. No. 3,924,240 entitled "System for Controlling Processing Equipment", Ser. No. 349,016 filed Apr. 9, 1974 to Arthur P.

Given and assigned to the assignee of the present invention. This application is incorporated herein specifically by reference for purposes of establishing a complete disclosure. However, in order to provide a thorough understanding of the operation of the invention, a brief description of the logic incorporated in remote terminals and the I&MM will be given.

Each of these units (remote terminals and the I&MM) includes address decode logic responsive to address signals from the bus controller for recognizing addresses intended for the units. Further each of the units contains routing logic. In the case of the terminals 26 the routing logic serves to transfer information between the bus controller and the process equipment. In the case of the I&MM it serves to transfer information between the bus controller and the I&MM indicators and switches. Control logic is also provided in each of the units for generating various control signals for controlling the addressing and information transfer sequencing. Further, each of the units is capable of containing a plurality of data transfer units of two types, designated an input termination unit (ITU) and an output termination unit (OTU). These data transfer units are selectively addressable from the address decode and routing logic.

When the bus controller 18 generates a system address on signal buses 32 and 34 each of those data transfer units in the various remote terminals and the I&MM recognizing the address will be latched in a selected state. Immediately following the system address, the bus controller may generate either an output data transfer function or an input data transfer function. In the case of the output data transfer function, the bus controller transfers data, via signal buses 32, 34 and bus interface 30 through one or more of the OTU's. In the case of the I&MM the data is transferred through the OTU(s) to the various indicator lights. In the case of the remote terminals the OTU's transfer the data to the control inputs of the process equipment.

Subsequent to the output data transfer function the bus controller may generate an input data transfer function, at which time those selected (addressed) ITU's in the remote terminals will transfer data provided thereto from the sensor outputs of the process equipment to the bus controller. In the case of the I&MM those selected ITU's will transfer data from various ones of the switches on the console.

Reference is now specifically made to the aforementioned patent application, System for Controlling Processing Equipment, Ser. No. 349,016 in conjunction with FIG. 4 of the present application which shows the I&MM control panel. The details showing the electrical interconnections of the various switches and indicators of the I&MM to the interface logic contained therein are not shown. This detailed information has been specifically omitted from the present application since, as will readily be seen, it is a simple matter to interconnect these switches and indicators to that interface logic.

Figure 5:
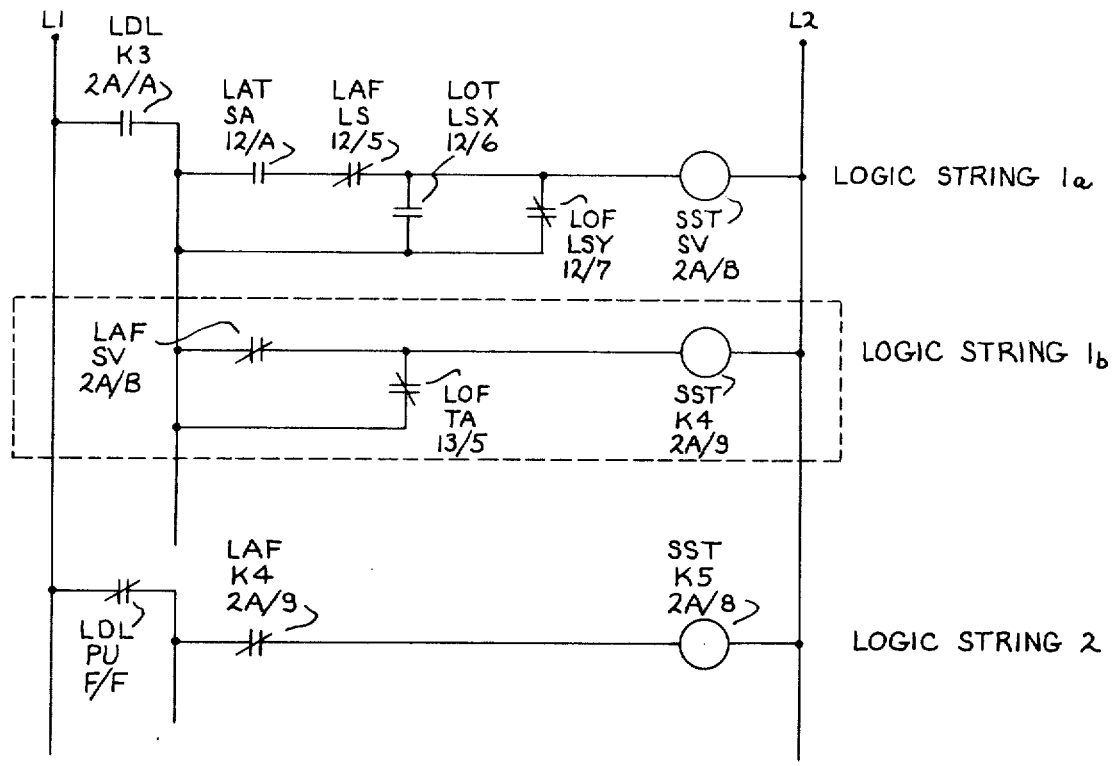
FIGS. 5, 33, 35, 36, 37 and 38 are electrical schematic drawings of typical ladder type diagram circuits useful in understanding the operation of the invention.

Referencing FIG. 5 of that application it will be noted that the two types of data transfer units (OTU and ITU) are shown at slots 1 and 2 respectively. In that figure output signal lines DOO through DON are shown as being provided to the process equipment. However, in the case of the I&MM, these signals are applied directly to appropriate indicator lamps on the I&MM. When output data from the bus controller (FIG. 1) is provided to the OTU in Slot 1, for example, the data on each of these various lines DOO through DON will cause their corresponding connected lamps to turn on or off in accordance with the states of the signals on these lines.

In a similar fashion the various switches on the I&MM panel are connected to data input lines DIO through DIN to provide corresponding input signals to the ITU in slot 2. It is obvious that the switches and indicators in the I&MM should be connected to a potential source. This source is provided by a block 36 as shown in FIG. 4. Whenever a lamp is to be illuminated, or when a switch is closed, appropriate continuity is established through the indicator or the switch to the source to either turn on the indicator or generate an input signal to the ITU, the signal being transferred to the bus controller.

In the ensuing description the details of how the OTU's and ITU's are addressed will not be discussed since this detailed information is covered in the previously referenced patent application. However, sufficient information will be given to enable one to thoroughly understand how the remote terminals and the I&MM operate in the system.

Prior to proceeding with a detailed description of the operation of the invention it is considered advantageous to describe the organization of data which resides within the system memory (main store and the I&MM store) of FIG. 1. Reference is now made to FIG. 5 which illustrates an electrical ladder type diagram to be simulated by the control or application program of the sequencer of FIG. 1. The diagram of FIG. 5 is comprised of two vertical buses L1 (left bus) and L2 (right bus). These buses are connected into the terminals of a power source not shown. Each of the strings of logic include a plurality of logic elements or switches shown as normally open or normally closed relay contacts and each string of logic terminates in a relay coil or status condition means having one end connected to the logic string and the other end connected to the L2 bus. Since each string of logic functions basically in the same manner, only the top logic string 2a will be explained. As previously mentioned, a common permissive contact or switch may be simulated by the program to control a plurality of logic strings. This permissive contact is shown in the top left of FIG. 5 as contact K3. It will be noted that each of the elements in the logic string 1A has associated with it three identifying symbols. The top one of these symbols specifies the mnemonic or symbolic operation code of a particular command to be executed by the sequencer to simulate the particular type of logic element. The second or middle one of the symbols is the symbolic name of a memory location (K3) specified by the third symbol 2A/A which is a physical memory address designating bit A of word location 2A. In logic string 1A the top symbols specify the commands LDL (Load L), LAT (Logic and True), LAF (Logic and False), LOT (Logic or True), LOF (Logic or False), and SST (Store Status). Coil designations are specified by the SST symbol.

As can be seen in FIG. 5 if the K3, SA, and LS contacts are all closed, continuity is established between L1 and L2 to energize the relay coil SV (SST). The logic string also includes two parallel connected contacts, LSX (LOT) and LXY (LOF). As can be seen the LSX and LSY contacts allow the incorporation of OR functions within the application program. For example, if contact K3 (LDL) is closed and contact LSY (LOF) is closed as shown, relay SV will be energized. Similarly if contact K3 is closed, LSY is open and LSX (LOT) is closed, the coil SV will be energized because of continuity established through the normally open LSX contact.

Figure 6:
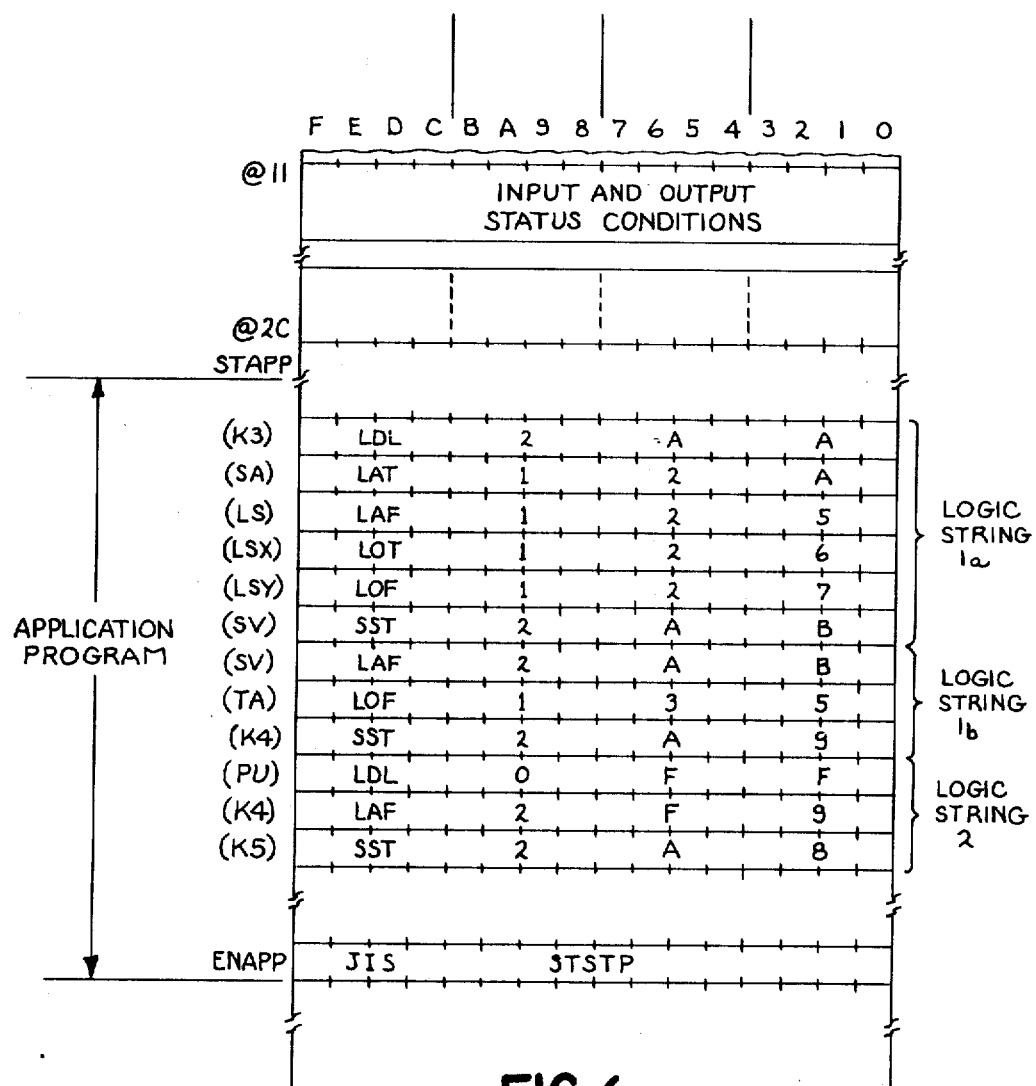
FIGS. 6 and 7 are memory maps showing in greater detail the organization of instructions and data in the memory of the data processor of FIG. 1.

Programming the sequencer utilizing a command structure of the type shown in FIG. 5 to simulate an electrical schematic is a relatively simple matter since the commands or instructions for each logic string may be sequentially stored in the main store directly from observation of the schematic. FIG. 6 shows how the logic structure of logic strings 1a, 1b, and 2 of FIG. 5 are stored as a simulated electrical schematic in the application program portion of the main store. The mnemonic symbol of each command, the actual memory location referenced by each command and the symbolic name of the referenced location have been transposed directly from FIG. 5 to the memory map of FIG. 6. For example, logic string 1A in FIG. 5 is stored as commands LDL, LAT, LAF, LOT, LOF and SST, with each command containing an actual memory address referencing a symbolic location in memory shown in parenthesis to the left of each command. Typical of all commands in LDL containing address 2AA, which references symbolic location (K3).

Figure 7:
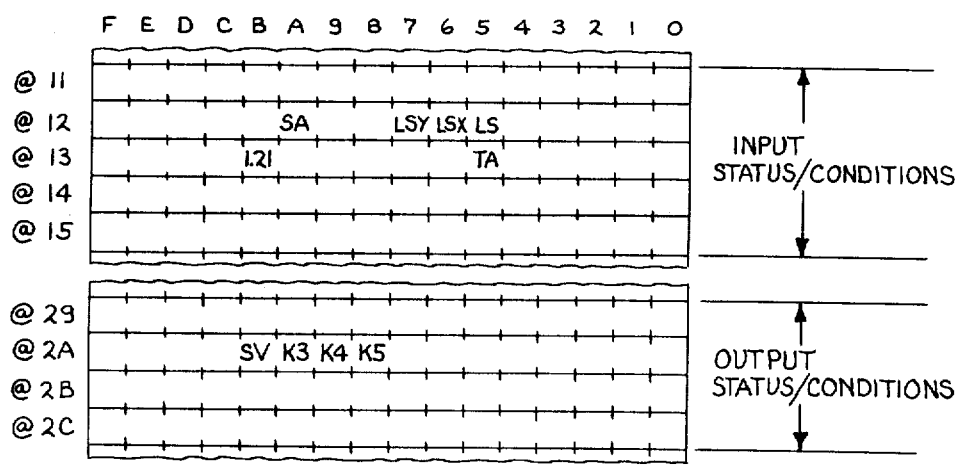

Reference is now made to FIG. 7 which shows the input and output status conditions regions of the main store as previously described in connection with FIG. 2. It will be noted that the LDL command of FIG. 6 references address location 2AA, which is the location of relay contact K3 shown in FIG. 7. Contact K3 is an output status contact located at bit position A or word 2A. Still referring to FIGS. 6 and 7, a typical input contact SA is referenced by an LAT command which addresses location 12A in FIG. 7. By observation it can be seen that each of the commands in FIG. 6 references an actual location in FIG. 7 of a simulated logic element having symbolic name identifying the element by type and specifying the normal condition of the element.

Reference is now made to the relay coil SV (SST) in logic string 1a of FIG. 5 and to the corresponding command in FIG. 6 referencing the output status location SV of FIG. 7. The SST command is used in the control program of the present invention to store the status condition of the contacts in a given string of logic, whereby logic string 1A is representative. When the SST command is executed by the sequencer, the operation code effects the storing of an accumulated status condition to a location in store as specified by the address field of the command. In the case of logic string 1A this location is SV, which has a memory address 2AB as shown by FIGS. 6 and 7. When the status condition is stored in the output status region, that status condition will be transferred from the store, through the bus controller and to the process equipment to control the latter. (FIG. 1)

Reference is now made to FIG. 2, the memory map of main store 14. The basic control for activating the system to control the transfer of information between the sequencer and the remote terminals, via the bus controller is accomplished by an executive program called the Initialization and Standard Status Program (ISSP). As shown in FIG. 2 the ISSP is divided into three segments designated the ISSP scratch area, the ISSP procedure segment and permanent constants for ISSP. The purpose and content of these three segments will subsequently be described.

Reference is now made to FIG. 8, which is a flow chart showing the basic operating cycle of the system of FIG. 1 without the I&MM. The operating cycle starts with the ISSP actuating the system hardware to read the process input signals from the process. Basically this reading of the process input signals is performed by actuating the bus controller, which scans or addresses the remote terminals to read the input signals into the main store. Depending on the type of process signals, the latter are either stored in the input region or the timer counter region (current values) of the main store (FIG. 2). The input signals stored in the input region each represent the status condition of a logic element such a relay contact or switch closer from the process equipment. Those input signals stored in the timer/counter region are stored as complete data words representative of the current value of a timer or couner (i.e., a count number).

Reading of the process input signals is preferably done in a sequential fashion, i.e., the information represented by the input signals is stored in sequential storage locations in the input and timer/counter regions. Further, as will subsequently be described, the addresses sent to the remote terminals have a one-to-one correspondence to the storage locations in the last mentioned regions. For example, each time a remote terminal is addressed via the bus controller, the input signals from the process equipment are transferred through the addressed remote terminal and placed in a location in one of the input regions have the same address as the remote terminal.

Once the controlling ISSP has effected the reading of all of the process input signals, the ISSP then actuates the bus controller to send output signals or status conditions to the addressed terminals from the output region of the main store. In a similar fashion to the reading of the input signals, the output signals are sequentially retrieved from the output region of the working store. The output signals are transmitted via the bus controller through the addressed remote terminals to the control inputs of the process equipment.

After the ISSP has completed sending the process output signals to the process equipment it then runs the application program. As previously described the application program is the descriptive control circuit(s) for controlling the process equipment. The application program, as previously described, resides in the application program segment of the main store (FIG. 2). It will be recalled from the description of FIGS. 5, 6 and 7 that the purpose of the application program is to update the status of the contacts or logic conditions in the output region of the main store. The status of the output contacts is updated in accordance with the input signals previously stored in the input region.

When the application program is completed it effects a program branch back to the beginning of the ISSP whereby the basic cycle is again repeated. The basic operating or sweep cycle of the ISSP is performed so rapidly that the externally controlled process equipment is not aware that it is being time-shared. The sweep rate of the system is dependent upon the total quantity of inputs and outputs handled and on the size of the application program.

The system also includes a special program referred to as the Installation and Maintenance Module Program (IMMP). The IMMP is a special program which operates in conjunction with the ISSP and is utilized to read input signals from the switches of the installation and maintenance module (I&MM) of (FIGS. 1 and 4).

The IMMP also controls the operation of the indicators on the control panel of the I&MM as shown in FIG. 4.

FIG. 9 is a flow chart showing how the IMMP operates with the ISSP. The IMMP is comprised basically of two programs designated IMMP1 and IMMP2. By comparing FIGS. 8 and 9 it can be seen how the IMMP is run in conjunction with the ISSP. In FIG. 9 IMMP1 is run by the controlling ISSP between the reading of the process input signals and the sending of the process output signals. IMMP2 is run by the controlling ISSP after the sending of the process output signals and before the running of the application program.

The primary function of the IMMP1 is to enable an operator operating the I&MM to inspect and change logic conditions in the input, output and application program regions of the store.

After the IMMP1 has run, the ISSP sends the output signals from the output region of the store to the remote terminals via the bus controller. It will be noted that IMMP2 is run subsequent to the running to the ISSP sending the output signals. To understand the purpose of the IMMP2 it is necessary to realize that one of the functions performed by the I&MM, while IMMP1 is running, is to selectively force the conditions of the status bits in the output region of the main store. The primary funtion of IMMP2 is to unforce those forced status bits and restore them to their natural states. The output status bits are unforced because a bit which exists in the output status region of the main store may be referenced by various logic operator instructions during the running of the application program which could cause erroneous data to be stored in the output region of the store.

When the IMMP2 has completed running, the controlling ISSP then runs the application program whereby, upon its completion, the sweep cycle is repeated as previously described in connection with the ISSP. The subsequent description will provide a detailed explanation of the I&MM and the IMMP.

DIGITAL BUS CONTROLLER

Figure 10A:
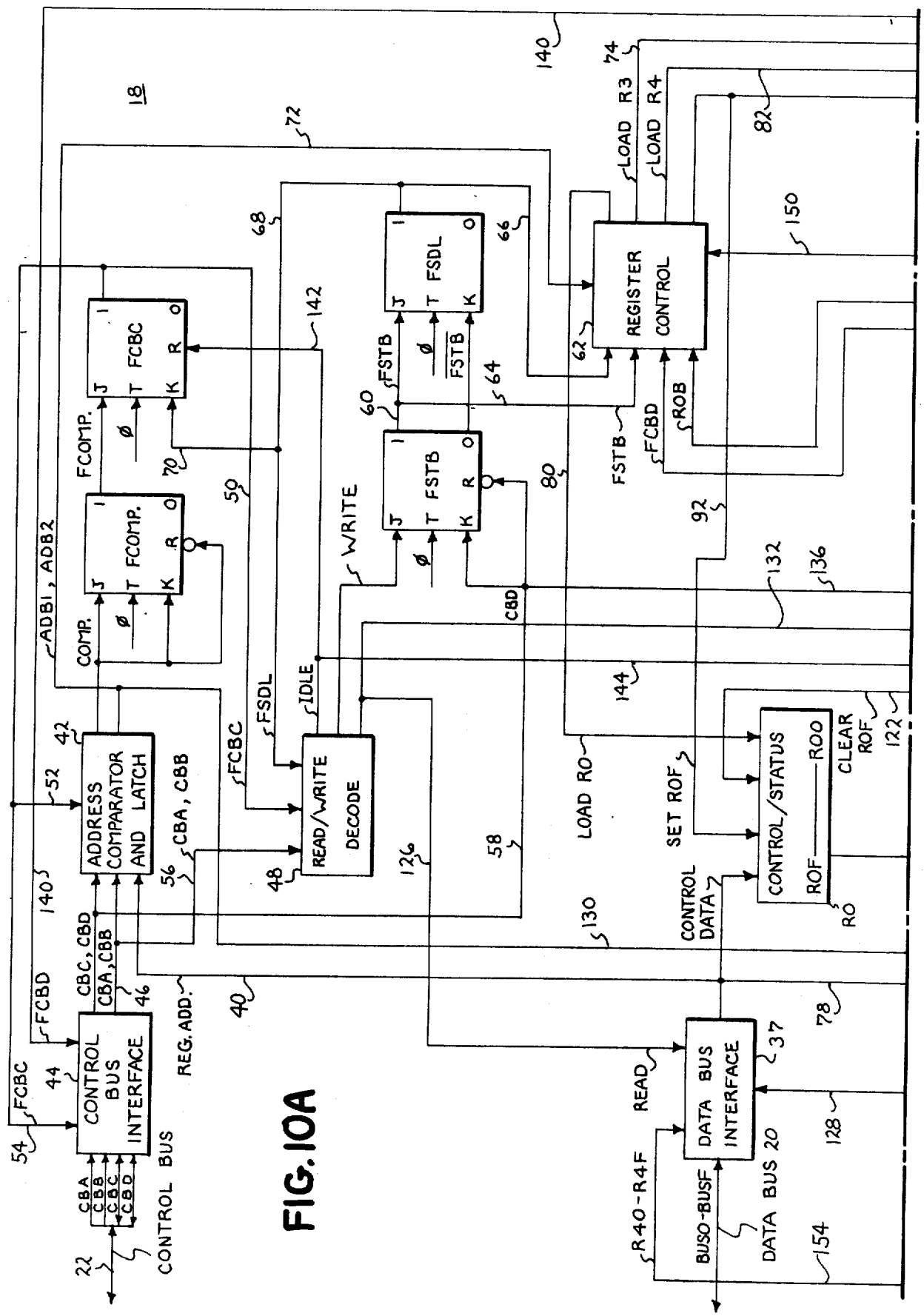
FIGS. 10A and 10B are detailed block diagrams of a bus controller of FIG. 1 for controlling the transfer of information between the computer and a plurality of remote terminals and the operator's console of FIG. 1.
Figure 10B:
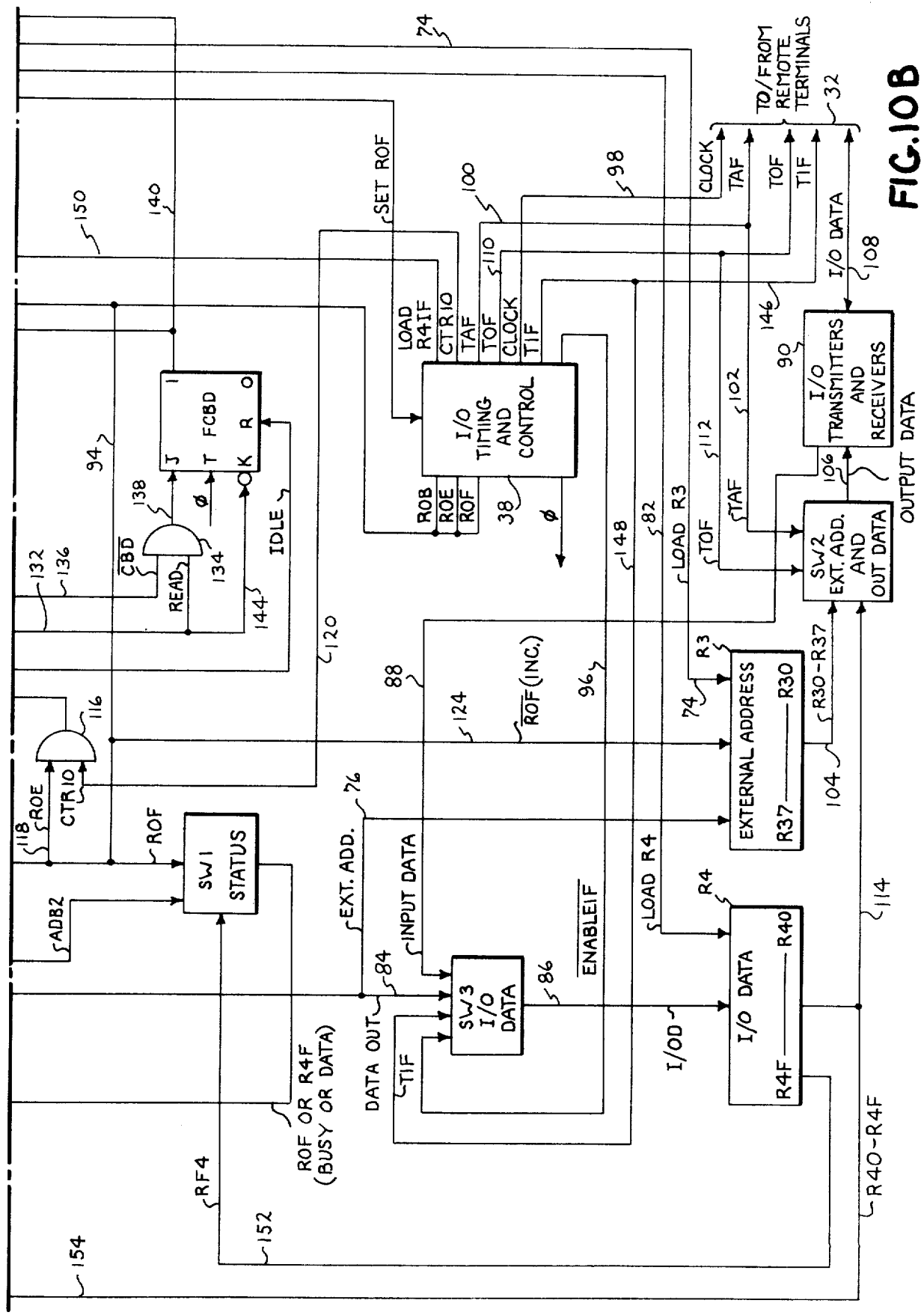

The digital bus controller 18 of FIG. 1 plays a significant part in the operation of the overall system because it is the primary interface hardware for controlling the transfer of input and output data between the sequencer, the remote terminals, which includes the I&MM. In order to get a thorough understanding of the operation of the ISSP, the I&MM and the IMMP it is necessary to understand the operation of the bus controller. The bus controller 18 is shown in logic schematic form in FIGS. 10A and 10B where FIG. 10 is a legendary drawing showing the relationship between FIGS. 10A and 10B.

The bus controller operates in two sequences. These are an output data transfer sequence and an input data transfer sequence. During an output data transfer sequence, information is transferred from the sequencer through the bus controller to either the remote terminals or the I&MM. During an input data transfer sequence information, from the remote terminals or the I&MM, is transferred through the bus controller to the sequencer for storage in the main store.

In order to enable the bus controller to perform either of its sequences, it must receive address and control information from the sequencer. The bus controller is addressable from the sequencer as if it were a memory. It also contains addressable registers for storing data in a similar fashion to a memory. In this regard, the bus controller responds to three of the previously described commands executed by the sequencer. The commands are the store A to data (SAD), logic and true (LAT), and load A from data (LAD).

The bus controller contains three registers, a control/status register (R0), an input/output or I/O data register (R4) and an external address register (R3). Each of these registers is virtually memory addressable from the sequencer and can be loaded with specific data during the execution of an SAD instruction. When data is loaded into any one of these three registers, it is done basically in the same manner as if the sequencer were writing data to the main or I&MM stores. In a similar fashion, the control/status and the I/O data registers round by are virtually memory addressable from the sequencer to read from these registers. The contents of the control/status register R0 is interrogated by the sequencer by reading from that register while executing an LAT instruction. The contents of the I/O data register are read into the main store, via the sequencer, during the execution of an LAD instruction.

The contents of R0 determine whether data is to be transferred to the remote terminals or received from the latter. The I&MM is considered a remote terminal in this latter statement. Although register R0 is shown containing 16 bits (ROO through ROF) only three of those bits ROB, ROE, ROF) are utilized in controlling the operating of the bus controller. The purpose and significance of these bits will subsequently be described in the operation of the bus controller.

Figure 11:
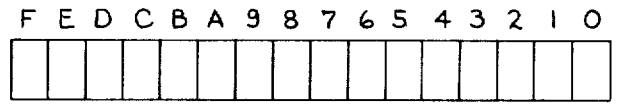
FIGS. 11, 12 and 13 are representative instruction formats of those words of which the bus controller of FIGS. 10A and 10B utilizes in transferring information between the computer and process equipment.
Figure 12:
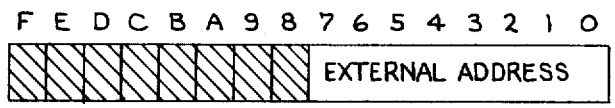
Figure 13:

All information which is transferred over the data bus 20 between the sequencer and the bus controller passes through a data bus interface 37 (FIG. 10). Bus 20 is a 16 bit bus shown carrying information or signals on lines designated BUS0-BUSF. Information is transferred over bus 20 in a plurality of word formats as shown by FIGS. 11, 12 and 13. FIG. 11 shows that all addresses for R0, R3 and R4 are presented to the bus controller from the sequencer as a 16 bit word. FIG. 11 also shows that all input and output data transferred between the sequencer and the remote terminals passes over data bus 20 and a 16 bit word.

All external addresses for addressing the remote terminals are loaded into R3 from the sequencer. These addresses are transferred to the bus controller from the sequencer over the data bus 20 in a format as shown in FIG. 12. The hashed out lines in bits 8 through F of FIG. 12 indicate that these bits are not utilized in the system.

FIG. 13 shows the data format of R0. Only three bits of R0 are utilized in the system, where the cross hashed bits are not used. As shown in FIG. 13 when bit ROB or R0 is equal to a binary 1, the bus controller will generate an output data transfer sequence. When bit ROB is equal to a binary 0 the bus controller will generate an input data transfer sequence.

Another bit in the control/status register R0, bit ROE, is utilized to enable or disable a clock signal in the bus controller which is provided on the external bus 32 (FIGS. 1 and 10B) to control the clocking of data into and out of the remote terminals. Under certain conditions, during the operation of the system, it is desirable to prevent sending any control signals to the process equipment which could have an adverse affect on the end product being produced.

Bits ROB and ROE of th control/status register R0 are always loaded with either a binary 1 or a binary 0 from the sequencer.

During the operation of the system it is necessary that the sequencer, which contains the ISSP and the IMMP, be notified when the bus controller is in the process of transferring data or if it is idle. Bit ROF of the control/status register R0 is utilized to notify the ISSP and the IMMP that the bus controller is either busy or not busy. When the sequencer executes a LAT instruction addressed to the bus controller, bit ROF is interrogated by the program (ISSP) or IMMP) to determine the operational state of the bus controller. If bit ROF is equal to a binary 1 the bus controller is busy, i.e. it is transferring either input or output data between the bus controller and the remote terminals. If bit ROF is equal to a binary 0 ($\overline{busy}$) the program is notified that the bus controller is available for initiation of either an input or output data transfer sequence. Bit ROF is controlled solely within the bus controller. This bit is not loaded or controlled from data provided to the bus controller from the sequencer.

With the preceding brief overview of the bus controller in mind, its operation will now be explained in detail. The operation will first be described with the controller 18 going through an output data transfer sequence, then through an input data transfer sequence.

The Programs, ISSP and IMMP, as will subsequently be described, are written in such a fashion that the instructions affecting the bus controller are presented in a predetermined sequence. That is, when initiating either an output or input data transfer sequence, the instructions supplied to the bus controller from either the ISSP or the IMMP are provided in a specified sequence corresponding to that type of sequence.

Figure 15:
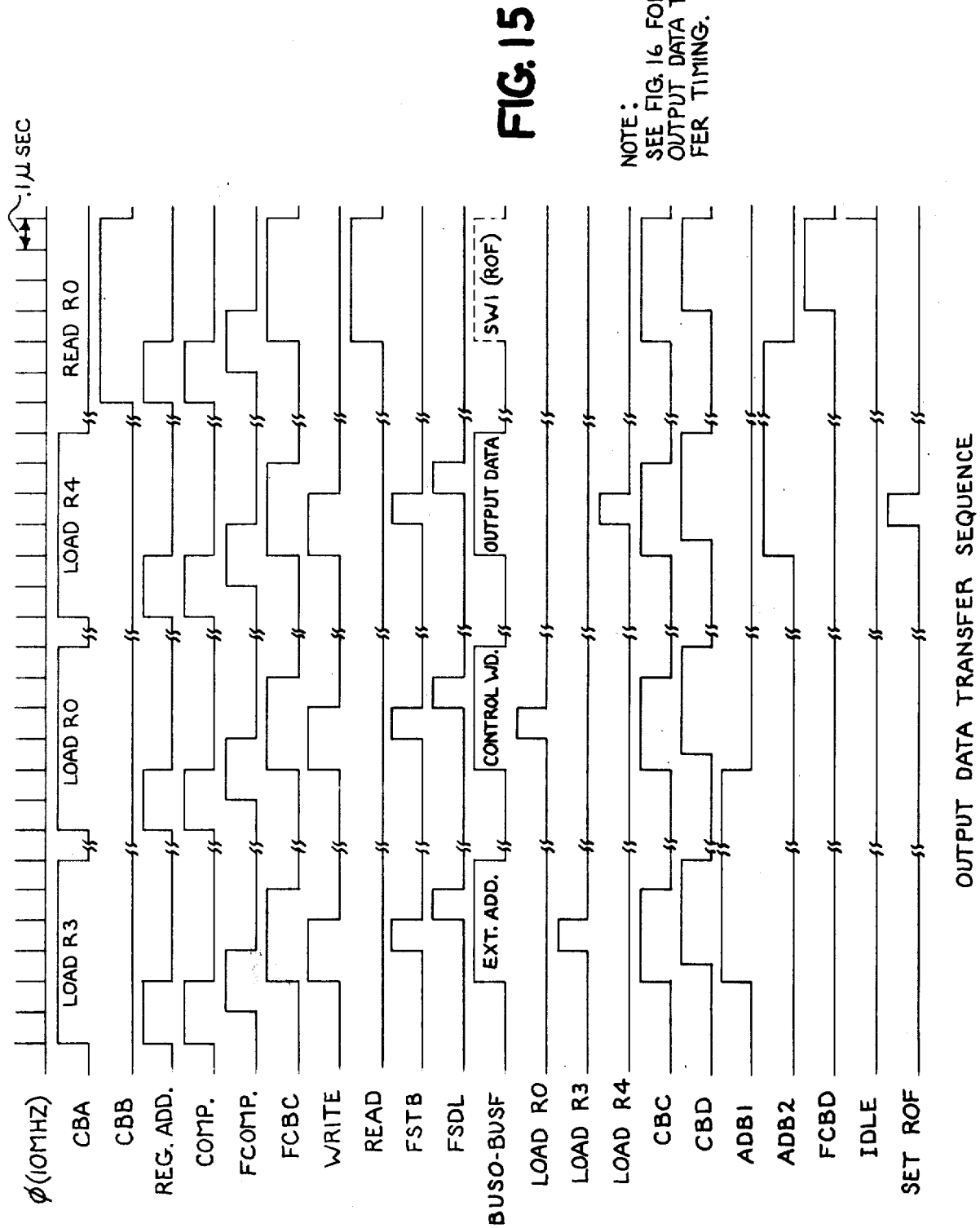
FIGS. 15, 16, 17 and 18 are timing diagrams useful in understanding the operation of the bus controller of FIGS. 10A and 10B.
Figure 16:
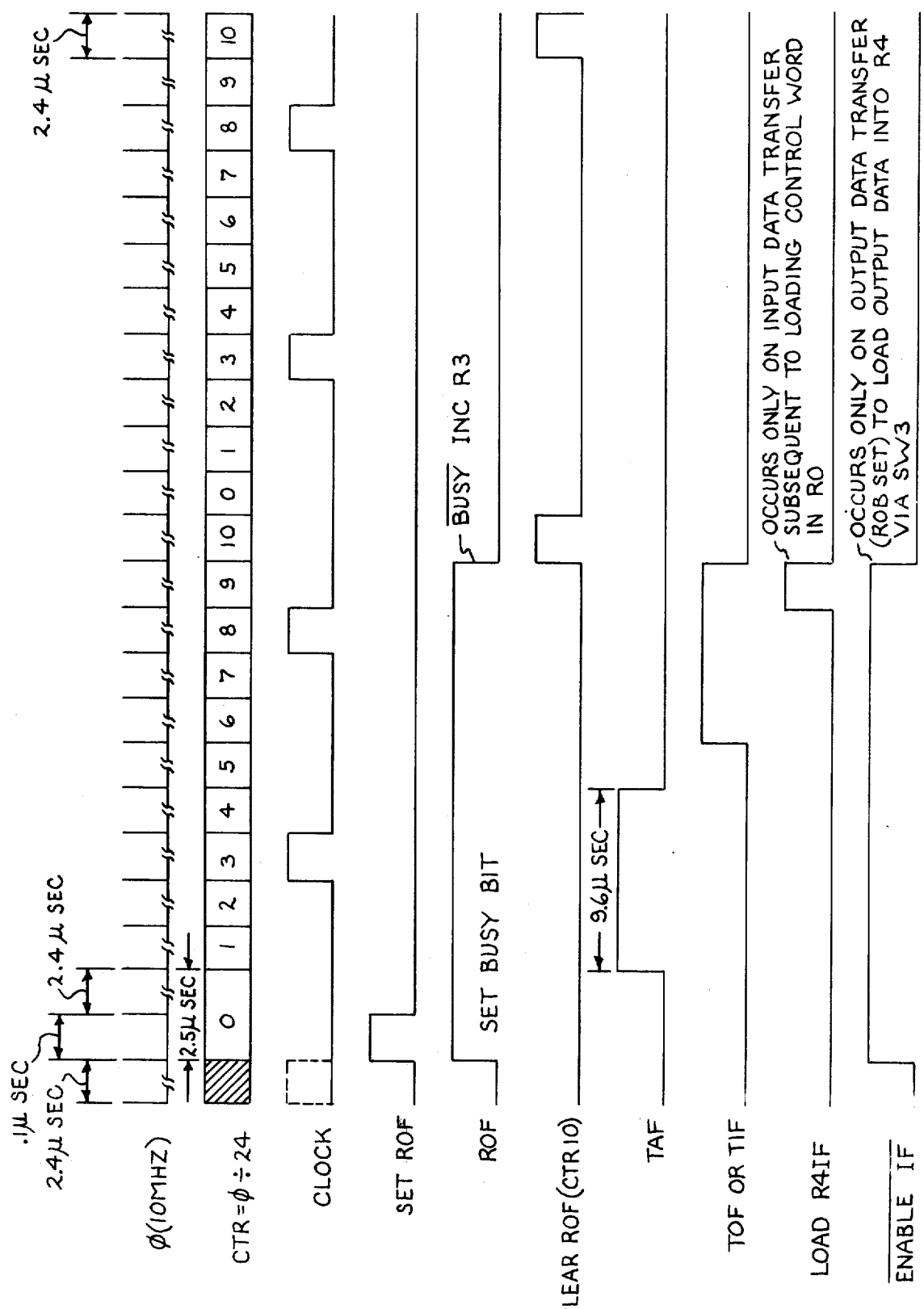

Certain blocks in FIGS. 10A and 10B contain decode and control logic for controlling specified functions in the bus controller. The logic internal to these blocks is not shown in drawings, however, they will be fully explained by reference to FIG. 14 which is a listing of the equations for implementing the logic in each of the blocks. Also, FIGS. 15 and 16 are two timing diagrams which will be referred to and are useful in an understanding of the operation of the bus controller output data transfer sequence.

It will be noted in FIG. 10B that an I/O timing and control block 38 generates an output signal $\phi$. This signal $\phi$ is utilized as shown in the timing diagrams of FIGS. 15 and 16 as the master clock signal for timing all operations in the controller, such as setting and resetting of the various flip-flops. The I/O timing and control 38 is shown generating the signal $\phi$. In the ensuing description it will be assumed that the sequencer also operates off of the same basic clock signal $\phi$ as does the bus controller. In this manner all operations will be synchronized over the control bus 22 and the data bus 20. Also let it be assumed that all of the controller flip-flops and registers start off in the reset state (all binary 0's). To initiate an output data transfer sequence it is first necessary to assume that the A register in the sequencer presently contains an external address, to be placed in Register R3 of the bus controller. Also assume that the IAR register in the sequencer contains a register in the sequencer presently contains an external address, to be placed in Register R3 of the bus controller. Also assume that the IAR register in the sequencer contains a register address for addressng R3. Let it now be assumed that the sequencer executes a store A to data (SAD) instruction. With the execution of the SAD instruction the sequencer generates two control bus signals CBA and CBB having binary 1 and 0 states respectively (FIG. 15). The sequencer places the register address (R3) from the instruction address register (IAR) on the data bus 20 (BUS0-BUSF). The register address is passed through the data bus interface 37 and applied as REG. ADD. signals on a plurality of lines 40 to an address comparator and latch 42. This register address has a 16 bit format for addressing R3 as shown in FIG. 11.

During this address register transfer phase the CBA signal is propogated through a control bus interface 44 via one of the conductors 46 and applied to the address comparator and latch 42 in conjunction with the REG. ADD. signals. Reference is now made to the address comparator and latch equations of FIG. 14. There it is shown that a compare (COMP) signal is now generated as a binary 1 and applied to the J and K input terminals of a compare flip-flop (FCOMP). The generation of the COMP signal is shown in the timing diagram to be coincident with the register address signals. By observation of the timing diagram it can be seen that all of the conditions specified in the equation for the generation of the COMP signal are satisfied at the time that the REG. ADD. and the CBA signals are applied to the address comparator and latch.

The COMP signal now causes FCOMP to achieve a set state upon the occurrence of the next $\phi$ signal applied to the T terminal of FCOMP. A 1 output terminal of FCOMP now generates a signal FCOMP which is applied as a binary 1 to a J input terminal of a control bus flip-flop FCBC. FCBC will now set upon the application of the next $\phi$ signal as shown in FIG. 15. With FDBC set, a binary 1 output signal FCBC from its 1 output terminal is simultanteously applied to a read/write decode 48, the address comparator and latch 42 and the control bus interface 44 via conductors 50, 52 and 54 respectively.

Reference is now made to the address comparator and latch equations in FIG. 14 for generating two address signals designated ADB1, ADB2 from the address comparator and latch 42. In the equation the REG. ADD. term is respresentative of any one of the address for addressing R0, R3 or R4. Thus, a particular address (REG. ADD.) and the FCBC term will generate ADB1, ADB2 or both from the address comparator and latch 42. At the present time the REG. ADD signals applied to the address comparator 42 are decoded to generate the address signal ADB1, shown as a binary 1 in FIG. 15. ADB1 is generated coincident with the FCBC signal. Additionally suitable latch circuitry, such as flip-flops, within the address comparator 42 latch up to remember the address ADB1. Address ADB1 will be retained in the latch circuitry until the REG. ADD. signals applied to the address comparator change to a different address.

Reference is now made to the read/write decode 48 which receives the two control bus signals CBA and CBB on conductors 56 in conjunction with the presently generated FCBC signal on line 50. Referring to the read/write decode equations of FIG. 14, it will be noted that the terms for generating a write signal are presently satisfied as shown in the timing diagram of FIG. 15. The write signal is now generated and applied to a J or set input terminal of a strobe flip-flop FSTB. The FSTB flip-flop will now achieve a set state upon the occurrence of the next $\phi$ signal. The FSTB flip-flop is only set for one time period, i.e. the time between two of the φ signals. In order to understand this timing of the FSTB flip-flop, it is now necessary to refere back to the control bus interface 44. It will be recalled that the FCBC signal is presently being applied to the control bus interface. The FCBC signal causes the control bus interface 44 to gate a control bus signal CBC as shown in FIG. 15 to the sequencer on the control bus 22. Logic internal to the sequencer, but not shown, recognizes the presence of the CBC signal and causes the sequencer to generate a CBD signal back to the bus interface on bus 22. A sight spacing is shown between the occurrence of the CBC, and CBD signals to indicate that there is a slight propagation delay between the generation of the two signals. The CBD signal is now applied from the control bus interface on conductor 58 to a K input and a reset terminal (R) of the FSTB flip-flop. As shown in FIG. 15 the binary 1 CBD signal causes flip-flop FSTB to reset upon the occurrence of the next φ signal. The purpose of the CBD signal being applied to the R terminal having an inverter (circle) is to cause the FSTB flip-flop to be held in a reset state whenever the CBD signal is a binary 0.

Reference is now made back to the 1 output terminal of the FSTB flip-flop where the FSTB signal is a binary 1 as a result of the write signal causing it to set. The FSTB signal is applied to two places, to a J or set input terminal of a delayed strobe flip-flop FSDL on conductor 60 and as one input to a register control logic 62 on a conductor 64.

The FSDL flip-flop achieves a set state upon the occurrence of the next φ signal (FIG. 15). A binary 1 output signal form the 1 output terminal of flip-flip FSDL is simultaneously applied to the register control 62, the read/write decode 48 and to the K or reset input terminal of the FCBC flip-flop on conductors 66, 68 and 70 respectively. Reference is now made to the read/write decode 48 and to the corresponding equations (FIGS. 10A and 14). It will be noted that the term $\overline{FSDL}$ forms a part of the equation for generating the write signal from the read/write decode. Since flip-flop FSDL is now set, the $\overline{FSDL}$ signal is a binary zero disabling the write signal causing it to become a binary zero. Also, the binary 1 FSDL signal applied to the K input terminal of the FCBC flip-flop causes that flip-flop to reset on the next φ signal. When FCBC resets the FCBC signal goes to a binary 0, thus removing the CBC signal from the control bus 22 and from the sequencer.

At the outset of this discussion, it was stated that an external address will be loaded into the external address register R3 for addressing the remote terminals. This is accomplished as shown in FIG. 10A by the generation of a signal load R3 from the register control logic 62. The register control equations of FIG. 14 for generating the load R3 signal require two terms; ADB1 and FSTB. Referring to the timing diagram of FIG. 15 it can be seen that coincidence now exists between the FSTB signal applied to the register control on conductor 64 and the ADB1 signal from the address comparator and latch applied to the register control on one of conductors 72. It is during the coincidence of these latter two signals that the load R3 signal from the register control is applied via conductor 74 to the external address register R3 to gate the external address (EXT. ADD.) into R3 from the data bus interface via conductors 76 and 78.

To understand how the EXT. ADD. signals are applied to R3 it is necessary to refer back to the timing diagram of FIG. 15 and to the control and data bus interfaces of FIG. 10A. It will be recalled that the setting of flip-flop FCBC effected the gating of the CBC signal to the sequencer. The generation of the CBC signal notifies the sequencer that the address of R3 is latched in the bus controller so that the sequencer can transfer the external address (EXT. ADD.) into R3 from the data bus interface via conductors 76 and 78.

To understand how the EXT. ADD. signals are applied to R3 it is necessary to refer back to the timing diagram of FIG. 15 and to the control and data bus interfaces on FIG. 10A. It will be recalled that the setting of flip-flop FCBC effected the gating of the CBC signal to the sequencer. The generation of the CBC signal notifies the sequencer that the address of R3 is latched in the bus controller so that the sequencer can transfer the external address (EXT. ADD.) from its A register to the controller. This transferring of the EXT. ADD. is shown in FIG. 15 whereby lines BUS0-FUSF carry the EXT. ADD. signals which are applied to the data bus interface 37. It will be noted that the EXT. ADD. signals at the output of the data bus interface are applied to the register R3 via conductors 76 and 78 in coincidence with the load R3 signal. This coincidence effects the loading of the external address into R3. Flip-flop FSTB is reset due to the CBD signal at its K terminal, thus removing the load R3 signal. The FSDL flip-flop is reset on the first φ signal following the resetting of the FSTB flip-flop. Also at this time the FCBC flip-flop resets as a result of the FSDL signal at its K terminal removing the CBC signal from the control bus 22 to the sequencer.

The sequencer controls the removal of the CBA and CBD signals from bus 22 and the external address signals from bus 20 one φ signal after the CBC signal is removed from bus 22.

Register R3 has just been addressed and loaded with an external address to be used to address the remote terminals during the output data transfer sequence. To place the bus controller in an output data transfer mode, register R0 will now be loaded with a control word having the format of FIG. 13.

Prior to proceeding with a description of how the control word is loaded from the sequener into R0, attention is called to the timing diagram of FIG. 15. In that figure there are break lines showing a separation between the writing of data into the various controller registers; e.g., the break lines shown in the load R3 and load R0 signals. These lines are shown to indicate that there may be a time lag between the loading of the registers. That is, the controlling program (ISSP or IMMP) may be written in such as fashion that the starting external address can first be written into R3 of the bus controller. The program then could execute several instructions (e.g., housekeeping, processing of data, etc.) and, after executing these instructions, come back and write the control word to R0. The bus controller has been designed to operate in this fashion to achieve the speed and efficiency of operation desirable in on-line real process control systems of the type being described.

To understand how the control word is written into R0 it is necessary to make basic assumptions similar to that as previously described for loading R3. First it should be asumed that the controlling program (ISSP or IMMP has placed a control word having the format of that shown in FIG. 13 in the sequencer's A register. Since this is to be an output data transfer sequence, the format of this word will have Bits ROB and ROE both equal to a binary 1. As previously described Bit ROF of the control word will always be a binary zero. This bit is not controlled by the sequencer or program. It is controlled by internal logic within the bus controller as will be subsequently described. It should also be assumed that the sequencer IAR register contains an address for addressing R0 (see FIG. 11).

In a manner similar to that just described for the loading of R3, the sequencer will execute an SAD (store A to data) instruction. This time, the execution of the SAD instruction will cause the contents of the IAR register to present an address on the data bus 20 which will address R0. By observing FIG. 15 it can be seen that the timing for writing of the control word to R0 is exactly the same as just described for R3. Thus, this portion of the operation of the bus controller will not be described again. The only difference between the operation of the bus controller while loading R0 compared to loading R3 is the generation of a signal Load R0 from the output of the register control 62 and the generation of the appropriate address signals ADB1 and ADB2 to effect the generation of the load R0 signal.

When the sequencer executed the SAD instruction, the register adress signals (REG. ADD.) applied to the address comparator and latch 42 cause the two signals ADB1 and ADB2 to achieve the binary zero state (FIG. 15). These two signals are applied to the register control as $\overline{ADB1}$ and $\overline{ADB2}$ where they are combined with the signal FSTB to generate the load R0 signal (see register control equations of FIG. 14). The load R0 signal is thus gated to R0 on a conductor 80. The control word from the data bus interface 38 is gated into R0 by the laod R0 signal at a time shown in FIG. 15.

The bus controller now contains all of the information in its appropriate register (R0 and R3) in preparation to transfering output data to the remote terminals.

The operation of the bus controller will now be described related to how output data from the sequencer is loaded into register R4 and transferred from the controller to the addressed terminal(s). It should first be assumed that the controlling program (ISSP) or IMMP) has previously placed an output data word in the sequener A register having a 16 bit word format as shown in FIG. 11. Also it should be assumed, as previously described for the loading of R0 and R3, that the sequencer IAR register contains an address for addressing R4, the I/O data register. In a manner as previously described for loading R0 and R3, the sequencer executes an SAD instruction which activates the address comparator and latch 42 to generate the necessary ADB1 and ADB2 signals. These signals are applied to the register control 62 via conductors 72 to effect the generation of a load R4 signal. As shown in the register control equations of FIG. 14 the load R4 signal is generated in response to ADB2 and FSTB. The timing relationships between these two signals is shown in FIG. 15. The load R4 signal from the register control is applied on conductor 82 to R4 to gate output data into that register. The output data (data out) destined for R4 is applied from the data bus interface 37 to the input of a multiplexer switch SW3 via conductors 78 and 84 and applied to R4 from SW3 on conductors 86 as signals I/OD.

Switch SW3 is the type of switch which allows data to be transferred from two different sources. The source transfer is controlled by the application of two input signals designated $\overline{ENABLE\ IF}$ AND TIF. The two sources from which data is to be transferred through SW3 is from the data bus interface 38 in the case of an output data transfer sequence and from a plurality of I/O transmitters and receivers 90 on conductors 88 during an input data transfer sequence. Since the present discussion is dealing only with the transfer of output data, only $\overline{ENABLE\ IF}$ signal will be discussed at this time.

To understand how the $\overline{ENABLE\ IF}$ signal is generated, reference is first made to FIGS. 14, 15 amd 16. In the I/O timing and control equations of FIG. 14 the ENABLE IF signal is generated as a binary 1 in response to two binary 1 signals, ROF and ROB. ROF and ROB are signals from bits ROF and ROB of register R0 (FIGS. 10 and 16). To understand how bit ROF is set to a binary 1 it is necessary to refer to the register control equations of FIG. 14 and to the timing diagrams of FIGS. 15 and 16. As shown in those figures, a signal, set ROF, is generated upon the coincidence of three binary 1 signals, (ROB, ADB2 and FSTB). The set ROF signal is generated by the register control 62 (FIG. 10A) to perform two functions. The first of these functions is the application of the set ROF signal to register R0 via conductor 92. The set ROF signal causes bit ROF of R0 to achieve a binary 1 state, thus causing the bus controller to go busy as shown in FIG. 16. With bit ROF now in the set state a binary 1 signal ROF is applied to the I/O timing and control logic 38 on one of conductors 94.

Reference is now made back to the I/O timing and control equations of FIG. 14 to the equation for $\overline{ENABLE\ IF}$. It can now be seen that that signal is a binary 1 due to the coincidence of the binary/signals, ROF, and ROB, applied to the I/O timing and control logic on their corresponding conductors 94. The coincidence of these two latter signals causes the $\overline{ENABLE\ IF}$ signal to become a binary 1 on conuctor 96 effecting the transfer of the output data through SW3 into the I/O data register R4.

With the external address now in R3, the output data in R4 and with the bus controller busy (bit ROF set) the output data now can be transfered to the remote terminals. The transferring of the output data is accomplished intwo phases, an address transfer phase and a data transfer phase.

Reference is now made to FIG. 16 which is a combination input/output timing diagram showing the timing relationships between timing signals for controlling the transfer of data between the terminals and the bus controller. In the present description, only those timing signals related to the output data transfer sequence will be described.

Prior to proceeding with a further description of the output data transfer sequence it is considered advantageous to explain the generation of timing signals by the I/O timing and control 38 (FIG. 10B). It should first be noted that the timing diagram of FIG. 16 is based on an entirely different time frame than that previously explained in connection with FIG. 15. The $\phi$ signal is still utilized in FIG. 16 as a basic clock to time all operations within the system. This difference in time frame is manifested by breaklines in the $\phi$ signal showing that 24 of the $\phi$ signals appear in each 2.4 microsecond period shown (24 $\phi$ signals × 0.1 $\mu$sec = 2.4 $\mu$sec).

The I/O timing and control 38 contains a frequency divider, of which there are many well known types, for dividing the φ signal by 24. The frequency divider used in the timing and control preferably uses a resettable counter and associated counter decode logic which sequentially generates a plurality of count signals CTR0 – CTR10 as shown in FIG. 16. Each of the CTR signals has a time period of 2.4 μsec with the exception of the CTR signal which has a 2.5 μsec. The frequency divider counter preferably runs continuously, counting from 0 to 10 and back to 0.

Reference is now made to the set ROF signal of FIG. 16. One of the functions of this signal in the I/O timing and control is to reset the frequency divider counter to zero each time the bus controller goes to a busy state (bit ROF set). Resetting the cunter insures that it will always start from zero during each data transfer sequence, whether it be an input or output data transfer. An explanation of why count CTR0 has a 2.5 μsec. period can be understood by reference to the set ROF signal of FIGS. 15 and 16. It will be recalled that the set ROF signal shown in FIG. 15 has a pulse width of 0.1 μsec. The same set ROF signal appears in FIG. 16. During the period that the set ROF signal is present (binary 1) the frquency divider counter is held in a forced zero state shown by count CTR0. Upon termination of the set ROF signal (binary 0) the counter is then allowed to begin counting the φ signals. It is this set ROF signal which adds the 0.1 μsec to the 2.4 μsec period normally possessed by counts CTR1 – CTR10. The previously mentioned decode logic of the frequency divider generates an output clock signal for transmission to the remote terminals each time the counter achieves either a count of 3 (CTR3) or a count of 8 (CTR8). This clock signal is provided to the terminals on a conductor 98 of bus 32 (FIGS. 10B and 16). FIG. 16 also shows that bit ROF of register R0 is set on the leading edge of the set ROF signal. Bit ROF will remain in the set state until the end of the output data transfer sequence. How bit ROF is reset will be described as the description proceeds.

It will now be explained how the bus controller transfers output data to the remote terminals by reference to FIGS. 10B, 14 and 16. To address the terminals the controller first generates a transfer address function signal TAF on conductor 100 from the I/O timing and control. It is this signal which is transferred over the I/O bus 32 to the remote terminals to transfer the external address previously loaded into the external address register R3. As shown in FIG. 16 TAF signal has a pulse width of 9.6 μsec, which lasts from counts CTR1 through CTR4. The equation for generating the TAF signal is shown in FIG. 14 under the I/O timing and control equations. As can be seen, it is the combination of the ROF signal from R0 to one of the conductors 94 to the I/O timing and control and counts CTR1-CTR4 which generate the TAF signal.

The TAF signal is also applied via a conductor 102 to a switch SW2. Switch SW2 is a multiplexer switch like the previously described switch SW3. SW3 responds to two input cntrol signals, TOF and TAF, to control the transfer of data therethrough from two sources (R3 and R4). In this particular instance, the TAF signal directs the external address in R3 (bits R30–R37) on conductors 104 through SW2 to the transmitters of I/O data transmitters and receivers 90 on conductors 106. The external address is thus transmitted on conductors 108 of Bus 32 to the remote terminals in conjunction with the TAF signal on conductor 100.

The TAF signal, in conjunction with the external address signals, is applied to the remote terminals, causing these terminal(s) recognizing the address to go into an addressed latched state. As previously mentioned, the details of how the remote terminals operate in response to the TAF and the external address signals can be found in the previously referenced patent application, SYSTEM FOR CONTROLLING PROCESSING EQUIPMENT, Ser. No. 349,016. The addressed terminal(s) is now latched in its addressed state ready to receive output data from the bus controller.

The I/O timing control next generates a transfer output function signal, TOF, also having a pulse width of 9.16 μsec. The I/O timing and control equations of FIG. 14 show that the TOF signal is generated in response to the ROF and ROB signals from register R0, and the timing signals CTR6–CTR9.

The TOF signal is applied to the remote terminals from the timing and control via conductor 110 of bus 32 and to switch SW2 on conductor 112. The TOF signal now direct the previously stored output data from register R4 on conductors 114 as bits R40–R4F through SW2 to the transmitters of I/O transmitters and receivers 90 on conductors 106. The addressed remote terminal(s) receives the output data on conductors 108 along with the TOF signal on conductor 110, the latter signal gating the output data to the process equipment control inputs (FIG. 1).

Not previously mentioned was how the clock signal shown in FIG. 16 is generated. As shown in the I/O timing and control equations of FIG. 14, the terms required to generate the clock signal are ROE, the enable clock signal bit loaded into the control status register R0 from the sequencer at the outset of the present discussion and counts CTR3 or CTR8. From the equation and FIG. 16 it can be seen that a clock signal is generated each time the counter achieves a count of 3 (CTR3) and a count of 8 (CTR8). From the equation it is obvious that the clock signal will not be generated when bit ROE of register R0 is reset. It is the presence of the clock signals applied to the remote terminals on conductor 98 from the I/O timing and control 38 (FIG. 10B) which enables the terminals to transfer the output data to the process equipment. If the clock signal is not present the remote terminals cannot be addressed to enable the transfer of data to the process equipment. It is a desireable feature in controllers of the present type to be able to sometimes prevent sending control signals to the process equipment, eg, should a catastrophic failure occur in the process equipment, it may be desirable to immediately cease sending control signals which could have an adverse affect in the operation of the equipment. In the controller, the clock signal can of course be stopped by the program causing the sequencer to laod bit ROE of register R0 with a binary 0 by executing an SAD instruction as previously described.

Reference is now made back to FIG. 10 to an AND gate 116 receiving, as one input, the ROE signal on conductor 118 from the control status register R0. The other input signal to AND gate 116 is CTR10 on conductor 120 from the I/O timing and control 38. The coincidence of the ROE and CTR10 signals generates the clear ROF signal at the output of AND gate 116 on conductor 122 which is applied to R0, resetting bit ROF to a binary 0 state. As shown n FIG. 16 when bit ROF resets the bus controller to go to the not busy ($\overline{BUSY}$) state.

When bit ROF resets a binary 1 signal $\overline{ROF}$ (INC.) is applied from register RO to the external address register R3 on conductor 124. The ROF (INC.) signal increments the address previously loaded into the external address register R3 by 1. The purpose of incrementing R3 will become clear in the ensuing description.

Also, as shown in the I/O timing and control equations of FIG. 14, when the ROF signal achieves a binary zero state the conditions no longer exist to satisfy the $\overline{ENABLE\ IF}$ signal. As a result the $\overline{ENABLE\ IF}$ signal achieves a binary 0 state disabling SW3 so that it cannot pass data to register R4.

This completes the explanation of the operation of the bus controller for one complete output data transfer sequence whereby one word of output data has been transferred from the I/O Data Register R4 to at least one remote terminal addressed by an external address in the address register R3.

Once a data transfer sequence (output or input) has been initiated, the sequencer must wait until that transfer sequencer is complete before another sequence can be initiated. The controlling program (ISSP or IMMP) and the sequencer detect the completion of a data transfer sequence by interrogating or examining the state of bit ROF (busy bit) of register RO. The operation of the controller, when bit ROF is being interrogated by the sequencer, is shown by FIGS. 10A, 10B and 15. The break in the signal lines separating the two columns entitled LOAD R4 and READ RO indicates that the sequencer, under control of the controlling program, can interrogate the busy status of the bus controller at any time during an output data transfer sequence. To interrogate the controller the sequencer, under control of the controlling program, can interrogate the busy status of the bus contoller at any time during an output data transfer sequence. To interrogate the controller the sequencer, under control of the controlling program, executes an LAT (Logic and True) instruction to test the status of bit ROF in the bus controller. The timing for interrogating bit ROF is shown in the read RO column of FIG. 15. When the sequencer executes the LAT instruction, signals CBA and CBB are applied as binary 0 and 1 respectively to the control bus interface 44. Simultaneously, the register address is applied to the data bus interface 38 which in turn provides the REG. ADD. signals to the address comparator and latch 42. Signals COMP, FCOMP and FCBC are generated in the same manner as previously described for load R3, RO and R4. This time the REG ADD signals applied to the address comparator and latch cause the output signals ADB1 and ADB2 to both become binary 0's when FCBC sets. See the equations in FIG. 14 for ADB1 and ADB2.

Also at this time a read signal is generated by the read/write decode 48. The read signal is applied to the data bus interface via conductor 126 to enable the bus interface to transfer data from the controller to the sequencer. The data to be transferred in the present instance is bit ROF, which is applied to the bus interface 38 on conductor 128 from a multiplexer switch SW1. SW1 functions in a manner similar to switches SW2 and SW3. SW1 is presently enabled by the binary 0 state of the ADB2 signal on conductor 130 from the address comparator and latch to transfer bit ROF from register RO to the data bus interface 38. Bit ROf from SW1 is thus gated by the read signal, from the controller to the sequencer over data bus 20 at a time shown in FIG. 15 as signal SW1 (ROF), the latter signal shown in dotted lines to indicate that bit ROF will either be set (busy) or reset ($\overline{busy}$).

It will be recalled from the previous description that the sequencer generates the CBD signal when registers RO, R3 and R4 are loaded. However, when the sequencer is reading data from the controller the CBD signal is generated by the controller. This is best explained by referring to FIGS. 10A and 15. The binary 1 read signal from the read/write decode 48 is applied on conductor 132 as one input to an AND gate 134. The other input to AND gate 134 is a binary 1 signal CBD, supplied from the control bus interface 44 via conductors 58 and 136. AND gate 134 is now enabled applying a binary 1 set signal on conductor 138 to a J input terminal of a flip-flop FCBD. As shown in the timing diagram of FIG. 15, flip-flop FCBD achieves a set state in response to the first $\phi$ signal following the generation of the read signal. Flip-flop FCBD is now set generating a binary 1 output signal FCBD from its output terminal on a conductor 140. The FCBD signal is applied to the control bus interface 44 via conductor 140 wherein the FCBD signal is gated to the sequencer over the control bus 22 as a binary 1 CBD signal. The CBD signal notifies the sequencer that data is on the data bus 20 (bit ROF) whereby the sequencer stores the data in the main memory in the form of a bus controller status word for testing by the controlling program.

When data is read from the controller, the FCBC flip-flop is reset by an idle signal shown in FIG. 15. An equation is shown in FIG. 14 under the read/write decode equations for generating the idle signal from the read/write decode 48 of FIG. 10A. As shown in FIG. 15, the equation is satisfied when the sequencer removes the CBB signal from the control bus 44. At the instant CBB goes not true, $\overline{CBB}$ goes true to a binary 1 generating the idle signal as a short pulse which is simultaneously applied to an R (reset), terminal of the FCBC and FCBD flip-flop via conductors 142 and 44 respectively. Both of these flip flops are reset at the same time as shown in FIG. 15 thus removing the CBC and CBD signals from the control bus 22 to the sequencer.

It is well to recognize at this time that the controlling program may be written to cause the sequencer to execute the LAT instruction several times in sequence to test for the busy status of the controller, or the LAT instruction may be interspersed, as determined in the program, to be periodically executed. In any event as soon as the busy test, as determined by the controlling program, indicates that the bus controller is no longer busy, the controlling program can then continue to direct the sequencer to transfer additional output data to the remote terminals via the controller.

It was previously mentioned that it is sometimes desirable to transfer large blocks of data to several remote terminals. When large blocks of data are to be transferred it is not necessary to reload registers RO and R3. The reason for this is because RO always retains its control word information, i.e., unless its contents are changed by the controlling program. Also register R3, at the end of each data transfer sequence, contains the previous external address plus one (i.e., it is incremented at the end of each data transfer sequence). To transfer large blocks of data, the control program merely has to load a new output data word into register R4 after the busy test indicates that the controller is not busy (i.e., the controller has completed the previous output data transfer sequence). To accomplish the block transfer the sequencer merely repeats the steps of loading R4 and reading RO (test for busy) until the desired number of data words have been transferred from the sequencer through register R4 out to the remote terminals.

From the previous description it can now be seen how the system of the present invention sequentially or randomly transfer output status information or data from the output region of the store of FIG. 2.

This completes the explanation of how the bus controller operates in an output data transfer sequence. The operation of the bus controller, during an input data transfer sequence, will now be described.

Figure 17:
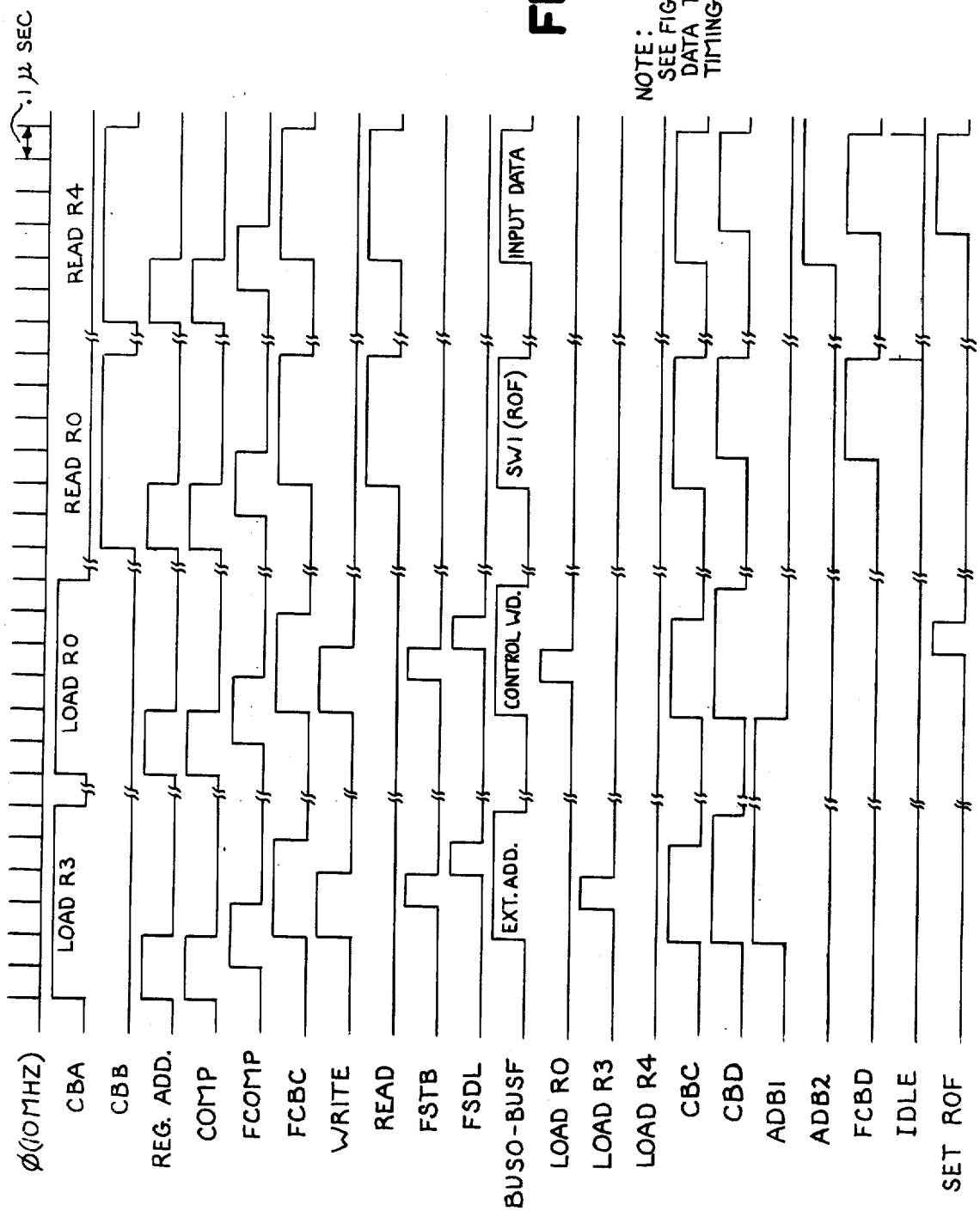

Reference is now made to FIGS. 10A, 10B, 16 and 17. FIG. 17 is a timing diagram showing the operation of the bus controller during the input data transfer sequence. The steps which are required to activate the bus controller for an input data transfer sequence are as follows.

Step 1 - the Controlling Program (ISSP or IMMP) writes an external address to register R3 of the controller from the sequencer (FIG. 17).

Step 2 - the Controlling Program then loads a status word from the sequencer into register RO, directing the controller to read input data from the remote terminals. The controller also goes BUSY at this time, beginning the transfer of the input data to the I/O data register R4 from the remote terminals.

Step 3 - At sometime subsequent to the beginning of the input data transfer sequence, the controlling program reads the contents of register RO to test for the busy status of the controller.

Step 4 - When the results of Step 3 indicate that the controller is not busy (bit ROF reset) the controlling program reads the contents of register R4, thus placing the input data into a location in the main store as specified by the address of an instruction STA (store A register).

Step 5 - Once the input data has been stored in the main store, the controlling program can then read RO, testing for $\overline{BUSY}$. When the controller goes not busy (bit ROF reset) the controlling program can then read the contents of R4 into the main store. Register R3 is incremented by one each time the controller goes not busy. This tes*ing for busy and the reading of R4 can be continued by the program until the desired amount of data has been read from the remote terminals.

In explaining the operation of the input data transfer sequence, basically the same assumptions can be made as those previously described in connection with the output data transfer sequence. That is, assume first that the sequencer contains in its A register an external address word to be loaded into register R3 for addressing the remote terminals. Also assume at this time that the sequencer executes an SAD (store A to data) instruction which will place the external address for register R3 on the data bus 20 (BUSO–BUSF). Upon the execution of the SAD instruction, the sequencer loads the external address into R3 in the same manner as previously described for the output data transfer sequencer. Also, as previously described, the sequencer loads a control word from its A register into the control status register RO by the execution of a second SAD instruction. However, the contents of this control word now have the format as shown in FIG. 13 whereby bits ROB and ROF are both binary 0's. The state of bit ROF instructs the bus controller to begin the input data transfer sequence. As previously described, the clock in the I/O timing and control is enabled by bit ROE being a binary 1.

The operation of the bus controller during the load RO phase of the input data transfer sequence is the same as previously described for the output data transfer sequence with the exception, that the signal set ROF is generated at this time. Reference is made to the timing diagram of FIG. 17 and to the set ROF signal under the register control equations of FIG. 14. As can be seen in FIG. 17 the terms to satisfy the equation at this time are FSDL, ROB (read input data), $\overline{ADB1}$ and $\overline{ADB2}$. The set ROF signal has a pulse width controlled by the FSDL signal.

Reference is now made to the timing diagram of FIG. 16. This is the same timing diagram as previously described in connection with the output data transfer sequence. As shown the set ROF signal causes bit ROF of register RO to set, causing the bus controller to go busy.

The TAF signal which is applied to SW2 and to the remote terminals (FIG. 10B) is generated in the same manner as previously described. The TAF signal gates the external address from register R3, to the remote terminals. However, in the present instance, since input data is to be transferred from the remote terminals to the sequencer, the controller I/O timing and control generates an transfer input function signal, TIF. The equation for generating the TIF signal is shown in FIG. 14 under the I/O timing and control equations. The TIF signal is generated at this time for the duration of counts CTR6 –CTR9 because bit ROF is set (controller busy) and bit ROB is reset ($\overline{ROB}$). The TIF signal is transferred to the remote terminals on conductor 146 causing the addressed remote terminals to gate their input data from the process equipment into the receivers of the I/O transmitters and receivers 90 via the I/O data bus 32 on conductors 108. The input data is transferred to SW3 from the I/O transmitters and receivers via conductors 88.

The TIF signal is also applied to SW3 on conductor 148. SW3 is now activated by the TIF signal allowing the input data to be transferred therethrough to the I/O data register R4 as signals I/OD. Reference is now made to FIG. 14 to the equation for the load R4 signal. The load R4 signal is generated at this time as a function of a load R41F (Load R4 on input function) signal supplied on conductor 150 to the register control 62 from the I/O timing and control 38. In FIG. 14, under the I/O timing and control equations, it can be seen that the load R41F signal is generated due to coincidence between the signals ROF, $\overline{ROB}$ and CTR9. It is at the count of CTR9 that the load R4 signal is applied to register R4 gating the input data into that register.

Bit ROF is cleared at the count of CTR10 in the manner as previously described to place the controller in the $\overline{BUSY}$ condition (see FIG 10A). Also the $\overline{ROF}$ (INC) signal increments the external address register R3 in the same manner as previously described in connection with the output data transfer sequence in preparation to transferring another word of data from a newly addressed remote terminal(s). It should be noted that the input data now resides in R4 in preparation to being transferred to the sequencer. However, before the input data can be transferred, the controlling program must test for the busy condition of the controller, i.e., is the input transfer complete (R4 loaded and bit ROF reset)? In FIG. 17 the controller is activated by the controlling program to read RO (test for $\overline{busy}$) in the same manner as described in connection with the output data transfer sequence. That is, bit ROF of RO is tested by the controlling program executing an LAT instruction to determine if the controller has completed its input data transfer sequence.

Once the controlling program has determined that the input transfer sequence is complete, it can then effect the reading of the input data from R4 into the main store. The previously stored input data is read from R4 by the controlling program executing an LAD instruction with an address which causes the contents of that register to be gated on to the data bus 20. The operation of the bus controller during the execution of an LAD instruction to read R4 are the same as previously described for read R0 with the exception, that the address in the LAD instruction causes the ADB2 signal from the address comparator 42 to be supplied to SW1 as a binary 1.

Figure 18:
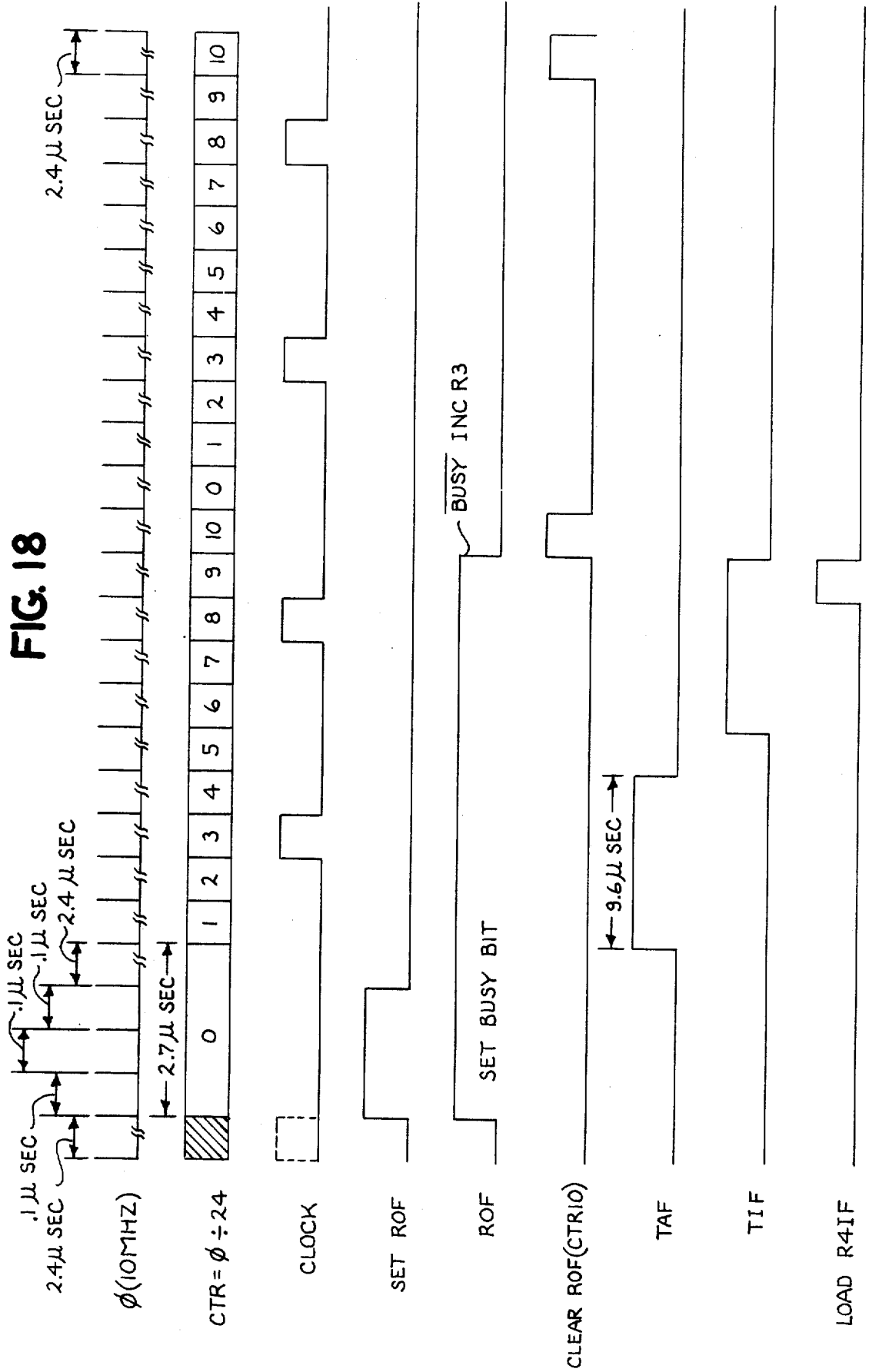
Figure 19:
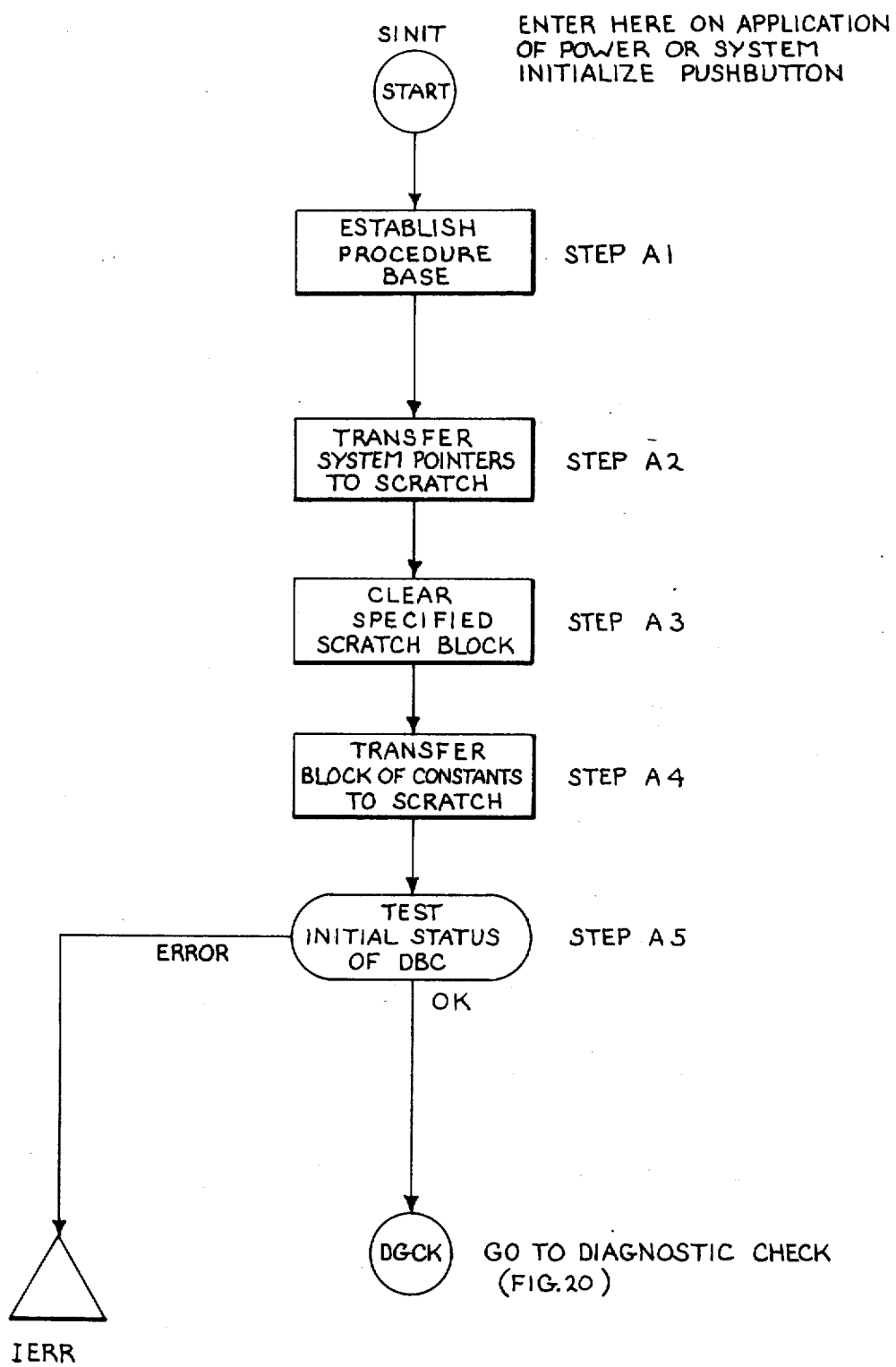
FIGS. 19 through 29 are program flow charts describing the operation of the executive program of the present invention for directing the transfer of information between the computer and the remote terminals of FIG. 1.

The ADB2 binary 1 signal now enables SW1 to pass Bit R4F from register R4 via conductor 152 through SW1 to the data bus interface Bits R40-R4E 0+R4 are also supplied to the data bus interface on conductors 154. Also, at this time, since the Read signal is present, the contents of register R4 are gated through the data bus interface on to the data bus 20 and placed in the sequencer A register. The set R0F signal is also generated during read R4 and setting Bit R0F, thus causing the controller to go busy as shown in the timing diagram of FIG. 18. Those signals for gnerating the set ROF signal are present as shown in FIG. 17 in the Read R4 column and as manifested by the terms ADB2, ROB and FCBD in the set ROF equation of FIG. 14. The timing diagram of FIG. 18 is basically the same as FIG. 16 with the exception that the counter remains at a count of CTR0 for 2.7 µsec. as opposed to 2.5 microseconds as shown in FIG. 16. The reason for this is because the set ROF signal, which resets the counter, is at a binary 1 state for 0.3 microseconds (FIG. 18) instead of 0.1 microseconds (FIG. 16). As can be seen during read R4 (FIG. 17) and by the set ROF equation the pulse width of the set ROF signal is determined by the FCBD signal. After the set ROF signal achieves a binary B state the counter (CTR) will begin to count in the manner as previously described for the output data transfer sequence.

The I/O timing and control logic will now sequentially generate the TAF, TIF and LOAD R4 signals in the same manner as previously described for load R0 of the input data transfer sequence (FIG. 17).

It is significant to note that the input data transfer sequence is basically a two operation. This is made clear by referring to the "Ready R4" column of FIG. 17 and to FIG. 18. It will be noted that data is first transferred from register R4 into the sequencer for storage in the main store by the read signal. As shown in FIG. 18, new input data is next loaded into register R4 when the load R41F signal is generated. Once the bus controller completes an input data transfer sequence, i.e., reads input data from R4 into memory and loads new input data into R4, it goes not busy as shown in FIG. 18 ($\overline{BUSY}$). The controlling program will now normally begin executing LAT instructions to test for $\overline{BUSY}$. condition of the controller while the new input data is being transferred from the terminals into R4. When the controlling program determines that the bus controller is no longer busy it can then execute another SAD instruction to repeat the "Read R4" phase of the input data transfer sequence. This process of reading input data from R4, loading new input data into R4 and testing for the $\overline{BUSY}$ condition of the controller can continue until the required number of input data words have been transferred into memory. The amount of input data transferred is determined by the controlling program.

This completes the operational description of the bus controller. With this background information of how the bus controller operates, the ensuing description will first deal with the operation of the initialization and standard program (ISSP) and how it functions to control the overall operation of the system. Following the description of the ISSP, the installation and maintenance module program (IMMP) will then be explained. The IMMP will be explained in conjunction with the operation of the Installation and Maintenance Module (I&MM) and how an operator operating the I&MM can observe status conditions of data stored in the store and make changes, additions and deletions in the stored data.

DESCRIPTION OF THE EXECUTIVE

The executive program of the present system is comprised basically of three programs. These programs are defined as the Initialization and Standard Status Program (ISSP), the Installation and Maintenance Module Program (IMMP), and the Application Program. These three programs each compliment each other to form the executive program, in that they are written to interface with one another to control industrial process equipment and to effect on-line changes in the executive program desirable for efficient system operation. Due to the design of the executive program, it is possible, however, to describe the operation of each of these programs individually. This will be done in the order starting with; (1) a description of the ISSP, (2) a description of the IMMP, and then, (4) a description of how these three programs interface with one another in an industrial process control system.

Description of ISSP

The ISSP is a program for on-line control of an industrial process and forms an integral part of the application program and the IMMP. The ISSP resides in memory in the format as shown in FIG. 2 as briefly mentioned previously. It consists of, an ISSP procedure segment, a permanent constants for ISSP segment and an ISSP Scratch Area. The primary functions of the ISSP are to initialize the memory by clearing specified regions and areas, setting up system pointer addresses, recovering after a power failure while the system is in a test mode and operating with the I&MM and initializing specified constants and flags or indicators in memory. The ISSP also performs diagnostic tests such as, checking the status of the bus controller 18 (FIG. 1) for proper sequencing and checking the operating of the various instructions used in the application program for simulating the necessary electrical and logic functions for controlling the process equipment.

Operating on-line, the ISSP also controls the reading of external input signals in the form of data from the process equipment and stores a duplicate copy of those input signals as states or status conditions also an input region of the memory as shown in FIG. 2. Additionally, the ISSP controls the transferring of output control signals as states or staus conditions from an output region of the memory to the process equipment control inputs via controller 18, and the selectively addressable remote terminals 26.

Another important feature of the ISSP is that it provides the proper interface and system information for the operation of the installation and maintenance module (I&MM) by transferring control to and receiving control from the IMMP. The ISSP also provides control of various counters, data base registers and data index registers which reside in the memory of FIG. 2. The ISSP also controls the program when the latter simulates repeated loop logic functions for simultaneously controlling several like machines, such as mechanical drives.

The present system is also capable of containing within the memory timers and counters shown as timer/counter regions in FIG. 2. Control of these timers and counters is also a function of the ISSP.

Prior to proceeding with the discussion of the operation of the ISSP, it is considered advantageous to briefly describe the organization of the data in the program as it resides in the memory. Once the system user has defined his system structure and has written the application program which defines that structure, he then is in a position to specify parameters for input to an assembler program for assembling the executive program. These parameters are specified in symbolic code form and are provided as inputs to the assembler which uses them to establish the memory map as shown in FIG. 2 and to assign various locations in the memory for program usage. The input parameters are tabulated on pages A1–A5 of Appendix A. On pages A1–A4 an EQL symbol is utilized to indicate "assign symbolic equivalent", i.e., the symbol EQL is used to assign an equivalent value to a symbol during the assembly process of the program. For example, referring to Page A1 the expression SINIT EQL @ 400 means assign the symbolic code SINIT to @ 400 where @ means address. In a similar fashion on page A5 a symbol EQB is used during the assembly process to indicate "assign a symbolic equivalent for a bit". For example, under "bit definitions for DBC status, page A5, DBBSY EQB DBSRG, #F means assign the contents of symbolic code location DBBSY to be equal to bit F of symbolic code location DBSRG.

A comparison of pages A1 and A2 with FIG. 2 shows how the symbolic codes are associated with their respective memory locations. The user of the system defines these various symbolic memory locations and appends to them their true memory address locations by listing them in a manner as shown in pages A1 and A2. In this manner the user defines the sizes and the boundaries of the various areas, segments and regions in the memory of FIG. 2.

The ISSP Scratch Area of FIG. 2 contains a plurality of addressable storage locations designated ● B0 through ● CF for containing words or information items representative of address pointers, counters/timers, etc. Each of these words is defined on page A4 under "Definitions of Words in ISSP Scratch Area". These locations are written into and read from during the execution of the ISSP to control the operation of the program. The purpose of the information contained in each of the locations ● B0 through @ CF will be described in the subsequent operational description of the ISSP.

The ISSP also contains a Permanent Constants Area for ISSP (FIG. 2) which retains data words constants, etc. which are used for controlling the executive program. A listing of the Permanent Constants is shown on pages A23–A26 of "Program Constants and Presets". The symbol CON on those pages is a flag for the assembler identifying the words as constants to be assembled into the permanent constants area of the memory.

Pages A6 through A22 is a symbolic program listing of the portion of the ISSP contained in the ISSP procedure segment of FIG. 2. The procedure segment contains a chronological listing of instructions for carrying out the execution of the executive program by the sequencer. In view of the detail presented by the listings on pages A6–A22, it is not considered necessary to provide a detailed description of the execution of every instruction as shown in those listings, as it is considered that one having ordinary skill in the programming art could follow these listings and practice the invention as set forth therein. However, to provide a thorough understanding of the operation of the ISSP, it will be described by reference to the flow charts of FIGS. 19 through 29, with reference being made to the apropriate pages of Appendix A when considered necessary.

The execution of the ISSP begins by a computer operator either turning electrical power on to the system or activating an initialization pushbutton (not shown) within the sequencer 12 (FIG 1). The sequencer automatically forces a bootstrap address of @ 400 into the P register (@ 0) to start the program entering into Step A1. See FIG. 19 and page A6. As shown in the memory map of FIG. 2, location SINIT is at @ 400 of the ISSP procedure segment. In step A1 the ISSP establishes the procedure base by setting the procedure base register @ 1 to @ 400, the start location of the ISSP procedure segment.

The ISSP now goes to Step A2. In Step A2, under control of an index loop as listed in page A6, the first 10 words of the program constants and presets on page A23 are transferred from the permanent constants for ISSP segment (FIG. 2) as system pointer addresses into the first ten locations of the ISSP Scratch Area. After the system pointers are transferred, the ISSP proceeds to Step A3 to clear a specified block of scratch memory. This block encompasses each of the memory locations in the regions from location STCLB (@40) through ENCLB (@7F). These regions are the output region, the intermediate region and the timer/counter region (current values).

The ISSP now enters into Step A4 wherein a block of constants are transferred into the timer/counter region (Final Values) and the Reserved Area. The boundaries of these two regions is specified by symbolic locations STCNB (start of constants block) and ENCNB (end of constants block). The constants transferred into these regions are specified by the user, and can be transferred from any location in memory. Generally, however, the timer/counter region receives constants representative of timer and/or counter final values for the ISSP to use when simulating timers or counters. These constants can be transferred from the permanent constants region of the store of FIG. 2 or from any other location in store not shown. The reserved are of FIG. 2 generally receives constants from some location in store whereby those constants are for use by other programs no disclosed herein.

With the memory now initialized, the ISSP enters a decision block at Step A5 designated Test Initial Status of DBC (i.e. the digital bus controller 18 of FIG. 1). In Step A5 the ISSP tests to see if the DBC is busy, or if the clock signal (also called strobe), provided to the remote terminals from the DBC is enabled (see page A8). If either of these conditions is true, it is indicative of an error, and the ISSP exits through an error branch wherein a stall flag is set and the system is stalled at a location IERR (initialization error). If an error exists, the system operator should depress the initialize pushbutton again. This will cause the sequencer to branch back to location SINIT whereby Steps A1–A5 will be repeated. Normally, during initial system start-up, an error should not occur because the DBC will be busy and the clock signal will not be enabled.

Figure 20:
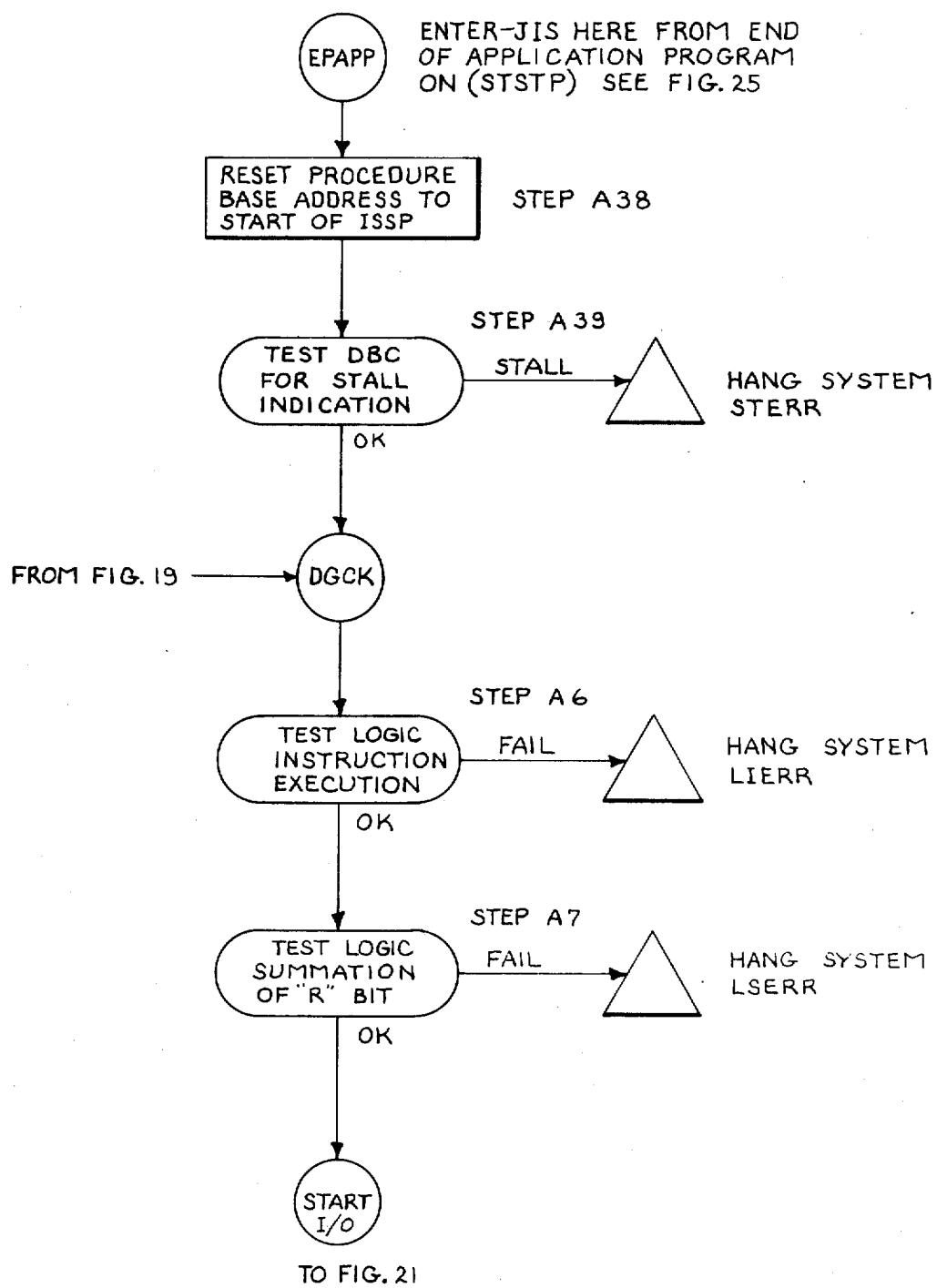

Assuming that the tests in Step A5 are positive, the ISSP exits Step A5 throuh an OK branch to a diagnostic check at location DGCK at Step A6 of FIG. 20. Step A6 is listed on page A10.

In Step A6 the ISSP checks the LDL, LOF, LOT, LAF, LAT and SST instructions for proper execution. If any one of these instructions fails in its execution, the ISSP exits through a fail branch wherein the system is stalled at a location LIERR (Logic Instruction Error). However, if each of the instructions executes properly, the ISSP will exit through an OK branch into Step A7 to a test logic summation of R bit (FR) decision block. Step A7 is listed on page A11 wherein the ISSP sequentially executes, first the two instructions, LAT and LOT. If the summation of the R bit in the sequencer tests to be correct (execution of BRS instruction) then the ISSP will sequentially execute the two instructions LAF and LAT. After the execution of these latter two instructions, the status of the R bit is again tested (execution of BRC instructon). If the execution of any of these four instructions fails to yield the proper status bit, the ISSP will exit through a Fail branch to a location LSERR (Logic Summation Error) hanging the system in a stalled condition. As previously described, if the system does hang on any error, it will be necessary for the operator to depress the initialize button causing a branch to the beginning of the ISSP to location SINIT.

Figure 21:
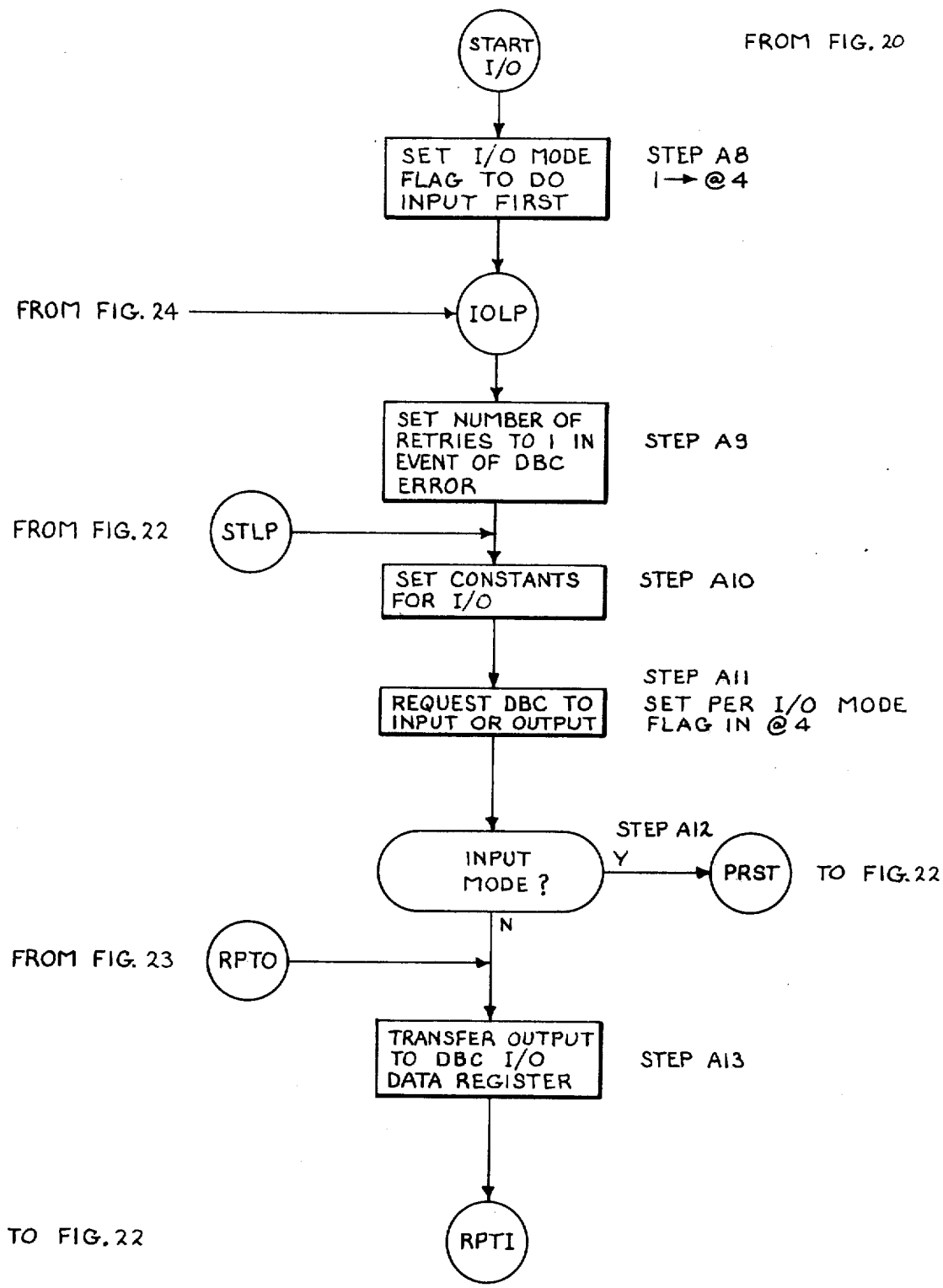

If the tests performed in Step A7 are satisfactory, the ISSP exits through an OK branch to start I/O, entering into Step A8 of FIG. 21. Step A8 is listed on page A11. In Step A8 an input/output (I/O) mode flag is set to cause the ISSP to first read input signals from the remote terminals. This is accomplished by loading a binary 1 into location @ 4, the Xp index register (procedure reference) (FIG. 2). The ISSP now proceeds to a location IOLP (input/output loop) to perform Step A9. In this step, a constant from location NTRY (number of retries) is placed in location TRAGN, the diagnostic counter for I/O errors, to cause the ISSP to re-read the input signals a number of times specified by the value of NTRY in the event of a DBC error.

Proceeding now to Step A10 constants are set for controlling the transfer of input data from the remote terminals into the proper location(s) in the store input region of FIG. 2. This control is effected as listed on page A12 by storing the DBC base address (starting input address FFEO) from location DBCAD into locations @ 2 (Bd) and @ 3 (Bd), thus establishing the data and bit base reference addresses respectively. The number of input data transfers which are to take place are also established by storing the constant INSP-INST (number of input addresses) from location ADRCT, X (indexed by 1 in accordance with the State of the I/O mode flag in location @ 4) into location NIOT, the counter for I/O transfers. Also, the starting external address is written to the DBC by the execution of an SAD instruction to location DBXAD, the DBC external address register R3. Also, the starting internal address is stored in location @ 5 (Xd) by the execution of an SAN instruction. The addresses presently stored in location NIOT, DBXAD and @ 5 (Xd) are the same so that the remote terminal and the corresponding memory address are the same.

The program now enters into Stap A11 (FIG. 21) wherein the DBC is requested to read input data from the remote terminals. This is accomplished as listed on page A12 by transferring the DBC control word RWCNT, X (indexed according to the I/O mode flag in location @ 4) to the DBC control register (R0) by the execution of an SAD instruction to address location DBCRG, which is the address for register R0.

The ISSP now enters Step A12 wherein it tests to see if the ISSP is in the input mode. This test is performed by testing the contents of location INPRG (page A13) which is equal to the contents of location @ 4, bit # 0. Since the ISSP is presently in the input mode, it exits through a Y (yes) branch to a location PRST (preset late timer) into Step A16 of FIG. 22.

In Step A16 a DBC late timer is preset by loading a constant 12 from location LTPRS (late timer preset) into the DBC late timer at location DBCLT. The purpose of the DBC late timer (DBCLT) is to give the DBC sufficient time to complete its operation (transferring input or output date) prior to continuing with the program.

Upon exiting Step A16 the ISSP now enters a location BSYT in Step A17. As can be seen on page A14, the contents of location of DBBSY, which contains the status of the DBC status register (DBSRG, # F, page A5) are tested to see if the DBC is in a busy state, i.e., whether it is transferring input or output data. If the DBC is busy, the ISSP exits through a Y branch to Step A18. In Step A18 (page A14) the DBC late timer at location DBCLT is decremented by 1, whereupon Step A19 is entered.

In Step A19 a test is performed to see if the DBC late timer (DBCLT) has expired. That is, has it decremented to zero. If the timer has not xpired, the ISSP exits through an N (no) branch looping back to location BSYT wherein the previous Steps A17, A18 and A19 are repeated. The ISSP will remain in this loop until the DBC goes $\overline{\text{BUSY}}$ in Step A17, or until the DBC late timer has expired in Step A19. If the DBC late timer has expired and the DBC is still busy, the ISSP exits from Step A19 into a decision block at Step A20.

In Step A20 the diagnostic counter at location TRAGN is first decremented and then a test is performed to determine if this is the first DBC error, i.e., did the DBC remain in a busy state longer than it should have (i.e., longer than a count of 12). If the results of this first error test are negative, the ISSP will exit through an N branch wherein the ISSP will enter into a location DBCER (DBC error) causing the system to hang, halting instruction execution. However, if the results of the test are positive, the ISSP will exit through a Y branch to a start loop location STLP thus entering back into Step A10 of FIG. 21 to make another try through the input read mode as just described.

Figure 22:
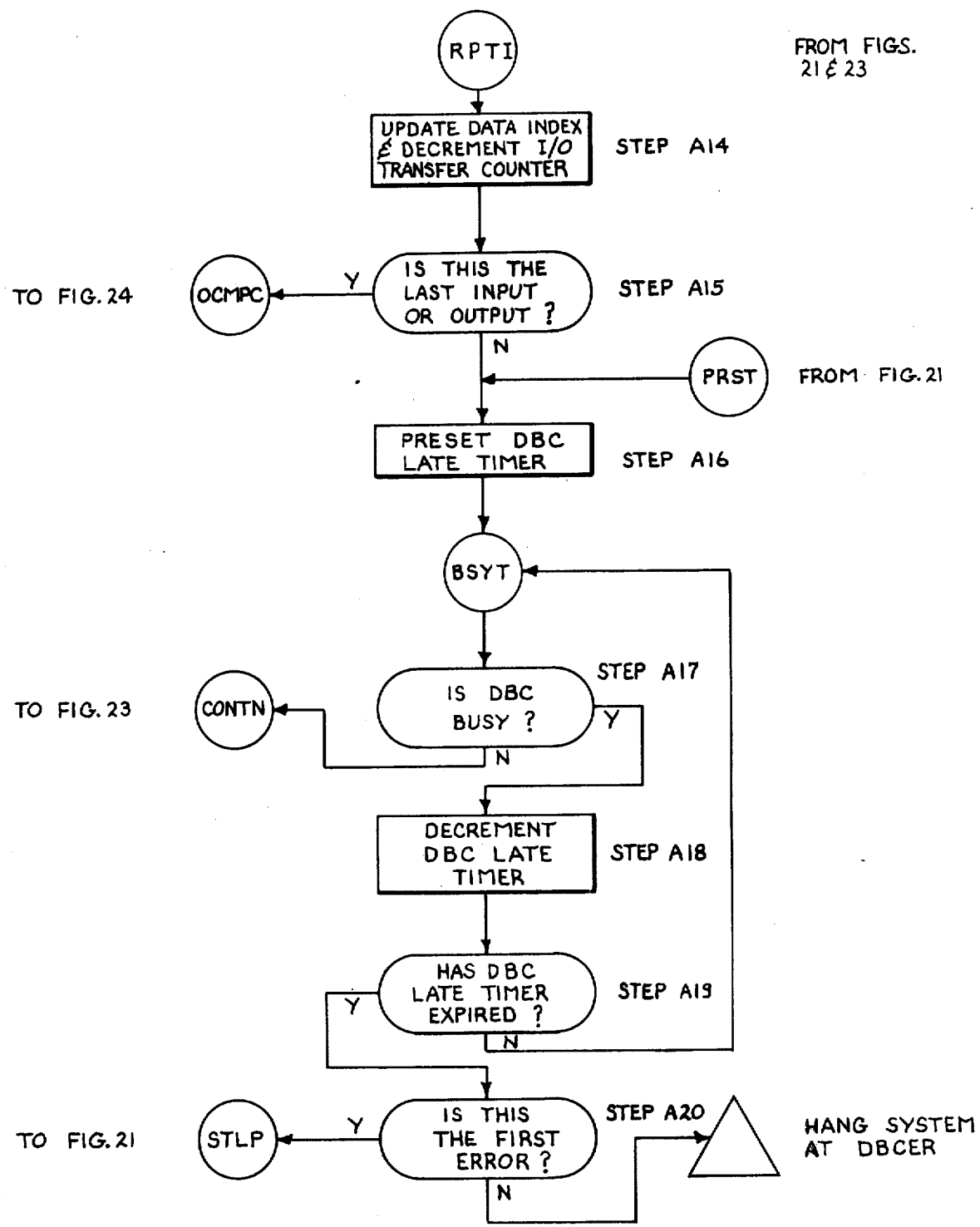

Reference is now made back to Step A17 of FIG. 22. Assuming that the DBC is not busy (completed its operation), the program exits through an N branch to a continue location, CONTN, to Step A21 of FIG. 23. In Step A21 the contents of location INPRG (●4) are again tested to see if the ISSP is in the input mode. In the present discussion, since it is assumed that the ISSP is in the input mode, the program exits through a Y branch to Step A22.

In Step A22 the ISSP transfers data from the DBC into the input region of the memory (FIG. 2). This transferring of data is accomplished as can be seen on page A15 by loading the sequencer A register with the contents of location DBDRG, the DBC I/O data register R4 which has an address FFE4. The contents of DBDRG are then transferred into the memory input region to a location specified by the contents of the P counter (●O) indexed by the contents of the index register (@5) the latter presently containing the data index as a pointer to that location.

Immediately upon storing the input data, the ISSP exits to a repeat input location RPTI to Step A14 of FIG. 22 to repeat the reading of input data. In Step A14 the data index in address location @5 (Xd) is updated by adding 1 plur the contents of location DBOFS to that location, whereby the contents of DBOFS contains a value to offset the DBC data base address to zero. Also, in Step A14 the I/O transfer counter NIOT is decremented by one. The purpose of NIOT is to keep track of the number of input or output data words which have been transferred between the sequencer and the DBC.

The ISSP now exits from Step A14 into Step A15 wherein a test is performed, asking, "is this the last input or output?" The test is performed by the execution of a BRC instruction which essentially is a test to see if the counter NIOT has decremented to zero.

Let it be assumed that this is not the last input data transfer from the DBC. The ISSP therefore will exit through an N branch into Step A16. In Step A16 the DBC late timer is present by storing the contents of LTPRS (late timer preset value) to location DBCLT, the DBC late timer.

Figure 23:
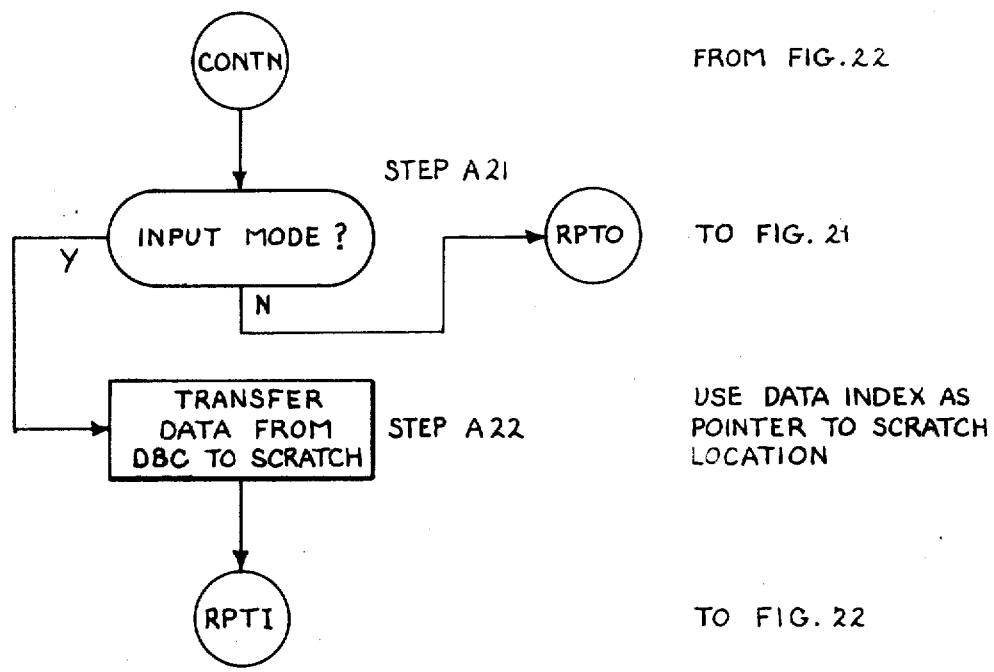

The ISSP will now continue transferring input data from the DBC into sequential locations in the memory input region as just described in conection with FIGS. 22 and 23 by exiting from Step A17 to location CONTN to Step A21 of FIG. 23, and returning from that figure to location RPTI in FIG. 22 until the contents of location NIOT are decremented to zero. As previously described the testing of NIOT is done in Step A15 of FIG. 22. When NIOT decrements to 0 (i.e. last input data word has been transferred) the ISSP will then exit through a Y branch to an operation complete location OCMPC in FIG. 24. At location OCMPC the program enters into Step A23 (page A15) wherein the I/O mode flag at location @4 (Xp) is decremented by 1 (i.e., reset to zero) by the execution of a DMR instruction. The R bit ($F_R$) is set to a 1 based on the contents of location @4 by the execution of a DMR instruction. A test is then performed in Step A24 to determine if this is the completion of the transfer of output data to the DBC. Since it is not the completion of outputs (R bit set), the program exits from Step A24 through an N branch wherein a test is performed in Step A25 to see if the initialization count at location INZCT is completed. Location INZCT nitially contains a constant 6 which was placed in that location from the Program Constants and presets table (page A23) in Step A2 of FIG. 19. The purpose of the initialization counter, INZCT, is to cause the ISSP to cycle through the input mode (i.e., read input data) and the application program a predetermined number of times prior to running the IMMP or sending any control outputs to the process equipment. This is done so that all inputs and outputs from and to the process equipment can be updated before the system goes under complete automated control of the Executive Program. Let it first be assumed that the initialization count is not completed, thus the program exits through an N branch to Step A26 wherein the initialization count, INZCT, is decremented by 1 (page A16).

The program now exits from Step A26 into Step A27 wherein the initialization count completed test is again performed. Still assuming that the initialization count is not completed, the ISSP exits through an N branch to a location FTCK (first time check) to Step A30 in FIG. 25. A test is now performed to see if a first time flag is set to determine if this is the first time that the ISSP is being executed. This is accompanied by testing Bit F of a Diagnostic Flag word, DIAGF, which is loaded into locaton INOFB from location FBAS in this step. On the first time through the ISSP, bit F of DIAGF will be set (INOFB contents), thus the program exits through a Y branch of Step A30 to Step A32. In Step A32, bit F, the first time flag, is reset and stored at initial output flag bit location INOFB by the execution of an SST instruction. The ISSP now goes to Step A33 wherein a first pass flag PUDO, from the constants table (page A23) is set or stored in location @F (FIG. 2). The first time flag PUDO is stored for subsequent use by the IMMP.

Figure 26:
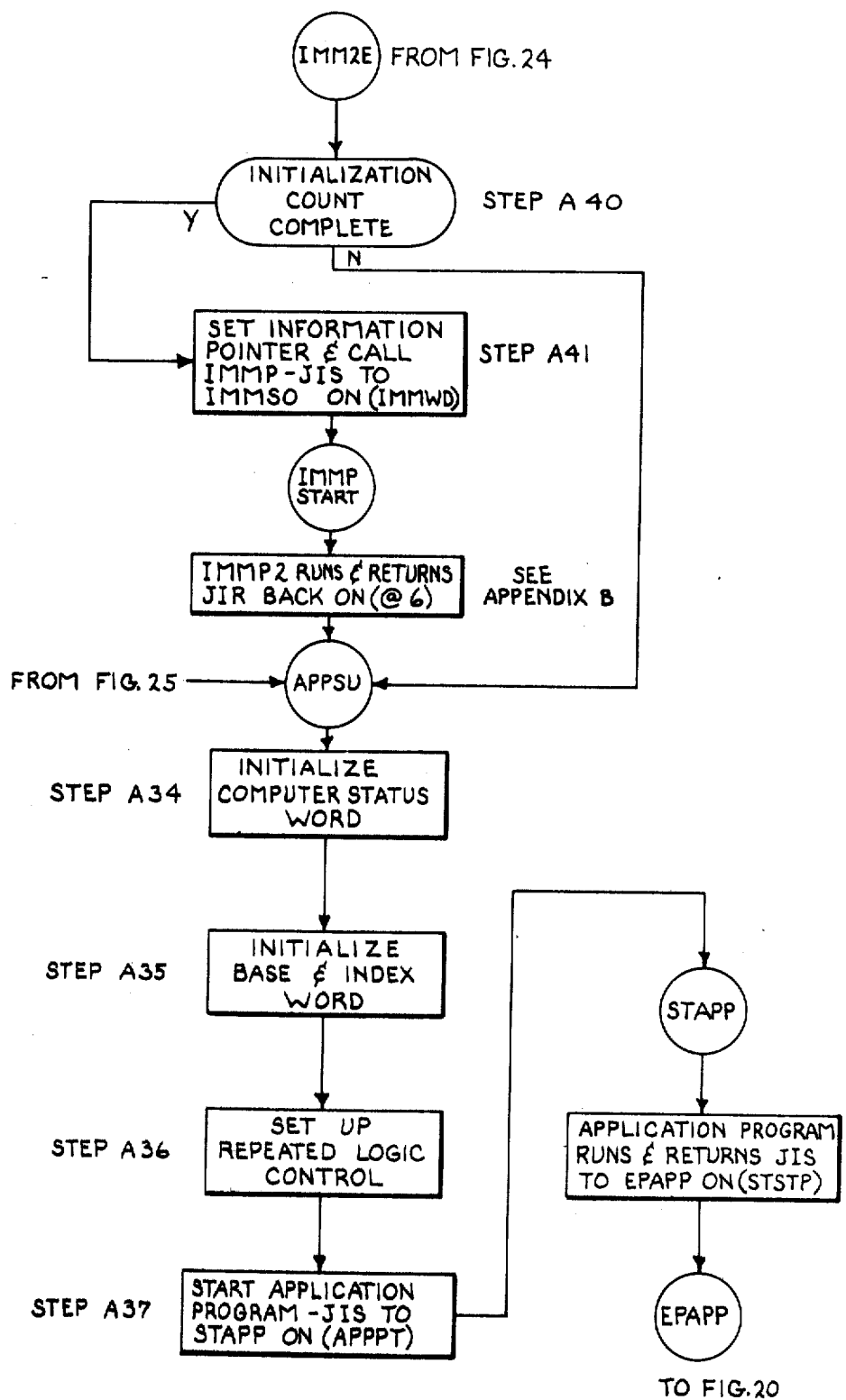

At the completion of Step A33 the ISSP branches to a location APPSU (application program set up) in FIG. 26. Entry in location APPSU is at Step A34 wherein the program initializes a status word in the sequencer or computer by loading the contents of a constant from location SWIN (status word initial preset) into location STAT, the location for the computer status word. The contents of this status word will subsequently be described.

The program now proceeds to Step A35 — wherein the data base (@2), data index (@5) and the bit base (@3) registers in the memory (FIG. 2 and page A19) are initialized in preparation for running the application program.

The ISSP now continues to Step A36. Various parameters are set up in this step to control the operation of repeated loop logic to subsequently be run by the application program. The repeated loop logic will be described with the application program. A designated number (NRPLP, number of repeated loops) is loaded from locaton NLOOP (page A25) into location LPCNT, the repeated loop counter in the ISSP Scratch Area. In addition, the contents of a constant minus 1 from location MINI is placed into location @4, the index procedure reference register, Xp. The purpose of this constant will be described during the description of the repeated loop logic in the application program.

Continuing on to Step A37, the ISSP executes a JIS (jump indirect and store) instruction to memory locaton STAPP (start address of application program) based on the contents of location (APPPT). Henceforth all symbols enclosed in ( ) in the flow charts mean the contents of that term. As shown on page A4 under "Definitions of Words in ISSP Scratch Area", location APPPT contains an address which is an entry pointer to the application program, that address being to location STAPP.

Reference is now made to FIGS. 2, 5, 6 and 7. In FIG. 2 the address for STAPP is shown to be @ 530. The pointer APPPT specifies this location. Location STAPP also appears on FIG. 6. The executive program now enters the application program at STAPP and begins to run. The sequencer will sequentially execute each of the instructions stored within the application program region of the memory clear through to the end of the program.

Assume that the first instruction of the application program is LDL as shown in FIG. 6. This LDL instruction references location @ 2AA. Referring now to FIG. 7 it can be seen that location @ 2AA is in the output status region of the memory and is defined as contact K3. When the LDL instruction is executed the status or condition of contact K3 is stored into the FL flip-flop (LBIT). This establishes the condition of the common L Bus contact for logic string 1a of FIG. 5 as previously described.

In FIG. 6 three exemplary logic strings are shown comprising an application program: Logic strings 1a, 1b and 2. All of the instructions pertaining to these three logic strings are consecutively located in memory such that they are sequentially executed by the sequencer. Thus, as soon as the LDL instruction is executed, the next instruction LAT referencing location 12A, which is contact SA, will be executed. Upon the execution of the LAT instruction, the input status or the condition of the SA contact will be stored in the $F_R$ flip-flop. The remaining instructions in logic string 1a will continue to be executed, such as the LAF, LOT, LOF and then the SST, the last instruction in logic string 1a. When the SST instruction is executed the contents of the $F_R$ flip-flop, which now contains the status of the series string of logic elements in logic string 1a, is stored in location 2AB in the memory output region as an output contact SV (FIG. 7). The application program will continue to run, executing all of the instructions in the remaining logic strings, e.g., 1b and 2, until it reaches the end. The actual end of the application program is defined by a JIS STSTP instruction at the end of the application program as shown by FIGS. 2, 6 and 26.

This latter instruction causes the executive program to branch indirectly from the application program to location EPAPP on the contents of location STSTP (page A4). Location STSTP now contains the address EPAPP (entry pointer from the application program back to the ISSP). The ISSP now enters location EPAPP at Step A38 of FIG. 20 (page A8). In Step A38 the ISSP resets the procedure base address back to the start location of the ISSP. This is accomplished by storing the contents of location INITA into the base register Bp at location @ 1 of the memory, which contains the base address of the ISSP (location SINIT).

After completion of Step A38 the ISSP enters into a decision block in Step A39 (page A9) testing to see if the DBC is stalled.

This is done by testing the clock or strobe enable bit at location DBSEN which contains the status of register RO in the controller having an address DBSRG, #E (Bit E is strobe enabled bit). If the results of the test in Step A39 are negative, the ISSP exits through a stall branch wherein the system is placed in a hang condition at a stall error location STERR. As previously described, should an error occur, it will be necessary for the operator of the sequencer to reinitialize the system by depressing the initialize button. Assuming, however, that the DBC is not in a stalled condition, the ISSP exits through an OK branch to location DGCK, wherein the ISSP will repeat the execution of Steps A6 and A7 as previously described.

Upon the completion of Step A7, the ISSP proceeds to Step A8 of FIG. 21. Again as previously described, the ISSP sets the I/O mode flag to a 1 in location @ 4 to repeat reading inputs from the DBC into the input region of the memory. It will be recalled that the I/O mode flag was reset to a zero in Step A23 of FIG. 24 (page A15). The reason for setting the I/O mode flag again at this time is, that it is desirable to run the application program a sufficient number of times to firmly establish the output status conditions in the output region of the memory prior to sending those conditions to the process equipment. It will be recalled, as previously described in FIG. 24, that the application program will repeatedly run during initialization until the initialization count at location INZCT is decremented to zero. Thus, until INZCT decrements to zero, the ISSP will continue reading the process inputs from the DBC and then branching to the application program wherein the process outputs in the output region of the memory are updated.

Still referring to FIG. 21, the ISSP will proceed through Steps A9, A10, A11 and A12 as previously described. Since the ISSP is still in the input mode the program will exit again through the Y branch of Step A12 to location PRST in FIG. 22. From this point on the ISSP will continue in the initialization sequence of reading the input data into the input region of memory and running the application program to update the output status conditions in the output region of memory until the initialization counter of location INZCT decrements to zero.

Still referring to FIG. 22, let it be assumed that the input/output counter NIOT is now decremented to zero in Step A14, thus indicating to the ISSP in Step A15 that the last input data word has been stored in the input region of memory. As a result, the ISSP will exit again to location OCMPC into Step A23 of FIG. 24.

Again, in Step A23 (page A15) the ISSP decrements (resets) the I/O mode flat at ● 4 to a zero, while setting $F_R$ (R bit) to a one, the state of the I/O mode flag prior to its reset. In Step A24 the state of $F_R$ is again tested and since it is a one (not completion of outputs) the ISSP enters into Step A25. In Step A25, as previously described, the initialization count, INZCT, is again tested to see if it has decremented to zero (i.e., complete). Let it be assumed that INZCT has been decremented to zero. With INZCT now at zero, it indicates to the ISSP that it has read the inputs and has run the application program six consecutive times as specified originally by the constant of 6 in location INZCT.

Figure 24:
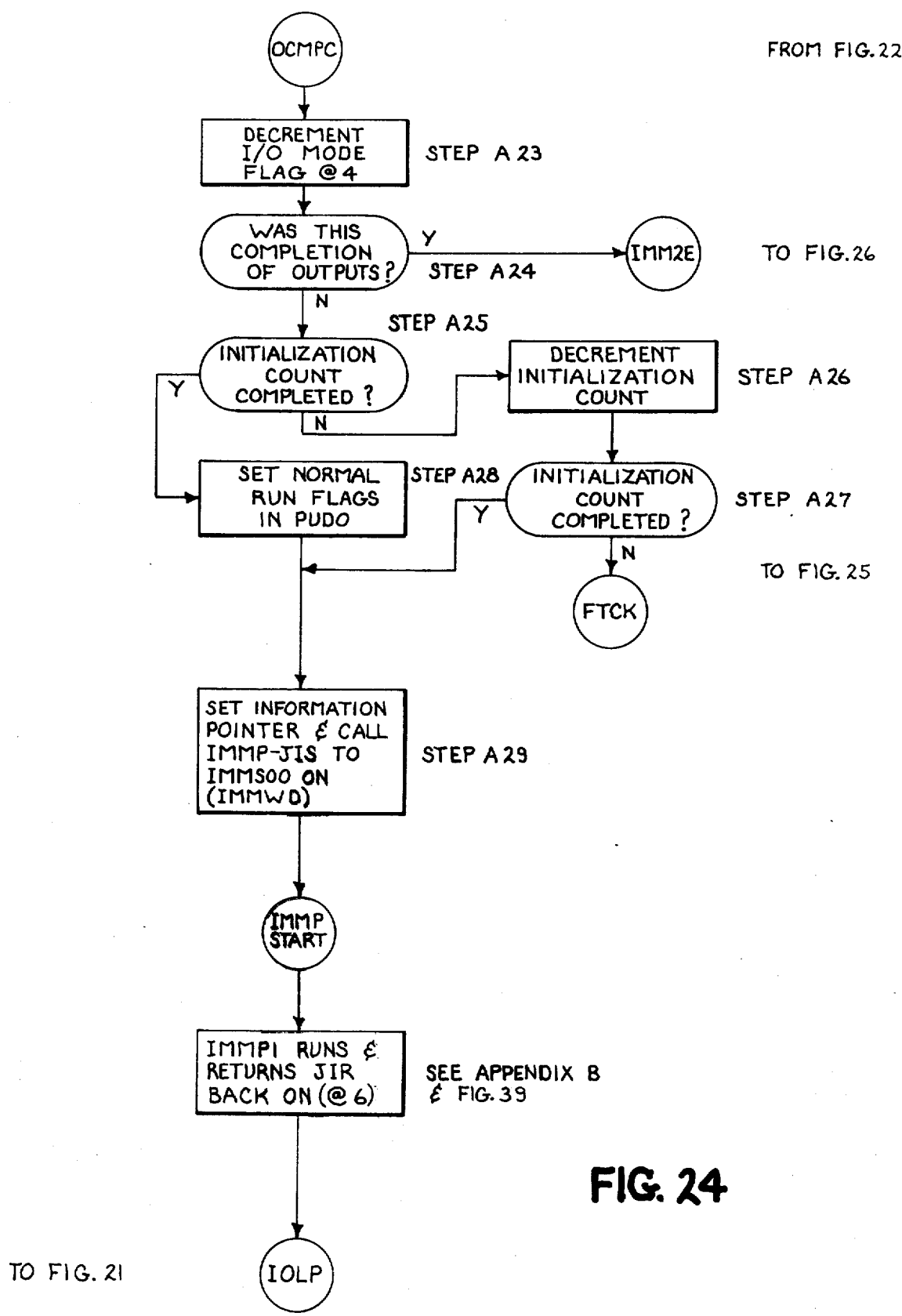
Figure 25:
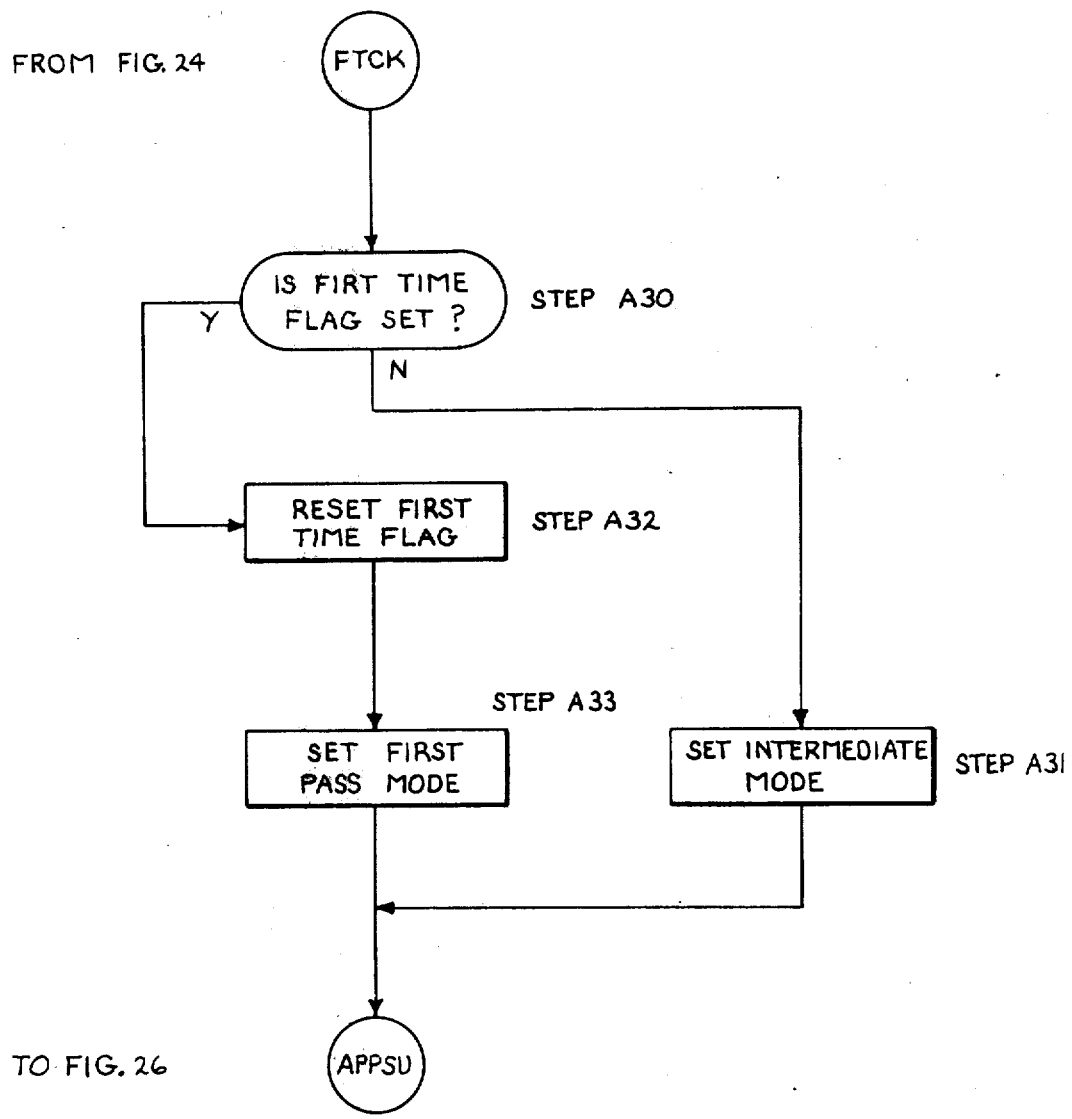

With INZCT at zero the program exits through a Y branch into Step A28 wherein a normal run flag from location PUDO2 (page A23) is loaded in location ● F of the memory. The purpose of PUDO2 will subsequently be described. With the initialization of the ISSP now complete, the program exits from Step A28 into Step A29. In Step A29 an information pointer (address) is set for the IMMP to return to the ISSP on, and the IMMP is called into operation. This is accomplished as shown on page A17 by the ISSP executing a JIS (jump indirect and store) instruction to a location designated IMMSOO based on the contents of an installation and maintenance module word at location IMMWD. Location IMMSOO is the IMMP start location shown at ⊚ 800 in FIGS. 24 and 30. Entry into location IMMSOO will cause the IMMP to begin running. A description of the operation of the IMMP will subsequently be given. However, for the present let it be assumed that the IMMP has just completed running and that it exits back to the ISSP into a location designated IOLP. (FIGS. 21, 24 and pages A17, A11). This first entry back into the ISSP is effected by the IMMP executing a JIR (jump indirect and restore) instruction back to location IOLP based on the contents of the SAVE location for P register at ⊚ 6 (FIG. 2).

Reference is now made to FIG. 21 to Step A9, wherein the ISSP will again set the number of retries to 1 in the event of a DBC error and exit to Step A10. In Step A10 the ISSP, again as previously described, establishes the data and bit bases for communication with the DBC also, since output data is now to be transferred from the output region of the memory the output starting external and internal addresses are established. The number of output data transfers which are to take place is loaded into location NIOT, the counter for I/O transfers. The operation in Step A10 for establishing the number of output data transfers is the same as previously described for input data transfers with the exception that, the contents (OTSP–OTST) of location ADRCT are placed in location NIOT. OTSP–OTST define the boundaries of the output region of memory (see FIG. 2). In a similar manner, the starting external and internal addresses are established by placing the constant OTST from location ADRST in location DBXAD, the DBC external address register R3, and in the data and bit reference index register at location ⊚ 5 (Xd). Step A10 now terminates and the ISSP goes to Step A11. In this step, the DBC is requested to transfer output data by the ISSP loading the write control word from location RWCNT into the DBC control register R0 at location DBCRG.

It will be recalled that the I/O mode flag was reset to a zero back in Step A23 of FIG. 24. Thus, the I/O mode flag to be tested in Step A12 is now a binary zero, causing the ISSP to exit through an N branch to Step A13 (page A13). In Step A13 the ISSP now transfers the first word of output data from the output region of the memory to location DBDRG, the DBC I/O data register R4 (see pages A4 and A13).

On transferring the output data to the DBC I/O data register, the ISSP now (i.e., Step A13 into location RPTI in Step A14 of FIG. 22. In FIGS. 22 and 23 the operation of the ISSP for transferring output data is the same as that previously described for the transfer of input data with the exception, as shown in Step A21 (page A15) of FIG. 23 in the input mode decision block, the ISSP will now exit through an N branch to a repeat output location RPTO of FIG. 21. Location RPTO is the entry point back into Step A13 of FIG. 21 wherein the ISSP will again transfer the next output data word to the DBC as previously described. The ISSP will now continue to execute in a loop from FIG. 21 to location RPTI of FIG. 22, exiting FIG. 22 to location CONTN of FIG. 23 and returning from that figure back to location RPTO of FIG. 21 until all of the output data words are transferred (i.e, until NIOT is decremented to zero).

As previously described NIOT is tested in Step A15 of FIG. 22. Assuming at this time that the last output data transfer has taken place, the ISSP will again exit the Y branch re-entering into location OCMPC of FIG. 24 at Step A23. Upon entry into Step A23 the I/O mode flag will be a zero, however, the execution of the DMR instruction (page A15) causes the FR flip-flop (R bit) to be reset to the state of the I/O mode flag. Thus, the ISSP will exit through a Y branch of Step A24 due to the execution of a BRC (branch on R clear) instruction (page A15). The ISSP now enters into a location IMM2E at Step A40 of FIG. 26. It is possible at this time that the initialization count INZCT may not be completed, therefore a test of location INZCT is again made. If the initialization count is not complete, the program will exit through an N branch, branching directly to location APPSU wherein the application program will be run as previously described (page A18). This last test of location INZCT is performed so that the running of the second part of the IMMP (i.e., IMMP2) may be circumvented in the event that the initialization is not complete. This is done because, as will subsequently be described, IMMP2 may affect certain ones of the output status conditions provided from the output region of the memory to the process equipment.

Let it be assumed, however, that the initialization count is complete. Therefore, the ISSP exits through a Y branch entering into Step A41. The ISSP now sets an information pointer from which the IMMP2 can return to after its execution. The ISSP also calls the IMMP by executing a JIS instruction to location IMMSOO (IMMP start) based on the contents of location IMMWD (FIG. 30). IMMP2 will now run to its completion and return back to the ISSP to location APPSU (page A19) by the execution of a JIR instruction based on the contents of locaiton 6. The ISSP will continue through Steps A34 through A37, entering from the latter step to run the application program in the same manner as previously described.

Upon completion of the application program, entry will again be made back into location EPAPP in Step A38 of FIG. 20. The ISSP will now repeat its execution of reading the input data to update the status conditions in the input region. IMMP1 will then run and upon its completion the ISSP will send the previously updated status conditions from the output region to the process equipment. The IMMP2 will then be run and upon its termination the application program will be run to update the output status conditions.

The above described sequence of operations will continue repeatedly until the system is either shut down or until a stalled condition occurs, stopping all instruction execution.

Repeated Loop Logic

Many industrial type processes include several similar types of machines which operate in the same manner. For example, in a hot strip mill there are frequently several like stands, commonly referred to as drives for rolling steel. The present invention provides the capability of simultaneously controlling several like drives by the utilization of common logic simulated by the application program. In programmable controllers of the type of the present invention this capability becomes important in that it makes it possible to conserve a great deal of memory space by not having to repeat the logic for each of the like drives.

Figure 31:
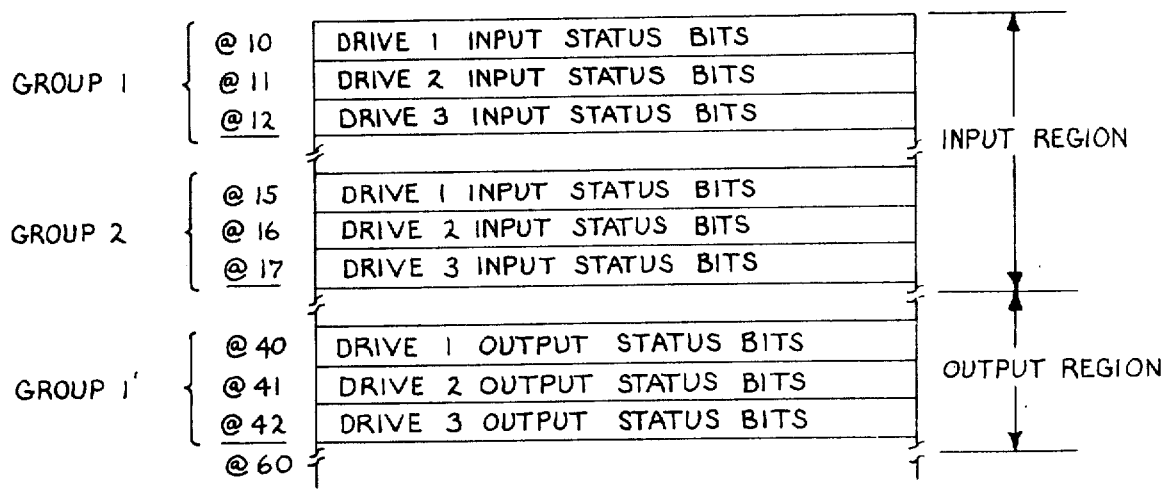
FIG. 31 is another memory map of the memory of FIG. 1 showing in detail how various data is organized within that memory.

To understand how these drives are controlled by the executive program, it is first considered necessary to understand the organization of data as stored in the memory input and output regions, and how the application program is formatted. FIG. 31 is a partial memory map of the input and output regions in the memory showing how the input and output status bits for each of three drives 1, 2 and 3 are stored in the memory (also see FIG. 2 for memory map orientation). It will be noted that each word of the input status bits for drives 1, 2 and 3 are consecutively located in memory into two groups, groups 1 and 2, of three drives to a group. In a similar fashion, the output status bits for each of the drives are organized in consecutive memory locations in a group, designated group 1'. In the example illustrated in FIG. 31 each word in the input and output regions is comprised of 16 bits. There may be as many assigned word locations as required to receive the input and output status conditions. For example, drive 1 is capable of holding 16 bits of input status information in location ⦿ 10 and 16 bits in location ⦿ 15 for a total of 32 bits. Each of the drives 1, 2 and 3 is capable of receiving 16 discrete output status conditions from the sequencer from corresponding locations as shown in group 1' at locations ⦿ 40, ⦿ 41 and ⦿ 42.

It is significant to note that, when implementing the repeated loop logic of the present invention, the bit address assignments in each of the input and output status bits for each of the drives in each of the groups be identical. The input status bits for drives 1, 2 and 3 are read into sequential storage locations in the input region of the memory in the order as shown in FIG. 31 by the ISSP. Likewise the output status bits for drives 1, 2 and 3 are in consecutive locations in the output region whereby those output conditions can be consecutively updated during the running of the application program.

Figure 32:
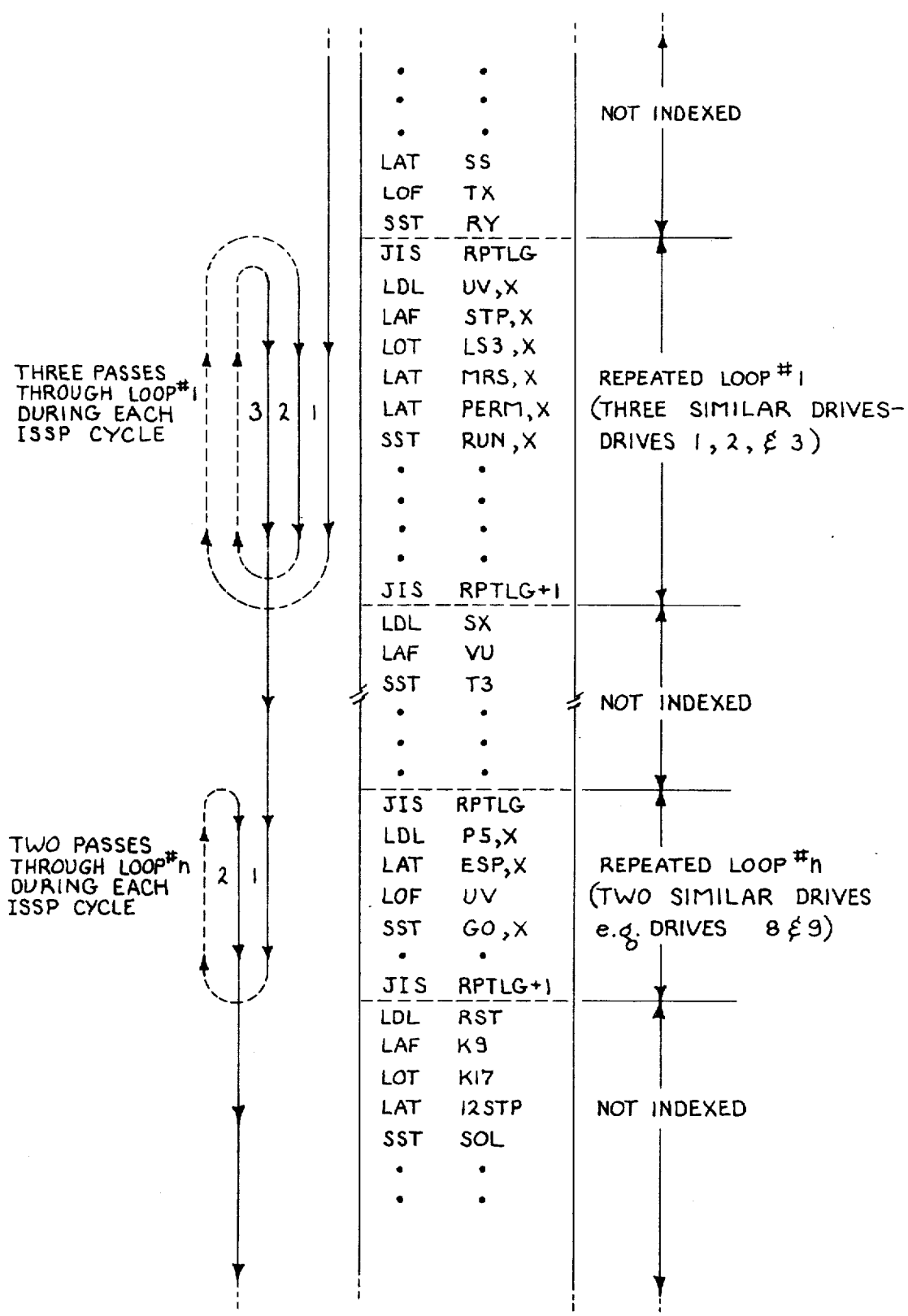
FIG. 32 is a functional diagram showing the flow of the execution of instructions during the execution of a program by the computer and is useful in conjunction with FIG. 31.
Figure 33:
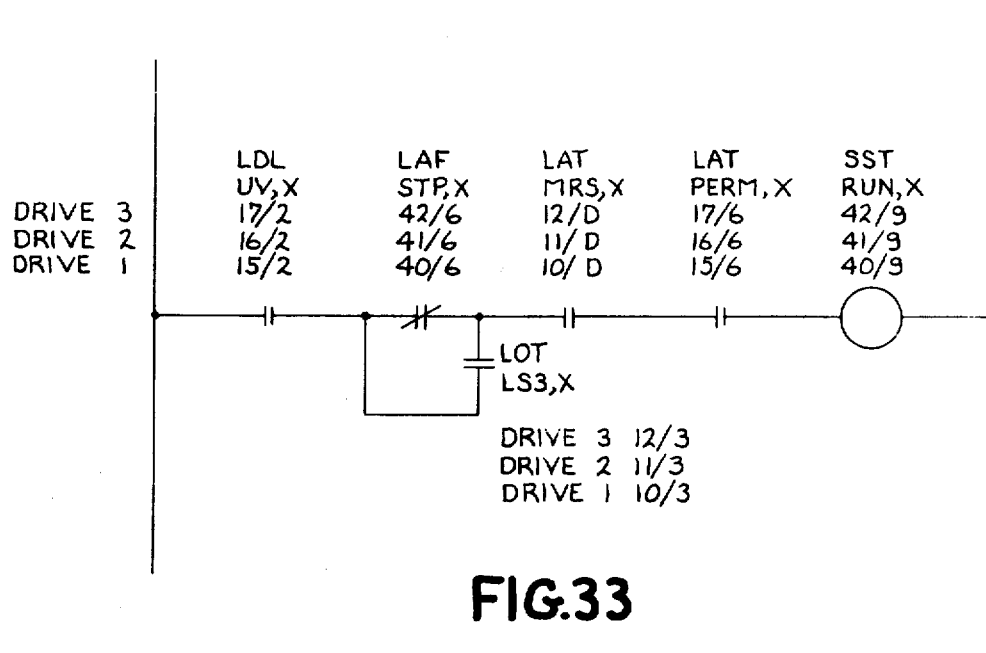

The reason for organizing the input and output status bits for drives 1, 2 and 3 as shown in FIG. 31 can best be understood by referencing FIG. 32. FIG. 32 is a memory map showing a portion of a typical application program including the indexed or repeated loop logic and how that logic functionally operates in one basic operating cycle of the application program. An electrical schematic of the logic simulated by repeated loop #1 of FIG. 32 is shown by FIG. 33. By comparison of FIGS. 32 and 33 it can be seen that each of the instructions LDL (UV, X), LAF (STP, X), LOT (LS3, X), LAT (MRS, X), LAT (PERM, X) and SST (RUN, X) appear in both figures. Further, it will be noted that each of the instructions in FIG. 33 includes three address assignments, each address corresponding to one of the drives, 1, 2 or 3. For example, the LDL instruction references a symbolic location UV which is located in bit 2 of each of the input status bits in the input region at locations ⦿ 17 (drive 3), ⦿ 16 (drive 2) and ⦿ 15 (drive 1). FIG. 31 shows these locations as the ones referenced by the instructions of FIGS. 32 and 33.

Repeated loop #1 in FIG. 32 shows those instructions comprising only one logic string for controlling each of the drives 1, 2 and 3. However, loop #1 may be comprised of several logic strings as indicated by the dots extending downward from the last instruction SST (RUN, X).

Figure 27:
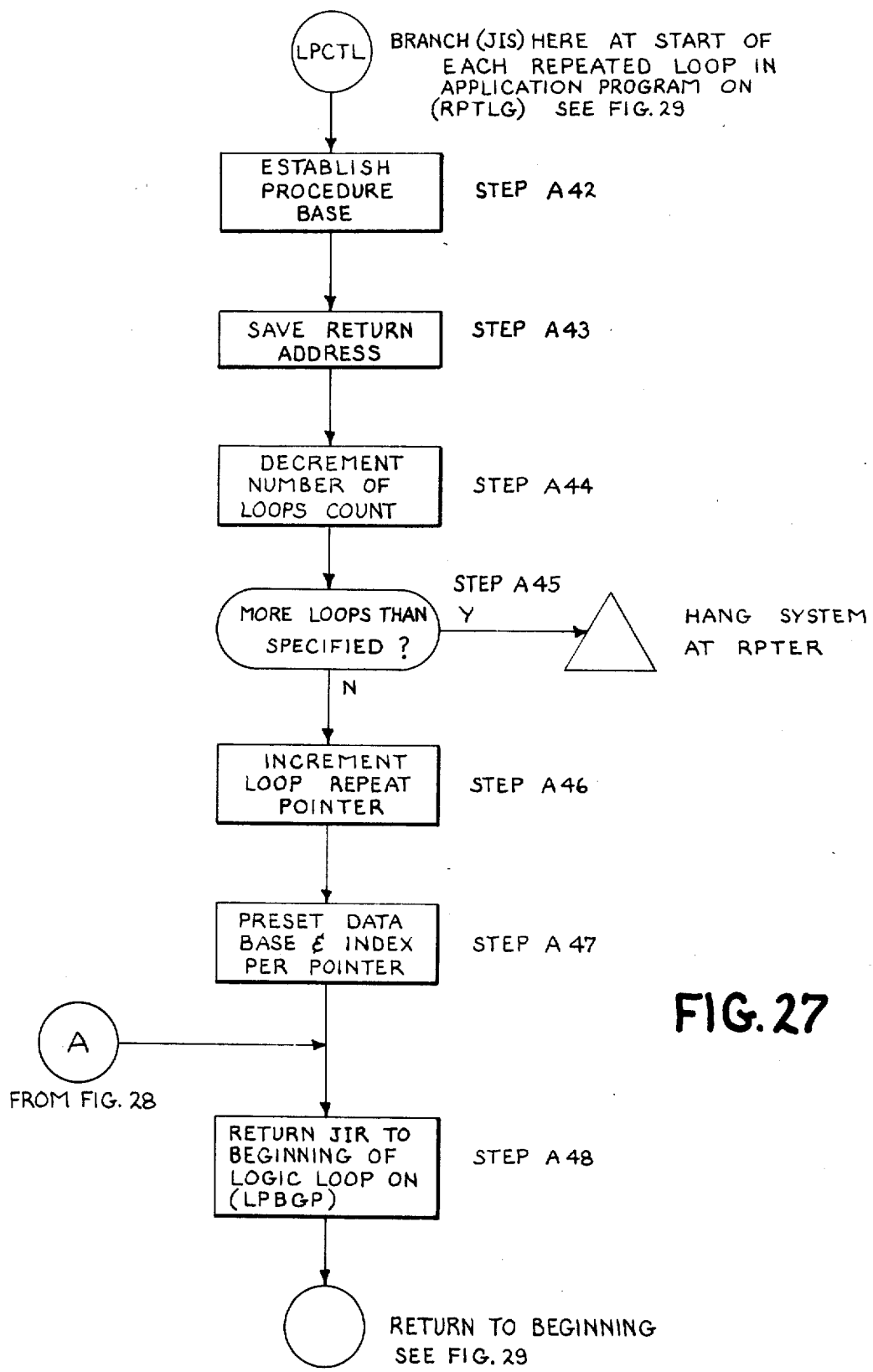
Figure 28:
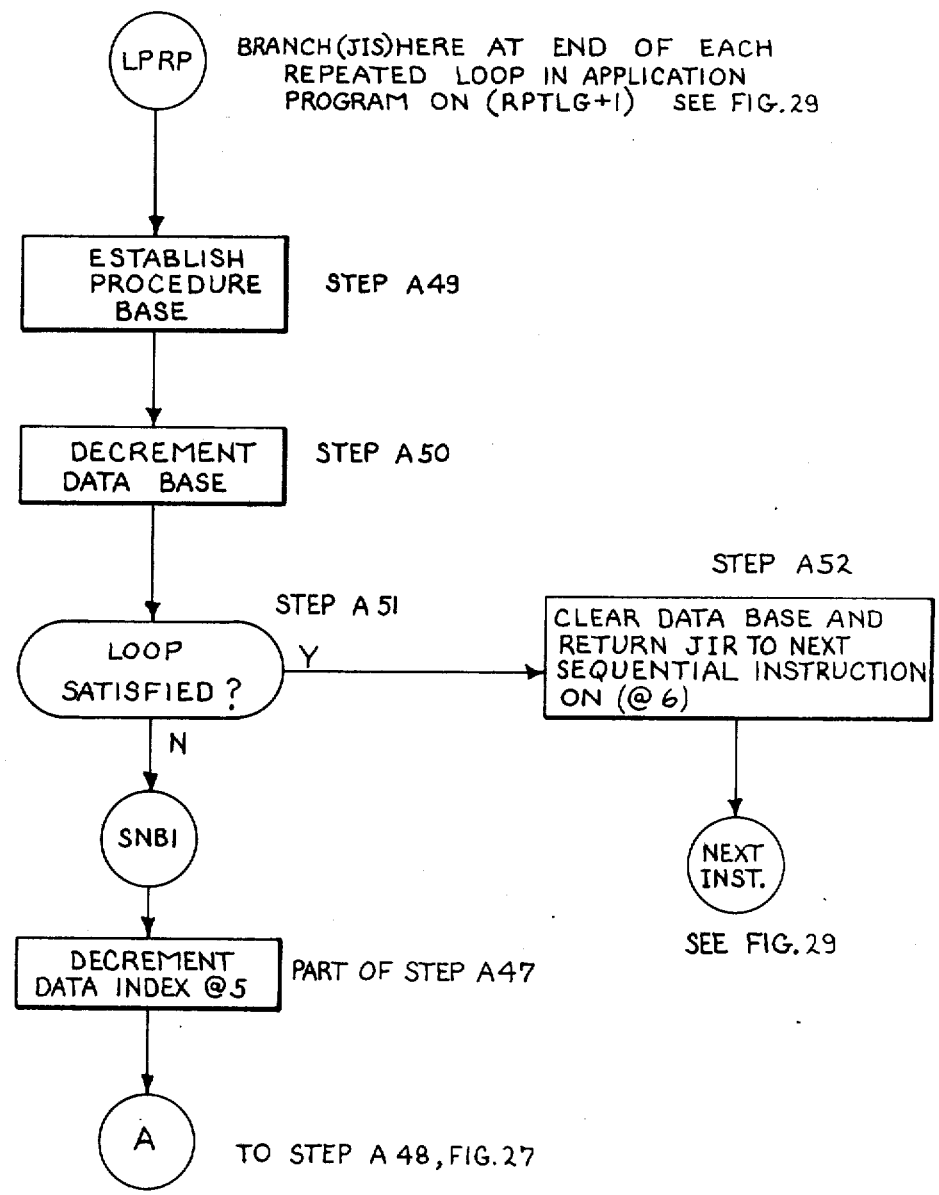
Figure 29:
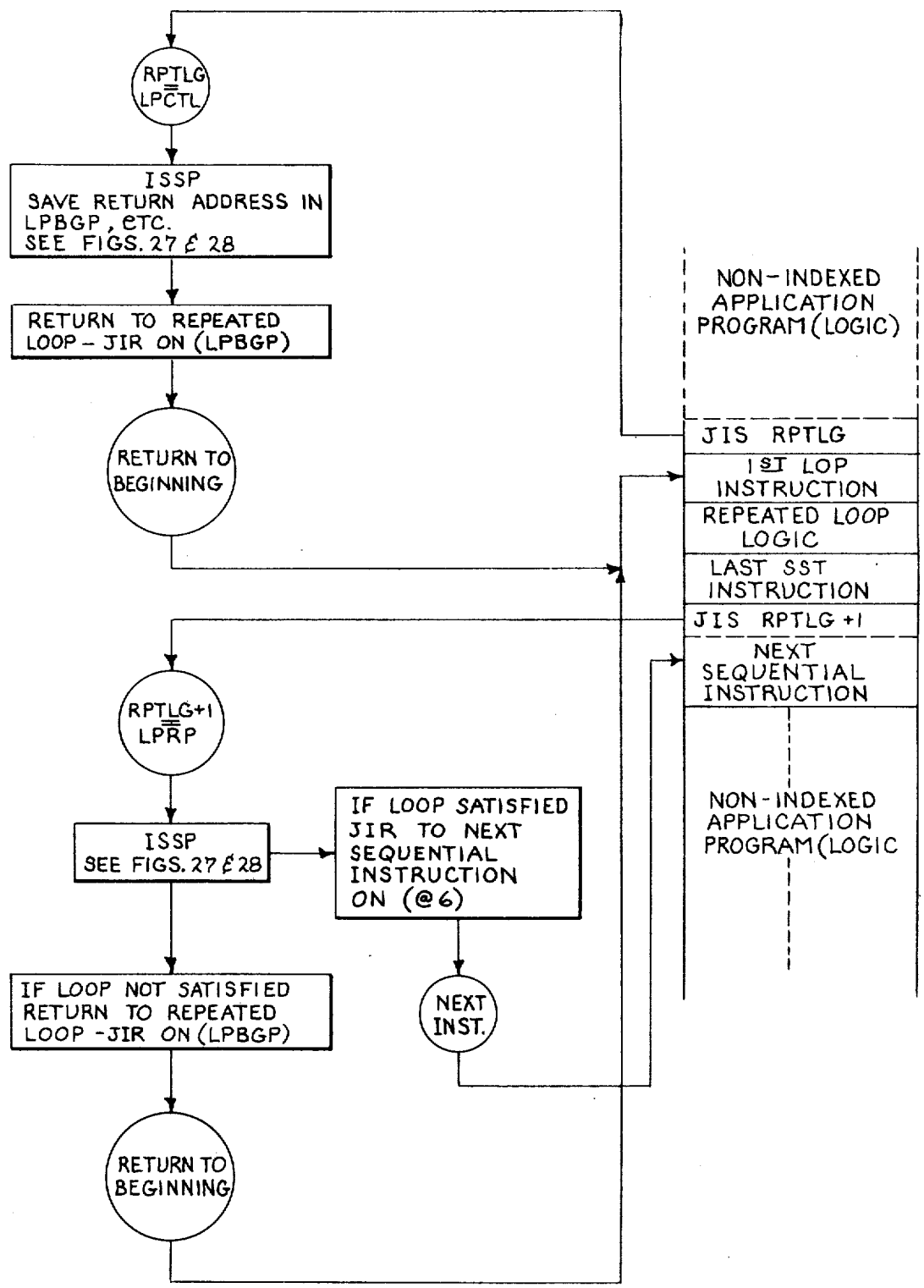

Reference is now made to FIG. 29, which is a high level flow chart showing functionally how the ISSP receives control from and transfers control to the repeated loop logic and how the ISSP controls the operation of the repeated loop logic. FIGS. 27 and 28 are detailed flow charts of the ISSP showing how it controls the repeated loop logic. FIG. 29 is useful in conjunction with FIGS. 27 and 28 to understand how the latter figures interface with the repeated loop logic shown in FIGS. 29 and 32.

Reference is now made to FIGS. 27 and 29. Let it be assumed now that the application program is running and that it has just entered into the first location defining the beginning of the repeated loop (loop #1). The first instruction in the repeated loop is a JIS RPTLG, which causes the application program to branch to a loop control location LPCTL (page A20) based on the contents of location RPTLG (page A4), thus entering into Step A42 of the repeated loop control portion of the ISSP. In Step A42 the procedure base register is established by storing the contents of location INITA (page A4) into location ⦿ 1, the procedure reference base register (FIG. 2). The ISSP now proceeds to Step A43 wherein the return address is saved. This is accomplished by storing the contents of location ⦿ 6, the save location for P, and the contents of location ⦿ 7, the save location for Bp, into loop beginning pointer locations LPBGP and LPBGP+1, respectively (page A4).

A repeated loop counter at location LPCNT (page A4) is next decremented in Step A44, at which time the FR flip-flop (R bit) will be reset if the value of LPCNT is greater than the number of specified loops in the application program (i.e., two loops, loops #1 and #n in the example of FIG. 32), otherwise FR will be set. The ISSP now tests in Step 45 to see if there are more repeated logic loops in the system than specified. If there are more loops than specified, the program exits through a Y branch wherein the system is halted at a repeated loop error location RPTER.

Assuming that there are not more loops in the system than that specified, the ISSP will exit through an N branch into Step A46. In Step A46 (page A21) the contents of location ⦿ 4 (Xp), which is now functioning as a loop repeat pointer, is incremented by 1. The ISSP now goes to Step A47 wherein the data base is preset by storing the contents of location BNDX, X (NLP1-1, page A25) into the data reference base register at location ⦿ 2. Also, at this time, the data index is preset by shifting the contents of the A register, which contains the contents of the presently preset data base, right circular 12 times by the execution of an SRC 12 instruction and storing the contents of the A register in location ⦿ 5, the data and bit reference index register. The program now enters Step A48, wherein the ISSP returns to the repeated loop to the first instruction following the JIS RPTLG instruction as shown in FIG. 29. This return is effected by the ISSP executing a JIR instruction to the location specified by the contents of location LPBGP.

The application program repeated loop logic will now begin to run whereby each of the instructions in the repeated loop will be sequentially executed, while each of those instructions will be indexed upon execution as indicated by the X appended thereto as shown in FIG. 32. The purpose of indexing the instructions in the repeated loop is so that for each pass through the loop, the appropriate input status bits associated with the drive being operated upon during each pass will be accessed. It should also be noted that the SST instruction at the end of each string of logic in the repeated loop is indexed, such as the instruction SST (RUN, X). By indexing the SST instruction, the proper output status bit for each drive will be addressed for each pass through the loop.

Let it now be assumed that the application program has just completed its first pass through repeated loop #1 and now executes an instruction JIS RPTLG+1 as shown in FIG. 29. The execution of this latter instruction causes the application program to now branch to location LPRP based on the contents of location RPTLG+1 entering into Step A49 of FIG. 28. LPRP is the loop repeat pointer. In Step A49 the procedure base register is again established by storing the contents of location INITA (page A4) into the procedure base register Bp at location ⊛ 1.

The ISSP now proceeds to Step 50 wherein the data base register at location ⊛ 2 is decremented by one and the FR flip-flop is either set or reset in accordance with the value in ⊛ 2. At the termination of Step 50 the ISSP proceeds to Step 51 to a loop decision block. If the loop satisfied test proves to be negative, meaning that the repeated loop logic has not been executed the required number of times, the ISSP exits through an N branch into Step A47. In the example of FIG. 32 this required number of executions is three, once for each of the drives 1, 2 and 3. In Step A47 the data index at location ⊛ 5 is decremented by one. This is effected as shown in FIG. 28 and on page A21, wherein the ISSP enters into location SNBI wherein the contents of location ⊛ 2, the data base, are again shifted right circular 12 times to decrement the data index by placing the decremented data base in location ⊛ 5.

The ISSP now exits at A of FIG. 8 entering into A at Step A48 of FIG. 27. In Step A48 a JIR instruction is executed returning the ISSP back to the beginning of the repeated loop logic based on the contents of location LPBGP. This return back to the beginning of the repeated loop is best shown in FIG. 29. The repeated loop logic will now continue to run repeatedly until the loop satisfied test performed in Step 51 of FIG. 28 is positive. When the loop satisfied test is positive, meaning that the loop has been executed the required number of times, the ISSP exits Step A51 through a Y branch to Step A52 (page A22). In Step A52 the ISSP first clears the data base register in location ⊛ 2 and then executes a JIR instruction to the next sequential location following the JIS RPTLG+1 location as shown in FIG. 29 based on the contents of the previously saved P count in the save location for P at ⊛ 6.

Referring to FIG. 32, it can be seen that the next sequential instruction to be executed in the application program is a non-indexed instruction (LDL, SX). The application program will now continue running through the non-indexed portion of the program as shown in FIG. 32 until it encounters another repeated loop illustrated as repeated loop #n controlling two drives, 8 and 9. Repeated loop #n is executed in the same manner as just described for repeated loop #1, with the exception that there are only two drives. Thus, loop #n will only be executed twice prior to exiting that loop and continuing on to the next sequential instruction in the application program shown as LDL RST. The application program will now continue to run to its completion, at which time it will exit and reenter the ISSP at location EPAPP of FIG. 20 as previously described.

DESCRIPTION OF THE INSTALLATION AND MAINTENANCE MODULE (I&MM) AND INSTALLATION AND MAINTENANCE MODULE PROGRAM (IMMP)

The I&MM communicates directly with the executive program through the media of the IMMP to perform a variety of functions. The I&MM is particularly useful during the installation and maintenance phases of a system of the type presently being described for debugging the application program by making changes thereto and for over-riding the conditions of the status bits in the input/output regions of the memory to control the process equipment.

The I&MM provides the capability of displaying various conditions within the application program, such as the status of simulated contacts and relay coils. The I&MM can also display the status of the various input/output bits contained in the input and output regions of the memory. Additionally, the I&MM provides the capabilities of making changes in the application program and of forcing the status condition of the various input and output bits in the input and output regions of the memory. An operator, utilizing the I&MM, can enter a complete application program into the sequencer memory, however, this is normally done from punched paper tape, magnetic tape or the like (not shown). The IMMP communicates with the I&MM to perform various functions as specified by an operator operating the I&MM.

Figure 34:
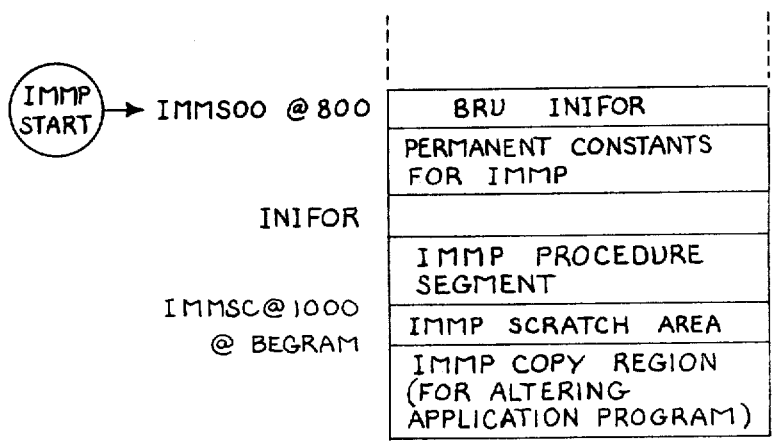
FIG. 34 is also a memory map showing in detail how instructions and data are organized in the computer memory as related to the operation of the operator's console (I&MM) of FIG. 1.

To obtain a thorough understanding of the operation of the I&MM, reference is first made to FIG. 34. FIG. 34 is a memory map showing the organization of the IMMP as it resides in the sequencer memory. The IMMP as shown in FIG. 34 may be considered to be an extension of the memory map of FIG. 2, thus forming a part of the main store of FIG. 1. However, the IMMP may also be included in a separate memory such as the IMMP store of FIG. 1.

The IMMP is comprised basically of four portions or segments. The top segment as shown in FIG. 34 contains permanent constants for the IMMP for controlling its operation. The second segment is an IMMP procedure segment which contains the actual IMMP instructions. An IMMP scratch area is utilized during the execution of the IMMP for storing variables which are written into and read from during program execution. Another important part of te IMMP is an IMMP copy region which is written into and read from during the execution of the IMMP when an operator is altering the application program from the I&MM.

Reference is now made to FIG. 4 which shows the front control panel of the I&MM 28 with its various indicators, pushbutton switches and thumbwheel switches for use by an I&MM operator. Connected to the control panel is a potential source 36 for the switches and indicators. Source 36 serves to provide current through the various switches and the indicators on the control panel via the respective input and output termination units forming a part of the I&MM. As previously mentioned, the I&MM functions as a remote terminal containing those OTU's and ITU's as previously described and referenced in the aforementioned copending patent application, Ser. No. 349,016, "System For Controlling Processing Equipment", filed Apr. 4, 1973 and assigned to the assignee of the present invention.

The I&MM in communication with the IMMP is capable of operating in six modes. These modes are:

(1) Stand-By Mode

In the Stand-By Mode the I&MM is operational and standing by. Also when the I&MM is in standby the IMMP scratch area is cleared (FIG. 34).

(2) Bit Display Mode

In this mode any status bit (input/output/intermediate) can be displayed. See input, output, intermediate and timer/counter regions of FIG. 2. In addition, the condition of any of the status bits in the input/output regions of the memory can be forced. It is well to define at this time what is meant by a forced input or output. A forced input is the status of that input bit in the input region of the memory which is interrogated or referenced by the descriptive logic of the application program, wherein that referenced input takes on a forced state or condition as forced by the I&MM and the actual state of that input bit is ignored while the application program is running. A forced output is the state of an output bit in the output region of the memory as forced by the I&MM providing an output signal to control the process equipment regardless of what the state of that output bit should be as specified by the descriptive logic in the application program.

(3) Logic Display Mode

In the Logic Display Mode any single descriptive logic statement (instruction) in the application program and the current state of the status bit referenced by the logic statement can be displayed. In this mode the I&MM actually displays the application program instructons as they exist in the sequencer memory.

(4) Copy Or Build Mode

In this mode a copy of a specified logic string of interest from the applicaton program may be placed in the IMMP copy region (FIG. 34). Using the I&MM, descriptive logic statements in that copied logic string may be displayed, modified, added to or deleted from while it resides in the IMMP copy region. Additionally, entire logic strings may be added to the applicaton program while in the Copy Mode.

(5) Test Mode

The Test Mode occurs concurrently with either the Bit Display, Logic Display or Build Modes. In this mode all logic strings previously copied into the IMMP copy region of the memory from the application program are exectued as a part of the application program in place of those logic strings which were copied into the IMMP copy region. The original logic strings in the application program (i.e. those having copies thereof in the IMP copy region) remain unaltered in the sequencer memory. These original logic strings can be caused to be executed in their original form in te application program by taking the I&MM out of the Test Mode. The Bit Display and Logic Display Modes functon as previously described when operating concurrently with the Test Mode. However, when the I&MM is concurrently in the Copy and Test Modes, the copies of the logic strings in the IMMP copy region cannot be modified (i.e. logic statements cannot be added to or deleted from those copies). The contents of the IMMP copy region are, however, displayed on the I&MM.

(6) Enter Mode

In the Enter Mode, the I&MM causes the IMMP to insert a logic string or strings from the IMMP copy region into the application program of the sequencer memory. Additionally, the contents of the IMMP copy region are cleared. Also the portion of the memory containing the application program (see FIG. 2) is expanded or compacted to allow the added or modified logic strings to be inserted into the application program. Additionally the I&MM is automatically placed into the Bit Display Mode. Any input or output status bits which were forced prior to entry into the Enter Mode will remain forced until they are unforced The purpose of each of te switches and indictors on the I&MM will now be described. As can be seen in FIG. 4 the switches and indicators are each outlined in a rectangular box with descriptive nomenclature defining the function or functions thereof.

(1) Stand-By

Stand-By is pushbutton back-lighted indicator and is used to place the I&MM into the Stand-By Mode. This pushbutton can be operated while in any mode except the Test Mode. Pressing the Stand-By pushbutton clears the entire IMMP scratch area and the IMMP copy region. This effectively unforces all forced input and output bits and removes all logic string copies. When the Stand-By light is ON the I&MM is in the Stand-By Mode. From the Stand-By Mode, it is only possible to go to the Bit Display or Logic Display Modes.

While in the Stand-By Mode an alpha numeric readout or address display 156 indicates the number of spare memory locations available in the application program region for receiving additional logic strings for inclusion in the application program. In FIG. 2 these spare locations are located in the portion of the memorydesignated, expansion area for application program. As the I&MM operator adds new terms into the application program, the number displayed will change to reflect the number of spare memory locations remaining in the expansion area.

(2) Bit Display

Bit Display is also a pushbutton back-lighted indicator. When depressed, this pushbutton places the I&MM into the Bit DisplayMode. This pushbutton will function while the I&MM is in any other mode. The Bit Display light will be ON to indicate that the I&MM is in the Bit Display Mode. In this mode the only other pushbuttons which can function are Stand-By, Logic Display and Test.

In the Bit Display Mode the only active controls and displays are the address read-out 156, three thumbwheel switches designated PLACE, and three backlighted pushbuttons designated FORCE, CLOSE and OPEN.

In the Bit Display Mode the I&MM can address and display the state of addressed bits (one at a time) in the input, output and intermediate regions of memory (FIG. 2). If an address outside of the boundaries of these regions is dialed into the PLACE thumbwheels the read-out 156 will display a special code and an error light designated ERROR will turn on. Should tis type of error occur, the operator should place an allowable address into the PLACE thumbwheels and press the error display button to clear the error. When the error is cleared the error light will go out andte bit address last placed in the PLACE thumbwheels will be displayed on the read-out 156.

The state of the bit which is addressed by the PLACE thumbwheels, and displayed on the read-out, is indicated by two indicator lights designated CLOSED and OPEN. The CLOSED light will be on if the addressed bit is a binary one, or the OPEN light will be on if the addressed bit is a binary zero. Additionally, while in the Bit Display Mode, input and output bits in the input and output regions can be forced.

(3) Logic Display

Logic Display is a back-lighted pushbutton indicator switch, and when depressed, places the I&MM into the Logic Display Mode. This pushbutton will function while the I&MM is in any other mode. The Logic Display light will be ON to indicate that the I&MM is in the Logic Display Mode. While the I&MM is in this mode, the only other pushbuttons which can function are Stand-By, Bit Display, and Copy.

In the Logic Display Mode the I&MM can address and display (one at a time) the logic instructions or terms making up any string of logic in the application program. An example logic string may be like that of logic string 2 as shown in FIG. 5. A logic string ends in one or more relay coils, each identified by an SST instruction. Logic string 2 shows only one coil, however, there may be as many parallel connected coils as desired at the end of each logic string. A logic tring normally beings with an L-bus term designated LDL as shown in logic string 2. As will subsequently be described, the I&MM can point to any one instruction at a time by the utilization of two pushbutton back-lighted indicators having arrows on the control panel designated 158 for move left and 160 for move right.

(4) Copy Mode

The Copy Mode control is also a pushbutton back-lighted indicator which, when depressed, places the I&MM in the Copy or Build Mode. This pushbutton functions only while the I&MM is in the Logic Display or Test Modes. In the Copy Mode the only other pushbuttons which can function are Stand-By, Logic Display and Test.

In Copy Mode a logic tring is copied from the application program region of the memory into the IMMP copy region so that it may be operated upon. The original logic string remains unaltered in the application program and continues to function while the application program is running.

A typical logic string which might be copied from the application program into the IMMP copy region may be logic string 1a of FIG. 5. It is significant to point out at this time that the LDL term associated with logic string 1a is only accessible when the I&MM is in the Copy Mode. Thus, when logic string 1a is transferred into the IMMP copy region, the entire logic string 1a, including the LDL term is also transferred. If it is desirable to copy logic string 1b from the application program into the IMMP copy region, the I&MM operator would normally dial the address 2A9 (logic string) into the PLACE thumbwheels and then depress the Logic Display and Copy pushbuttons, respectively. Upon depressing the Copy pushbutton the entire logic string 1b will be copied into the IMMP copy region, excluding the LDL instruction. The reason for this, as will be recalled, is because the LDL term is a common permissive contact to logic strings 1a and 1b; thus, the LDL term need not be included in logic string 1b when copied into the IMMP copy region.

(5) Test Mode

The Test Mode control is also a pushbutton back-lighted indicator which is utilized to toggle the I&MM between the Test Mode and the Copy Mode. Pressing the Test pushbutton, while the Copy light is ON, will place the I&MM into the Test Mode. Pressing the Test pushbutton while the Test light is on will restore the I&MM to the Copy Mode (i.e., untest mode). The Test button can only function in the Copy or Test modes. When the Test light is on it indicates that the I&MM is in the Test Mode. The only other mode pushbuttons which can function while the I&MM is in the Test Mode are the Bit Display, Logic Display and Copy.

When the I&MM operator depresses the Test Mode switch (turning on the test indicator) the I&MM notifies the IMMP to process the application program logic strings (now existing in the IMMP copy region) in place of their corresponding logic strings in the application program region of the memory. In the Test Mode, the logic strings in the application program are retained in the application program region and are jumped over while the corresponding logic strings in the IMMP copy region are tested as an integral part of the application program. The logic strings executed in the IMMP copy region actually generate output status bits for controlling the industrial process. If the operator observes that the logic strings being tested in the IMMP copy region do not perform as desired, he can place the I&MM back into the Copy Mode by depressing the Test Mode pushbutton. Placing the I&MM back into the Copy Mode from Test Mode causes the original logic strings in the application program to again control the industrial process, while the logic strings in the I&MM copy region are retained. With the I&MM back in the Copy Mode the operator can continue to make changes, additions or it to the logic strings in the IMMP copy region prior to placing I&MM back Limits Test Mode.

6. Enter

The Enter control is preferably a key switch, however, it may also be a pushbutton switch, and does not have any indicator associated with it. The Enter control is used to place the I&MM in the Enter Mode and functions only while the I&MM is in the Test Mode.

When the I&MM is placed in the Enter Mode, it notifies the IMMP to insert the logic strings in the IMMP copy region into the proper locations in the application program region of the memory. When the logic strings are transferred into the application program, certain alternations are performed on the IMMP logic strings and on the application program logic strings to optimize memory space in the application program region. One of these alterations consists of removing all delete instructions (DEL's) from the IMMP logic strings before they are entered into the application program. Also, an alteration is required in the application program if a string(s) of logic is added to or deleted from the application program. In this instance the application program instructions are appropriately moved up or down in the application program region of memory to allocate the exact amount of space needed by the logic strings being inserted into the program. After the IMMP has completed entering the IMMP logic string(s) into the application program, it automatically places the I&MM into the Bit Display Mode.

7. Open and Close

The Open and Close controls are both pushbutton back-lighted indicators and function only when the Bit Display and Force indicator lights are both on. The Open and Close pushbuttons are used to force either an input or an output status bit in the input and output regions of the memory respectively to their opposite state. If the Force and Open lights are both on (contact forced open) then the operator must push the Close pushbutton to force the status bit presently being addressed by the I&MM to be closed. If the forced and closed lights are both on (contact forced closed) then the operator must push the Open pushbutton to force the addressed status bit to the open state.

When the I&MM is in the Bit Display Mode without the Force light on, the Open and Closed lights indicate the state of the input or output status bit whose address is shown in the PLACE thumbwheels and displayed on the read-out 156.

When the I&MM is in either the Logic Display or Copy Mode, the Open and Close lights indicate the current state of the status bit or contact in the application program that the I&MM is pointing at or addressing. For example, referring to logic string 1a, FIG. 5, if the I&MM is pointing at the LAT 12/A term of the application program and if bit address ⦿ 12/A of FIG. 7 (SA contact) is a logic 1 the closed light will be ON indicating that the contact SA is currently closed.

As another example, if the I&MM is pointing at the term LAF 12/5 and if bit address ⦿ 12/5 (LS contact of FIG. 7) is a logic 1 then the Open light will be ON indicating an open contact. If bit address ⦿ 12/5 is a logic 0, then the Closed light will be ON. As a further example, if the I&MM is pointing at an SST 2A/8 term as shown in logic string 2 of FIG. 5, then the Closed light will be ON if coil K5 at bit address ⦿ 2A/8 is a logic 1 or the Open light will be ON if bit address ⦿ 2A/8 is a logic 0.

8. Force

The Force control is a pushbutton back-lighted indicator switch which functions only when the I&MM is in the Bit Display Mode. Pressing the Force button forces the state of the input or output status bit whose address is placed in the PLACE thumbwheels and presently being displayed on the read-out 156. The state of the addressed status bit will be forced to a state indicated by which of the Open or Close lights is ON. If it is desired to force a bit to the opposite state, the operator must press the unlighted Open or Close light after having pressed the Force pushbutton. An Open light is an indication of a logic 0 at that bit address in memory. A Closed light is an indication of a logic 1 at that bit address in memory.

If the Force light is ON, pressing the Force button will unforce the addressed status bit and the Force light will go out. If the I&MM is in Logic Display and Copy Modes, and the Force light is ON, the states of forced input status bits will be displayed but they cannot be changed by operation of the Open and Closed buttons.

It is significant to note at this time that the forcing of the state of an input status bit in the input region of the memory affects all instructions in the application program which reference that status bit. As a result the state of the coil (SST) terminating the logic string(s) encompassing those referencing instructions will be affected. However, forcing the state of an output status bit in the output region of the memory does not affect the state of that status bit as calculated by the application program. This is accomplished in the present system by the IMMP which makes two entries into the basic operating cycle of the ISSP and is best illustrated by again referencing FIG. 9.

From the preceding description of the ISSP, it will be recalled that the ISSP first actuates the hardware (i.e. the digital bus controller) to read the process inputs into the input status region of the memory. After having read the last of the process inputs, the ISSP then causes the IMMP, shown as IMMP1, to run. During the running of IMMP1 the states of the input and output status bits are forced as specified by the I&MM operator. The IMPP1 remembers the original states of the forced output status bits by storing them in a designated region of memory. Upon the termination of IMMP1, the ISSP actuates the DBC to transfer all of the output status bits (forced and unforced) from the output region of the memory to the process equipment. As soon as the ISSP has transferred all of the output status bits, it then runs the second half of the IMMP, IMMP2. The purpose of IMMP2 is to restore all of the forced output signals back to their original states. This is accomplished by placing those remembered output status bits back into their original locations in the output region of memory where they resided prior to the forcing as done in IMMP1. Upon termination of IMMP2, the ISSP now runs the application program which will update all of the output status conditions in accordance with the states of the forced and unforced input status bits.

9. Error

The Error control is also a pushbutton back-lighted switch indicator. The Error light will come on to indicate an operator error, and it can come on while the I&MM is operating in any one of its modes. Additionally, an Error code is displayed on the read-out 156 when the Error light is ON. Also, when the Error light is ON, with Error code being displayed, all other indicators on the I&MM are extinguished. With the Error light ON, only the Error button is functional. Pressing the Error button will restore the I&MM to the mode it was in before the error condition was produced. An error condition is normally caused by the operator pressing one of the pushbuttons out of the normal sequence or placing a wrong address into the PLACE or BUILD thumbwheels. In the case of an error resulting from wrong information being placed in the PLACE or BUILD thumbwheels, it will be necessary for the operator to correct the information in these thumbwheels prior to clearing the error (i.e., pressing the Error button).

10. Left & Right

The Left & Right controls 158 and 160, respectively, are pushbutton back-lighted switch indicators shown having arrows pointing left and right. The operation of the Left and Right pushbuttons by the operator enable him to selectively move left and right across a logic string from one instruction to the next while the I&MM is in the Logic Display and Copy Modes. The lights essentially tell the I&MM operator that he has permission to move left and right across a logic string. As previously described, a logic string is normally located by placing the address of the SST instruction terminating a desired logic string in the PLACE thumbwheels. For example, referring to logic string 2 in FIG. 5, if the operator places the address 2A/8 in the PLACE thumbwheels while in the Logic Display or Copy Modes, the read-out 156 will display 02A8 and an address light directly below the display will come ON. In addition, a coil state light and one of the Open or Close lights will indicate the status of the relay K5. In addition, the move right light will be out and the move left light 158 will come ON to indicate to the operator that the logic string continues to the left of the SST instruction 2A/8. When the operator presses the Left pushbutton once, the I&MM will specify to the IMMP to move left across logic string 2 displaying the next contact to the left of the SST. Also, the move right light will come on indicating that at least one instruction exists to the right of the instruction presently being displayed. In the example, logic string 2 of FIG. 5, this contact is K4 at location @ 2A/9 and will be displayed as such on the readout 156. Also, a normally closed series contact light LAF, representative of an LAF instruction, will come ON. Further, one of the Open or Close lights will come ON indicating the open or closed status of contact K4.

The operator can depress the Left pushbutton as many times as necessary to move to the left across a logic string to reach any desired contact. The move left light will remain ON as long as there is a contact remaining to the left of the one presently being displayed on the I&MM. Referring back to logic string 2 in FIG. 5, if the operator presses the move left button, after displaying contact K4, the next display to appear on the read-out will be address 00FF which is contact PU referenced by the LDL instruction. Also, at this time, an L indicator light will come ON, indicating that the I&MM is presently looking at an LDL instruction. Simultaneously, with a displaying of the LDL instruction, the move left indicator light will go out.

It was previously stated that the move right indicator light came on with the first operation of the move left button. This light will remain ON so long as an instruction exists to the right of the present instruction being displayed on the I&MM. If the I&MM operator now desires to step to the right across logic string 2 of FIG. 5, starting with the LDL instruction, he merely has to press the move right pushbutton to first display the instruction LAF, and contact K4, and then depress the button one more time to display the instruction SST and contact K5. The move right light will remain ON until the last SST instruction at the end of a logic string has been displayed. Thus, since instruction SST, K5 is the last instruction of logic string 2 the move right light will not go out. Further operation of the move right pushbutton by the operator will result in no change on the I&MM.

11. Coil State Indicator

The Coil State Indicator does not contain a pushbutton. The Coil State light indicates the current status of the relay coil (SST instruction) at the end of a logic string currently being displayed on the I&MM while in the Logic Display Mode. When the indicator is ON it indicates that the relay coil is energized (logic 1) and when it is OFF it indicates that the relay coil is deenergized (logic 0).

Regardless of which instruction in a given logic string the I&MM is pointing at, the Coil State light will indicate the current state of the relay coil terminating that particular logic string. For example, referencing logic string 1a of FIG. 5, the Coil State light will indicate the current state of the SV relay coil (bit 2A/B) even though the operator may have adjusted the PLACE thumbwheel switches to point at location 12/6, the LOT LSX contact. Thus, the Coil State light enables the operator of the I&MM to constantly monitor the status of the relay coil in a particular logic string of interest while moving left and right across the logic string examining the status of the other contacts in the logic string.

Still referring to logic string 1a, if the I&MM is pointing at the SST SV instruction, then the Open and Close lights will also indicate the current status of the SV coil at location @ 2A/B. The interrelationships between the Coil State light and the Open-Close lights in this case are:

a. Close light ON = Coil State light ON and relay coil is energized (logic 1);
b. Open light ON = Coil State light out and relay is deenergized (logic 0).

12. Copy Storage

The Copy Storage control is a pushbutton back-lighted switch indicator which, when illuminated, indicates to the I&MM operator that at least one version of a logic string exists in the IMMP copy region of the memory. The Copy Storage light will come On upon the operator pressing the Copy Mode pushbutton for the first time. The Copy Storage light will remain ON until the IMMP copy region of the memory is cleared. The IMMP copy region can be cleared by operating the Enter key switch, the Stand-By Mode pushbutton or by pressing the Copy Storage pushbutton.

The primary purpose of the Copy Storage light is to serve as a reminder to the I&MM operator that logic string information exists in the IMMP copy region.

As previously mentioned, depressing the Copy Storage pushbutton clears the IMMP copy region in the memory. This button can be pressed while the I&MM is in either the Copy Mode, Logic Display Mode, or the Bit Display Mode. Its operation does not affect any forced input or output bits in the input/output regions of the memory which have previously been forced.

13. LDL, LAT, LAF, LOT, LOF, SST

These controls have been grouped together in one explanation since the functions which they perform are quite similar.

Each of these control is a pushbutton back-lighted switch indicator functioning only while the I&MM is in the Copy Mode. While in the Copy Mode, if the operator presses any one of these pushbutton switches, the operation that the particular switch represents (instruction) will be written over the instruction in the IMMP copy region that the I&MM is pointing to at that time. The indicator lights on each of these controls, when lit, indicate the type of operation to which the I&MM is pointing. Since the I&MM points to only one instruction at a time, only one of these lights will be on at any given time.

If the I&MM is in the Logic Display Mode, these indicator lights indicate the instructions that exist in the application program. When the I&MM is in the Copy Mode these lights indicate to the operator the instructions that exist in the IMMP copy region of the memory.

It is significant to note that the instructions which are displayed on the I&MM while in the Copy Mode may not be the same instructions that exist in the application program for the corresponding logic strings existing in the application program. This is due to the fact that the operator may have transferred a logic string from the application program into the IMMP copy region and then changed that logic string.

When observing these lights the operator can look at the read-out which will indicate the address of the status bit which corresponds to the operation or instruction whose light is ON. For example, referring to logic string 2 of FIG. 5, if the LAF indicator light is ON, the read-out will display the address 02A9, thus indicating to the operator that that instruction LAF refers to location @ 2A9 which is contact K4 in the output status region of the memory (FIG. 7).

14. Counter/Timer

The Counter/Timer controls are comprised of a plurality of pushbutton back-lighted indicators for displaying and changing the various Timer/Counter instructions in the application program. The Timer/Counter pushbuttons are operative only when the I&MM is in the Copy Mode. The Counter/Timer instructions information can be displayed when the I&MM is in the Logic Display Mode. The Timer/Counter pushbutton indicators shown in FIG. 4 are identified as RESET, 0.1 SEC timer, 1 SEC timer, COUNTER and FV.

Two input lines 162 and 164 are shown in schematic form coming into the Timer/Counter from the string contacts and the L (left bus) contact. Line 162 represents an increment (INC) input from the string contacts to a current value (CV) symbol. CV is shown to symbolically indicate a counter or timer which is driven by the INC input and always contains the current value (CV). Line 164 represents a reset (RST) input to a counter or timer in series with a normally open contact 166. From a functional standpoint, when the application program is running and when a TCR instruction is executed, contact 166 momentarily closes to reset or zero out a timer or counter (i.e. reset the current value, CV).

An output line 168 connects a normally open switch 170 to a relay coil forming a part of a timer or counter and shown on the I&MM as the SST,K indicator. From a functional standpoint, during the running of the application program, when the current value (CV) equals the final value (FV), switch 170 closes to energize the relay connected to that switch.

With the I&MM in the Copy Mode, when any one of the pushbuttons in the Timer/Counter group is pressed, the operation which that switch represents will be written over the instruction to which I&MM is pointing. For example, with the I&MM pointing at a TCR instruction at an address location previously placed into the PLACE thumbwheels, the operator can; (1) press the reset (TCR) button to change the bit address associated with the TCR instruction to an address previously dialed into the BUILD thumbwheels; or (2) he may push the delete button to overwrite all three of the timer or counter terms with delete (DEL) instructions, thus essentially removing the entire timer or counter from the IMMP copy region.

With the I&MM pointing at a TTU, TOU, or CTU term (the middle term of the three instructions required to build a counter or timer) with the value indicator ON, the operator can press any one of the following buttons:

counter (CTU), 1 SEC timer (TOU), or 0.1 SEC timer (TTU). The operation of any one of these three buttons will change the term which the I&MM is pointing at to the term corresponding to the switch just pressed and also set the current value (CV) of that new term to a value previously dialed into the BUILD thumbwheel switches (normally 0000).

With the I&MM pointing at a TTU, TOU, or CTU term and with the address light ON, the operator can press any one of the following switches:

counter (CTU), 1 SEC timer (TOU), or 0.1 SEC timer (TTU). The operation of either one of these three button will change the word address associated with these terms to an address previously dialed into the BUILD thumbwheels. Subsequent to pressing any of these buttons, the I&MM operator should then press the value button, followed by setting a current value into the BUILD thumbwheels (normally 0000) and then pressing which ever one of the three buttons (0.1 SEC timer, 1 SEC timer or COUNTER) is lit at that time.

With the I&MM pointing at a CFV term (current value instruction) and with the value light on, the operator can dial a new final value (FV) into the BUILD thumbwheels and then press the final value (FV) pushbutton. This sequence of operations will change the set point of the final value for either a counter or a timer.

This covers the basic operation of the Timer/Counter controls; however, this description has not explained how to build a completely new counter or timer in the IMMP copy region. The description of how to build a complete timer or counter will subsequently be given in the description of how to use the I&MM.

15. Address and Value

The Address and Value controls are pushbutton back-lighted indicators for use primarily when building timers and counters. However, they also indicate that an address of a LOP type of instruction or the current or final value of a term in either a timer or a counter, is being displayed on read-out 156.

When the Address pushbutton is operated, with the I&MM in the Copy Mode, the word address associated with either a TOU, TTU, CTU, or CFV term will be obtained and the address indicator will come on. When the Address indicator is ON, both the read-out and the BUILD thumbwheels (is appropriate) are divided so that the three left-hand characters of the read-out represent the word address and the right-hand character of the read-out is the bit address. If a particular address is only a word address then the right-hand character on both the display and the thumbwheel switches is normally ignored by the operator. With the I&MM in the Copy Mode, the value pushbutton can be operated to set a desired current or final value term into the counter or timer being built in the IMMP copy region. This is accomplished by the operator first pressing the value pushbutton and then setting the desired current or final value into the BUILD thumbwheels and then pressing either the counter or FV pushbuttons. A more thorough description of the operation of these two controls will subsequently be given.

16. Delete

This control is also a pushbutton back-lighted indicator, wherein the Delete button functions only while the I&MM is in the Copy Mode. When the Delete pushbutton is pressed, it will cause the IMMP to overwrite the instruction that the I&MM is currently pointing at with a delete (DEL) instruction. Whenever the Delete pushbutton is operated the Delete light will come on indicating to the operator that a DEL instruction has been written over the instruction referenced by the I&MM.

17. Insert Space

This control is also a pushbutton back-lighted indicator and the button functions only while the I&MM is in the Copy Mode. When operated, this pushbutton inserts a DEL instruction between the term that the I&MM is pointing at and the immediately adjacent right term (i.e., a space is created between two adjacent memory locations). The Insert Space control is used to add an additional operation or instruction to an existing logic string in the IMMP copy region. Once a space is created by the operation of the Insert Space pushbutton, any desired operation or instruction can be built directly into that space. If the DEL instruction is never overwritten with an operation, then it will be removed from the logic string when the I&MM is placed in the Enter mode. A more detailed description of the use of this control will subsequently be described.

18. Multi-Reference

The Multi-Reference control is also a back-lighted pushbutton indicator. The Multi-Reference light comes ON to indicate that the SST instruction bit address that the I&MM is currently pointing at is referred to by more than one SST instruction. The Multi-Reference pushbutton can only function in the Logic Display and Copy Modes. The light can come on only while in the Logic Display Mode, but once it is ON, it will remain ON in Copy Mode as a warning and as a reminder to the operator that multi-references exist in the application program. When the light is OFF, it indicates to the operator that no multi-references exist for this particular bit address. When the Multi-Reference button is pressed, it causes the IMMP to find the next logic string that contains and SST instruction that references the bit address currently being shown on both the read-out and in the PLACE thumbwheels. This bit address will continue to be shown upon each operation of the Multi-Reference pushbutton until the last SST instruction (that instruction referring to the same address as in the PLACE thumbwheels) is being displayed. When this last instruction is displayed, the Multi-Reference light will go out; however, the pushbutton may be pressed again to obtain the first SST reference in the logic string of interest.

19. Repeated Loop

The Repeated Loop control is comprised of an indicator and a thumbwheel switch. The Repeated Loop indicator will be ON to indicate that the logic string currently being displayed, built, or tested is within the storage boundaries of the repeated loop logic for controlling several like drives. When the Repeated Loop light is ON, the instructions in the logic string of the repeated loop currently being pointed to by the I&MM can be indexed. Whether or not a particular instruction is indexed is indicated by the X light on the I&MM.

The Repeated Loop thumbwheel functions only when the I&MM is in the Logic Display Mode and when both the Repeated Loop and X lights are ON. The function of the Repeated Loop thumbwheel is to enable the operator to interrogate indexed instructions within a repeated loop logic string while in the Logic Display mode. To locate a particular logic string in the repeated loop, the operator should dial in a number on the thumbwheels corresponding to a particular logic string associated with the desired drive. The operator should also dial in at the PLACE thumbwheels the bit address of the relay at the end of the logic string he desired to display. When he presses the Logic Display button, the Repeated Loop light will come ON, the X light will come ON, and the read-out will display the address referenced by the SST instruction terminating the selected logic string. When the I&MM is in the Copy Mode the Repeated Loop light and the X light function as in Logic Display Mode; however, the Repeated Loop thumbwheel switches perform no function.

20. X Control

The X control is also a pushbutton back-lighted indicator, wherein the X pushbutton only functions while the I&MM is in the Copy Mode and the Repeated Loop light is ON. Under these conditions, consecutive operations of the X pushbutton will toggle the X light ON and OFF. For example, if it is desired to index a non-indexed instruction, the operator may merely do so by pressing the X pushbutton while having the I&MM point at the instruction to be indexed. To un-index that same instruction, the operator need merely press the X pushbutton again and the instruction will be un-indexed and the X light will go out.

OPERATION OF THE INSTALLATION AND MAINTENANCE MODULE

The following description related to a step-by-step procedure of how to utilize the I&MM.

A. To display the state of a status bit in the input, output or intermediate regions of the memory perform the following:

| | Function | | Indications |
|---|---|---|---|
| Step 1 | Press Bit Display button | 1) | The Bit Display light will come on (ignore all other indications). |
| Step 2 | Dial into the PLACE thumbwheels the bit address of the bit it is desired to display. For example, referring to FIGS. 5 and 7, for Bit SA, the address 12A would be dialed into the PLACE thumbwheels. | 2) | The read-out 156 will display the bit address (012A) just dialed in. Either the Open or Closed light will be on to indicate the current status of contact SA. |

B. To force input or output status bits in the input or output regions of the memory perform the following:

| | Function | | Indications |
|---|---|---|---|
| Step 1 | Repeat Steps 1 and 2 in A) above using the bit address of the input or output bit to be forced. | 1) | As described in A) above. |
| Step 2 | Press the Force button once. | 2) | The Force light will come on. |

-continued

| | Function | | Indications |
|---|---|---|---|
| Step 3 | Press the Close or Open button (if required) to obtain the desired force state | 3) | Either the Closed or Open light will come on following that pushbutton operation. |

NOTE: To unforce a forced status bit when the Force light is on, press the Force pushbutton and the Force light will go out, indicating that the status bit is no longer being forced. Also, all forced status bits may be simultaneously unforced by returning the I&MM to the Stand-By Mode by depressing the Stand-By button.

NOTE: To unforce a forced status bit when the Force light is on, press the Force pushbutton and the Force light will go out, indicating that that status bit is no longer being forced. Also, all forced status bits may be simultaneously unforced by returning the I&MM to the Stand-By Mode by depressing the Stand-By button.

C. To display a logic string in the application program perform the following:

NOTE: All of the logic elements or terms shown in the sample logic string 1a of FIG. 5 are accessible by repeatedly pressing the move left and right buttons. To display a different logic string, repeat Steps 1 and 2 above.

Figure 35:
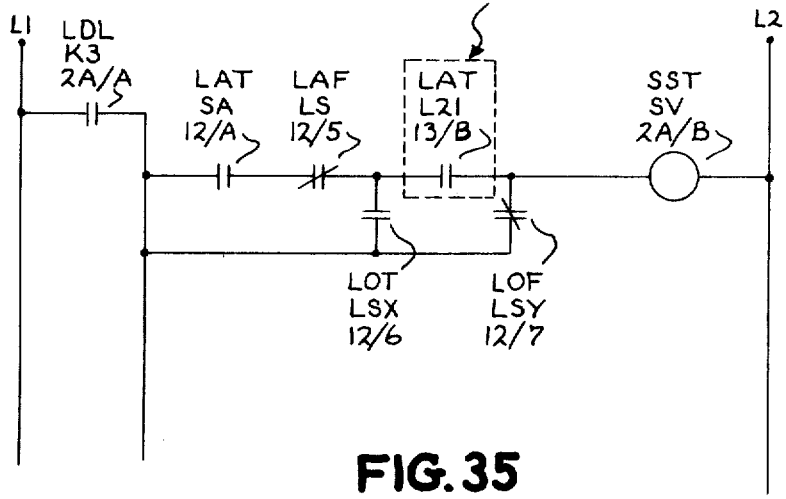

D. To modify or add to an existing logic string in the application program, such as change the logic string 1a in FIG. 5 to the logic string as shown in FIG. 35, per-

| | Function | | Indications |
|---|---|---|---|
| Step 1 | Dial into the PLACE thumbwheels the bit address of the relay coil at the end of the desired logic string. For example, in FIG. 5, logic string 1a, dial into the PLACE thumbwheels the address, 2AB, of the SV contact (Fig. 7). | 1) | Ignore any indications. |
| Step 2 | Press the Logic Display button. | 2) | The Logic Display light will come on. The read-out will display the bit address (02AB) of the SV contact. The Address light will come on. The move left light 158 will come on. The K light will come on indicating a coil or SST instruction is selected. And, either the Closed or Open light will come on to indicate the status of the relay coil. The Coil State light will also indicate the status of the relay; on for energized and off for de-energized. |
| Step 3 | Press the move left and right pushbuttons to move left and right, respectively, across the logic string to point at individual relay contacts in the string. Each press of the respective pushbuttons will move across the logic string in the appropriate direction one logic element at a time. For example, press the move left pushbutton once. | 3) | The K light will go out and the LOF light will come on. The read-out will display 0127. The Closed or Open lights will indicate the current status of the LSY contact and the LOF light will come on. The move right light will come on, the move left light will remain on and the Coil State light will continue to indicate the current state of the SV relay coil. |

NOTE: All of the logic elements or terms shown in the sample logic string 1a of FIG. 5 are accessible by repeatedly pressing the move left and right buttons. To display a different logic string, repeat Steps 1 and 2 above.

form the following:

| | Function | | Indications |
|---|---|---|---|
| Step 1 | Repeat Steps 1 and 2 in C) above. | 1) | Same as described in C) above. |
| Step 2 | Press the Copy pushbutton. | 2) | The Logic Display light will go out and the Copy light will come on. The Coil State light will no longer indicate the status of the relay. |
| Step 3 | Press the move left and right pushbuttons until pointing at a term it is desired to build from. In the example, press the move left button once. | 3) | The move left light will come on and the read-out will display 0127. The Close or Open lights will indicate the current status of the LSY contact. The LOF light will come on. |
| Step 4 | Press the move left button once more. | 4) | The LOF light will go out and the LOT light will come on pointing at the LSX contact. The read-out will now display 0126 and the |

-continued

| | Function | | Indications |
|---|---|---|---|
| | | | Close or Open light will indicate the current status of the LSX contact. |
| Step 5 | Press the Insert Space button. | 5) | The LOT light will go out and the Delete light will come on with the I&MM now pointing at the space (DEL instruction) just inserted between the LSX And LSY contacts. The read-out will display FFFF indicating all binary 1's as a DEL instruction now being pointed to. Neither the Closed or Open lights will be on. |
| Step 6 | Dial into the BUILD thumbwheels the address 13B for the new contact L21 to be added and then press the LAT button to insert the new term into the logic string 1a whereby logic string 1a appears as shown in FIG. 35. | 6) | The Delete light will go out and the LAT light will come on. The read-out will display 013B and the Closed or Open lights will indicate the current status of the L21 contact. |
| Step 7 | To change the normally open series contact SA of logic string 1a in FIG. 5 to a normally closed series contact perform the following: | 7) | |
| | a) Press the move left button 3 more times. | a) | On the last press of the move left button the LAF light will go out and the LAT light will come on. The read-out will display 012A and the Close or Open light will indicate the current status of the SA contact. |
| | b) Press the LAF button. | b) | The LAT light will go out and the LAF light will come on. The read-out will still display 012A and the Closed or Open light will indicate the current status of the SA contact. |
| Step 8 | Press the Test pushbutton. | 8) | The Test light will come on indicating that the I&MM is now in the Test Mode. The logic string of FIG. 35 is now being tested as a part of the application program and is controlling the industrial process. The logic string of FIG. 35 is now replacing the logic string 1a of FIG. 5. Logic string 1a still remains in the application program but is not being executed. |
| Step 9 | Operate the Enter key switch. | 9) | The Test light will go out and the Bit Display light will come on along with the indications associated with the Bit Display Mode. The Copy Storage light will go out. The modified logic string of FIG. 35 is now entered into the application program in place of logic string 1a which is removed from the application program. |

(E) To add or insert a completely new logic string such as logic string 1b of FIG. 5 into the application program perform the following:

| | Function | | Indications |
|---|---|---|---|
| Step 1 | Dial into the PLACE thumbwheels the bit address of the relay at the end of the logic string immediately before (above) the desired location of the new logic string. Example: dial into the PLACE thumbwheels the address 2AB. This is the SST instruction of logic | 1) | Ignore any indication. |

|  | Function | Indications |
|---|---|---|
|  | string 1a. |  |
| Step 2 | Press the Logic Display button. | 2) Same as explained in Step 2 under C) above. |
| Step 3 | Press the Copy pushbutton. | 3) The Logic Display light will go out and the Copy light will come on. The Coil State light will no longer indicate the relay coil status and the Copy Storage light will come on. |
| Step 4 | Press the Insert Space button. This creates a memory space (DEL) to the right of the term that the I&MM is pointing at (2AB) in the schematic of FIG. 5 (i.e. below location 2AB in memory). | 4) The K light will go out and the Delete light will come on. The read-out will display FFFF and neither the Open or Closed lights will be on. |
| Step 5 | Dial into the BUILD thumbwheels the bit address of the first new term to be inserted and then press the appropriate one of the pushbuttons. In this example, dial 02AB into the BUILD thumbwheels and press the LAF pushbutton. | 5) The Delete light will go out and the LAF light will come on. The read-out will display 02AB and the Close or Open lights will indicate the status of the SV contact just built. |
| Step 6 | Press the Insert Space pushbutton. | 6) The LAF light will go out and the Delete will come on. The read-out will display FFFF and neither the Open or Closed lights will be on. |
| Step 7 | Dial 0135 into the BUILD thumbwheels and press the LOF pushbutton. | 7) The Delete light will go out and the LOF light will come on. The read-out will display 0135 and the Close or Open lights will indicate the status of the TA contact just built. |
| Step 8 | Press the Insert Space pushbutton. | 8) The LOF light will go out and the Delete light will come on. The read-out will display FFFF and neither the Open or Closed lights will be on. |
| Step 9 | Dial 02A9 into the BUILD thumbwheels and press the K pushbutton. | 9) The Delete light will go out and the K light will come on. The Coil State light will indicate the status of the relay coil. The read-out will display 02A9 and the Close or Open lights will indicate the status of the K4 relay just built. |
| Step 10 | Press the Test pushbutton. | 10) The Test light will come on and the I&MM will now test the logic string 1b as part of the application program. |
| Step 11 | Operate the Enter switch. | 11) The Test light will go out and the Bit Display light will come on along with the indications associated with Bit Display Mode. The Copy Storage light will go off. Logic string 1b is now entered into the application program. |

F. To display a logic string that includes a timer such as in FIG. 36 perform the following: (counters are displayed in the same manner)

|  | Function | Indications |
|---|---|---|
| Step 1 | Dial into the PLACE thumbwheels the bit address of the relay associated with the counter or timer. Example: dial into the PLACE thumbwheels address 357. | 1) Ignore any indication. |
| Step 2 | Press the Logic Display button. | 2) The Logic Display light will come on. The read-out will display the bit address (0357) of the relay MCT. The Address light, the K light and the move left light will each come on. Either the Close or Open light will come on to indicate the status of the MCT relay. The Coil State light will also indicate status of the MCT relay. |

Figure 36:
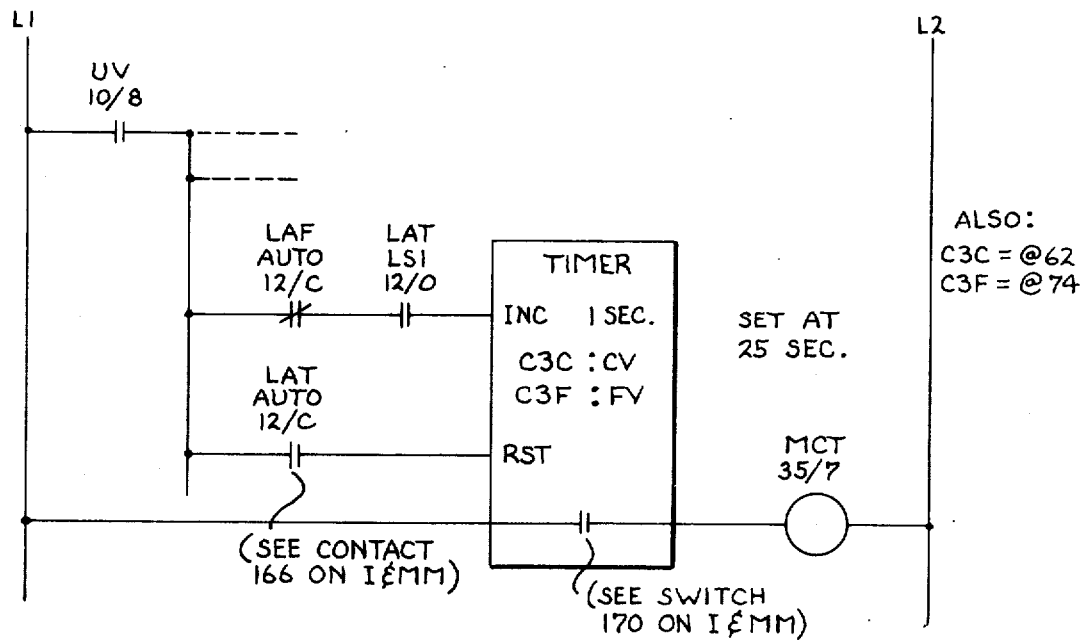

| | Function | | Indications |
|---|---|---|---|
| Step 3 | Press the move left and right pushbuttons to move left and right, respectively, along the logic string to point at the individual terms. Each press of one of these buttons moves the I&MM either left or right one term. In the example press the move left pushbutton once. | 3) | The K light will go off and the final value (FV) light will come on. The Address light will go off and the Value light will come on. The read-out will display 0025 which is the 25 second final value (FV) setting for the timer. Neither the Close or Open lights will be on. The move right light will come on and the Coil State light will continue to display the status of the MCT relay. |
| Step 4 | At this time, if the operator so desires, while the final value term or the current value term is being displayed, he may press the Address pushbutton to display the address associated with one of these terms. For example, press the Address pushbutton. | 4) | The Value light will go off and the Address light will come on. The read-out will now display the address of the final value (FV) term as being at address location 0740 as shown in FIG. 36, which is also equal to location C3F. Neither the Close or Open lights will be on. |

Figure 37:
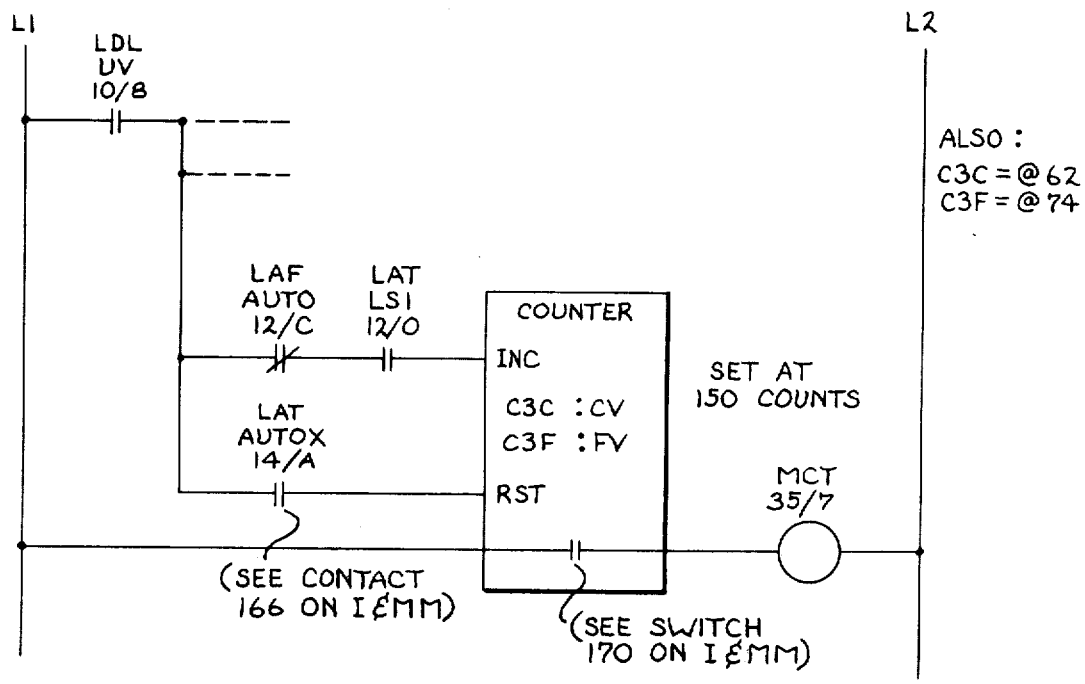

G. To modify the counter or timer portion of an existing logic string, such as those shown by FIGS. 36 and 37 perform the following:

| | Functions | | Indications |
|---|---|---|---|
| Step 1 | Repeat Steps 1 and 2 in F) above. | 1) | As described in F) above in Step 2. |
| Step 2 | Press the Copy pushbutton. | 2) | The Logic Display will go off and the Copy light will come on. The Copy Storage light will come on and the Coil State light will no longer indicate the status of the relay. |
| Step 3 | Press the move left pushbutton until pointing at a term it is desired to build from. For example, press the move left pushbutton once. To change the address of either the RESET, CV or FV terms or to change the type of CV term performed Steps 4 and 5. | 3) | The K light will go off and the final value (FV) light will come on. The Address light will go out and the Value light will come on. The read-out will not display 0025 or 0150. Neither the Closed or Open lights will be on and the move right light will come on. |
| Step 4 | Press the Address pushbutton if it is not already lit. For example, press the Address pushbutton. | 4) | The Value light will go out and the Address light will come on. The read-out will now display 0740 the address location of the final value term. |
| Step 5 | Dial into the BUILD thumbwheels the new address as it will finally be and then press one of the following buttons to build over the existing term:<br>a) If the FV light is on, then press the FV pushbutton.<br>b) If the CV light is on, press the CV button.<br>c) If the Reset light is on, then press the Reset pushbutton.<br>As an example, to change the address of the FV term to at 85, dial 0850 into the BUILD thumbwheels and press the FV pushbutton. To change the value of either the current value (CV) or final value (FV) terms perform Steps 6 and 7. | 5) | the read-out will display 0850. NOTE: In Step 5, to delete a timer or counter, set the BUILD thumbwheels to the address pointing to the reset (RST) term (e.g. 012C1n FIG. 36 or 014A in FIG. 37) and press the Delete button. This will remove all three counter/timer terms (RESET, CV and FV, where CV is either 0.1 SEC timer, 1 SEC timer or counter). |
| Step 6 | Press the Value pushbutton if it is not already on. | 6) | The Address light will go off and the Value light will come on. The read-out will display the contents of address 0850 which could be anything at this time. |
| Step 7 | Dial into the BUILD thumbwheels the desired value | 7) | The read-out will display 0150 which is the new |

| | Functions | Indications |
|---|---|---|
| | and do one of the following:<br>a) If the FV light is on, then press the FV button.<br>b) If one of the CV terms (0.1 SEC timer, 1 SEC timer or counter) is on, push the button associated with the CV term which is on. For example, to change the final value setting, dial 0150 into the BUILD thumbwheels for a 150 count counter and then press the FV pushbutton. | contents or final value count of address location 0850. |
| Step 8 | Repeat Steps 3–7 as required to complete all modifications and/or additions to the timer/counter logic. To change the timer of FIG. 36 to the counter of FIG. 37 perform the remaining steps. | |
| Step 9 | Press the move left button once more. | 9) The FV light will go out and the 1 SEC timer light will come on. The read-out will display the current value of the timer which could be any value and could even be incrementing at this time. |
| Step 10 | Press the Address button. | 10) The value light will go out and the Address light will come on. The read-out will display 0620. |
| Step 11 | Dial 0620 into the BUILD thumbwheels and press the Counter button. | 11) The 1 SEC timer light will go out and the Counter light will come on. |
| Step 12 | Press the move left button once more. | 12) The Counter light will go out and the Reset light will come on. The read-out will display 012C, the address of the timer reset (RST) term AUTO. The Open or Close lights will indicate the current status of the AUTO contact. |
| Step 13 | Dial 014A, the address for the counter reset (RST) term AUTOX, into the BUILD thumbwheels and press the Reset button. | 13) The read-out will display 014A and the Close or Open lights will indicate the current status of the counter reset term AUTOX. |
| Step 14 | Press the Test button. | 14) The Test light will come on. |
| Step 15 | Turn the Enter key switch. | 15) The Test and Copy Storage lights will go out. The Bit Display light and all lights associated with Bit Display Mode will come on. |

Figure 38:
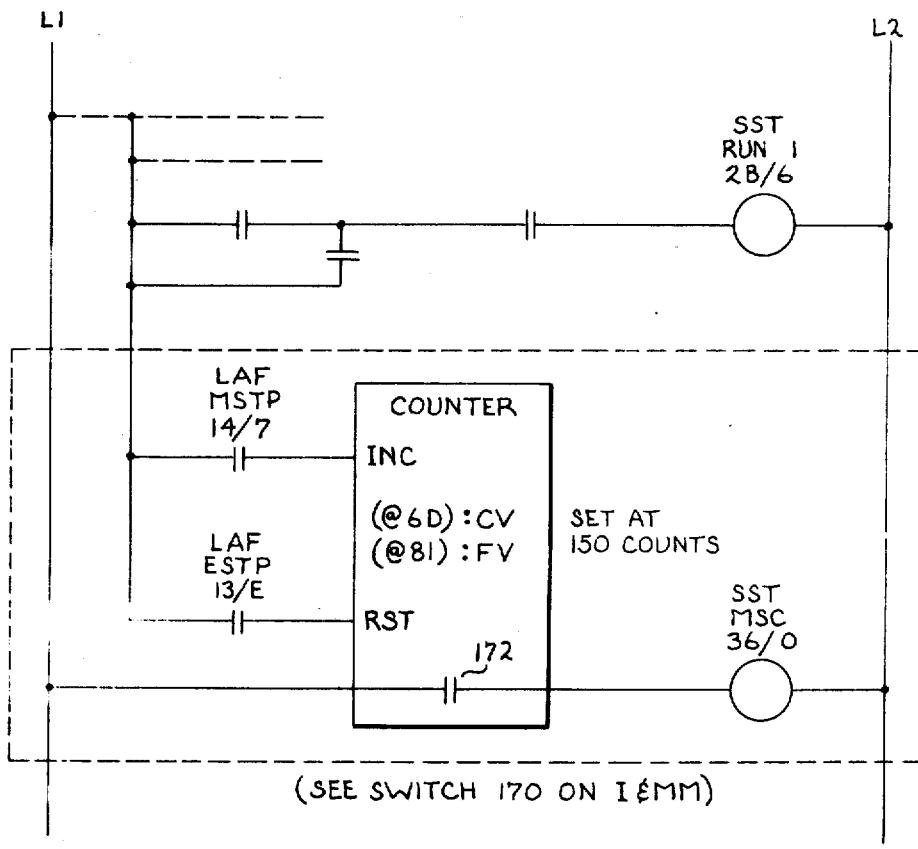

H. To add a completely new logic string which contains a timer or counter to the application program such as the counter shown in dotted lines in FIG. 38 perform the following:

| | Functions | Indications |
|---|---|---|
| Step 1 – Step 4 | Repeat Steps 1 through 4 in E) above, substituting the address 2AB with the address 2B6 of the run contact in FIG. 38. | |
| Step 5 | Dial into the BUILD thumbwheels the bit address of the new term and then press the appropriate one of the buttons, L, LAT, LOT, LAF, LOF, K. In this example dial 0147 into the BUILD thumbwheels and press the LAF button. | 5) Delete light will go out and the LAF light will come on. The read-out will display 0147 and the Open or Close light will indicate the current status of the MSTP contact. |
| Step 6 | Repeat Step 4 in E) above and Step 5 in H) until the counter/ timer portion of the logic string is reached. (In this example, do nothing). | 6) No indication changes. |

| | | |
|---|---|---|
| Step 7 | Create three spaces (DEL's) by pressing the Insert Space button three times. | 7) The LAF light will go out, the read-out will display FFFF (all binary 1's) and the Open and Close lights will be out. |
| Step 8 | Return to the first space (furtherest to the left) by pressing the move left button twice. | 8) The move right light will come on. |
| Step 9 | Dial into the BUILD thumbwheels the bit address of the new reset (RST) term and press the Reset button. In this example, dial in 013E. | 9) The Delete light will go out and the Reset light will come on. The Close or Open lights will indicate the current status of the ESTP contact. |

NOTE:
At this time the IMMP will also write over the two other spaces created for the counter or timer with dummy terms. Specifically, a 0.1 SEC timer referencing @8 is written into these two spaces while the I&MM under control of the IMMP remains pointing at the reset (RST) term. These dummy terms are created only to prevent entering a partially built counter or timer into the application program. They will not be left as they are.

| | | |
|---|---|---|
| Step 10 | The two dummy terms are overwritten with the CV and FV terms by dialing into the BUILD thumbwheels the address of each of the terms and then pressing the button which corresponds to the desired term (i.e. 0.1 SEC timer, 1 SEC timer or counter). Similarly the values (current and final) referenced by those terms are established by dialing the desired values into the BUILD thumbwheels and then pressing the button which corresponds to the value being established. In the present example, to build the counter term:<br>a) Press the move right button once. | 10)<br><br><br><br><br><br><br><br><br><br><br><br><br><br><br><br>a) The Reset light will go out and the 0.1 SEC timer light will come on. The Open and Close lights will be off, the Address light will go off and the Value light will come on. The read-out will display the contents of location at 8, which can be anything and are meaningless. |
| | b) Press the Address button. | b) The Value light will go off, the Address light will come on and the read-out will display 0080, the address of the dummy term @ 8. |
| | c) Dial 05D0 into the BUILD thumbwheels and then press the Counter button. | c) The 0.1 SEC timer light will go out, the Counter light will come on and the read-out will display 06D0. |
| | d) Press the Value button. | d) The Address light will go out and the Value light will come on. The read-out will display the contents of location @ 6D which can be anything and are meaningless. |
| | e) Dial 0000 into the BUILD thumbwheels and press the Counter button setting the current value (CV) of the counter to zero. To build the final value term for a timer or counter, in the present example a counter:<br>f) Press the move right button once. | e) The read-out will display 0000.<br><br><br><br><br><br><br>f) The Counter light will go out and the FV light will come on. The read-out will display the contents of location @ 8 which can be anything and are meaningless. |
| | g) Press the Address button. | g) The Value light will go off and the Address light will come on. The read-out will display 0080. |
| | h) Dial 0810 into the BUILD thumbwheels and then press the FV button. | h) The read-out will display 0810. |
| | i) Press the Value button. | i) The Address light will go out and the Value light will come on. The read-out will |

| | | | |
|---|---|---|---|
| | j) Dial 0150 into the BUILD thumbwheels and then press the FV pushbutton setting the final value of the counter to 150 counts. When the counter is executed in the application program and when the current value (CV) equals the final value (FV) a contact 172 in FIG. 38 closes to energize the MSC relay coil (Bit 36/0). | | —continued<br>display the contents of location ⊕ 8 which can be anything and are meaningless.<br>j) The read-out will display 0150. |
| Step 11 | Complete a timer or counter logic string by pressing the Insert Space button and overwriting each space (DEL) with the desired term until all terms are entered. In the present example, to add the MSC relay coil term of FIG. 38: | 11) | |
| | a) Press the Insert button. | | a) The FV light will go out and the Delete light will come on. The read-out will display FFFF, the Value light will go out and the Address light will come on. |
| | b) Dial 0360 into the BUILD thumbwheels and press the K button. | | b) The Delete light will go out and the K light will come on. The read-out will display 0360 and the Open or Close light will indicate the current status of the MSC relay coil. |
| Step 12 | Press the Test button. | 12) | The Test light will come on. |
| Step 13 | Turn the Enter key switch to operate. | 13) | The Test light will go out and the Bit Display light will come on along with the indications associated with the Bit Display Mode. The Copy Storage light will go out. |

NOTE: At this time the IMMP will also write over the two other spaces created for the counter or timer with dummy terms. Specifically, a 0.1 SEC timer referencing ⊕ 8 is written into these two spaces while the I&MM under control of the IMMP remains pointing at the reset (RST) term. These dummy terms are created only to prevent entering a partially built counter or timer into the application program. They will not be left as they are.

With the preceding background the Installation and Maintenance Module Program (IMMP can now be described in detail).

DESCRIPTION OF INSTALLATION AND MAINTENANCE MODULE PROGRAM (IMMP)

Figure 39:
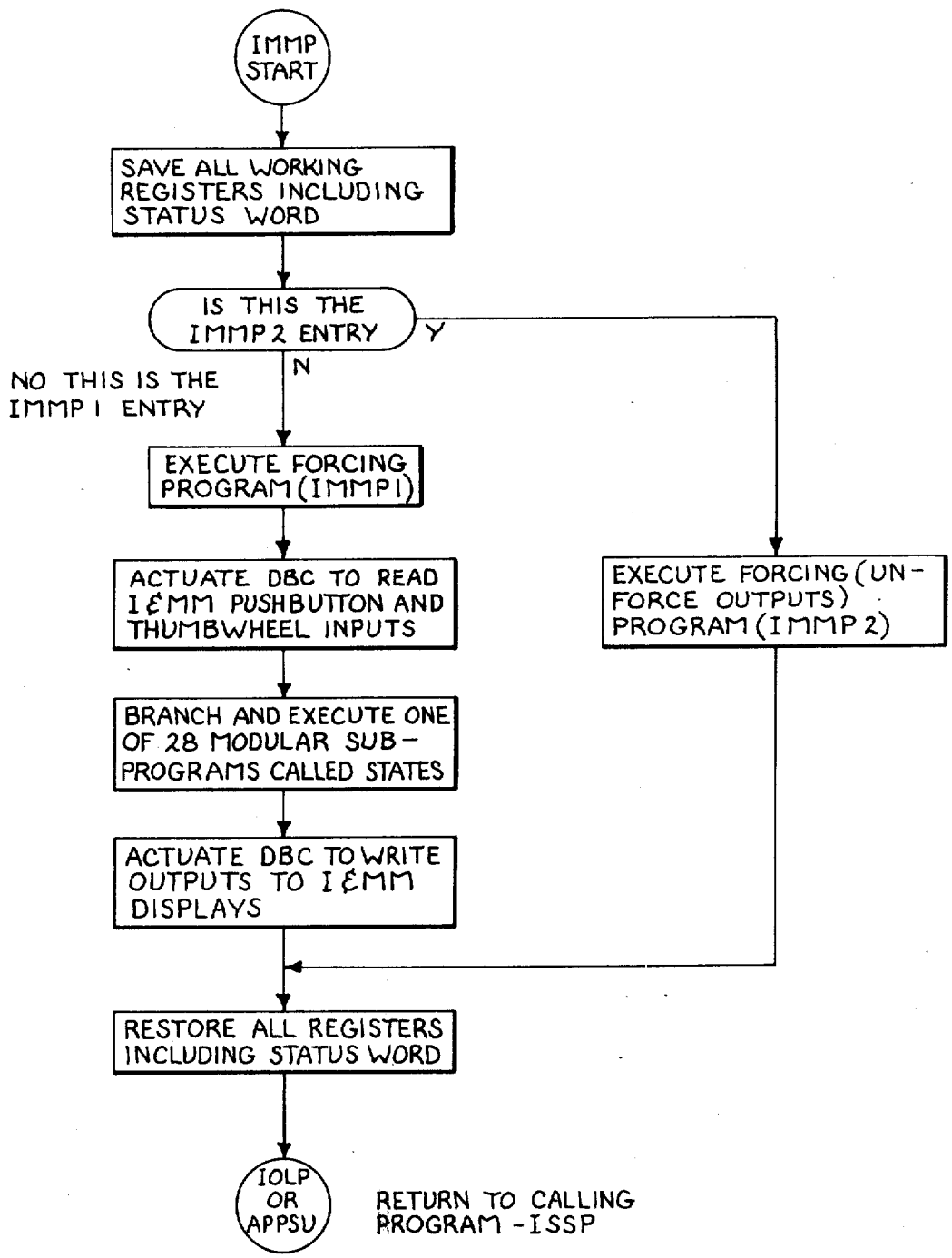

Reference is now made to FIG. 39 which is a high level flow chart of the IMMP. Reference is also made to FIGS. 24 and 26 of the ISSP. As previously described the IMMP is segmented into two programs IMMP1 and IMMP2. FIGS. 24 and 26 show how the IMMP of FIG. 39 fits into the overall execution of the Executive Program and how the IMMP is entered and re-entered from and to the ISSP. In FIG. 24 it will be recalled that IMMP1 runs and returns back to location IOLP in the ISSP.

In normal system operation the ISSP jumps to the IMMP twice per sweep cycle. That is IMMP1 and IMMP2 are both run during each sweep cycle of the ISSP. In FIG. 39 when IMMP1 is executed, this is referred to as the first pass or entry into the IMMP. When IMMP2 is executed it is the second pass or entry into the IMMP. On each of the first and second passes into the IMMP as shown in FIG. 39 various working registers are saved, and also the status word of the sequencer is saved. The IMMP then tests to see if this is the IMMP2 entry (that is, second pass into the IMMP). Assuming that it is the first pass, then IMMP1 will be executed. IMMP1 performs the majority of the work for the overall IMMP. As shown in FIG. 39 the IMMP1 first executes a forcing program wherein the previously mentioned input and output status bits in the input and output status regions of the memory of FIG. 2 may be forced by the I&MM operator.

After the input and output bits are forced, the IMMP then actuates the DBC to read the I&MM input pushbutton and thumbwheel switches to store the status of those switches in the IMMP scratch area of FIG. 30. After the input data from the I&MM is stored, the IMMP then branches and executes one of 28 modular sub-programs or subroutines which are referred to as states. Each of these states is designed to perform a specified function or functions to control the operation of the IMMP and to also provide access to the ISSP when the operator is modifying the application program logic. After the IMMP has executed one of the modular programs it then actuates the DBC to write output signals to the I&MM displays to display to the operator the function being performed as previously designated by him when he actuated one of the input pushbuttons. After the information is displayed on the I&MM, the IMMP then restores all of the various working registers, including the status word of the sequencer. The IMMP then branches from IMMP1 back to the ISSP to location IOLP as shown in FIG. 2.

The ISSP will now continue to operate and actuate the DBC to send output signals from the output region of the memory. After the ISSP has sent all outputs to the process equipment it will reenter as shown in FIG. 26 into the IMMP again for the second pass through the IMMP, causing IMMP2 to now run. As shown in FIG. 39 the ISSP will again branch to IMMP start, wherein the registers and the status word will again be saved. Since this is the IMMP2 entry (second pass) the IMMP will then exit through a yes branch and execute a forcing program designated as IMMP2. The purpose of the IMMP2 is to unforce those output status conditions or signals which were previously forced when IMMP1 was run. The reason for this will become apparent as the detailed description of the IMMP proceeds. When IMMP2 terminates, again the IMMP will restore all of its various working registers, including the status word and then branch back to the ISSP to location APPSU as shown in FIG. 26. The ISSP will now begin to execute again and run the application program as previously described. Upon termination of the application program (FIG. 26), the program will then branch back to the ISSP to location EPAPP wherein the entire sweep cycle will again be repeated.

Figure 40:
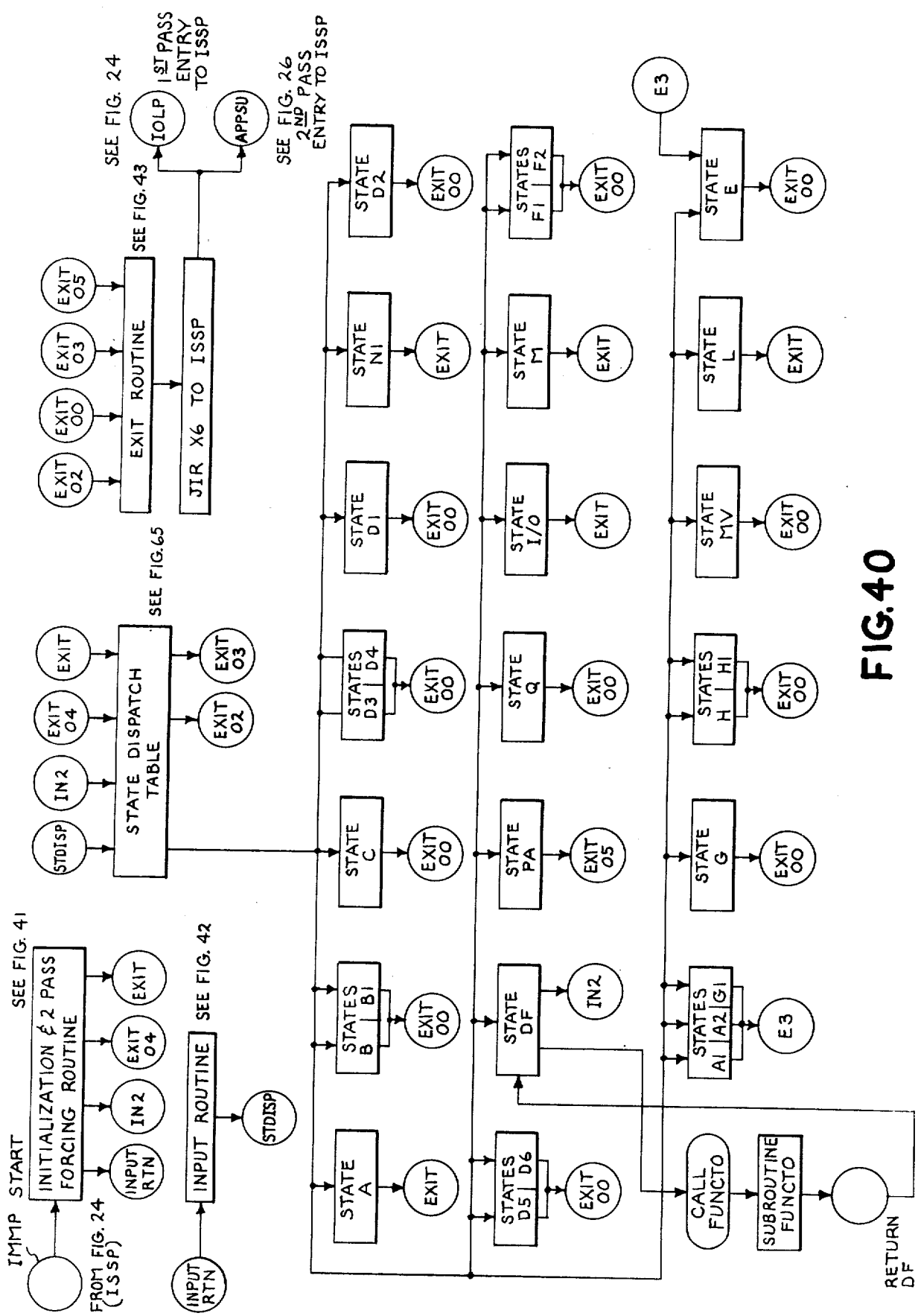

Reference is now made to FIG. 40 which shows in block diagram form a flow chart of a slightly higher level that the flow chart of FIG. 39 of the IMMP. The previously mentioned 28 modular subprograms are shown as blocks on FIG. 40 as states A, B, B1, C, etc. In the lefthand top corner of FIG. 40 there is shown an initialization and two-pass forcing routine which is entered at the IMMP start location each time the ISSP jumps to the IMMP. It is in this routine where the IMMP saves all of the working registers and the status word, performs the test for the IMMP2 entry and selectively executes one of the forcing subroutines for IMMP1 or IMMP2 as previously described in connection with FIG. 39.

Whenever the IMMP is entered on a first pass the program always branches from the initialization and two-pass forcing routine to a location designated Input RTN entering into an input routine. It is in this input routine wherein the IMMP actuates the DBC to read the I&MM pushbutton and thumbwheel switch inputs. After the inputs have been read, the IMMP branches to a state dispatch table shown in FIG. 40 to a location STDISP. In the system under discussion the purpose of the state dispatch table is to direct the IMMP to execute one of the twenty-eight (28) modular sub-programs or to effect a direct exit from the state dispatch table to an exit routine which effects return of the IMMP back to the ISSP. As shown in FIG. 40, the exit routine executes a jump instruction JIR X6 to the ISSP to one of the previously described locations IOLP or APPSU. If it is a first pass through the IMMP the exit routine will jump the IMMP back to location IOLP of the ISSP. Whereas, if it is a second pass through the IMMP the exit routine will jump the IMMP back to location APPSU of the ISSP.

When the IMMP is entered on a second pass, and after the output status bits are unforced in the initialization and pass forcing routine, the IMMP will exit from the latter routine through an exit 04 into the state dispatch table. The state dispatch table will then effect an exit into exit 03 of the exit routine which will in turn jump the IMMP back to location APPSU of the ISSP.

Those blocks shown in FIG. 40 comprise the entire IMMP and each block is shown in detailed flow diagram form in FIGS. 41 through 65. Reference is now made to Appendix B which is a complete program listing of the programs as documented in the flow charts of FIGS. 41 through 65. Like the ISSP the IMMP also contains an equals table having EQL and EQB columns identified by a symbolic code specifying a location for the various words in the IMMP scratch area of FIG. 30. The symbolic code associated with each of the EQL and EQB locations is a symbolic code location assigned by the computer program assembler and these locations are assigned and assembled into the IMMP scratch area. The information contained in each of these various locations will subsequently be described as the description proceeds.

Also in Appendix B there is shown a table of constants shown by a column CON which are various constants utilized by the IMMP and are stored in the permanent constants for IMMP region of FIG. 30. Additionally, Appendix B shows a listing of the entire IMMP (that is all of the subroutines which make up the IMMP) which are stored in the IMMP procedure segment of the memory of FIG. 30.

In the ensuing description of the flow charts of the IMMP reference will be made to Appendix B when considered appropriate.

Figure 41:
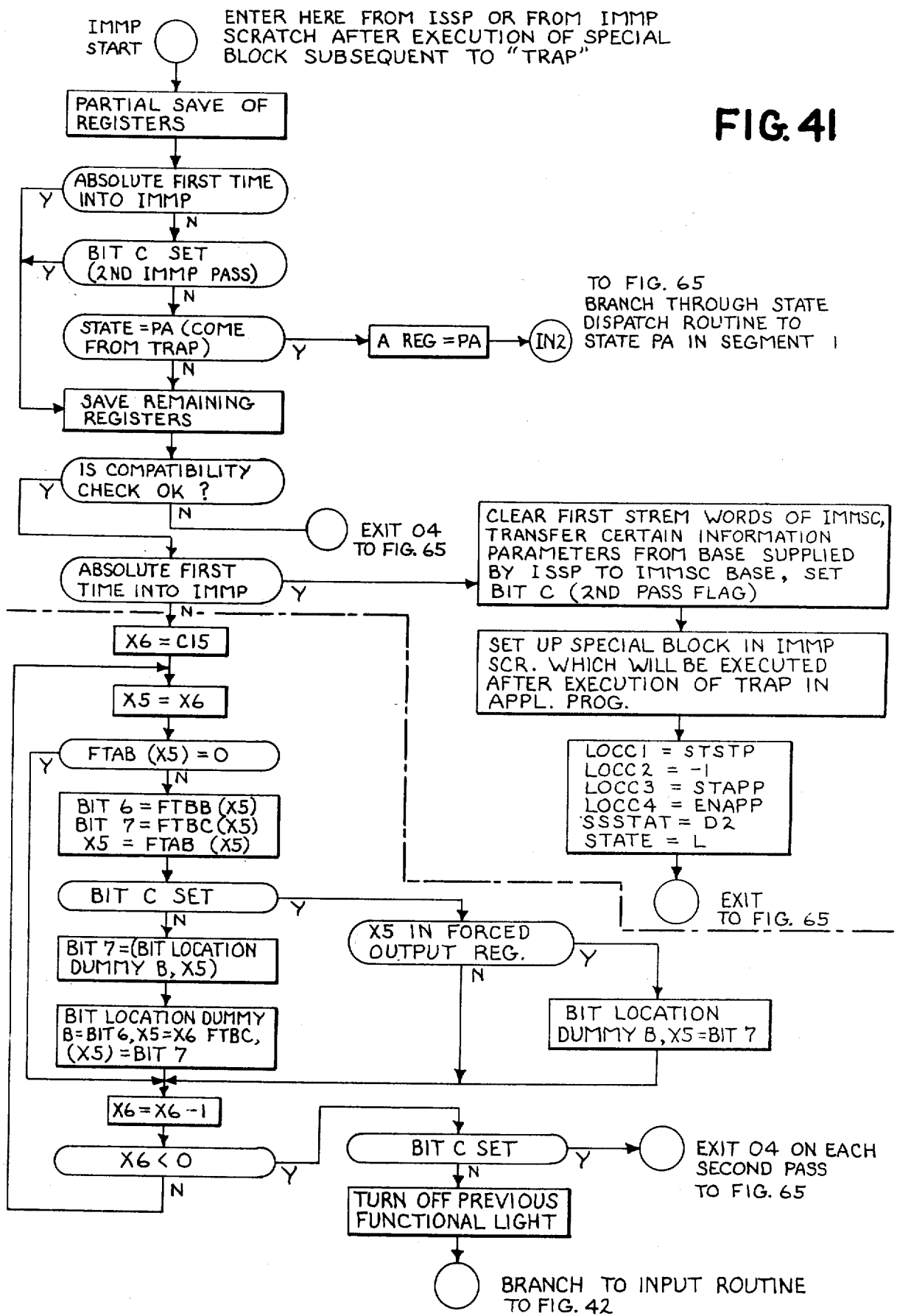

Reference is now made to FIG. 41. It will be recalled from the previous description of the ISSP that the program went through an initialization phase during initial system startup. In a similar fashion the IMMP also goes through an initialization phase. The IMMP goes through this initialization phase primarily for the purpose of clearing out various word locations of the IMMP scratch region and to set up special information blocks in the IMMP scratch region for execution during various phases of the IMMP. It will also be recalled from the previous description of the flow chart of FIG. 24, that, during the initialization phase, the ISSP continuously read the input signals from the remote terminals and then branched to the application program, updating the output status bits in the output region of the memory until the initialization count was completed. When the initialization count was completed in Step A27 of FIG. 24, the ISSP then branched to the IMMP. Also, during the execution of Steps A25, A26 and A27 the ISSP either set or reset a first time bit designated as BITS as shown in the EQB listing of Appendix B. When the ISSP branches from Step A27, this BITS is in the reset state. It is the state of this bit which tells the IMMP in FIG. 41 whether this is the absolute first time that the IMMP has been entered from the ISSP.

Let it now be assumed that the ISSP is in the initialization phase and that it has just branched from Step A27 of FIG. 24 to the IMMP start as shown in FIG. 41. As shown in FIG. 30 the IMMP start is at location @ 800 which contains an instruction BRU INIFOR. The BRU instruction causes the IMMP to branch to location INIFOR in the IMMP procedure segment as shown in FIG. 30. INIFOR is shown also as the first location in the initialization and force states of the program listing in Appendix B. The first block in FIG. 41 indicates that the IMMP goes through a partial save of registers. It is standard procedure in programming when branching from one program to another to save the various data base registers, index registers, and procedure reference registers in the event the contents of those registers may be required later when branching back to the program. The registers which are saved can be seen by referencing Appendix B. The IMMP now enters into an "absolute first time into IMMP" test block. It is in this block where the IMMP tests the status of BITS to see if this is the absolute first time into the IMMP from the ISSP. Absolute first time is defined herein as the first time which the IMMP is entered from the ISSP (i.e., during system initialization). Since, at this time, BITS is reset the IMMP will exit through a Y branch into a save remaining registers block. As can be seen in Appendix B the remaining registers which are saved in this block are the contents of location XA which now contains the A register contents. The contents of location X6 which contains the P count and the contents of location X7 which contains the procedure reference base register. The reason for not saving all of the registers upon initial entry into the IMMP will become evident as the description proceeds.

After saving the remaining registers the IMMP then enters into an "is compatibility check OK" decision block. In this block the IMMP is performing a test to see if it is compatible with the ISSP. That is, is it running with the proper ISSP. Referring back to FIG. 24, prior to the ISSP jumping to the IMMP it sets appropriate flags in word F shown as location EFF4 through EFF7 in Appendix B of the IMP. The bits in this word comprise a special key which is utilized by the IMMP to test to see if it is compatible with the bits in word F. If the compatibility check is not OK the IMMP will exit through an N branch to an exit 04. Exit 04 is to the "state dispatch table" shown in FIG. 65 to subsequently be described.

Let it now be assumed the compatibility check is OK, thus the IMMP exits through a Y branch wherein the absolute first time into the IMMP question is again asked. Since, in the present discussion, it is the absolute first time into the IMMP an exit through a Y branch is taken to an action block wherein a block of words in the IMMP scratch area designated as first STREM words are cleared. Referring to Appendix B in the constants table, it can be seen that STREM is a constant which is utilized to specify the number of words which are to be cleared or zeroed out in the IMMP scratch area. Also, at this time, specified information parameters are transferred from the base address supplied by the ISSP to the IMMP scratch base address. Basically what happens is, when the ISSP jumps to the IMMP it contains an address in the A register which is the address of an information block for the IMMP. This information block contains information parameters that the IMMP is interested in. For example, parameters related to the particular process that is being controlled and also parameters such as where does the IMMP scratch area exist. So, initially the IMMP clears out the first STREM of words and then transfers the information parameters of the requisition, etc. to its own scratch base. That is, the IMMP scratch base, where it can conveniently get at them without having to set particular data base addresses. The IMMP transfers this block of information, which is supplied by the ISSP into its own scratch area and then sets a bit called BIT C.

Bit C is an important bit in the operation of the IMMP because it defines whether the IMMP is in either the first or the second pass. That is, it defines whether the IMMP is executing IMMP1 or IMMP2. However, during the absolute first time through the IMMP the status of Bit C is insignificant. Bit C can be found in the EQL listing in Appendix B, and it is part of word 14 in the IMMP scratch area. There are 16 bits in word 14 and each one of those bits is identified as a particular flag bit used by the IMMP. The purpose of these various flag bits will be described as the description proceeds.

The IMMP now enters into another action block wherein it sets up a special block of four words in the IMMP scratch area which will be executed after execution of a trap subroutine in the application program. The trap subroutine is a special function performed by the IMMP when the I&MM is in either the Logic Display or Bit Display Modes. It will be noted at the top of FIG. 41 that the IMMP may be entered from two places, from the ISSP or from the IMMP scratch area after execution of a special block subsequent to the trap. A detailed description of the trap operation will be given in the subsequent description.

In order for the IMMP to properly communicate with the I&MM the IMMP must know certain things about the application program, such as, the start location of the application program, the end permissible point of the application program and the actual end of the application program. This information is imparted to the IMMP by various parameters which the IMMP transfers from the ISSP and is shown in the action block immediately following the set up of the special block in the IMMP scratch. In this immediate block certain parameters are established so that on the next sweep cycle; that is, on the first pass through the IMMP, the IMMP will enter into a special search routine which will search down through the application program for a specific mask which will identify the end of the application program. In this particular block, four variables at locations LOCC1-LOCC4 are set to various parameters for subsequent use in the previously mentioned search routine. LOCC1-LOCCU reside in the IMMP scratch area and are shown in the EQL listing of Appendix B. LOCC1 is set equal to the contents of location STSTP in the EQL listing. STSTP is the mask for a JIS instruction to the ISSP from the application program. That is, LOCC1 is a variable in the IMMP scratch which is set equal to the particular mask which the IMMP will be looking for during the search routine. LOCC2 is set equal to a minus one which in hexadecimal is qual to all binary 1 bits in that word. LOCC2 is used to notify the searching routine what bits in the mask it is interested in looking for. In this particular instance, since all of the bits are set, it is interested in every bit in that word. LOCC3 is set equal to the contents of STAPP in the EQL listing. STAPP defines the start of the application program. This is the point where the IMMP starts looking during the search routine. LOCC4 is set to the contents of location ENAPP, the end permissible point of the application program, shown in the EQL listing also. LOCC4 will define to the search routine where to quit looking for the mask. Also at this time a location SSSTAT (the state remember location for the time shared search and move routines) is set from the CON listing equal to D2, which is the modular state that the IMMP will go to after it has completed the searching routine. Additionally, location STATE in the EQL listing is set equal to the constant state L, the latter being the time shared search state shown in FIG. 63. This is the state which the IMMP will enter into on the next first pass through the IMMP.

Figure 65:
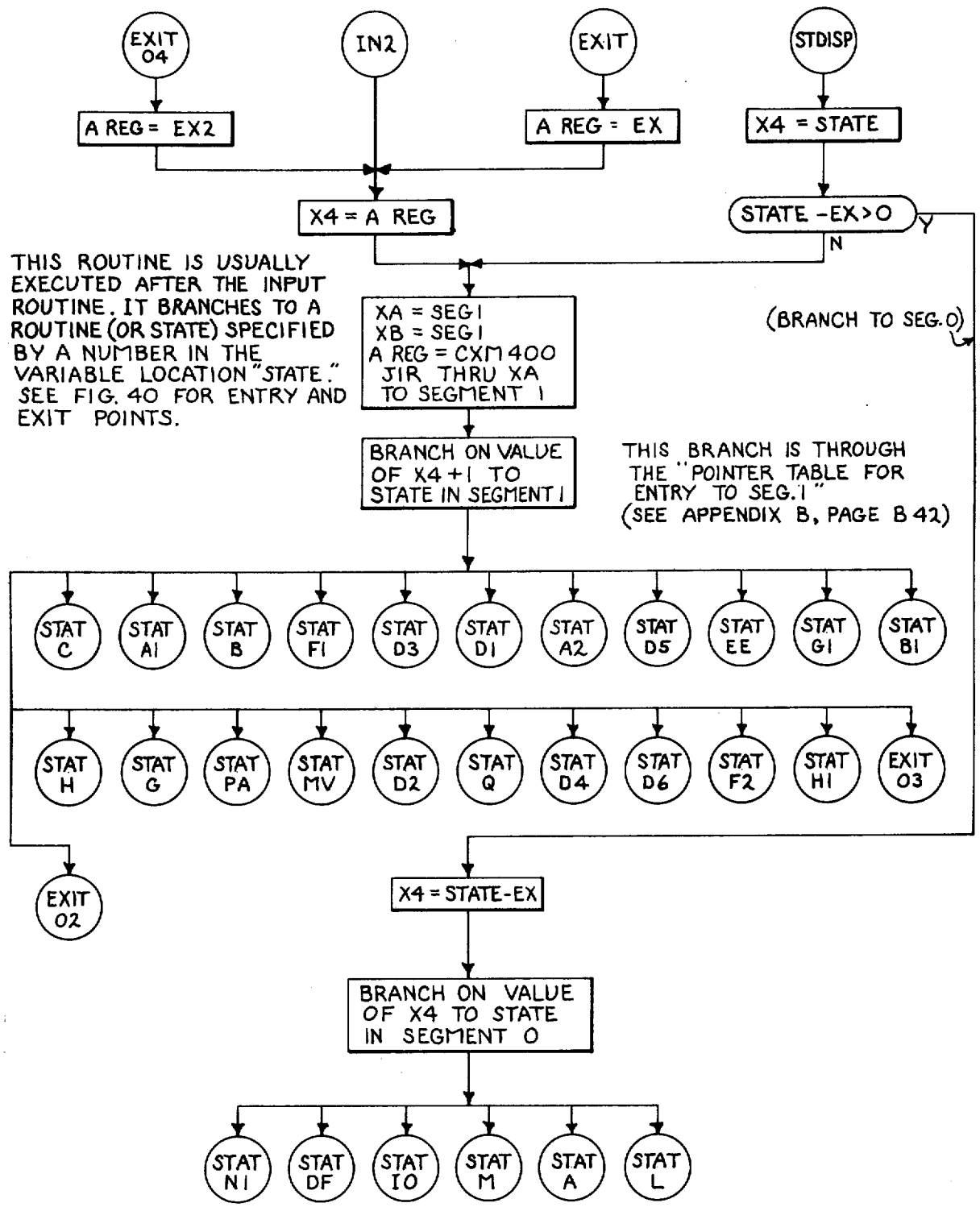

The IMMP now goes to a location EXIT shown in the state dispatch table in FIG. 65. The operation of the state dispatch table in FIG. 65 will now be described. This subroutine is somewhat common to the overall operation of the IMMP because it is entered every time the IMMP runs. As previously described, FIG. 40 shows the interrelationships between the initialization and two-pass forcing routine, the input routine and the state dispatch table. FIG. 65 is a detailed flow chart of the state dispatch table. As can be seen the state dispatch table can be entered from the input routine into location STDISP or from the initialization and two-pass forcing routine from any one of the exit points IN2, EXIT04, or EXIT. The sole purpose of the state dispatch table is to cause the IMMP to branch to the exit routine or to one of two segments in the IMMP. It will be noted in FIG. 65 that the previously mentioned states (shown as locations STATA, STATB, etc.) are broken into segments 0 and 1. Whenever the state dispatch table is entered through either one of the inputs, EXIT04, IN2, or EXIT, the IMMP will branch to one of the states in segment 1. However, when the state dispatch table is entered at location STDISP the segment selected is determined in a decision block which poses the question "STATE − EX >0".

Reference is now made to the EXIT input to the state dispatch table. This is the entry point from the initialization and two-pass forcing subroutine of FIG. 41 during the absolute first time into the IMMP. Upon entering into EXIT the IMMP first sets the sequencer A register equal to the contents of a constant at location EX shown in the CON listing. This constant is then placed in location X4, the index register procedure reference, shown in the EQL listing by setting location X4 equal to the A register.

The IMMP next goes into an action block wherein two locations, XA and XB, in the EQL listing are set to the contents of location SEG1 from the CON listing. SEG1 contains the base address to the segment 1 portion of the IMMP. Also an offset constant is loaded into the A register from location CXM400 in the CON listing. This offset constant is utilized to help develop the proper address to the proper state in segment 1. The IMMP then executes a JIR instruction through location XA, which now contains the base address of segment 1, thus entering into a branch block wherein the IMMP branches to location exit 03 based on the contents of location X4+1, the index register plus 1. This branch is effected by the execution of a BRU instruction located in the pointer table for entry to segment 1 shown in Appendix B (page B43).

Reference is now made back to the exit 04 input of the state dispatch table of FIG. 65. Exit 04 is entered only from FIG. 41 during a second pass through the IMMP. Whenever exit 04 is entered, the A register, instead of being set equal to the value of location EX, is set equal to the value of location EX2 in the CON listing. After the A register is set to EX2 the operation of the state dispatch table is as previously described in connection with branching to segment 1 of the IMMP.

The state dispatch table is also entered from FIG. 41 into location IN2 after execution of the previously mentioned special block subsequent to the trap operation. In this particular instance location X4 is set equal to the A register, which will always be equal to state PA. Thus, whenever the IMMP enters into IN2 the program will branch to state PA (STATPA) in segment 1.

Reference is now made back to the STDISP input of the state dispatch table of FIG. 65. As previously mentioned, as shown in FIG. 40, STDISP is always entered from the input routine. In the state dispatch table of FIG. 65, whenever STDISP is entered, location X4 is set equal to the variable at location STATE. STATE is shown in the EQL listing of Appendix B. The value of STATE will always be dependent upon what STATE was set to in a previous sweep cycle through the IMMP. Once X4 is set equal to location STATE the IMMP will then branch to either segment 0 or segment 1. If the value of STATE minus the constant EX is greater than 0 the IMMP will branch to segment 0, whereas if it is not the IMMP will exit through an N branch and enter one of the states in segment 1. If segment 0 is to be entered, the IMMP then sets the value of X4 equal to the value of STATE minus the constant EX. The IMMP will then branch to one of the states in segment 0 based on the value of location X4'.

This completes a description of the operation of the state dispatch table. In subsequent descriptions reference will be made to the entry points such as EXIT04, IN2, EXIT and STDISP. However, when reference is made to the state dispatch table, it will merely be stated that the IMMP will branch through the state dispatch table to one of the designated states, for example, such as states C, A1, etc. In FIG. 65 the STAT designation with the appropriate suffix relates to an actual symbolic code location which defines the start location of one of the states in Appendix B. Referring to FIG. 40 in conjunction with FIG. 65 when the state dispatch table branches to one of the states as shown in the blocks on FIG. 40 the branch is actually to a location in the appropriate state in the IMMP such as to location STATC. It will also be noted that the state dispatch table can branch directly to the exit routine shown in FIGS. 40 and 65 through one of two exits shown as EXIT02 and EXIT03.

Figure 43:
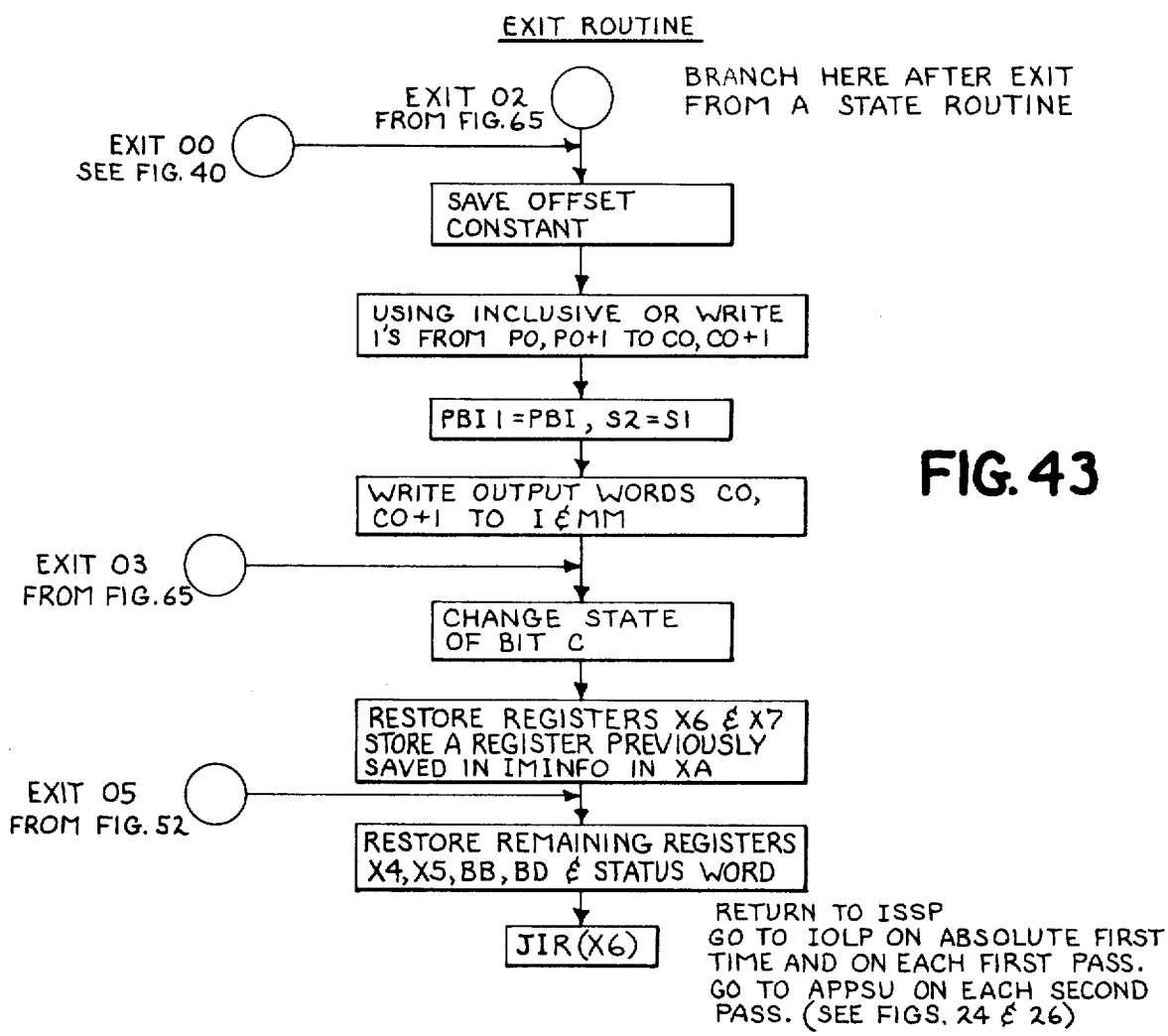

In the present discussion the IMMP is assumed to be on the absolute first time into the IMMP, thus the state dispatch table will cause a branch to exit 03 of the exit routine as shown in FIG. 43.

The exit routine of FIG. 43 will now be described in detail (see pages B78 and B79). The exit routine, somewhat like the state dispatch table, is common to the IMMP in that it is entered from either the state dispatch table or one of the state subroutines on every pass through the IMMP. For this reason it is considered appropriate to discuss the exit routine at this time so that it will not have to be described for each entry into the exit routine from one of the state routines.

In the present discussion it is still assumed that the IMMP is in the absolute first time, thus EXIT03 is entered from the state dispatch table into an action block wherein the state of Bit C is changed. It will be recalled that Bit C was set in FIG. 41 during the initialization and two-pass forcing subroutine. Changing the state of Bit C in the exit routine will become significant as the description proceeds. After the state of Bit C is changed, the registers in locations X6 and X7 (the save location for P and the save location for Bp) are restored. Also the previously saved A register from location IMINFO is stored in location XA. The IMMP then proceeds to restore the remaining registers X4, X5, BB, BD and the status word. Location X6 now contains the last P count that the ISSP was utilizing upon entry into the IMMP. The IMMP will now execute a JIR instruction based on the contents of X6, which will cause the IMMP to branch back to the ISSP (as shown in FIG. 24) to location IOLP. Location IOLP will be the contents of X6 plus 1.

Reference is now made back to FIG. 43 to an exit 02 input which is always entered from the state dispatch table of FIG. 65. When exiting from certain ones of the state subroutines it is necessary to save an offset constant is stored in the A register while the IMMP is in the state dispatch routine. This is the offset constant from location CXM400.

The exit routine may also be entered through an entry point designated EXIT00. Exit 00 is always an entry point into the exit routine from one of the state routines such as state C of FIG. 40. Upon entry into the exit routine through either EXIT02 or EXIT00 the IMMP, using an inclusive OR function always writes the number of binary 1's from two scratch memory locations designated as locations PO and PO+1 (previous output words) into current output words designated as locations CO and CO+1. These words are shown in the EQL listing of Appendix B. The EQL listing in Appendix B identifies each of the bits in the words Po and PO+1. Each of the bits in these two words corresponds to one of the output lights or indicators on the I&MM such as the error light, the close light, etc. When the binary 1 bits from words PO and PO+1 are transferred into words CO and CO+1 they are transferred directly across on a one-to-one relation. For example, Bit 2 of word PO is transferred into Bit 2 of word CO, Bit 2 of word PO+1 is transferred into Bit 2 of word CO+1, etc. With the binary 1 bits now in words CO and CO+1 these two words can be transferred to the I&MM through the DBC to turn on those indicators corresponding to those bits.

After the words are transferred from PO and PO+1 into CO and CO+1 the IMMP now enters into another action block wherein location PBI1 is set equal to the contents of PBI. PBI is a location shown in the EQL listing and contains a number representative of the previous value of the PLACE thumbwheels on the I&MM which are read in during the IMMP input routine to be discussed. PBI1 is also a word located and shown in the EQL listing which now contains the value of those PLACE thumbwheels. Also at this time, a variable at location S2 is set to the value of an adjacent variable S1, both shown in the EQL listing. The values of these two words are variables which are utilized during the input routine and in State DF. Their function and purpose will subsequently be described in the description of those two routines.

The IMMP now enters into another action block wherein the IMMP activates the DBC to write the output words now contained in locations CO and CO+1 to the I&MM. It is at this time that the indicators on the I&MM will change or remain the same for observation by the I&MM operator. Once the output words are sent to the I&MM the IMMP now steps into the next action block wherein the state of Bit C is changed. The operation of the EXIT routine is now the same as previously described.

It will be noted in the exit routine of FIG. 43 that during the absolute first time through the IMMP, wherein the exit routine is entered at EXIT03, that the output words are not transferred to the I&MM. The reason for this is that during system initialization there is no need to display any information to the operator of I&MM since this information would be superfluous.

Reference is now made back to FIG. 24 of the ISSP. Let it now be assumed that the ISSP has just run through its complete initialization phase wherein the initialization count in Step A25 is now completed. Thus, the ISSP will exit Step A25 through a Y branch wherein Steps A28 and A29 will be repeated as previously described. The IMMP will now be entered again at the IMMP start location in FIG. 41 in the manner as previously described. Again there will be a partial save of the registers as previously described and then the absolute first time into IMMP check will again be performed. It will be recalled from the previous description of the ISSP that location BITS in the IMMP equals table is cleared by the ISSP when the initialization count was completed. Thus, upon entry into the "absolute first time into IMMP" test block, the test will indicate that this is not the absolute first time. As a result, the IMMP will exit through an N branch into the test block wherein a test is performed to see if Bit C is set.

It will be recalled from the immediately preceeding description of the exit routine that Bit C is always changed upon entry into that routine. Thus, at this time, Bit C is reset, indicating that this is the first pass into the IMMP. The IMMP will therefore exit through an N branch into a "state = PA" decision block. The purpose of this decision block will be described in the description of the trap operation. For the present let it be assumed that location STATE is not equal to State PA, thus the IMMP will exit through an N branch into the save remaining registers action block. The remaining registers will now be saved as previously described and the compatibility check will be performed. Assuming that the compatibility is checked OK, the IMMP will exit through a Y branch into the "absolute first time into IMMP" test block again. Since this is not the absolute first time the IMMP will now exit through an N branch into an action block wherein location X6 is set equal to a constant at location C15. It should be noted at this time that the lower part of the flow chart of FIG. 41 is separated from the upper part by dashed lines. The lower part of the flow chart comprises that part of the IMMP which allows the I&MM operator to force the input and outputs status conditions in the input and output regions of the memory. It is considered premature at this time to describe how the IMMP in communication with the I&MM can force the input and output status bits. Thus, the lower part of the flow chart of FIG. 41, will not be described at this time, but will be covered in detail after a more thorough description of the various state subroutines has been given.

Figure 42:
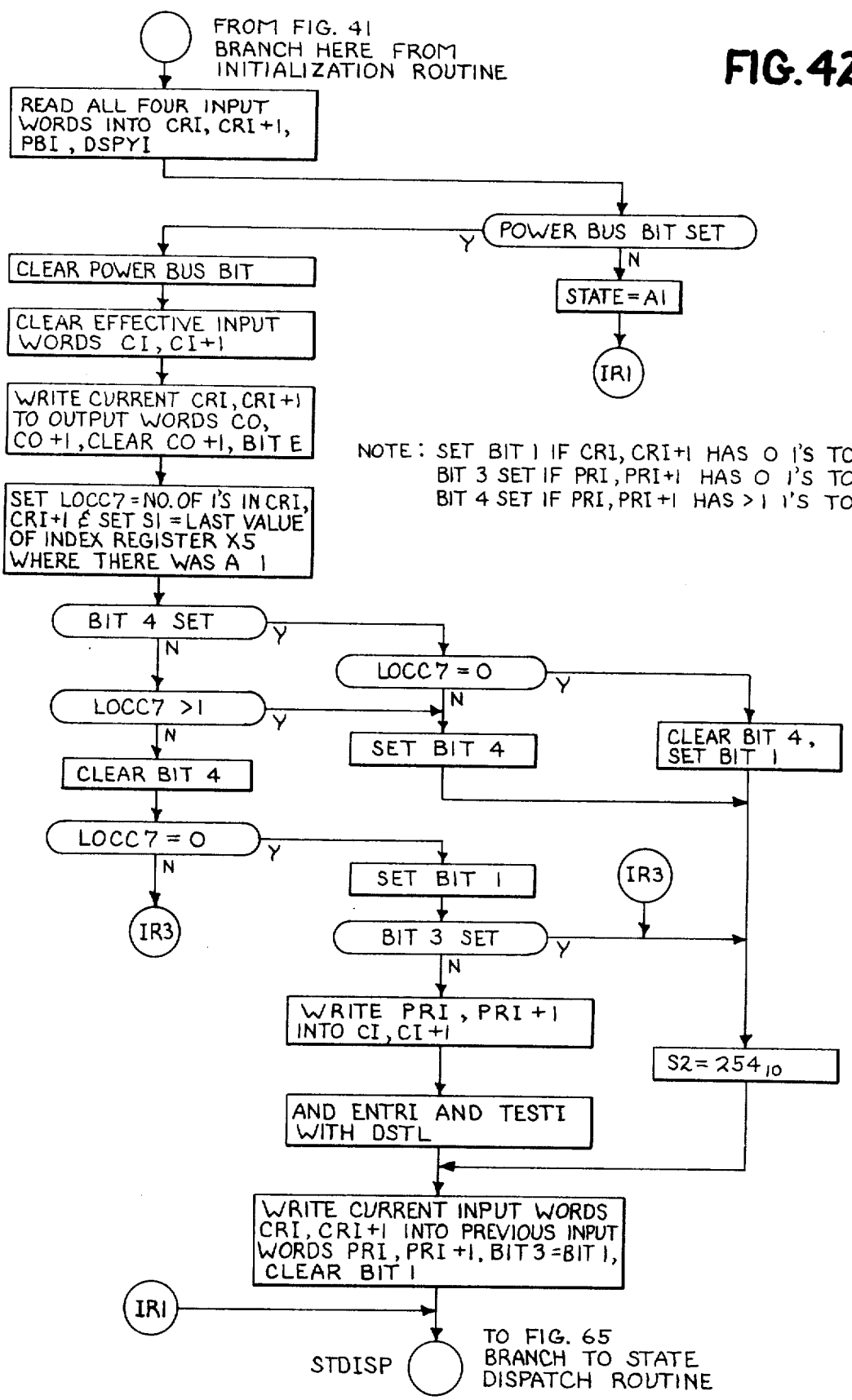

For the present, however, let it be assumed that the lower part of the flow chart of FIG. 41 has been executed and that the IMMP branches from the bottom of FIG. 41 directly to the input routine of FIG. 42. It is significant to note that each time the IMMP is entered on a first pass it is considered to be the input mode for the IMMP. Further, the IMMP does not branch to the state dispatch table on the first pass, but rather branches directly to the input routine.

Upon entering the input routine the first action performed by the IMMP is to direct the DBC to read for input words, consecutively, into locations CRI, CRI+1, PBI, and DSPYI. See the EQL listing. These words are located in the IMMP scratch area. As shown in the EQ1 listing of Appendix B, locations CRI and CRI+1 now contain the current status of the input switches read from the I&MM. Location PBI contains the value placed in the PLACE thumbwheels by the I&MM by the operator. Location PBI contains the value presently existing in the PLACE thumbwheels and is defined as the three right most digits. The significance of the information contained in each of these words will subsequently be described as each of the various state subroutines is covered.

The IMMP now performs a "power bus bit set" test by testing the status of location PLGI in the EQL listing. If the I&MM is plugged in this power bus bit will be set. The drawings of the present invention do not show the connection of this power bus bit from the I&MM into the DBC since it is not a significant part of the invention. However, if the I&MM were not plugged in and if the power bus bit line did exist the IMMP would then exit an N branch wherein the variable STATE is set equal to state A1. The IMMP would then exit to a point IR1 at the bottom of FIG. 42 to the state dispatch routine to location STDISP. There the state dispatch routine would then cause the IMMP to branch to state A1, which would then be executed. When A1 is executed it would again set the variable state to some predetermined state and exit through the exit routine back to the ISSP. The operation of state A1 will subsequently be described.

Let it now be assumed that the power bus bit is set, thus the program exits through a Y branch and enters into an action block wherein the power bus bit is cleared. The program then continues to execute wherein it clears two effective input words designated CI and CI+1. Each bit in these two words is identified and described in the EQL listing of Appendix B. Their purpose will become apparent as the description proceeds. The IMMP now writes the contents of the current input words, CRI, CRI+1, into output words CO and CO+1. It will be recalled that the output words CO and CO+1 are those words which are transferred to the I&MM during the exit routine. Also at this time Bit E of word CO+1 is cleared.

The IMMP now steps into the next sequential action block wherein location LOCC7 is set equal to the number of 1 bits in the current input words CRI and CRI+1. LOCC7 is a word located in the IMMP scratch area and shown in the EQL listing. The purpose of placing the number of ones from CRI and CRI+1 into LOCC7 is so that the IMMP, in the remaining portion of the input routine, can test to see if any bits have been read in from the I&MM. The reason that the number of ones in the input words must be determined is that the IMMP reacts to only one pushbutton at a time from the I&MM. Also in this same action block the loation S1 is set equal to the last value in the index register X5 where there was a one in either of the words CRI and CRI+1.

The IMMP now proceeds to a decision block to test to see if Bit 4 is set. Bit 4 is in word 14 shown in the EQL listing and it will be set at this time if the input words CRI and CRI+1 from the previous read input cycle (input routine) contains more than one bit total in these two words. However, Bit 4 will be reset at this time if, on the previous input read cycle, locations CRI and CRI+1 contain more than one one, or if there were no ones in either of those words.

During initialization, which the IMMP is presently going through, Bit 4 will obviously be in the reset state. Thus, the IMMP will exit through an N branch into another decision block wherein a test is performed to see if location LOCC7 is greater than one. LOCC7, it will be recalled now, contains the number of 1 bits contained in input words CRI and CRI+1. Since it is assumed at this time that CRI and CRI+1 both contain all zeros, LOCC7 will not be greater than 1. Thus, it will exit through an N branch into an action block wherein Bit 4 will be cleared. When Bit 4 is cleared, a decision block is then entered wherein the test to see if LOCC7 is equal to 0 is performed. Since LOCC7 is equal to 0, the program will exit through a Y branch wherein Bit 1 will be set in the next action block. As shown in the note on FIG. 42, Bit 1 is set if input words CRI and CRI+1 have zero ones total. Bit 1 is in word 14 shown in the EQL listing. As soon as Bit 1 is set the program proceeds into a decision block to test to see if Bit 3 is set. Bit 3 is Bit 3 of word 14 and it will be in the set state at this time, if locations PRI and PRI+1 have zero ones total as shown in the note in FIG. 42. The state of Bit 3 would have been determined from the previous sweep cycle through the input routine. Obviously at this time, since the IMMP is still in the initialization phase, Bit 3 is set, thus the program exits through a Y branch into a decision block wherein location S2 is set equal to the decimal number 254 to the base 10. The purpose of S2 will become apparent as the description proceeds.

The program now proceeds to IR2 in the bottom action block of FIG. 42. In this latter action block the IMMP now directly transfers or writes the current input word CRI and CRI+1 into two previous input word locations PRI and PRI+1. Location PRI and PRI+1 are also shown in the EQL listing. Also, in this latter action block, Bit 3 is set equal to the state of Bit 1 and simultaneously Bit 1 is clear. It can now be seen how Bit 3 from the previous input cycle into the input routine could have been set or reset dependent upon the number of ones in locations PRI and PRI+1.

Reference is now made back to the LOCC7 greater than one test block of FIG. 42. Let is now be assumed that LOCC7 is greater than one, thus the program will exit through a Y branch into an action block wherein Bit 4 is set. This indicates that the previous inputs from the I&MM read into CRI and CRI+1 contain more than one ones total. The program now continues on to the action block wherein again S2 is set equal to 254 as previously described. Still referring to the LOCC7 greater than one decision block, if, in the previous input cycle, only 1 bit was read into CRI and CRI+1, the program will exit through the N branch wherein Bit 4 will be cleared. With Bit 4 cleared the program will now enter into the LOCC7 equal 0 test block. At this time, if it is assumed that LOCC7 is not equal to 0 the program will then proceed to IR3 in FIG. 41, wherein S2 will again be set equal to 254.

Reference is now made to the top decision block for LOCC7 equal 0 in FIG. 42. This block is entered from the Y branch of the "Bit 4 set" decision block if Bit 4, on the previous input cycle, had been set due to locations CRI and CRI+1 having received more than one ones total from the I&MM. On the current input cycle, however, if LOCC7 is equal to 0, meaning that no inputs have been provided from the I&MM, the program will exit through a Y branch wherein Bit 4 is cleared and Bit 1 is set in an action block connected to that Y branch. On the other hand, if LOCC7 is not equal to 0, the IMMP will exit the N branch, Bit 4 will be set and the program will proceed to set S2 = 254 as previously described.

Reference is again made to the "Bit 3 set" decision block. Let it now be assumed that, from the previous input cycle, Bit 3 was placed in the reset state. As a result, the IMMP will now exit through an N branch into the action block connected thereto wherein the contents of the previous input words PRI and PRI+1 are now transferred into the previously cleared effective input words CI and CI+1. The IMMP now enters into an action block wherein location ENTRI, the enter key input switch in the I&MM, and location TSTI, the test input button location from the I&MM, are ANDed with location DSTL, the stall DBC status word key bit. This function stores the status of the ANDing of TSTI and DSTL in location TSTI and the ANDing of ENTRI and DSTL in location ENTRI. The purpose of storing this information will become apparent in subsequent description.

The program now enters into the next action block wherein the current input word CRI and CRI+1 are now transferred into the previous input word locations PRI and PRI+1. The status of the current input words are now stored in the previous input word locations for use on the next entry into the input routine. Also at this time, Bit 3 is set equal to Bit 1 and simultaneously Bit 1 is cleared.

From the immediately preceding description of the input routine it can now be seen that on each first pass through the IMMP the input routine will read the status of all of the input pusbbuttons and the thumbwheels from the I&MM and store the status of those inputs in the current input words CRI and CRI+1. The status of the current input words are then compared with the status of the previous input words in PRI and PRI+1 to determine whether a button has been pushed and released on the I&MM between two successive input sweep cycles. On each first pass through the IMMP the input routine will be directly entered from FIG. 41 as previously described wherein the input pushbuttons and thumbwheels from the I&MM will be read and a determination will be made as to whether one of those pushbuttons or an input thumbwheel has been changed. After execution of the input routine, the IMMP will branch to the state dispatch table from FIG. 42 to location STDISP as shown in FIG. 65.

The IMMP is still in the initialization phase in the present description, and the next operation that the IMMP will perform is to determine the actual end of the application program. This is accomplished by the state dispatch table which now causes the IMMP to branch to State L in segment 0 of FIG. 65 based on the state of location STATE as previously set in FIG. 41 during the absolute first time into IMMP.

Figure 63:
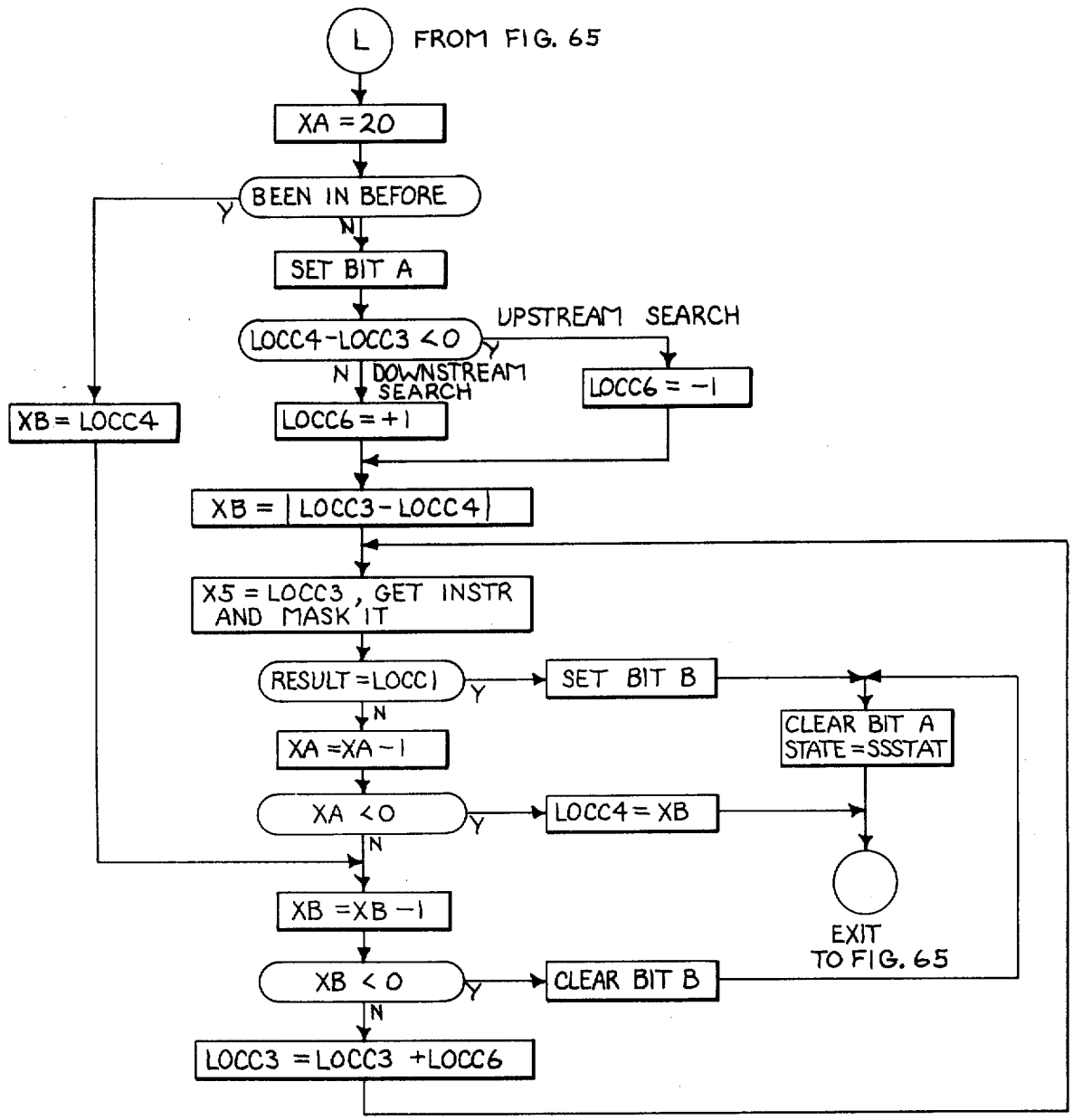

Reference is now made to State L in FIG. 63. It will be recalled from the previous description of FIG. 41 that the IMMP set various variables into locations LOCC1 through LOCC4 during the absolute first time into the IMMP. These locations are shown in notes on FIG. 63 explaining the contents of each of those locations. LOCC1 at entry into State L contains the pattern being searched, which is that information previously stored into LOCC1 from location STSTP defining a mask for a JIS instruction for branching back to the ISSP from the application program. LOCC2 upon entry into STATE L contains a mask of all binary zeros for masking the unwanted bits of the instruction being searched. Upon entry into State L, LOCC3 contains the absolute starting address, STAPP, which is altered during execution of State L and will subsequently be used as a search pointer during execution. LOCC4 contains the absolute finishing address, ENAPP, which is altered during execution of State L and will subsequently be used during that execution as a save area for location XB. Bit A is Bit A of word 14 in the EQL listing which, upon first entry into State L, will always be in a reset state. However it will be set during that first entry. Bit A is used as a flag bit to tell the IMMP that the search State L has been entered previously. Bit B is also Bit B of word 14 and that bit will be set when the time shared search state, State L, finds the mask defined by the pattern in LOCC1.

State L is a time shared search state in that it being its search at the beginning of the application program and searches through a variable number of instructions in the application program (e.g. 20 instructions at a time). If, during the search, of say 20 instruction, the end permissible point (ENAPP) of the application program is not found, State L then exits through the exit routine via the state dispatch table back to the ISSP. The reason for searching only a specified number of instructions at any one time is so that the IMMP does not spend so much time that it would effect the operation of the process. In State L, if the IMMP does not find the end of the application it will be entered again on the next first pass from the input routine. Upon each entry into State L the IMMP will continue searching through the application program from the point where it left off after the last entry. This repeated entry into State L and searching through the entire application program continues from location STAPP to location ENAPP.

The operation of State L will now be described in detail. On entry into State L the first action to take place is that location XA in the EQL listing is set equal to the constant 20. This constant is identified in the CON listing as location CNTCON, which contains a number specifying the number of words to be searched upon each entry in State L. The IMMP then enters into a decision block asking the question been in before. In this block the state of Bit A is tested to see if the search State L has been entered before. Assuming that it is the first entry into State L, the program exits through an N branch to an action block wherein Bit A is set. After Bit A is set the program then tests to see if LOCC4 minus LOCC3 is less than 0. This latter test is performed to see if the application should be searched in an upstream direction or a downstream direction. After the execution of certain state subroutines by the IMMP, State L will be entered wherein it will be necessary to search in an upstream direction. However, in the present description, upon entry into State L (sill in the initialization phase) LOCC4 minus LOCC3 will be less than zero, indicating that the search is to be in a downstream direction. Thus, the IMMP will exit through the N branch wherein location LOCC6 will be set equal to the constant +1.

In the present instance, LOCC6 is a variable which will be utilied in the State L search routine to increment location LOCC3, which is used as a search pointer. The program now enters into an action block where location XB is set equal to the contents of LOCC3 minus LOCC4. This action establishes the difference between the end of the application program (ENAPP) and the start of the application program (STAPP). The next action block is now entered wherein location X5, the data and bit reference index register, is set equal to LOCC3. Upon first entry into State L, X5 will be set to contain the address STAPP.

Also in this latter action block an instruction is retrieved from the application program and masked.

The program then tests in decision block to see if the result of the mask operation is equal to location LOCC1. Assuming that the result is not equal to LOCC1, indicating that the word being searched for has not been found, the program will exit through an N branch into an action block wherein location XA is decremented by setting XA equal to XA-1. This latter action decrements the count in XA, on the first time through State L, from 20 to 19. The program now proceeds into a decision block wherein a test is performed to see if XA is less than zero. So long as XA is less than zero the program will continue exiting through an N branch into a decision block wherein XB is set equal to XB minus 1. This latter action decrements the count in XB, which shows the difference between the present location and the end of the applicaton program. Now a test is performed to see if XB is less than 0. It it is assumed that the end of the application program has not been found, that is XB is less than 0, the program will then exit through an N branch into a block wherein location LOCC3 is set equal to LOCC3 plus LOCC6. LOCC3 has now been incremented by 1, whereby the program will re-enter into the action block and X5 is now set equal to LOCC3. In this block the next instruction will now be retrieved and masked as previously described.

The IMMP will continue to search through the application program in State L until XA is less than 0. Referring to the XA less than 0 decision block, when that block is satisfied the program will exit through a Y branch into a block wherein location LOCC4 is set equal to XB. LOCC4 now contains the finishing address previously retained in location XB. State L now goes to EXIT in the state dispatch table of FIG. 65 wherein the table will branch the IMMP to Exit 03 of the exit routine of FIG. 43. In FIG. 43 the state of bit C is now changed to be in the set state. As a result, upon next entry into the IMMP it will be the second pass through the IMMP from the ISSP. The IMMP now branches back to the ISSP to location APPSU in FIG. 26.

Reference is now made back to FIG. 41. Let it now be assumed that the IMMP is entered for the second pass from the ISSP. Again the registers are partially saved, the "absolute first time into IMMP" test will be performed, which is negative and the program will enter into the "Bit C set" decision block. At this time, since Bit C is set (second IMMP pass), the program will exit through a Y branch wherein the remaining registers will be saved. Again the compatibility check will be performed, and assuming it is OK the program will exit through a Y branch again into the absolute first time into IMMP test block. Without describing the operation of the forcing routine in the lower half of FIG. 41, let it now be assumed that the IMMP has proceeded down to the "Bit C set" decision block at the bottom of FIG. 41. Since Bit C is set, indicating that this is the second pass through the IMMP, the program will exit through the Y branch to EXIT 04 to the state dispatch table of FIG. 65. The state dispatch table at this time will again cause the IMMP to branch to EXIT 03 of the exit routine in FIG. 43 wherein the state of Bit C will be changed to the reset state and the program will exit back to location IOLP in the ISSP.

Reference is now made back to FIG. 41. Assume now that the ISSP has just read the inputs and the IMMP is again on a first pass. Also, at this time, since the system is still in the initialization state, the variable location STATE is still equal to State L. Thus, the initialization and two-pass forcing subroutine of FIG. 41 will be executed straight down the page whereby the program will branch to the input routine reading the input thumbwheels and switches as previously described. From FIG. 42 the program will again branch as previously described through the state dispatch table and re-enter directly back into State L of FIG. 63. Thus the IMMP is again back in the search state.

In FIG. 63 location XA is again initialized by the constant 20. At this time since the "been in before" test will shown positive the program in State L will exit through the Y branch into an action block whereby location XB will be set equal to LOCC4. The program will now proceed to the subsequent action block and XB is decremented by one by setting XB equal to XB-1 as previously described. After XB has been set the decision block is again entered to determine if XB is less than zero. If XB is not less than zero the program will run in the same manner as previously described whereby the next 20 words will be searched. After the next twenty words have been searched, and if the mask has not been found, the program will exit from State L back to the ISSP in the same manner as previously described. However, if the entire application program has been searched and a mask has not been found, XB is less than 0. As a result the program will exit through the Y branch into a block wherein Bit B is cleared. On the other hand if a successful search was found, that is the end of the application program was found, indicating that an application program does exist, Bit B will be set as a result of a test performed in the decision block result equal to LOCC1. When the result does equal LOCC1 the program exits through the Y branch from that decision block setting Bit B.

At the end of the time shared search state, State L, the program then proceeds into the last decision block in that state wherein Bit A is cleared in preparation to re-entering State L if necessary and the variable STATE is set equal to the contents of location SSSTAT. Reference is now made back to FIG. 41 where it will be recalled that in the absolute first time into the IMMP location SSSTAT was set equal to State D2. This explains how the contents of location STATE are set equal to State D2. As a result, upon the next first pass into the IMMP of FIG. 41, the program will enter State D2 after having gone through the initialization and two-pass forcing, the input, and the state dispatch routines.

Referring back to FIG. 63 the time shared search state will now again exit to the state dispatch table and from there through the exit routine whereby the state of Bit C will again be set and the program will branch back to the ISSP to location APPSU for the second pass entry into the IMMP. Let it now be assumed that the IMMP has completed its second pass and is now being re-entered again on the first pass back through FIG. 41. Since it is the first pass the IMMP will again branch from FIG. 41 to the input routine, then from the input routine through the state dispatch table, which in turn will cause the IMMP to now enter into State D2 in segment 1 of the program as shown in FIG. 65.

Figure 56:
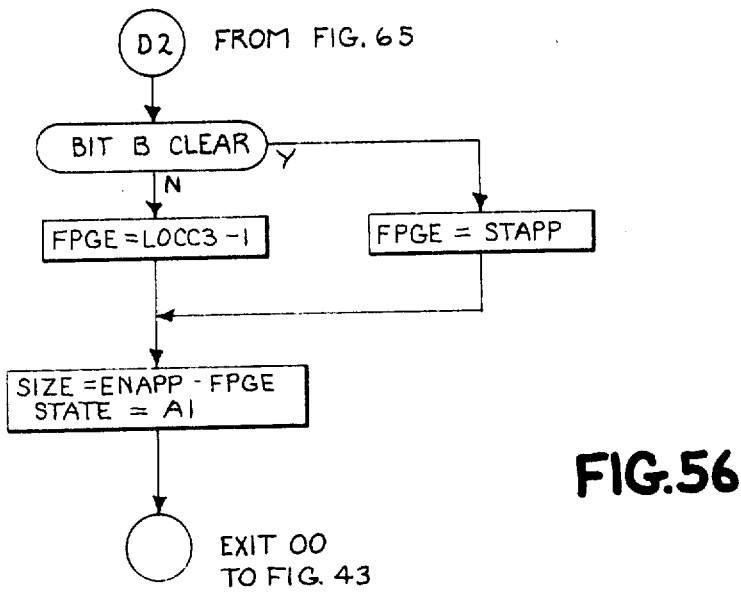

Reference is now made to State D2 of FIG. 56. As can be seen in State D2 that state is entered subsequent to searching for STSTP, the pattern which was searched in State L. Upon entry into State D2 the first test performed is to see if Bit B is clear. If that Bit is not clear, it indicates that there is no application program, as a result the program exits from State D2 through the Y branch into an action block wherein a location FPGE is set equal to location STAPP, the address of the beginning of the application program. However, if Bit B is set the program will take the N branch into an action block wherein location FPGE will be set equal to location LOCC3 minus 1. That is FPGE is set to the location where the mask was located in the application program. As will be recalled from the description of State L, LOCC3 contains the address where the mask was found, thus the end point of the application program is at location LOCC3 minus 1. Location FPGE now contains an address which points to the last instruction in the application program.

The program now proceeds into the next action block wherein a location SIZE in the EQL listing is set equal to the end permissible point (ENAPP) for the application program minus the actual end of the application program (FPGE). Location SIZE is going to be used in the future as a permissible area of the previously introduced expansion area for adding to the application program should the I&MM operator desire to do so. Also in this latter action block the variable state STATE is set equal to STATE A1, the state which the IMMP will enter on the next first pass. The IMMP now exits directly to Exit 00 of the exit routine of FIG. 43 wherein that routine will again write the output words to the I&MM indicators and displays, change the state of Bit C, restore the registers and jump back to the ISSP to location APPSU for the second pass into the IMMP.

The IMMP will again be entered on the second pass at FIG. 41. The program will go to Exit 04 of the state dispatch table, which in turn branches to Exit 03 of the exit routine, again changing the state of Bit C for the next first pass through the IMMP.

Figure 59:
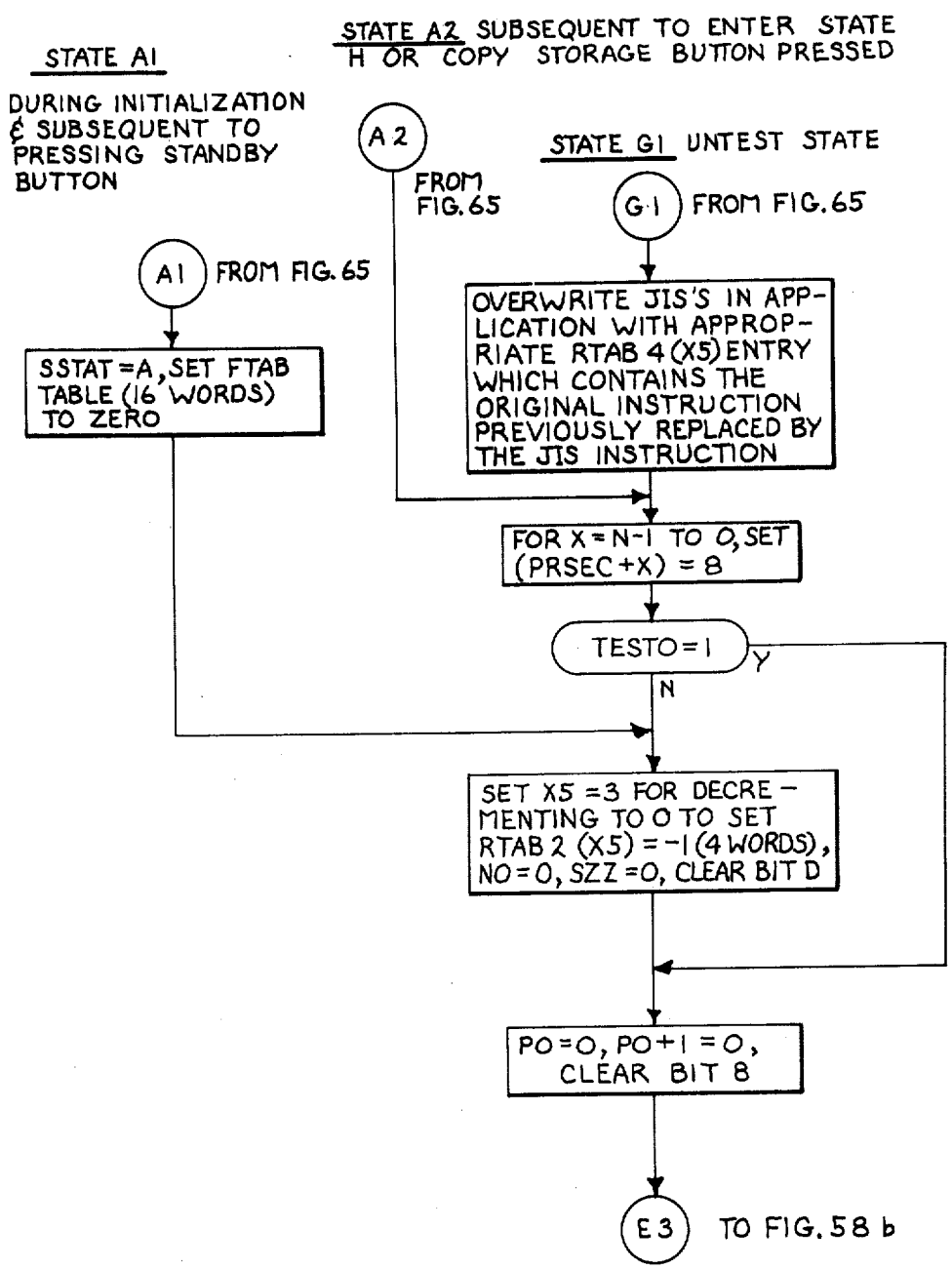

Let it now be assumed the IMMP has now entered into the first pass again wherein the program branches to State A1 of FIG. 59. State A1 is basically a housekeeping state wherein certain words in the memory are cleared in preparation to running subsequent portions of the IMMP. This state is entered during initialization and also subsequent depressing the Stand-By button on the I&MM. The first action to take place in State A1 is location SSTAT is set equal to State A and 16 memory locations shown in the EQL listing, and designated FTAB table, are cleared to zero. The purpose of the FTAB table will become clear as the description proceeds. The program now branches to a location A3 in FIG. 59 wherein location X5 is set equal to 3 for decrementing X5 to zero to set another table comprised of four words designated RTAB2 to a minus 1 as indexed by location 5. The purpose of the four RTAB2 locations will also become clear as the description proceeds. At this time locations N and SZZ are also set to 0, and location Bit D is cleared. The program now proceeds to the last action block in FIG. 59 wherein the output words PO and PO+1, the contents of which are normally sent to the I&MM, are cleared to 0 and bit 8 the test mode bit, is also cleared.

Figure 58A:
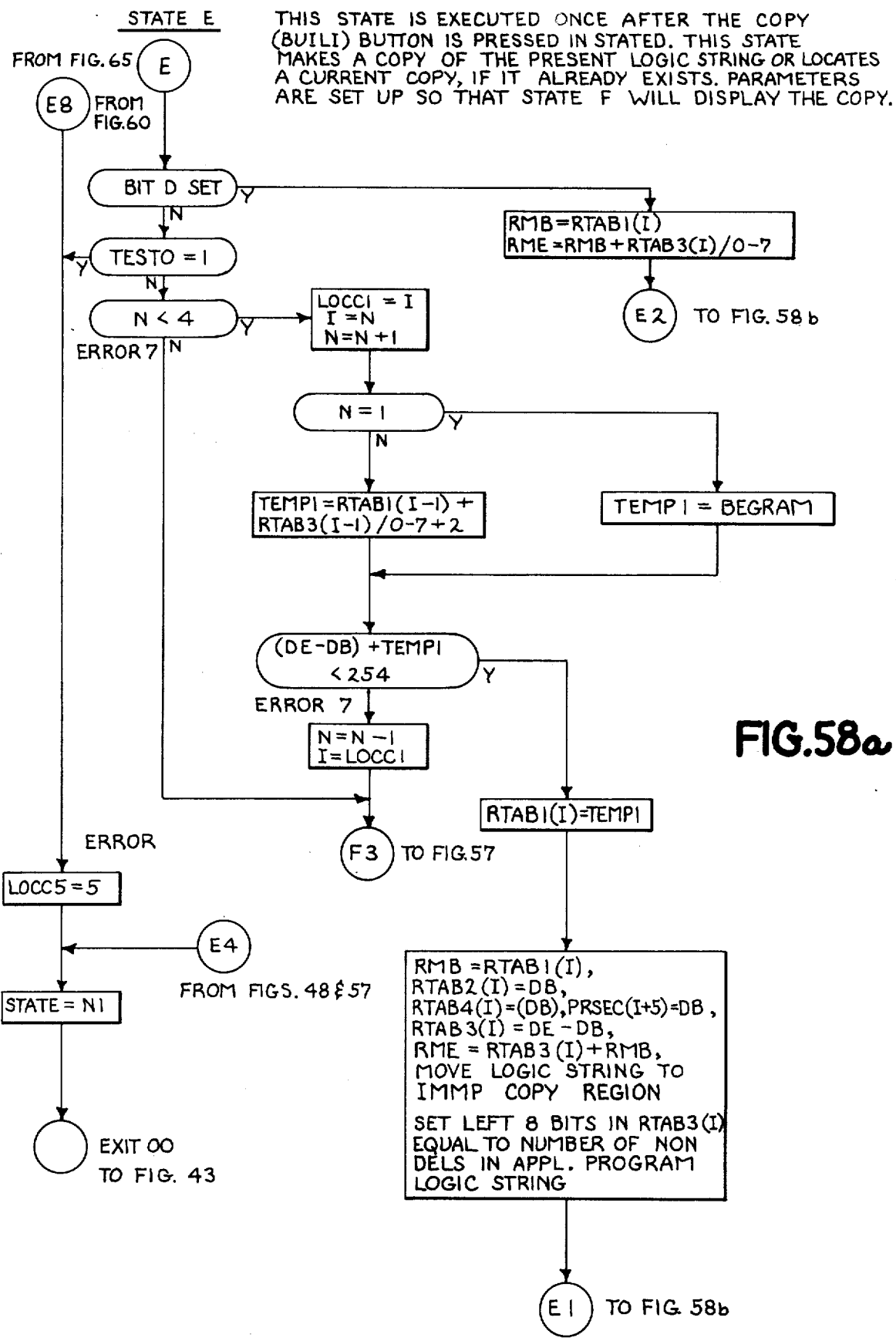
Figure 58B:
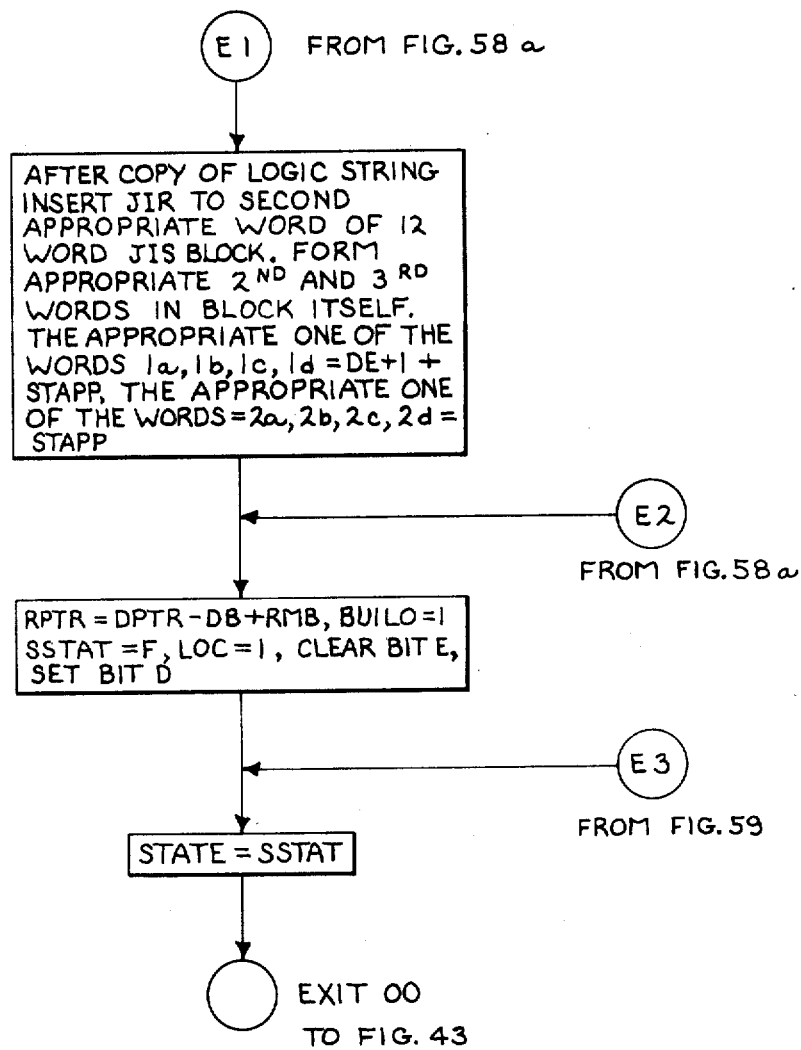

The IMMP now branches to E3 of FIG. 58b wherein the variable STATE is set equal to location SSTAT which now contains State A. Thus, STATE is set equal to State A, which will be entered on the next first pass through the IMMP. The program again exits to Exit 00 of the exit routine of FIG. 43, wherein the output words CO and CO+1 are transferred to the I&MM and the state of Bit C is changed in preparation for the second pass through the IMMP. The exit routine will again branch back to the ISSP to location APPSU as previously described.

Again let it be assumed that the IMMP has completed the second pass and has entered into FIG. 41 for the first pass. FIG. 41 will again be executed whereby the program will branch to the input routine. After completion of the input routine, the program will branch through the state dispatch routine which will in turn branch to State A of FIG. 44. It will be recalled that the variable state STATE was set to State A in State A1. State A is the standby state. At this time, essentially the Stand-By light on the I&MM is on as will become apparent in the following discussion of State A.

Upon entry into State A the first action to take place is that the output display location DSPYO is set equal to location SIZE. The reason for setting DSPYO equal to SIZE is so that during the exit routine the operator will have displayed on the display 156 of the I&MM the size of the expansion area for the application program. The obvious reason for this is so that the operator will know how much room he has in which to add to the application program. The IMMP will now enter into the first decision block wherein the question asked is BDPLYI set. BDPLYI is the location in the EQL listing (CI+1, Bit 9) which corresponds to the Bit Display button on the I&MM. Thus, if the operator has previously pressed the Bit Display button BDPLYI will be set indicating that he wants the I&MM to go into the Bit Display Mode. It will be recalled that all input pushbuttons and thumbwheels are read in from the I&MM by the IMMP during the input routine. For the present, since the system is still in the initialization state, let it be assumed that BDPLYI is not set. Thus, the program will exit into the next decision block wherein a test is performed to see if the logic display pushbutton at location LDPLYI has been pressed. Again assuming that the operator has not pressed the logic display button the program will exit through an N branch wherein the Stand-By light at location STDBO is set equal to 1. This places the IMMP in the Stand-By Mode, so that during the exit routine the Stand-By light will be turned on on the I&MM.

It can now be seen that upon first entry into State A, during the initialization phase of the IMMP, that the Stand-By light STDBO will always be set to a 1. This is because the IMMP is executed faster than the operator can respond by pushing any of the buttons on the I&MM. Thus, the first indication that the I&MM operator will receive is that the Stand-By light STDBO will be on. The IMMP will now go to EXIT of the state dispatch table (FIG. 65) which will in turn branch to Exit 00 of the exit routine wherein that routine will again write the output words to the I&MM and change the state of Bit C in preparation for the second pass of the IMMP. It is at this time (in the exit routine) that the I&MM will turn on the I&MM Stand-By light (see FIG. 4). The program will now branch back to the ISSP from the exit routine to location APPSU. Let it now be assumed that the second pass has been completed and that the IMMP is now on a first pass, again entering into State A in the manner as just described.

From State A the I&MM operator, utilizing the I&MM, can place the console in either Bit Display Mode or Logic Display Mode. Let it now be assumed that the I&MM operator has pressed and released the Bit Display button on the I&MM. Thus, during the input routine, when the input words from the I&MM are read into the memory, location BDPLYI will be set to a binary 1. As a result, when BDPLYI is tested, the program will exit through a Y branch into an action block wherein the variable state STATE is set equal to State B1. This is in preparation so that when the IMMP comes through on the next first pass it will branch to State B1. After setting STATE equal to B1 the program will now set location STDBO equal to 0, thus turning off the Stand-By light. The program now branches to EXIT of the state dispatch table, which in turn effects a branch to the exit routine through EXIT 00 returning back to the ISSP for the second pass.

Let it now be assumed tht the IMMP is now on its first pass again. After going through the initialization and two-pass forcing routine of FIG. 41, the input routine of FIG. 42 and the state dispatch routine of FIG. 65, the IMMP will branch from the latter routine into State B1 of FIG. 45.

Figure 45:
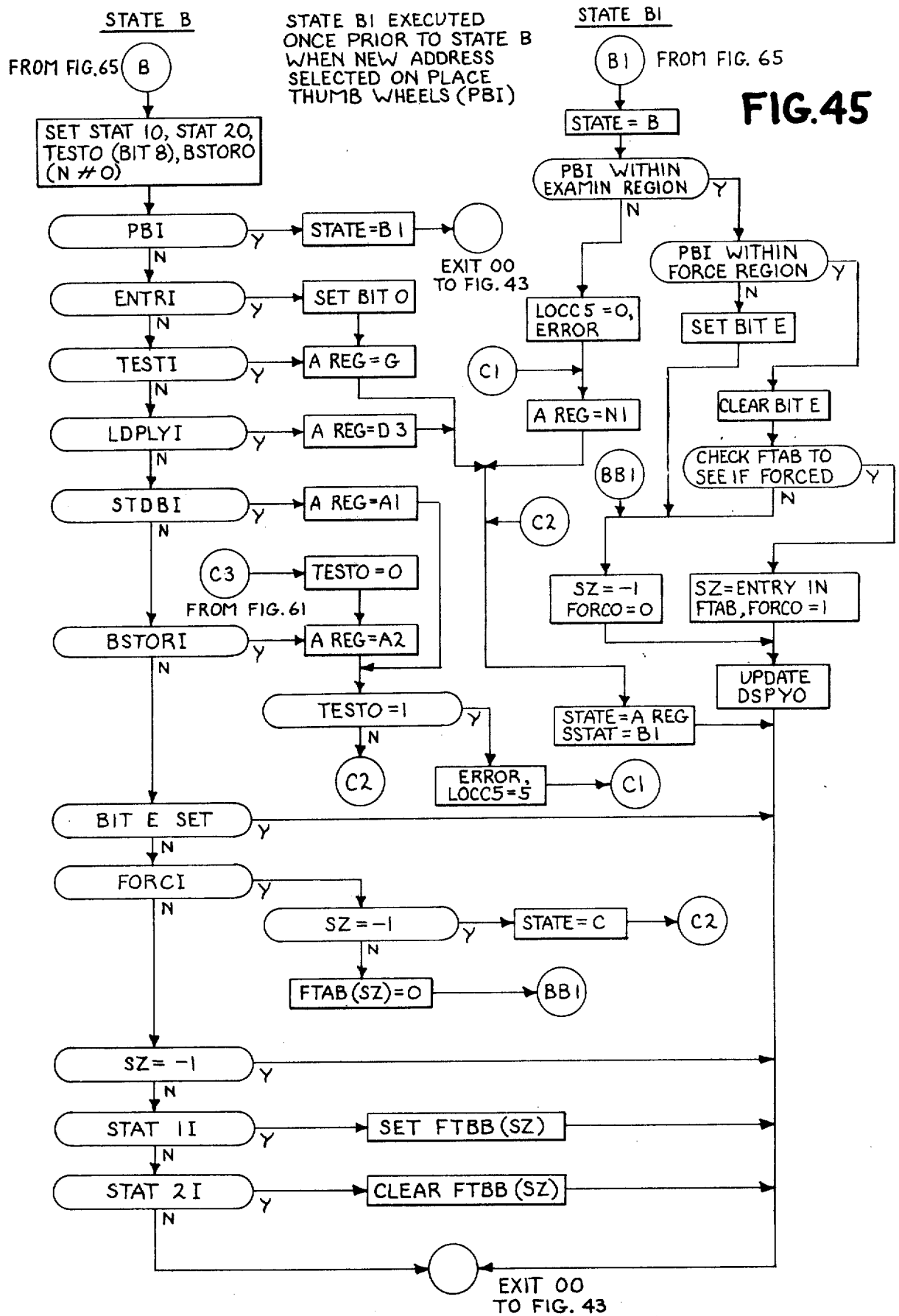

It wll be noted that States B1 and B both comprise FIG. 45. These two states constitute the bit display mode for the I&MM. State B1 is a preliminary housekeeping state which is always run prior to State B. The primary purpose of State B1 is to determine certain things about the bit address which is dialed into the PLACE thumbwheels by the I&MM operator. Since the forcing of the input and output status bits is performed by the IMMP when the I&MM is in the Bit Display Mode it is considered advantageous at this time to describe how the IMMP does in fact force the input and output bits and how the IMMP unforces the output bits.

The IMMP constrains the I&MM operator to work within a certain permissible memory region. This region is defined by the input, output and intermediate regions in the memory of FIG. 2. Together these three regions define the total status bit region available to the application program. Within this overall region there are two subgroups. One of these subgroups comprises strictly an examination region, which consists of input bits, output bits, and the intermediate bits in the memory. The other subgroup comprises a forcing region, which relates only to input and output bits of the memory. Still referring to FIG. 45, the IMMP performs various tests in State B1 on the address specified by the I&MM PLACE thumbwheels to determine if that address is within the examine region or if the address is in the force region. Additionally, in State B1 a test is performed to see if locations FTAB are forced. FTAB is a table of 16 words shown in the EQL listing and each word is capable of containing an address of a forced input or forced output bit. The addresses which are in the FTAB table are communicated to the IMMP by the I&MM operator during the Bit Display Mode. Since the FTAB table is 16 words long the IMMP is capable of forcing 16 separate bit locations at one time in the input and output regions of the memory. These input and output bits can be forced in any combination. During the execution of State B1, the IMMP searches each of the words in the FTAB table to see if anyone of those words contains a forced address corresponding to the address in the PLACE thumbwheels (PBI). The purpose of searching the FTAB words will be described in the subsequent description of State B1.

Reference is now made to FIG. 41 to the input/output forcing routine shown in the lower half of that figure. With the preceding basic description in mind, the IMMP forcing routine can now be understood.

Let it now be assumed that the IMMP is on a first pass and has just entered into the first decision block in the input/output forcing routine wherein that action block, location X6, is set equal to the constant C15 from the constant listing in Appendix B. It will be recalled that the FTAB table is comprised of 16 words. X6 will be utilized as a counter to count the words and it will be decremented to examine the contents of each of those words. The program now proceeds to the next action block wherein location X5, the data and bit reference index register, is set equal to the contents of X6. A test is now performed to see if any of the 16 words of FTAB indexed by the contents of X5 are equal to 0.

It will now be noted that the program in FIG. 41 comprises an indexing loop wherein an output through an N branch from a decision block X6 less than 0 (bottom of the page) loops back into the action block "X5 = X6". The purpose of this loop is so that each of the 16 words in the FTAB table will be examined on each pass into FIG. 41. So long as any of the FTAB words are equal to 0 (indicating that no forced addresses exist in any one of those word locations) the program will exit the "FTAB (X5) = 0" decision block through a Y branch entering into an action block wherein X6 is decremented by setting X6 = to X6=1. The program then immediately tests to see if the contents of X6 are less than 0. If X6 is not less than 0, indicating that all of the FTAB words have not been examined, the program will exit back through the N branch into the action block "X5 = X6". The IMMP will continue to circulate in this loop unless a forced address is found in one of the FTAB words.

Let it now be assumed that the entire FTAB table has been searched and that no forced addresses have been found in any of those words. As a result, after searching the last FTAB word, the contents of X6 will be less than 0, thus the program will exit through a Y branch of the X6 less than 0 decision block and a test is performed to see if Bit C is set. If it is the first pass through the IMMP, Bit C will not be set, thus it will exit through an N branch wherein the IMMP will turn off all previous functional lights and branch to the input routine in the manner as previously described.

Let it now be assumed that, during the searching of the FTAB words, one of those words contains a forced address. As a result, the IMMP will branch from the "FTAB (X5) = 0" decision block through the N branch into an action block wherein location Bit 6 is set equal to location FTBB indexed by (X5), Bit 7 is set equal to location FTBC indexed by (X5), and location X5, the index register, is set equal to FTAB indexed by X5. X5 now contains the forced address contained in the FTAB word.

Location FTBB is a 16-bit word shown in Appendix B capable of containing 16 bits of information, each corresponding to one of the input or output bits referred to by the FTAB word. Each of the various bits in FTBB will be either a binary 1 or a binary 0 to force a corresponding one of the input or output status bits as addressed by the FTAB word. Location FTBC is also a 16-bit word utilized to contain the natural state of any one of the output bits which may be forced. That is, that state of those forced output bits prior to their being forced. The reason for FTBC will become apparent as the description proceeds.

The IMMP now enters into another decision block wherein the question asked is "Bit C set". Since it is presently assumed that the IMMP is still on the first pass it will exit through an N branch into an action block wherein Bit 7 is set equal to a bit location designated DUMMYB, X5. At this time location X5 contains the bit address for location DUMMYB, which is effectively one of the bit addresses of the one of the 16 FTAB words presently being examined. Thus, the bit which is stored in Bit 7 is the natural or unforced state of either an input or an output status bit being addressed by a particular FTAB word.

The program now proceeds to a next action block wherein bit location DUMMYB, X5 is set equal to Bit 6. It will be recalled that Bit 6 is a location in Appendix B which temporarily holds the state of the forced input or output status bit from location FTBB. Thus, at this time the particular bit in location DUMMYB is forced to the state specified by FTBB. In this same action block X5 is now set equal to X6 and location FTBC (X5) is set equal to Bit 7. It will be noted that the particular bit which is set in word FTBC is designated by the contents of X5, the latter being a bit address. FTBC now contains the natural state of the forced input or output status bit which was previously stored in Bit 7. The program now proceeds again to the action block wherein X6 is decremented by setting X6 equal to X6-1. Again the test X6 less than zero is performed. If X6 is now less than zero, meaning that all of the FTAB words have not been examined, the program will again branch through the N branch entering back into the "X5 = X6" action block. The IMMP will continue in the loop just described whereby each of the FTAB words will be sequentially examined and if a particular FTAB word contains an address of a status bit to be forced in either the input or output region, that status bit will be forced to the state as specified by a corresponding bit in location FTBB. At the same time, the natural state of that status bit which is to be forced will be stored in location FTBC. It can now be seen how 16 input or output bits or any combination thereof can be forced by the IMMP in communication with the I&MM.

After all of the FTAB words have been examined, location X6 will be less than zero. Thus the program will exit through the Y branch at the bottom of FIG. 41 wherein the "Bit C set" test will again be performed. Since it is presently assumed that the IMMP is still in the first pass it will exit through the N branch, turn off the previous functional light as previously described and the branch to the input routine.

In summary the IMMP forces the input and output status bits in the input/output regions of the memory as follows.

1. After the ISSP has read all of the inputs from the process equipment the ISSP jumps to the IMMP.

2. The IMMP then enters into the initialization and two-pass forcing routine of FIG. 41. In the forcing routine, the IMMP searches down through the FTAB table to determine if any of the 16 FTAB words contain zeroes or any specific addresses.

3. If there are any addresses in any of the FTAB words, the IMMP forces the input or output status bit to either a one or a zero state addressed by the corresponding FTAB word wherein the state which the input or output bit is forced to is specified by one of 16 bits corresponding to the particular bit to be forced in location FTBB. Also, the natural state of the forced input and output bits are stored in location FTBC, the 16-bit word which stores the natural states of those forced input/output bits.

It was previously mentioned in FIG. 41 that that subroutine contained a two-pass forcing feature; (1) the forcing feature wherein the input and output status bits just described are forced on the first pass of the IMMP, and (2) the unforcing of the previously forced output bits. The latter feature can be understood by assuming that the IMMP has just completed its first pass, branched back to the ISSP wherein the ISSP has just sent the output signals from the output region of the memory to the process equipment. Upon completion of sending the process outputs, the ISSP now branches back to the IMMP to FIG. 41 for the second pass through the IMMP wherein IMMP2 will be run. On the second pass through FIG. 41, the IMMP will execute the top portion of the subroutine in the manner as previously described, entering again into the forcing subroutine in the lower part of FIG. 41 wherein the first action to take place is to set X6 = C15.

The operation of the forcing routine in the second pass is basically the same as in the first pass with the exception that the previously forced output bits, if any, are unforced. That is, the state of each bit is restored to the state in which it existed prior to the forcing that went on in the first pass. The natural states of each of these bits naturally were the states which existed after the standard status program ISSP read these bits into memory during the read input cycle of the ISSP. The IMMP will now continue as previously described to examine each of the FTAB words to see if a forced address exists in any one of those words. Again, as previously described in the decision block "FTAB (X5) = 0", if a particular FTAB word does not contain an address, the program will exit through the Y branch entering into the action block wherein X6 is decremented by 1. The program will continue to loop in the manner as previously described examining each of the FTAB words in a sequential fashion. When a word is encountered which contains a forced address the program will exit from the FTAB (X5) = 0 block into the action block wherein again Bit 6 will be set equal to FTBB (X5), Bit 7 will be set equal to FTBC (X5) and X5 will be set equal to FTAB (X5). The operations which take place in this latter block are exactly as previously described in connection with the first pass forcing feature.

The program now enters into the decision block Bit C set. Since it is assumed that this is the second pass through the IMMP, Bit C will be set thus, the program will exit through the Y branch into a decision block wherein the question is asked is X5 in forced output region?. At this time X5 contains an address corresponding to the presently being accessed FTAB word which is pointing to one of the bits in the input or output region of the memory. In this latter decision block if that address is outside of the forced output region; that is, outside of the output region of the memory, the program will exit through an N branch entering again into the action block X6 = X6—1. The program will now repeat itself entering into the loop back into the X5 = X6 action block and the next FTAB word will be examined.

Let it now be assumed that the contents of X5 contain an address which is within the forced output region of the memory. Since the address is within the forced output region, the program will now exit through a Y branch entering into an action block wherein bit location DUMMYB, X5 is set equal to Bit 7. It will be recalled that Bit 7 now contains the natural state of the previously forced output bit from FTBC. Thus, at this time the bit location DUMMYB (X5) is restored to its natural state. That is, the state in which that bit existed prior to the forcing routine which took place in the first pass. Upon completion of restoring this output bit, the program now branches into the action block wherein X6 is again set equal to X6—1. The program will continue to cycle in this loop examining each of the 16 FTAB words and restoring the appropriate output bits to their original states. When X6 is less than zero, meaning that all of the FTAB words have been examined, the program will exit again through the Y branch entering into the Bit C set decision block. Since this is the second pass the program will now exit through the Y branch to Exit 04 of the state dispatch table as previously described. The state dispatch table will then cause the IMMP to branch to Exit 00 of the exit routine wherein the output words are now sent to the I&MM and the state of Bit C is changed in preparation for the next first pass through the IMMP. The program now branches from the exit routine back to the ISSP. The application program is then run in the manner previously described.

The reasons for unforcing or restoring any forced output status bit is due to the way the application program processes data. It will be recalled that an SST instruction can change the state of a bit which it references. This bit will normally be in the output region and the state of this referenced bit will be determined by the various logic operator instructions in any given logic string preceding the SST instruction referencing that particular output bit. It will also be recalled that any logic operator instruction (LOT, LAT, etc.) can reference any status bit in the output region. As such, a logic operator instruction can reference a forced output status bit in the output region. If an output status bit is in a forced condition when the application program runs and if a logic operator instruction in the application program references that forced status bit, it will act on the state of that status bit in its existing state. Typically, in the operation of the application program, assume that the first reference to a particular forced output bit happens to be by an SST instruction. The SST instruction when executed will change the state of that forced bit to a 1 or a 0 depending on the logic in the logic string which preceded that SST instruction. Then, after the execution of this SST instruction there may be some logic operator instructions in subsequent logic strings which reference that location. If that referenced location is forced to its opposite state, when these logic operator instructions are executed, they will see the state of the forced bit as it was erroneously set by the execution of the SST instruction and not as forced by the IMMP. If the forced output status bits were not restored this would provide inconsistency in the handling of forced and unforced output status bits while running the application program. This inconsistency arises because, if the logic operator instructions, which come after the execution of the above mentioned SST, were to come before that SST, these logic operator instructions would see the forced output bit as forced by the IMMP. However, if they come after the SST instruction, they will see that same bit as set or reset by the SST instruction itself. Therefore, in order to achieve a desired consistency all input status bits are considered to be forced from the outside world, i.e., from the process equipment, whereby the application program will see those inputs as forced. All output status bits are forced to the outside world. That is to the process equipment. Again, as previously stated, all outputs going to the external world, that is to the process equipment, are forced. These outputs are then unforced or restored in the second pass through the IMMP prior to running the application program so that the application program sees those forced outputs in their natural states.

With the preceding description of how the IMMP forces input and output status bits and unforces or restores previously forced output status bits, it is now possible to get a better understanding of the operation of the IMMP when it is in the Bit Display Mode as depicted in the flow chart of FIG. 45. Reference is now made to FIG. 45 to State B1 wherein it will be recalled that that state was entered from State A subsequent to the I&MM operator pressing the Bit Display button. Upon entry into State B1 and in the first action block location STATE is set equal to State B. State B appears on the same figure (FIG. 45) with State B1 and that is the state where the IMMP will enter on the next first pass after exiting from State B1. The program now enters into a PBI with examine region decision block. The IMMP constrains the I&MM operator to work within a certain permissible bit region. This region is defined by the input, output and intermediate status bits (FIG. 2). Together these three regions effectively define the total status bit region available to the application program. As previously described, the overall region is comprised of two subgroups. One of these subgroups is the area in the application program that the I&MM operator may wish to examine, which consists of input bits, output bits and the intermediate bits. The other subgroup is related to only those bits in the input and output regions of memory which can be forced. It is in State B1 where these various subgroups are examined to determine if the I&MM operator has placed a proper address into the PLACE thumbwheels on the I&MM.

The first question asked on entry into State B1 is whether the I&MM operator has placed into the PLACE thumbwheels (PBI) an address which is within the overall examine region. It will be recalled that the examine region is specified to the IMMP by the parameters set by the ISSP and which were transferred by the IMMP upon the absolute first entry into FIG. 41 during initialization. Thus, the IMMP knows these parameters, and so it compares the PLACE thumbwheels (PBI) with those parameters defining that region. If the PLACE thumbwheels are not within that region, the IMMP then exits through an N branch into an action block wherein the variable in location LOCC5 is set equal to zero. This will result in an error being displayed on the I&MM to the I&MM operator.

The program then sets the A register equal to State N1 and then enters into the next action block wherein the variable state, STATE, is set equal to the A register, thus setting STATE equal to N1. Also, in this latter action block, the location SSTAT is set equal to STATE B1.

Figure 49:
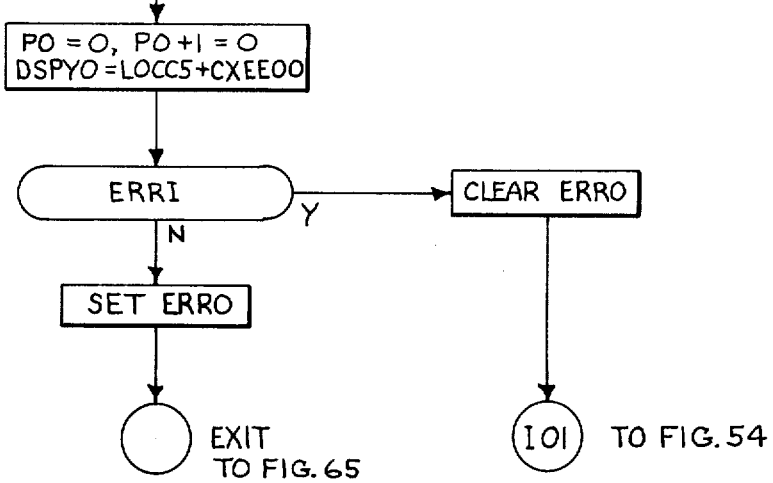

Setting STATE equal to N1 which will now cause the IMMP, on the next first pass, to jump to State N1 of FIG. 49. State N1 is an error information state which is executed to display an error to the I&MM operator should he enter wrong information into the I&MM. The location SSTAT is set equal to State B1, which is a subroutine that the IMMP will return to after execution of the error state (N1) of FIG. 49, if the I&MM operator has pressed the error button on the console clearing the error.

Still referring to FIG. 45, as soon as the IMMP sets location SSTAT equal to State B1, the program exits to Exit 00 reentering back into the ISSP to location APPSU via the exit routine. After the ISSP has run again, the latter will now branch back to the IMMP for the second pass. After the second pass, the IMMP will then branch back to the ISSP to location IOLP in the manner as previously described. The ISSP, after reading the process equipment inputs will again branch back to the IMMP for another first pass. Upon this first pass the IMMP now will enter into State N1 of FIG. 49, the error information state. State N1 is a common error information state which is entered from various ones of the state subroutines if the operator commits some type of illegal operation when operating the various buttons and thumbwheel switches on the I&MM. In the present instance, State N1 is entered from State B1, the Bit Display Mode state, because the I&MM operator placed an address in the PLACE thumbwheels which was outside the examine region.

State N1 (FIG. 49) will now be described in only this one instance, since the operation of this state is the same when entered from all other state subroutines. Upon entry into the first action block of State N1, the two previous output words PO and PO+1 are set equal to zero. It will be recalled in the previous description of the exit routine that the words PO and PO+1 each contain bits defining various indicators on the I&MM. When these output words are transferred to the I&MM in the exit routine their zero contents will turn off all of the indicator lights on the I&MM. Also in this action block, the output display word at location DSPYO is set equal to LOCC5 plus the constant CXEEOO, thus placing an error code in DSPYO which will be displayed to the I&MM operator. This error code will tell the operator what error he has committed.

The program will now enter into a test block ERRI wherein a test is performed to see if the operator has depressed the error input button on the I&MM. ERRI is a bit in the Appendix B EQL listing corresponding to the Error switch on the I&MM. If the I&MM operator has pressed the Error button prior to entry into State N1, the program will branch through an N branch wherein location ERRO is set to a binary 1. This will effect turning on the error light during the exit routine, thus signifying to the operator that an error does exist. The program will now exit through the state dispatch routine, and from that routine through the exit routine back to the ISSP as previously described.

The IMMP will now continue to reenter into State N1 on each first pass through the IMMP until the I&MM operator depresses the Error pushbutton. Still referring to FIG. 49, let it now be assumed that the I&MM operator has depressed the Error pushbutton. Thus, location ERRI will be a binary 1 and the program will exit from the decision block ERRI through the Y branch into an action block wherein the error bit, ERRO, will be cleared to a zero, thus turning off the Error light on the I&MM during the exit routine. The program will now branch to point 101 in FIG. 54, State 10, wherein the variable location STATE is set equal to the contents of SSTAT. Upon each entry into the error state, N1, and when exit is made from that state through State I/0, STATE will always be set equal to location SSTAT, which contains a number representative of a particular state that the IMMP will return to after the operator presses the clear button on the I&MM. In the present instance since State N1 was entered from State B1, STATE will be set equal to State B1. It will be recalled that location SSTAT was set equal to B1 back in State B1 in FIG. 45.

Figure 54:
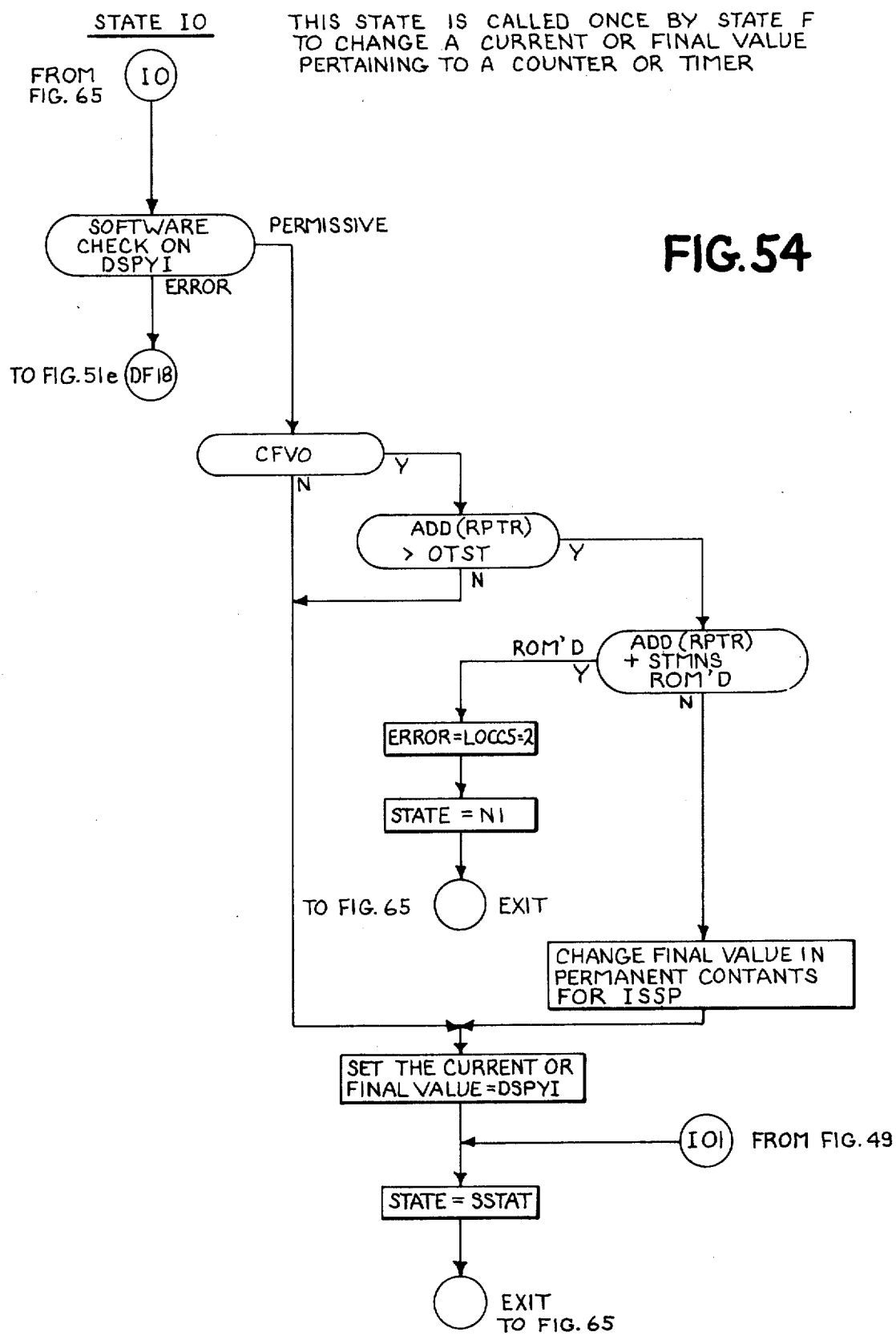

With the error now cleared by the I&MM operator, the program will exit from FIG. 54 through the exit routine, via the state dispatch table, returning back to the ISSP.

Reference is now made back to State B1 of FIG. 45. Let it now be assumed that the PLACE thumbwheels (PBI) do specify an address which is within the examine region. As a result, the program will now branch through the Y branch into another decision block designated "PBI Within Force Region". In this decision block, the question asked is, are the PLACE thumbwheels within the subgroup pertaining to the input and output bits force region?. If the thumbwheels are within this region, the program will branch through a Y branch into an action block wherein Bit E is cleared. If the PBI thumbwheels are not within the force region, the program will exit through an N branch wherein Bit E will be set. Bit E is a flag bit in word 14 (Appendix B) and is either set or cleared depending on whether location PBI specifies an address within the force region. Bit E is utilized as a flag bit so that the IMMP can tell in the future whether the address to be forced is within the force region.

Let it now be assumed that PBI specifies an address within the force region and that Bit E has been cleared. The program now enters into a decision block wherein a check is performed to see if any of the 16 FTAB words contains an address which corresponds to the address in the PLACE thumbwheels (PBI). In other words, the IMMP is now checking to see if the operator has previously forced some particular status bit. That is, is the I&MM operator attempting to reaccess a bit which has been previously forced. If the bit has been previously forced, the program then exits through a Y branch entering into an action block wherein a variable at location SZ is set equal to the entry in the FTAB word presently being examined. The information placed in location SZ may come from any one of the 16 FTAB words. It might be from the first forced bit address placed in the FTAB table, the second, or the fifth, etc. In any event it will not be more than the fifteenth entry. This is due to the fact that there are only 16 words in the FTAB table (numbers 0 to 15), thus SZ will not be greater than 15. Also, in this same action block the output location FORCO is set equal to 1 for turning on the Force light on the I&MM. The program now enters into the next action block wherein the output display word at location DSPYO is updated to display the setting presently existing in the PLACE thumbwheels.

Reference is now made back to the Check FTAB to see if Forced decision block. Let it now be assumed that none of the FTAB words contains a forced address corresponding to the setting in the PBI thumbwheels. As a result, the program will branch through the N branch into an action block wherein location SZ is set equal to −1 and the force light is turned out by setting location FORCO = 0. Location SZ is set equal to −1 whenever the FTAB words are examined, and none of those words contains a forced address. However, as previously mentioned, if a forced address is found, SZ will be set equal to the entry in the FTAB word presently being examined.

The program will now enter into an action block where the output display word in location DSPYO will be updated by setting the contents of that word equal to the address presently existing in the PLACE button thumbwheels (PBI). Thus, the address will be displayed to the I&MM operator on the display 156 during the exit routine. The IMMP will now go to Exit 00 of the exit routine and return back to the ISSP in the manner as previously described.

It will be recalled that the variable state STATE was set equal to State B immediately upon entry into State B1 of FIG. 45. Thus, upon the next first pass into the IMMP, the program will branch to State B coming back into FIG. 45. There are various operations which the I&MM operator can perform while the I&MM is in Bit Display Mode. In State B, the Bit Display Mode, various questions are asked regarding the states of certain ones of the input pushbuttons and PLACE thumbwheels on the I&MM to effect the branching of the IMMP to the proper state subroutines to control the I&MM which directs the I&MM operator in his actions.

Upon entry into the first action block State B, one of the locations STAT10 of STAT20 will be set to either a 1 or a 0. These two locations are specified in Appendix B as bits corresponding to the close and open lights respectively on the I&MM. One of these bits will be set to turn on a corresponding light depending on whether the bit being referenced by the PLACE thumbwheels is a binary 1 or a binary 0. Thus, the state of the referenced bit will be displayed to the I&MM operator when the information is transferred to the I&MM during the exit routine. Also, at this time the output bit TESTO, corresponding to the Test light on the I&MM, will be turned on if Bit 8, the Test Mode bit of word 14, is a binary 1. Also at this time, the bit corresponding to the Copy Storage light, BSTORO, will be turned on if location N is not equal to 0. It will be recalled that location N contains the number of logic strings which exit in the IMMP copy region. In other words, if a copy exists in the IMMP copy region, it indicates that the IMMP copy region is in use and that it does contain copies previously copied into that region from the application program or newly added copies put into the IMMP copy region by the I&MM operator. Of course, upon the very first time through State B no copies will exist in the IMMP copy region. As a result, both the Test light, location TESTO, and the Copy Storage light, location BSTORO, will be out. However, if any time, subsequent to the first time through Stat B, the I&MM operator has pressed the Test or Copy buttons, then locations TESTO and BSTORO would be set accordingly.

Exiting now from the first action block of State B, the first question asked is, has the I&MM operator changed the PLACE thumbwheels (PBI)?. While the I&MM is in the bit display mode the I&MM operator can change the PLACE thumbwheels to examine any bit within the examine region. As a result, he may have changed the PLACE thumbwheels since the last entry into State B.

Assuming that the operator has changed the PLACE thumbwheels, the program will exit through a Y branch into an action block wherein the variable state STATE will be set equal to State B1. It will be recalled that State B1 is a preliminary housekeeping state prior to entry into State B. As a result, if the operator has changed the PLACE thumbwheels, it is necessary for the I&MM on the next first pass into the IMMP, to recycle back through State B1. As previously described, State B1 will go through the basic searching of the PBI examine and force regions and checking the FTAB words for the new bit location dialed into the PLACE thumbwheels by the I&MM operator. After STATE is set equal to B1 in State B1, the program will exit again as previously described through Exit 00 of the exit routine returning back to the ISSP.

Let it now be assumed that the PLACE thumbwheels (PBI) have not been changed by the I&MM operator, thus the program will continue through an N branch entering into a decision block wherein a question is asked to see if the I&MM operator has pressed the Enter pushbutton on the I&MM by examining location ENTRI. If the operator has pressed and released the Enter pushbutton, the program will exit into an action block wherein Bit 0 is set. Bit 0 is a flag bit in word 14 of the EQB listing which is set when the Test pushbutton is actuated.

After Bit 0 is set, the A register is set equal to State G and the program proceeds to the next action block wherein the variable state STATE is set equal to the A register (State G) and location SSTAT is set equal to State B1. SSTAT is set equal to State B1 in the event that it is necessary to come back through State B1 in the future. The description of State G, shown in FIG. 60 will be described in connection with the operation of the I&MM in Test Mode. The program will now go to Exit 00 as previously described returning back to the ISSP.

Assume, however, that the Test button has not been operated (TESTI = 0), the program will then branch through an N branch into the next decision block wherein the question asked is, LDPLYI, the logic Display button pressed?. Location LDPLYI is in Appendix B of the EQL listing and corresponds to the Logic Display button on the I&MM. If the I&MM operator has pressed this button, the program will take the Y branch into the next action block wherein the A register will be set equal to D3. Again the variable STATE will then be set equal to the A register (State D3) and location SSTAT will be set equal to State B1 and the program will branch back to the ISSP via the exit routine. The operation of State D3 of FIG. 47 will be described in the subsequent description regarding the operation of the I&MM when in the Logic Display Mode.

Assume now that the Logic Display button has not been pressed, thus the program will exit through the N branch into a question block asking the question, has the Stand-By pushbutton been pressed on the i&MM?. This is performed by the IMMP by examining the state of location STDBI, the stand-by bit in the EQB listing corresponding to the Stand-By switch on the I&MM. If the Stand-by button has been pressed, the program will exit through the Y branch wherein the A register will be set equal to State A1, the Stand-By state. The program will now enter into a decision block TESTO = 1 wherein the question asked is, is the Test light on the I&MM on?. If location TESTO is equal to a 1, it indicates that the I&MM is in the Test Mode and that application program copies in the IMMP copy region are on line and being tested. As a result, it is not desirable at this time to clear out the IMMP copy region because it could have a catastrophic effect on the process equipment. Thus, if TESTO is equal to 1, the program will branch through a Y branch into an action block wherein an error is indicated by setting location LOCC5 equal to the constant 5. The program then branches to point C1 of State B1 (FIG. 45) wherein the A register is set equal to State N1, the error information state. The program will then enter into the next action block wherein the variable state STATE is set equal to the A register (State N1) and location SSTAT is set equal to State B1. The program will then exit back to the ISSP as previously described.

If location TESTO is not equal to 1, indicating that the I&MM is not in the Test Mode, the program will then branch through an N branch to point C2 of State B wherein the variable state STATE will be set equal to the A register (now State A1) and location SSTAT will be set equal to State B1. The program will now go to Exit 00 and back to the ISSP. On the next first pass into the IMMP the program will go to the Stand-By state (State A) via State A1 as previously described. It will be recalled in the explanation of the initialization routine that State A1 is basically a housekeeping state, which merely cleans up certain areas in the IMMP scratch area prior to going to State A, the Stand-By state.

Reference is now made back to the STDBI decision block of State B (FIG. 45). Let it now be assumed that STDBI is not set, thus the program will exit through an N branch into the next decision block "BSTORI". In this decision block the questions is asked, has the Copy Storage button been pressed? by examining the contents of location BSTORI (see Appendix B, EQL listing). If BSTORI is set, the program will then exit through the Y branch entering into an action block where the A register is set equal to State A2. The program will then again test to see if it is in the Test Mode in the block TESTO = 1. It is not legitimate to clear out the IMMP copy region, if the I&MM is in the Test Mode, thus if TESTO 32 1 the program will branch through the Y branch wherein an error would be set in the manner as previously described. However, if the program is not in Test Mode, the program will then again branch to point C2 entering into the action block wherein STATE will now be set equal to the A register (State A2). Again SSTAT will be set equal to State B1 and the program will go to Exit 00 returning back to the ISSP. With STATE now set equal to A2, upon the next first pass into the IMMP, the program will branch into State A2. The operation of State A2 will be described in the subsequent description with the I&MM in the Copy Mode.

Assuming that the Copy Storage clear button has not been pressed (BSTORI = 0) the program will exit through an N branch into the next decision block BITE set. The question asked in this block is, is Bit E set?. It will be recalled that Bit E was either set or reset in State B1. If Bit E was set in State B1 it is an indication that the PLACE thumbwheels (PBI) were not addressing a forcible region. If it is assumed at this time that Bit E is set, there is no point in going through the remainder of State B, thus the program exits through the Y branch to Exit 00 returning back to the ISSP.

However, if Bit E is not set, it is an indication that the PLACE thumbwheels (PBI) are pointing at an address within the force region. If it is assumed that Bit E is clear, the program enters into the next decision block FORCI wherein the question asked is, has the FORCE button on the I&MM been pressed?. This is accomplished by the IMMP examining the contents of location FORCI corresponding to the Force input button on the I&MM. The purpose of the Force pushbutton on the I&MM is to force a referenced bit in either the input or output regions of the memory, if that bit is not forced at the moment. However, if that referenced bit happens to be forced, then it will be unforced. Functionally, pressing the Force pushbutton causes the current bit location specified by the PLACE thumbwheels (PBI) to be either forced or unforced. That is, when the Force button is pressed one time it will cause the referenced bit to be forced. When it is pressed a second time, it will cause the same referenced bit to be unforced.

Let it now be assumed that the Force button has been pressed, thus location FORCI is a 1. The program will branch through a Y branch into a decision block SZ = −1. In this latter decision block, a determination is made as to whether the referenced bit is forced or unforced. It will be recalled from the previous description of State B1 that location SZ was set equal to a −1 if the referenced input or output bit was unforced. However, if the referenced bit was equal to the entry in the FTAB table that bit was already forced. Thus, if SZ is equal to a −1, meaning that the referenced bit is unforced, the program will then exit into an action block wherein the variable state STATE is set equal to State C. The program will then exit to C2 wherein again STATE will be set equal to the A register (State C) and SSTAT will be set equal to State B1. The program will then go to Exit 00 returning back to the ISSP as previously described. The purpose of going to State C is to go through a process of forcing the referenced bit. That is, the process of actually entering the address of that forced bit directly into the FTAB table. The details of State C will be described in connection with the description of the I&MM in the Force Mode.

Let it now be assumed that SZ is not equal to a −1. That is, the referenced force location is forced as specified by the entry previously found in the FTAB table. Thus, the program enters into an action block wherein the FTAB word (incremented by the contents of location SZ) will be set equal to zero. This effectively unforces the referenced bit. The program will now branch to point BB1 of State B1 reentering back into the action block wherein location SZ is again set to a −1 and the Force light is turned off (FORCO is set equal to 0). The output display (location DSPY0) is again updated for displaying the PLACE thumbwheel settings to the I&MM operator during the exit routine. From this latter action block the program will again go to Exit 00 returning back to the ISSP.

Reference is now made back to the FORCI decision block. Let it now be assumed that the forced input button on the I&MM has not been pressed. Thus, the program will exit through an N branch entering into the next decision block wherein again the question is asked, is SZ equal to a −1?. If SZ is equal to a −1, again meaning that the bit being referenced by the PLACE thumbwheels is unforced, the program will exit through the Y branch to Exit 00, thus returning back to the ISSP. If, however, SZ is not equal −1 the program will exit through the N branch into the next decision block STAT1I. Location STAT1I corresponds to the Close switch on the I&MM. The question asked in this decision block is "has the Close button been pressed?." If the button has been pressed, the program will exit through a Y branch wherein a bit in word FTBB is set as specified by the contents of location SZ. It will be recalled during the description of the Initialization and two-Pass Forcing routine of FIG. 41 that location FTBB is a 16 bit word, each bit containing a state of which the input and output status bits refered to by the FTAB table are to be forced to. The program will then exit through Exit 00 returning back to the ISSP.

If location STAT1I is not set, the program will branch through the N branch into the decision block STAT2I. Location STAT2I corresponds to the Open pushbutton on the I&MM, thus if the Open switch has not been pressed, the program will exit through the Y branch wherein the bit in FTBB specified by the contents of location SZ will be cleared. Again the program will then exit through Exit 00. If location STAT2I is not set the program will then exit to Exit 00 through the N branch returning back to the ISSP.

The reason for testing the states of the Closed and Open switches (STAT1I and STAT21) is to allow the I&MM operator to change the state of a forced bit referenced by the PLACE thumbwheels (PBI). For example, the I&MM operator would normally have previously placed the I&MM in the Force mode and would have pressed the Force pushbutton (FORCI), which effects the insertion of the forced address from the PLACE thumbwheels directly into one of the FTAB words. With the I&MM now in the Force Mode, in a subsequent first pass or passes through the IMMP, the I&MM operator, by pressing the Closed and Open pushbuttons, change the state of the forced bit referenced by the contents of the FTAB word from closed to open and vice versa. In this manner the I&MM operator is provided the capability of forcing and unforcing, if desired, the particular input or output status bit referenced by the setting on the PLACE thumbwheel switches to test the operation of the application program and to make temporary changes in the operation of the application program as it affects the process. This feature of the I&MM provides the operator with a powerful tool which allows him to make instantaneous changes to the application program, which in essence changes the controller wiring controlling the process equipment.

The IMMP will now continue to cycle from the ISSP on each first pass back through State B1 and then into State B as previously described until the I&MM operator presses one of the buttons on the I&MM which will cause the IMMP to go to a different state from State B.

Reference is now made back to the FORCI decision block in State B of FIG. 45. Let it now be assumed that the I&MM operator has previously pressed the Force pushbutton, thus setting the bit at location FORCI. As previously described, when FORCI is set it indicates to the IMMP that the I&MM operator wants to enter a new forced bit address from the PLACE thumbwheels (PBI) into the FTAB table. The program will again exit the Y branch, as previously described, entering into the SZ−1 decision block. Assuming that SZ is equal to −1, the program will exit again into the previously mentioned action block wherein the variable state STATE is set equal to State C. The program will now exit, via C2 wherein the variable STATE is set equal, State C and location SSTAT is set equal to State B1. The program will now again go to Exit 00 returning back to the ISSP.

On the next first pass through the IMMP, and after the IMMP has executed the Initialization and Two-Pass Forcing and Input routines, the IMMP will then branch through the state dispatch table into State C in FIG. 46.

Reference is now made to FIG. 46 which is executed to directly enter the address specified by the I&MM operator on the PLACE thumbwheels into the FTAB table. Upon entering into State C in the first decision block the program searches the FTAB table until one of the FTAB words is located which is equal to zero (i.e. an FTAB word which is available for receiving a forced address. In that first decision block defined "Find SZ where FTAB (SZ) = 0", the program will go into a search loop and begin to search each of the 16 FTAB words until it locates an FTAB word at an address specified by the contents of SZ, which is equal to zero. When an FTAB word is located, the program will branch through a Y branch indicated by the word FOUND. However, if, after the complete search of all 16 FTAB words, none of the words is found to be available for receiving a forced address (meaning that the entire FTAB table is in use) it will be considered an error and the program will branch through an N branch into an action block wherein location LOCC5 is set equal to the number 7. The program will then proceed into the next action block wherein the variable state STATE is set equal to State N1, the error information state, and the program will then exit back to the ISSP. As previously described, if an error does exist, upon the next first pass through the IMMP, the program will then branch to the Error State N1 wherein that error state will be displayed in the manner as previously described.

Reference is now made back to the Find SZ Where FTAB (SZ) = 0 decision block. Let it now be assumed that the program has found an FTAB word which is equal to zero. The program now enters into an action block wherein the bit address specified by the PLACE thumbwheels on the I&MM is actually placed into the FTAB table. This is accomplished by setting the FTAB word specified by the contents of SZ equal to the PLACE thumbwheels (PBI). Also at this time a bit in each of the locations FTBC and FTBB as specified by the bit address in location SZ are set equal to the present or natural state of the forced bit being referenced by the PLACE thumbwheels (PBI). Also in this action block, the Force light on the I&MM is turned on by the program setting the force bit FORCO equal to a 1. Additionally, the variable state STATE is set to State B. The program will now again exit through Exit 00 returning back to the ISSP.

It will be noted in State C that the variable STATE is set equal to State B, so that upon the next first pass into the IMMP from the ISSP, the program will branch directly to State B. The only time that State B is entered directly is from State C. All other times State B1 is executed prior to State B.

It will be recalled that location FTBC always contains the natural state of the forced output bits and that location FTBB always contains the states of which the forced input/output bits referred to by the FTAB words are to be forced to. In State C, both FTBC and FTBB are always set to the present or natural state of the bit which is being forced because the PLACE thumbwheels have been changed. As previously described in the Initialization and Two-Pass Forcing Routine of FIG. 41, the input and output bits are forced to a 1 or 0 state in accordance with the states of the bits in FTBB. It will also be recalled that the input/output bits cannot be forced or changed except by the I&MM operator pressing the open and close pushbuttons. This operation was previously described in State B. Because the thumbwheels have been changed when exiting State C, the state of which the addressed input/output bits are to be forced to is unknown upon the next first pass entry into the IMMP. As a result, upon the first pass into the forcing routine of FIG. 41, after exiting from State C, the input and output bits will be forced to the natural state. Then after this first pass through the IMMP, the program will enter into State B wherein the bits in location FTBB will be either set or reset in accordance with the states of the locations STAT1I and STAT2I, corresponding to the close and open pushbuttons on the I&MM, respectively.

Reference is now made back to FIG. 45 to State B. Let it now be assumed that the I&MM operator has just entered a new forced bit reference address from the PLACE thumbwheels (PBI) into the FTAB table and the program has entered into State B. Assuming that he has not pressed any of the other pushbuttons on the I&MM, the program will proceed down to the FORCI decision block. At this time the forced bit FORCI should be reset, thus the program will proceed through the $SZ = -1$ decision block into the "STAT1I" decision block. It is in this latter decision block that the particular bit in location FTBB, as addressed by location SZ, will be set if the operator has previously depressed the Closed button on the I&MM. If the Closed button has not been previously pressed, then the program will test to see if the I&MM operator has pressed the Open button on the I&MM by testing Bit STAT2I. If he has pressed the Open button, then the bit in location FTBB, as specified by the address in location SZ, will be cleared. Location FTBB now contains the state of the bit which the I&MM operator desired to force. Thus, the IMMP, upon the next first pass entry into the forcing routine FIG. 4, will cause the particular forced address bit to be forced to the state as specified by the operator by his operation of the Open and Closed switches.

Figure 44:
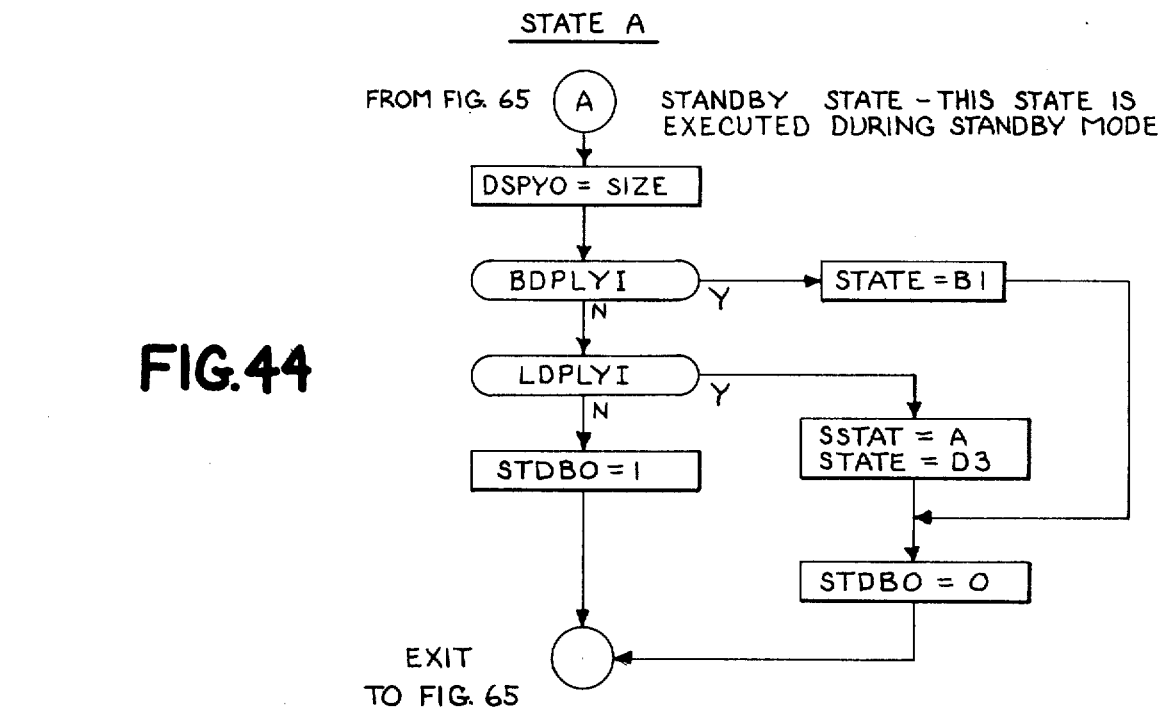

Reference is now made to FIGS. 44 and 45. It will be noted that in both of those figures that the test of the Logic Display button (LOPLYI) is performed to see if the operator has pressed that button. From the previous description of States A and B it can now be seen that the I&MM operator can place the I&MM in Logic Display Mode from either the Stand-By Mode or the Bit Display Mode. In either of these modes, if the I&MM operator has pressed the Logic Display button, the IMMP will branch to an action block shown on FIG. 44 and 45 wherein the A register is set equal to State D3. Referring to FIG. 44, location SSTAT is also set equal to State A, the Stand-by state, which is the state that the I&MM is in while in FIG. 44. Location SSTAT, effectively, is a variable state similar to location STATE and it is set equal to State A in the present instance for subsequent use during the Logic Display Mode to effect a return back to State A in the event that certain subroutines which are executed in that mode do not perform properly. Still referring to FIG. 44, after location SSTAT is set equal to State A and location STATE is set equal to State D3, the program then proceeds to the action block wherein the Stand-By light STDBO is turned out by setting location STDBO = 0. The program will now exit to FIG. 64 as previously described. Thus, upon the next first pass through FIG. 41 of the IMMP the program will then branch to State D3.

Reference is now made to FIG. 47 (State D3). It will be recalled from the previous description that when the I&MM operator desires to display a particular logic string he first dials into the PLACE thumbwheels the address of the first SST instruction terminating the desired logic string. Logically, the IMMP must locate this first instruction and by doing so it locates the proper logic string. In State D3 various parameters are set up preparatory to calling the time shared search state State L. State L will search for the particular SST instruction dialed into the PLACE thumbwheels.

Upon entry into the first action block of State D3 the IMMP first sets location PB12 equal to the setting in the PLACE thumbwheels from location PB1. PB12 is shown in the EQL listing as a remember setting for the PLACE thumbwheels (PBI). The reason for setting PB12 equal to PB1 is because, during the time shared search state (State L), while the IMMP is locating the SST instruction, the I&MM operator might possibly change the PLACE thumbwheels, thus changing PBI. Location PB12 merely serves as a safe guard in the event that the I&MM operator changes the PLACE thumbwheels.

In the next action block a location SSSTAT is set equal to State D1, which is the state where the IMMP will go after it has finished searching for the SST instruction in State L. Also at this time, a variable at location LOCC3 is set equal to the contents of location STAPP, the start of the application program where the search is going to start. The IMMP then proceeds into the third action block of FIG. 47 wherein location LOCC1 is set equal to the constant CSSTM in the constants table plus the contents of PB12. Location CSSTM contains the op code for the SST instruction. Thus, LOCC1 is set equal to the pattern of bits which will be searched for in State L. That is, LOCC1 now contains the SST op code (CSSTM) plus the contents of PB12, which is effectively that address specified by the PLACE thumbwheels. An example of the contents of LOCC1 at this time may be seen by referring to logic string 1a of FIG. 5. In that particular logic string the I&MM operator would have previously dialed the address 2AB into the PLACE thumbwheels. The address 2AB would be read into location PBI during the input routine and placed in location PB12 in State D2 as just described. Then the op code SST from location CSSTM would be added to the contents of PB12 and placed in location LOCC1. Also at this time location LOCC2 is set equal to all ones and Bit B of LOCC2 is cleared to a binary 0. It will be recalled in the previous description of FIG. 63 (State L) that LOCC2 is set equal to all 1's to form a mask for masking out unwanted bits of the instruction being searched. Additionally, as previously described in instruction formats of the controller, Bit B serves as an index bit for certain ones of those instructions, in this case the SST instruction. For this reason Bit B of LOCC2 is cleared to a binary 0 and will be utilized during the time-shared search state (State L) to tell that state not to worry whether the SST instruction is indexed. Location LOCC4 is also set equal to location FPGE, the actual end of the application program as determined initially during the Initialization and Forcing routine. Location FPGE is not the end permissible point of the application program, but the actual end of the application program. Location STATE is set equal to State L, which is the state that the IMMP will enter on the next first pass from the ISSP.

The program now enters into the last action block of FIG. 47 wherein the IMMP effectively turns off all indicator lights on the I&MM by setting locations PO and PO+1 to zero. The program will now go to Exit 00 of FIG. 43 returning back to the ISSP as previously described.

Let it now be assumed that the IMMP is again on its first pass and location STATE is set equal to State L. The program will now branch into the time-shared search state (State L) wherein the IMMP will begin the search starting at the beginning of the application program to find the particular SST instruction referenced by the address in the PLACE thumbwheels. In the previously cited example, this would be address 2A/B as shown in logic string 1a of FIG. 5. It will be recalled from the previous description of State L that that subroutine repeatedly looks at a predetermined number of instructions (20 in the example) for each entry into that state. It will further be recalled that for each short search through the memory, as controlled by State L, when the desired instruction is not found that the program goes directly to Exit of FIG. 65 from the action block LOCC4=XB. This has the effect of not changing the STATE, thus upon the next first pass entry through the IMMP the program will again enter into State L. The program will continue to cycle through State L until one of two conditions exist. As previously described, if the entire application program is searched and the desired word is not found, the program will then clear Bit B as shown in FIG. 63, entering into the action block wherein Bit A is cleared and the variable state STATE is set equal to location SSSTAT. The other condition would be when the particular word being searched for is found. Then the program will set Bit B entering into the action block wherein again Bit B is cleared and the location STATE is set equal to the contents of SSSTAT. The state of Bit B becomes significant in the ensuing description of the IMMP because that bit, when tested, specifies as to whether the particular SST instruction being searched for has been found or not found. In any event, if the IMMP does or does not find the SST instruction, it is searching for the variable location STATE is set equal to SSSTAT, which in the present instance it will be set of State D1. It will be recalled that State L was entered from State D3 wherein location SSSTAT was set equal to State D1.

Let it now be assumed that the IMMp has again gone through the exit routine returning back to the ISSP and is again on its next first pass through FIG. 41. After the execution of the Initialization and Input routines, the IMMP will then branch, via the state dispatch table, into State D1 of FIG. 48. At point D1 of FIG. 48, the program now enters into the first decision block wherein the question is asked, is Bit B set? If Bit B is not set it is an indication that the IMMP did not find an SST reference, thus it will branch through the N branch into the action block wherein location LOCC5 is set equal to 1, indicating an error. The program will then branch to point E4 in FIG. 58a entering into an action block wherein location STATE is set equal to N1 and the program will return to Exit 00 of FIG. 43. The IMMP will then return back to the ISSP through the exit routine as previously described. Upon the next first pass entry into the IMMP the program will then enter into the error state, State N1 of FIG. 49, and continue to cycle through that state until the I&MM operator presses the Error clear pushbutton.

Figure 48:
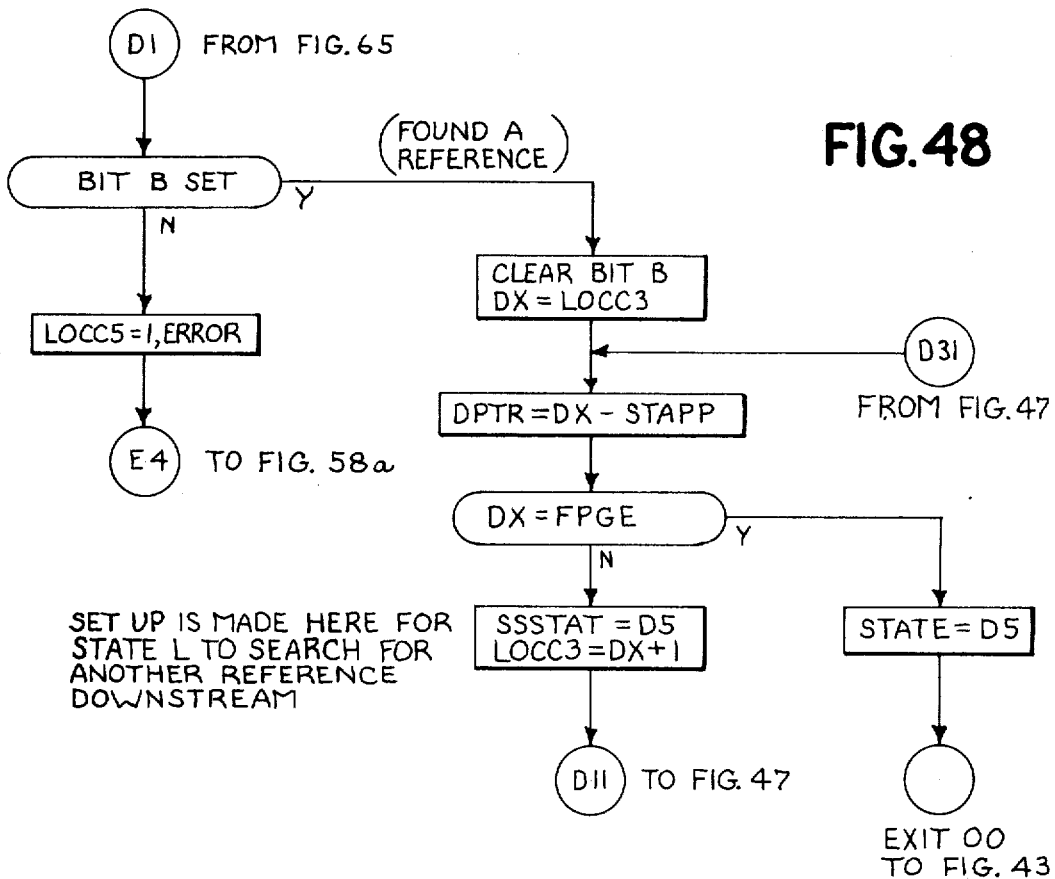

Still referring to FIG. 48, if Bit B is set, indicating that the IMMP has found the SST reference as dialed into the PLACE thumbwheels, the program will branch through the Y branch entering into the action block wherein Bit B is cleared and location DX is set equal to LOCC3. Bit B is cleared at this time just in case it is necessary to re-enter State L to search for additional SST references. Location DX in the EQL listing is utilized to record the absolute address of the highest current memory location containing the SST instruction previously located in State L. Thus, DX contains the address of where the SST instruction was found. The program then proceeds to the next action block wherein location DPTR, the instruction pointer for the application of the program, is set equal to DX minus STAPP. Thus, DPTR is a relative pointer to where the SST was found. That is, STAPP defines the beginning of the application program and DX is the absolute address of where the SST was found. The instruction identified by DPTR is going to be the first instruction that will be displayed in Logic Display Mode. The IMMP now asks the question, is DX equal to location FPGE, the very end of the application program. If it is not the end of the application program, the IMMP will then exit through the N branch into the next action block wherein location SSSTAT is set equal to State D5 and LOCC3 is set equal to DX+1. It is in this latter action block that the setup is made to return back to State L to continue searching for additional SST instructions referencing the same location as the first SST instruction. This is possible because SST instructions can occur in several places in a typical control system of the type disclosed wherein logic is simulated by instructions as shown in FIG. 5. For example, the SST instruction of logic string 2 in FIG. 5 could very well be tabulated to reference location SV2/AB in the same manner as the SST instruction of logic string 1a. Thus, if additional references do exist the program will branch to point D11 in FIG. 47, which again sets up to call the search State L all over again to look for additional SST references. Thus, upon the next first pass entry into the IMMP the program will effectively wind up in FIG. 63 in State L where again the program will search further downstream in memory for more references to this particular SST instruction. Additional references will either be found or not found. If they are not found Bit B will be reset, however if they are found Bit B will be set.

Reference is now made back to FIG. 48 to the DX = FPGE decision block. If the actual end of the application program is found, the program will then exit through the Y branch wherein STATE is set equal to State D5 and the program will go to Exit 00 of FIG. 43 returning back to the ISSP as previously described. At this time it is well to note in FIG. 48 that location SSSTAT is set equal to State D5 for each pass through State D1 until the end of the application program is detected. When the end of the application program is detected, the IMMP, upon the next first pass, will enter directly into State D5 via the state dispatch table.

Reference is now made to FIG. 63 in conjunction with FIG. 48. It will be noted that just prior to exiting from FIG. 63 that location STATE is set equal to SSSTAT. Referring to FIG. 48 it can be seen that SSSTAT is equal to State D5 when State L is entered from State D1, via State D3 of FIG. 47. It can now be seen that after State L has been entered twice, that is after a second search of the application program for the SST instruction, the IMMP will always enter into State D5 of FIG. 50. In any event, State D5 is always entered from State D1, this entry being made either at the end of the application program search or after the second search of the second SST reference through State L.

Figure 50:
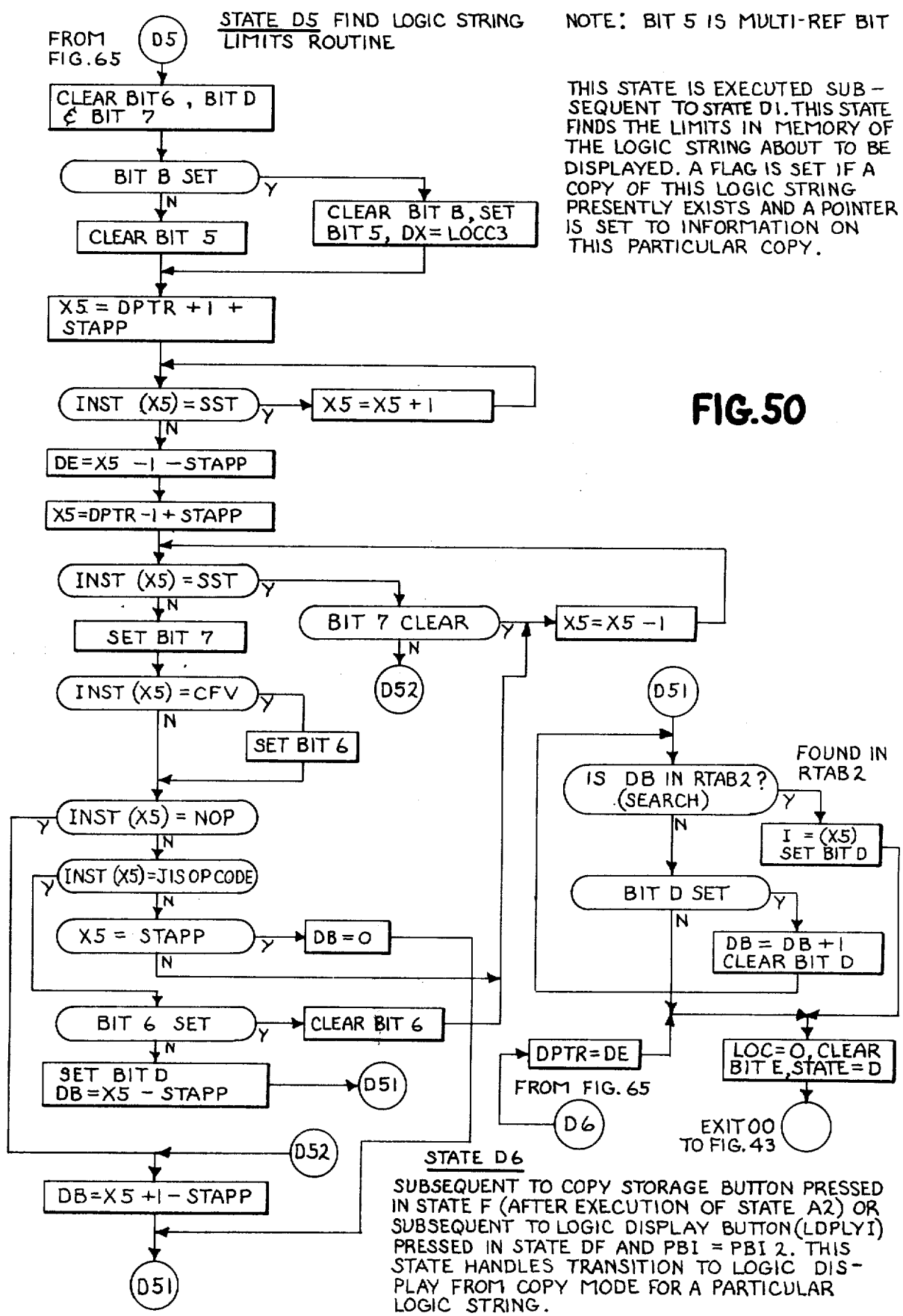

Reference is now made to FIG. 50. The IMMP now steps into an action wherein Bits 6, D, 7 are cleared. The program now proceeds to a decision block and Bit B set is tested to determine if a second downstream reference was found. If Bit B is set the program proceeds through the Y branch to the next action block wherein Bit B is cleared, Bit 5, the multi-reference bit, is set and location DX is set equal to location LOCC3. Location DX now contains the address of where the second reference was found. The program now proceeds to the next action block and location X5 is set equal to location DPTR+1 plus location STAPP. Location X5 now contains the address following the last instruction located (i.e., the last SST instruction). The program now proceeds into an "INST(X5) = SST" decision block. In this decision block the program tests to see if the instruction based on the contents of X5 is an SST instruction. At this point the program is testing to see if another SST instruction resides in parallel with the last located SST instruction of the present logic string. If this instruction does exist, the program will exit through a Y branch into the next action block wherein location X5 is set equal to X5+1, thus incrementing location X5.

The program will now continue into a loop testing to see if any further SST instructions reside in parallel in that logic string. When the last SST instruction has been located the program will exit through an N branch into the next action block wherein location DE is set equal to X5 minus 1 minus location STAPP. Location DE, as shown in the EQL listing, defines the right most boundary or the upper most instruction in the present application program logic string. By decrementing X5 at this time, location DE now contains an address pointing to the last located SST instruction. The program now proceeds to the next action block and X5 is set equal to DPTR minus 1 plus location STAPP. X5 now contains an address which is pointing to the instruction just prior to the last located SST instruction. The program now proceeds into an INST(X5) = SST decision block and again a test is performed to see if this last instruction is an SST instruction. At this point in time the IMMP is testing to define the left most boundary of the present logic string. This is determined by the program performing a search to locate the last SST instruction of the previous logic string. If the program finds an SST instruction, it indicates that the program is still looking at the same SST instruction in the current logic string. As a result, the program will branch through the Y branch into a decision block wherein a test is performed to see if Bit 7 is clear. At this time Bit 7 will be clear since it was cleared upon entry into State D5. As a result the program will proceed through the Y branch into the next action and X5 is decremented by 1. Decrementing X5 now causes the program to look at the next previous location in memory or the next instruction to the left in the logic string of the last instruction just located. The program will proceed in this loop testing to see if other SST instructions do exist. When a non-SST instruction is located, the program will branch through the N branch of the INST(X5) = SST decision block into an action block wherein Bit 7 is set.

A test is now performed to see if the current instruction based on the contents of X5 is a compare value instruction (CFV). If that instruction is a CFV the program will branch into an action block wherein Bit 6 will be set coming back into a decision block INST(X5) = NOP. If the instruction is not a CFV instruction the program will proceed directly into the latter decision block. In this latter decision block a test is performed to see if a no operation instruction (NOP) has been located. Assuming that it is not a NOP instruction, a test is now performed to see if the next instruction is a jump indirect and store (JIS) instruction. Assuming that a JIS instruction has not been located the program will now test to see if X5 is equal to location STAPP. Normally the last instruction located will not be at the beginning of the application program, thus the program will exit through an N branch entering back into the action block wherein X5 will again be decremented by 1. The program will now continue in a loop entering back into the INST(X5) = SST decision block until an SST instruction is located. At that time the program will again exit through the Y branch wherein the test is performed to see if Bit 7 is clear. Bit 7 at this time will be set, thus the program will exit through an N branch to point D52 (FIG. 50) which enters into an action block DB, defining the left most boundary of the application program, is set equal to X5 plus 1 minus STAPP. Location DB now contains the address of the left most instruction in the present logic string.

Reference is now made back to the INST(X5) = CFV decision block. A test is performed to see if a CFV instruction exists at the present location for the following reasons. All timer and counter instructions are comprised of three instructions which must reside sequentially in memory. The first instruction making up a timer/counter must be a TCR, followed by one of the instructions CTU, TTU, or TOU which identify whether the timer/counter is to be incremented by a specific amount. One of these latter instructions is always followed by a compare final value CFV instruction. The middle or second instruction in a timer or counter, for example a CTU instruction, could have the same operation code as a JIS instruction. Because of this, the program tests for the presence of a CFV instruction, and if that instruction does exist, the flag Bit 6 is set. Bit 6 will be used as a local flag later in this subroutine to allow the program to ignore the middle instruction. This is explained by referring to the INST(X5) = JIS OP CODE decision block. Let it now be assumed that the present instruction is a JIS instruction, the program will, therefore, branch through the Y branch into a decision block wherein a test is performed to see if Bit 6 is set. If Bit 6 is set, indicating that a CFV instruction was located, the program will branch through a Y branch wherein Bit 6 is cleared. The program will now re-enter back into the X5 = X5-1 action block and the program will continue as previously described. If Bit 6 is not set, indicating that the JIS instruction is in fact a JIS and not a CTU, TTU or TOU, the program will exit from the Bit 6 set decision block into an action block and Bit D is set. Also, location DB is set equal to X5 minus STAPP.

Reference is now made back to the INST(X5) = NOP decision block. Assuming that the program encounters a NOP instruction, it will exit through a Y branch entering again into the DB = X5 + 1 − STAPP action block as previously described. It will be noted in the two bottom left blocks of FIG. 50, that the exit point for both of these blocks is to a point D51. Upon leaving either of these blocks, location DB will contain the address of the left most instruction in the present logic string.

Reference is now made to the decision block X5 = STAPP. As previously described in that decision block, a test is performed to see if the presently encountered instruction is in fact at the beginning of the application program. If the results of this test are positive, the program will exit through Y branch wherein location DB is set equal to 0, thus defining the start of the application program and simultaneously defining the left most instruction of the current logic string. At this point in the subroutine of State D5, the right and left most boundaries have both been defined and the addresses of those boundaries are now stored in locations DE and DB.

The program will now enter into a decision block Is DB in RTAB2?(search). In the EQL listing of Appendix B there is shown four tables designated RTAB1, RTAB2, RTAB3 and RTAB4. Each RTAB table is comprised of four RTAB words (i.e., for RTAB1's, four RTAB2's, etc.). The purpose of these tables will subsequently be described, however, for the present suffice to say that the RTAB2 table can contain four addresses, that is one address in each of the four words of that table, which is an address of the start of an application program logic string previously copied into the IMMP copy region. How the RTAB2 tables get set up will be described in connection with the Copy Mode operation of the I&MM.

In this latter decision block (entry at point D51) the four RTAB2 locations are searched by the IMMP to see if any one of the addresses in those locations match the address in location DB. If an RTAB2 word is found that matches DB it indicates that a copy of the present application program logic string does reside in the IMMP copy region. As a result, the program will branch through the Y branch into an action block wherein Bit D is set and location I in the EQL listing is set equal to the contents of X5. Bit D is set as a flag to indicate that a copy has previously been made in the IMMP copy region. Location I now contains a pointer to the proper RTAB table to effect a proper inded in State E for making an entry in RTAB2. The program now proceeds to the last action block in the bottom right-hand corner of FIG. 50 wherein a location LOC is set equal to 0, Bit E is cleared and the variable state STATE is set equal to State D.

Reference is now made back to the Is DB in RTAB2 (Search) decision block. If an RTAB2 table is not located, meaning that a copy does not exist in the IMMP copy region, the program will exit through the N branch into a decision block wherein a test is performed to see if Bit D is set. When point 51 is entered from the action block DB = X5 - STAPP in the lower left of FIG. 50, Bit D will always be set. The reason for this is, as previously described, that location DB always contains the address of the JIS instruction located when searching for the left most boundary of the application program. As a result, in order to place the proper address in location DB it is necessary to increment it by 1 so that DB will point to the actual beginning location of the first instruction in the current application program logic string. Assuming that Bit D is set, the program will exit through the Y branch entering into the action block wherein DB is set equal to DB+1, thus incrementing DB, and Bit D is cleared. The program will now re-enter back into point 51 wherein the RTAB table will be searched again. After the RTAB2 table has been searched and no RTAB2 word is found equivalent to DB, the program will then exit again to the N branch wherein Bit D will not be set. Thus, the program will exit into the lower right-hand corner into the block where LOCC is set equal to 0 as previously described.

If point 51 is entered from the DB = X5 + 1 − STAPP action block the address in DB will be the actual address of the left most instruction in the application program. As a result, if an RTAB table is not found, Bit D will not be set, and the program will exit as previously described.

At this point the IMMP has performed all those functions necessary prior to going into the Logic Display Mode. This is accomplished basically by the IMMP first executing State A, wherein it was determined if either the Bit Display or the Logic Display buttons had been pressed. The program then entered into State D3 to set up the proper parameters for entry into the time-shared search state, State L, where the IMMP repeatedly searched to find a logic string in the application program. The program then proceeded from State L back to State D1, where it was recorded that the application program was either located or not located. If the program was not located it was an error and the program branched to the error state, however, if an application program was located, the program advanced back to State L to search for another reference downstream in the application program. After the first downstream search in State L, the program branched back to State D5 from State D1. In State D5 the limits of the application program logic string which were recorded and also the RTAB table was searched to see whether a copy of that logic string had been previously made. If a copy had been previously made, Bit D was set appropriately. Also, at the end of State D5 the variable location STATE was set equal to State D in preparation to the IMMP entering into that state on the next first pass through the IMMP.

Figure 51A:
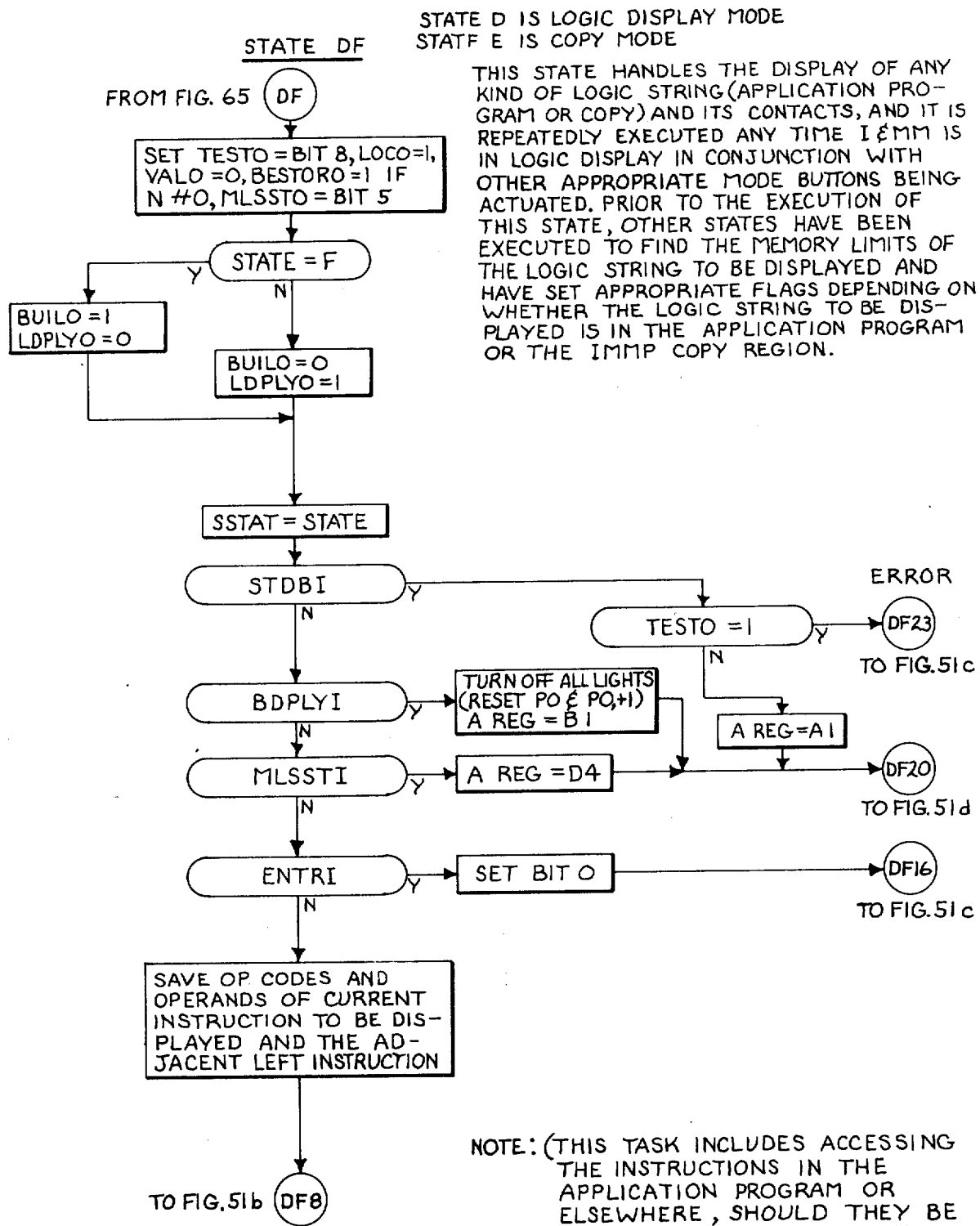
Figure 51:
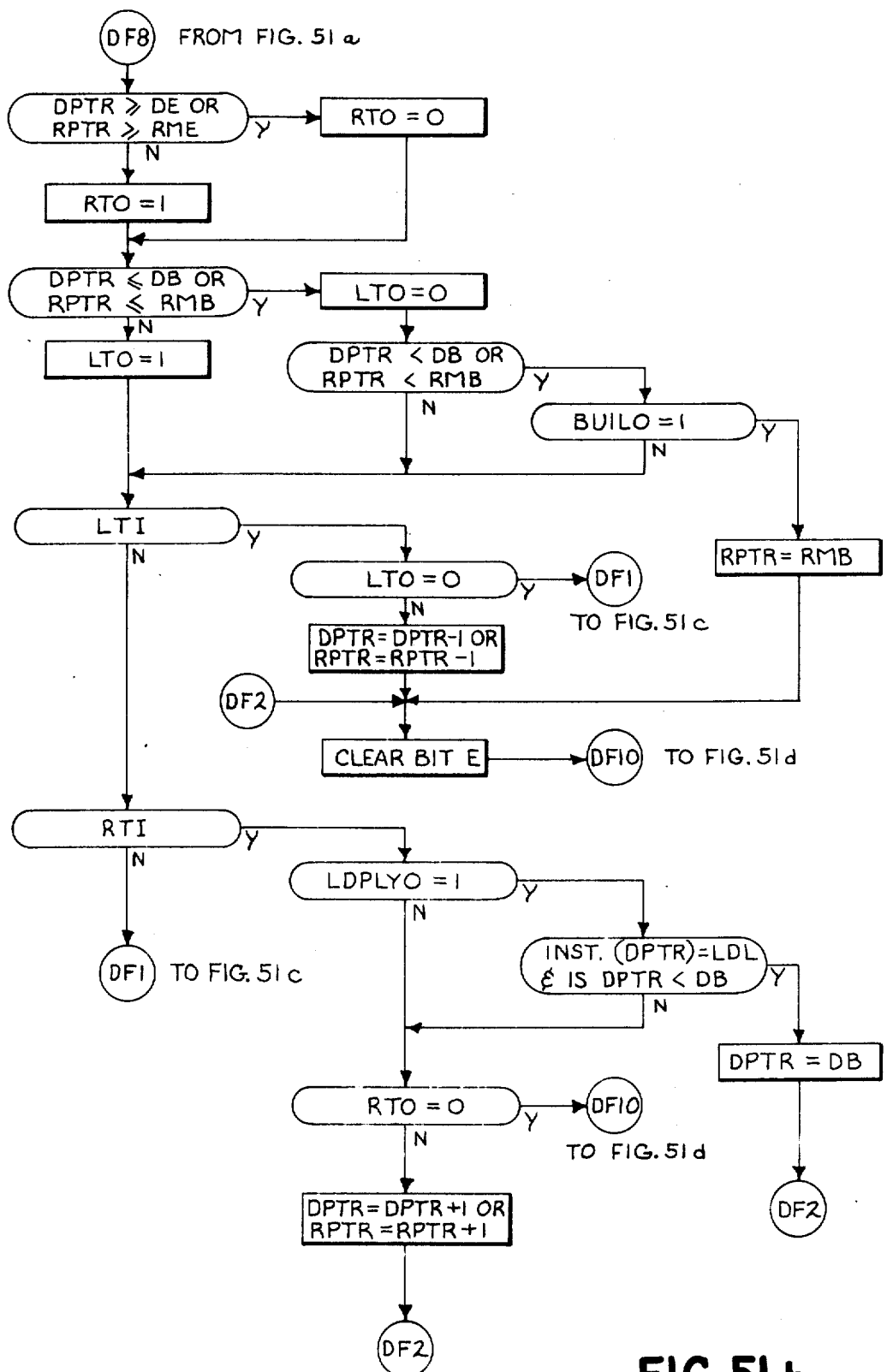

At this point the IMMP is now in the Logic Display Mode. Reference is now made to FIG. 51a (State D). Let it be assumed that the IMMP is again on its first pass, thus the program will branch into FIG. 51a at point DF from FIG. 65, the state dispatch table. It will be noted that the title of FIG. 51 is State DF. Actually FIGS. 51a through 51f comprise States D and F. Regardless of whether the IMMP is in State D or State F the IMMP will always enter into State DF on page 10, the logic display state. If the IMMP happens to be in State D the I&MM will display a logic string in the application program. On the other hand, if the IMMP is in State F, the I&MM will display a copy of the logic string in the IMMP copy region. It is apparent that logic strings residing in the application program or in the copy region have similar formats, but residing in different areas of the memory. As a result, application program logic strings and copy logic strings can be displayed in the same manner, the only requirement is that a few parameters must be changed to display the appropriate logic strings.

The IMMP now enters into State DF in FIG. 51a. In the first action block location TESTO is set equal to Bit 8, LOCO is set equal to a binary 1, location VALO is set equal to a binary 0, location MLSSTO is set equal to Bit 5, and location BESTORO is set equal to a binary 1, if location N is not equal to 0. The program now proceeds into a STATE = F decision block. It is in this decision block that the IMMP tests to see if the I&MM is to display either a logic string in the application program or in the IMMP copy region. If location STATE is equal to F, the IMMP is thus in the Copy Mode and the program exits through a Y branch wherein the Copy light, bit BUILO, is set equal to a binary 1 and location LDPLYO, the Logic Display indicator, is set equal to a binary 0. However, if the IMMP is in State D, the program will exit through the N branch wherein the Copy light indicator, BUILO, is set equal to a binary 0 and the IMMP is placed in the Logic Display Mode by setting location LDPLYO equal to a binary 1.

Figure 53:
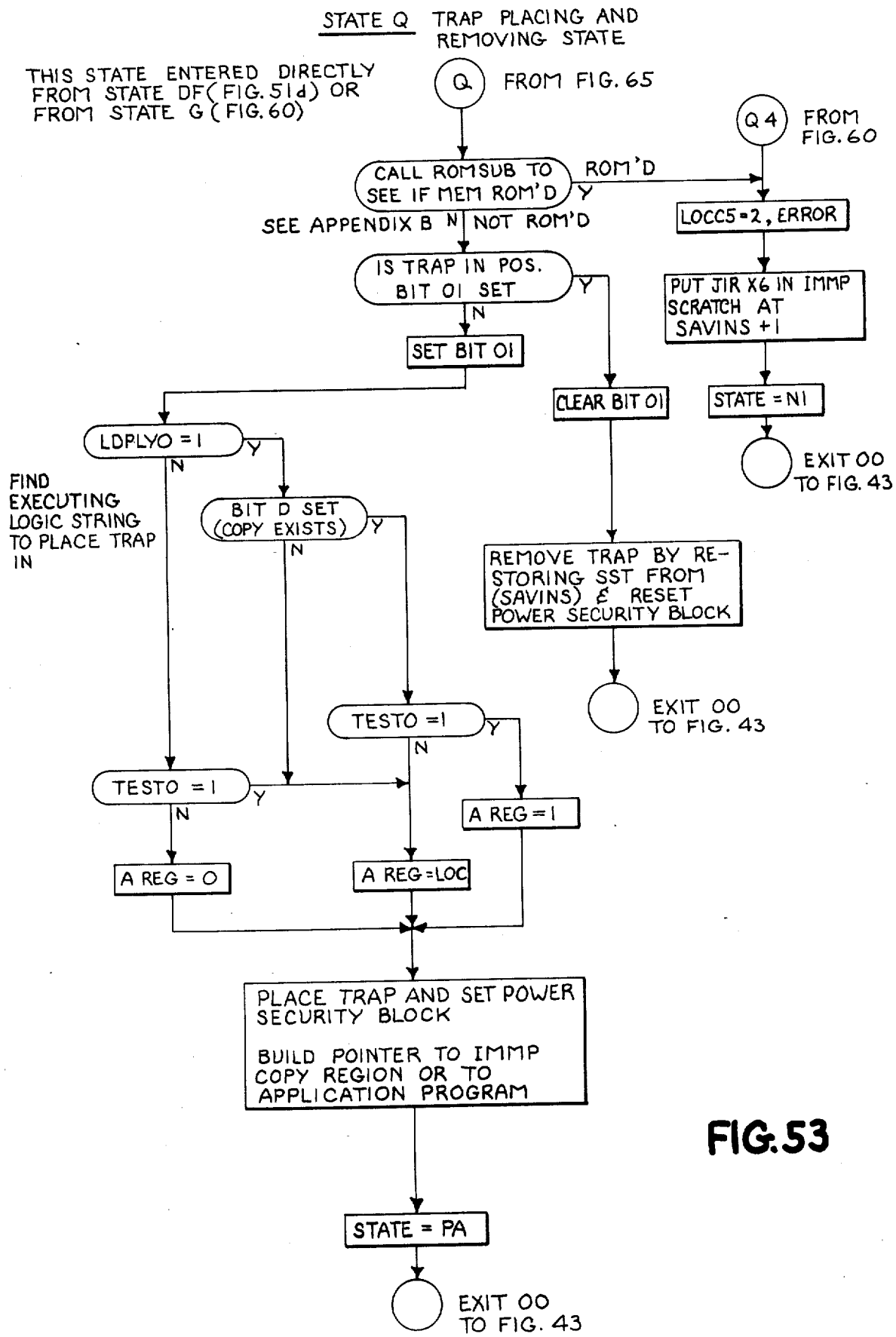

The program now enters into the next action block wherein location SSTAT is set equal to the present state of location STATE. SSTAT is equal to the present state in the event that the IMMP has to re-enter State D or F upon the next first pass through the IMMP. A test is now performed to see if the I&MM operator has pressed the Stand-By pushbutton by testing location STDBI. If he has pressed the Stand-By button, indicating that he desires to go back to the Stand-By Mode, the program will exit through the Y branch and enter into another test block wherein the output test light, location TESTO, is tested to see if it is equal to a binary 1. If location TESTO is not equal to a binary 1, the program will enter through the N branch into an action block wherein the A register is set equal to State A1. The program will now proceed to point DF20 in FIG. 51d wherein the variable state, STATE, s set equal to the A register (State A1). Upon setting STATE equal to State A1, the program now proceeds into the last action block at the bottom of FIG. 51d wherein the A register is set equal to State Q. The IMMP will now branch directly to State Q through the state dispatch table of FIG. 65. State Q is the trap placing and removing state and is shown in FIG. 53. The purpose of State Q will subsequently be described.

Reference is now made back to FIG. 51a to the STDBI decision block. If the I&MM operator has not pressed the Stand-By pushbutton, the program will branch through an N branch wherein the Bit Display pushbutton is tested by testing location BDPLYI. If the I&MM operator has pressed the Bit Display button, location BDPLYI will be a binary 1 and the program will exit through a Y branch into an action block wherein the output lights are turned off by resetting locations PO and PO+1. As a result, when the exit routine is executed, all indicator lights on the I&MM will be extinguished. Also in this action block, the A register is set equal to State B1 and the program enters into point DF20 of FIG. 51d and location STATE is set equal to State B1.

Still referring to FIG. 51a, if the I&MM operator has not pressed the Bit Display button, the program will branch through the N branch wherein the multi-reference input bit from the Multi-Reference switch on the I&MM will be tested. If location MLSSTI is a binary 1, indicating that the I&MM operator has pressed the Multi-Reference button, the program will exit into an action block wherein the A register is set equal to State D4. The program, as previously described, will enter into point DF20 of FIG. 51d and location STATE will be set equal to State D4. If the I&MM operator has not depressed the Multi-Reference switch, the program will then exit through an N branch and a test is performed to see if the Enter key switch has been activated by the operator. This test is performed by testing location ENTRI input bit corresponding to the Enter switch. If the I&MM operator has operated the Enter switch the program now branches through a Y branch into an action block wherein Bit 0 is set to a binary 1. Bit 0 is shown in the EQL listing and is a bit which is always set to a binary 1 when the Enter key switch is first activated and released. The program will now enter into point DF16 of FIG. 51c wherein the A register is set equal to State G, and the program will enter again back into point DF20 of FIG. 51d wherein the location STATE is set equal to the A register (State G).

Still referring to FIG. 51a, if the I&MM operator has not operated the Enter key switch, the program will branch to an N branch into an action block wherein the operation code and the operands of the current instruction to be displayed and the adjacent instruction to the left of that current instruction is stored. These instructions are stored for subsequent use in a subroutine designated FUNCTO to be described. The address of these two instructions is identified by two variables shown in the EQL as locations DPTR and RPTR. Location DPTR is a pointer for the current instruction in the application program, whereas location RPTR is the pointer for the current instruction, if that instruction resides in the IMMP copy region. If, upon entry into State DF, the variable STATE is equal to State D then location DPTR becomes the pointer for the current instructions, whereas if the variable STATE is equal to State F, the pointer for the current instruction will be RPTR. The reason for saving the op code and operands of the current instruction is because they will be used later in displaying information on the I&MM. As previously mentioned, these instructions can be instructions in either the application program or the IMMP copy region.

At this point in the explanation State DF of FIG. 51a, it is assumed that the I&MM operator has depressed only the Logic Display button, thus the program proceeds directly to point DF8 of FIG. 51b.

In FIG. 51b the IMMP will first turn the left and right lights 158 and 160 on or off appropriately. This is accomplished in a first decision block wherein a test is performed to see if location DPTR, the pointer to the current application program instruction is greater than or equal to DE. It will be recalled that location DE contains the relative address of the right most instruction of the logic string in the application program. Also in this same decision block, location RPTR, the pointer to the current instruction in the IMMP copy region, is tested to see if it is greater than or equal to location RME, the latter containing the relative address of the right most instruction in the IMMP copy logic string. These two tests are performed to determine whether the permission to step right light should be turned on or off. If either of the conditions tested in this decision block are positive, the program will take the Y branch and the permission to step right light is turned out by setting location RTO equal to a binary 0. However, if either of these conditions is negative the right turn light will be turned on by setting location RTO equal to a binary 1.

The IMMP now performs a test to turn on the permission to go left light appropriately. In the next decision block, location DPTR is now tested to see if it is equal to or less than location DB. Also in this decision block, location RPTR is tested to see if it is equal to or less than location RMB. Similarly to locations DE and RME, locations DB and RMB contain the relative address of the left most instruction in the application program or in the IMMP copy region, respectively. If either of the tests in this latter decision block prove to be negative, the permission to go left light is turned on by setting location LTO equal to a binary 1. However, if either of the conditions is positive, the program will branch through a Y branch into an action block wherein location LTO is set equal to a binary 0, thus turning out the permission to go left light. The IMMP now proceeds into another action block wherein DPTR or RPTR are again tested to see if they are less than DB and RMB, respectivey. This test is performed primarily to determine if the I&MM operator has moved left across the logic string, by depressing the left pushbutton, to the left limits of the logic string wherein the address of the instruction being pointed to the I&MM is an LDL instruction. Either DPTR or RPTR will be tested, depending upon whether location LOC is a 0 or a 1. If LOC is a 0, the IMMP will be in State D, whereas if LOC is a 1, the IMMP will be in State F. Assuming that the appropriate decision in the latter decision block is positive, the program will enter through a Y branch into another decision block BUILO = 1. In that block a test is performed to see if the Copy light is on. If it is the I&MM is in the Copy Mode and the program will exit through a Y branch into an action block wherein location RPTR is set equal to RMB. Location RPTR now contains the address of the left most instruction in the current copy logic string. The program will now enter into an action block wherein Bit E will be cleared and continues on to a point DF10 in FIG. 51d. The operation of the program will be described in connection with point 51d in the following description.

Figure 51C:
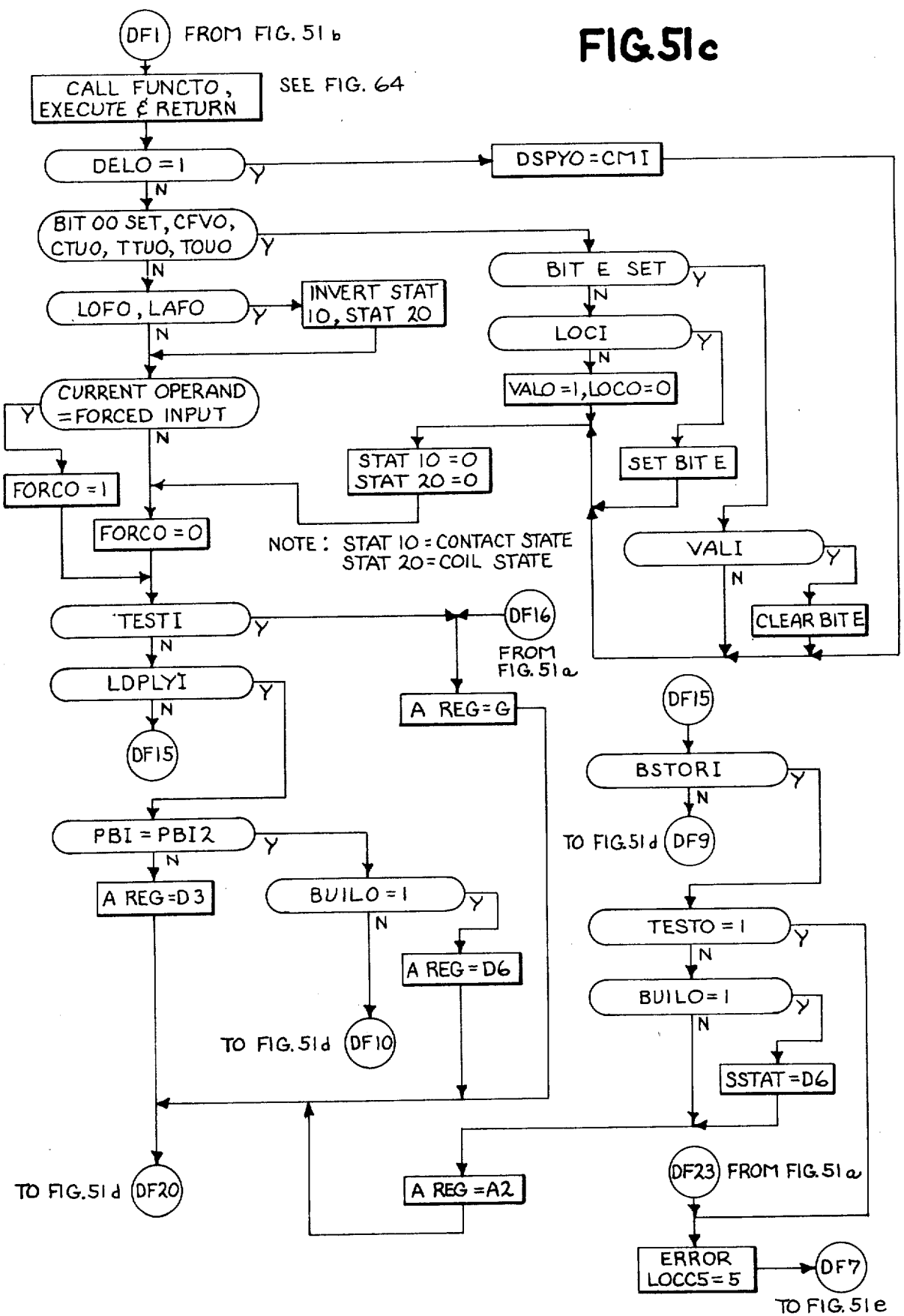
Figure 51D:
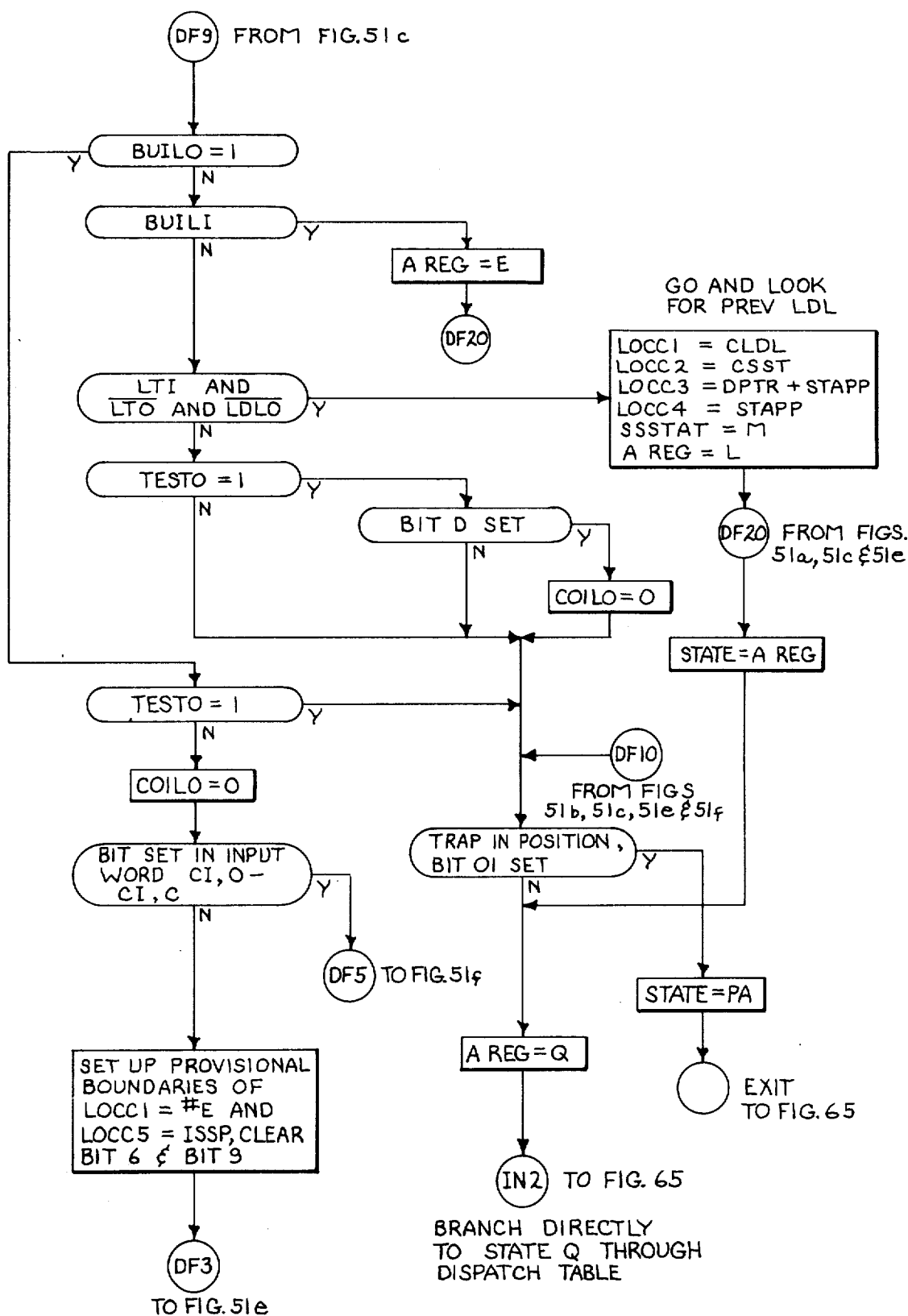

Reference is now back to FIG. 51d where DBTR and RPTR were last tested. If the results of this test prove to be negative, the program will exit through an N branch entering into an LTI decision block. Entry into this latter decision block is also from the LTO = 1 action block. In the LTI decision block the question asked is, has the I&MM operator depressed the move left pushbutton by testing location LTI. If the I&MM operator has pressed the move left pushbutton, the program will then proceed through a Y branch into another test block wherein the permission to move left light bit LTO is tested to see if it is a binary 0. If the permission to go left light is out, no further action need be taken, and the program branches to point DF1 of FIG. 51c into subroutine FUNCTO to subsequently be described. However, if LTO is not equal to 0 the program will take the N branch and th appropriate one of the pointers DPTR or RPTR will be decremented by 1. The appropriate pointer will now point to the next instruction to the left of the previous instruction. Again the program will clear Bit E and enter into point DF10 of FIG. 51b.

Reference is now made back to the LTI decision block of FIG. 51b. In that latter decision block, if the I&MM operator has not depressed the move left pushbutton, the program enters into an RTI decision block wherein a question is asked, has the I&MM operator depression the move right pushbutton (RTI). If he has not depressed that pushbutton, the program will again enter into point DF1 of FIG. 51c. However, if the I&MM operator has depressed the move right pushbutton, Bit RTI will be set and the program will take the Y branch and perform a test to see if the Logic Display light is on by testing to see if locatin LDPLYO is equal to 1. In this block a test is performed to see if the I&MM is in the logic Display Mode. If it is in the Logic Display Mode, the program will then exit through the Y branch entering into an INST (DPTR) = LDL and is DPTR<DB decision block. In this latter decision block the question being asked is, is the current instruction, as pointed to by location DPTR, equal to an LDL and is the pointer DPTR less than DB, the left most limit of the current logic string. If DPTR is less than DB the program exits through the Y branch into an action block and the pointer DPTR is set equal to DB, which is the address of the permissive left bus contact (LDL) for the current logic string and any other logic strings showing that left bus contact. The program now enters into the action block wherein, again, Bit E is cleared and the program continues to point DF10 as previously described.

If either of the tests performed in the latter decision block is negative the program will enter into another decision block where a test is performed to see if the permission to go right light is on by testing location RTO to see if it is 0.

If the permission to go right light is out (RTO=0), indicating to the I&MM operator that he has reached the right most extremity of the logic string, the program will then go to the point DF10 of FIG. 51b as previously described. However, if RTO is equal to a binary 1, he has permission to step in the right direction across the logic string. Thus, the program will enter into an action block wherein the appropriate one of the pointers DPTR or RPTR will be incremented by 1. If the I&MM is not in Logic Display Mode the program will take the N branch from the LDPLO=1 decision block into the RTO=0 decison block.

Reference is now made to FIG. 51c wherein the IMMP enters into a subroutine FUNCTO (FUNCTO for functional output light). Subroutine FUNCTO is entered if the I&MM operator has not pressed either of the move left or move right pushbuttons. The primary purpose of subroutine FUNCTO is to turn on the appropriate bit corresponding to the light on the I&MM console which will identity, to the I&MM operator, the instruction currently being displayed. Basically, in the operation of subroutine FUNCTO, a specified bit in a word is set which will eventually join the exit routine to cause the light on the I&MM corresponding to that bit to be turned on. Additionally, subroutine FUNCTO will turn on the index (X) light on the I&MM, if appropriate, by setting a specified bit in a word which will also join the exit routine for transfer to the I&MM.

To understand the operation of subroutine FUNCTO it is necessary to understand the order of addressing of the various lights on the I&MM. In subroutine FUNCTO the position of each bit in the word which is sent to the I&MM to turn on the appropriate lights has been organized whereby each of those bits corresponds to a number specified by a particular operation code related to that bit. For example, referring to Appendix B to the EQB tables to location LOFO, if the LOF light on the I&MM is to be turned on the operation code for the LOF instruction will specify Bit 0 in output word PO be set to a binary 1. The manner in which this is accomplished will become clear in the ensuing description.

Figure 64:
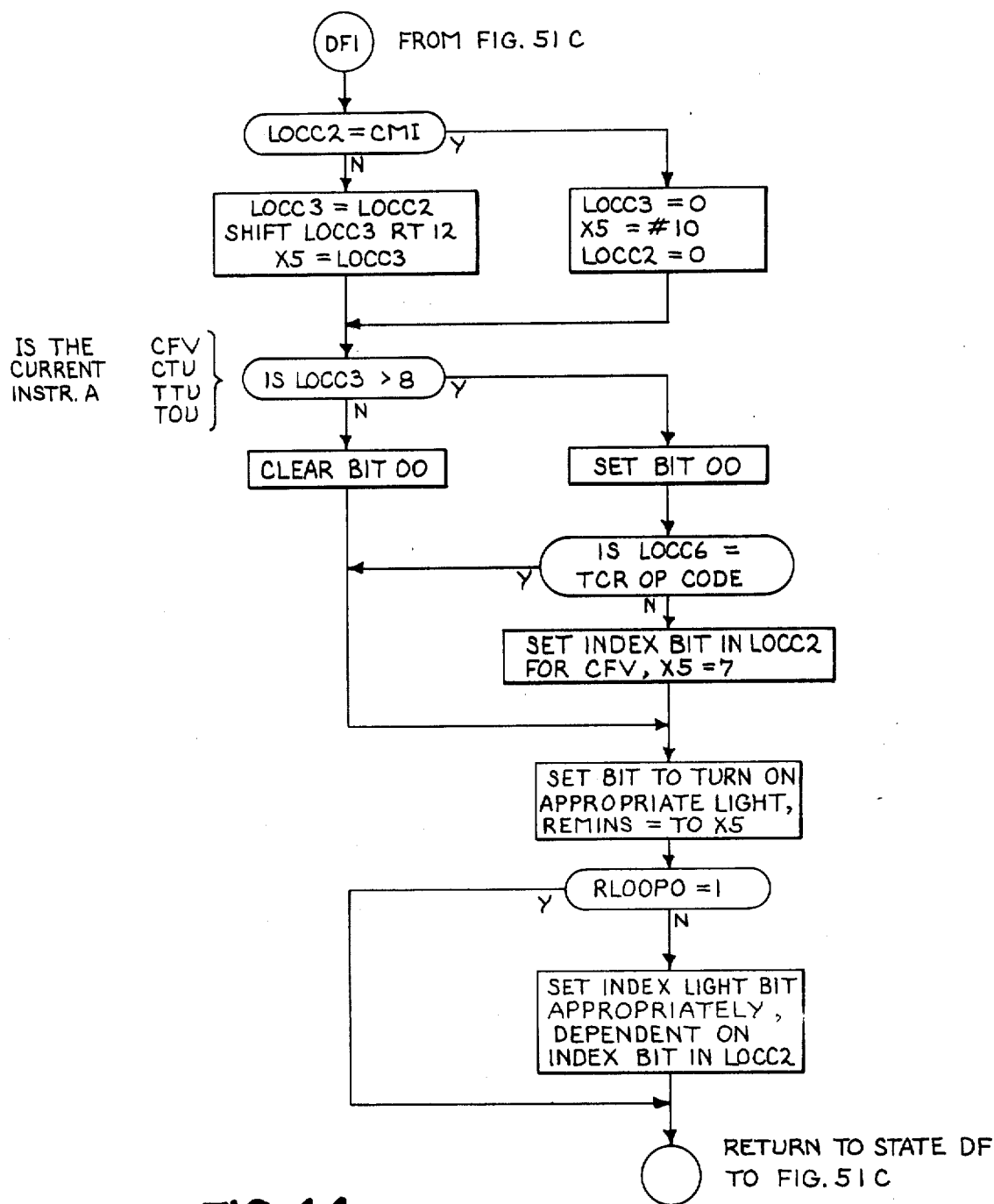

Reference is now made to FIG. 64 showing subroutine FUNCTO wherein the IMMP enters into DF. It will be noted that upon entry into subroutine FUNCTO that location LOCC2 contains the address of the current instruction at a location specified by the contents of either DPTR or RPTR. Additionally location LOCC6 contains the operation code of the previous instruction (adjacent left instruction) as specified by the contents of either DPTR-1 or RPTR-1.

The first test performed upon entry into subroutine FUNCTO is to determine if location LOCC2 is equal to the contents of CMI (all binary 1's). If LOCC2 is not equal to CMI, the program enters through the N branch into an action block wherein LOCC3 is set equal to LOCC2. This latter operation is accomplished by shifting the contents of location LOCC3 right 12 places while in the A register and shifting all binary 0's into the 12 most significant bits of the A register and storing the contents of the A register into location X5, where X5 now equals the contents of location LOCC3. The operation code of the current instruction now resides in the four least significant bits of X5. This operation code is utilized as a particular bit address in the output word PO as shown in the EQB listing. Again, utilizing the previous example, if the operation code now in location X5 is to turn on the LOF light, the binary bit configuration of that operation code will address Bit 0 in word PO.

Reference is now made back to the LOCC2 = CMI decision block. Let it now be assumed that LOCC2 is equal to CMI. Thus, the IMMP will branch into another action block through the Y branch and location LOCC3 is set equal to 0, and X5 is set equal to hexidecimal 10 (No. 10). Also, location LOCC2 is set equal to 0. This operation removes the current instruction from location LOCC2 and simultaneously puts an address into X5 which will cause the IMMP to address Bit O of the output word PO+1 shown in the EQB listing as location DELO. This latter location will cause the IMMP to turn on the Delete light on the I&MM when the exit routine is executed. It is significant to note in the EQB listing that each of the bits corresponding with a particular instruction and an associated light are contained in word PO, with the exception of DELO in location Bit O of PO+1.

Still referring to FIG. 64, the IMMP in subroutine FUNCTO now tests in a decision block to see if location LOCC3 is greater than 8. In this decision block a test is being performed to see if the instruction to be displayed is a CFV, CTU, TTU, or a TOU instruction. Each of these instructions contains an operation code greater than 8. If either of these instructions is to be dislayed the program will take the Y branch into an action block wherein Bit 00 is set. As shown in the EQB listing, when Bit 00 is set it indicates that the current instruction is a timer/counter instruction. The program now enters into another decision block where a test is performed to see if location LOCC6 is equal to a TCR op code. If LOCC6 does equal to TCR (timer/counter) op code the program exits through a Y branch entering into an action block wherein the appropriate bit in PO or PO+1, as specified by the op code is set for turning on the corresponding light on the I&MM. Also the contents of X5, which contains the op code are stored in location REMINS in the EQL listing. REMINS is a location utilized to remember the function or instruction light which was last turned on.

If location LOCC6 is not equal to a TCR op code, the next instruction must be a CFV. Thus, the program exits through an N branch entering into an action block and the index bit in location LOCC2 is set for a CFV instruction. Also, X5 is set equal to 7 the contents of which are utilized in the next action block to set Bit 7 of word PO at location CFVO to turn on the CV (compare final value) light on the I&MM.

Reference is now made back to the decision block Is LOCC3>8. Let it now be assumed that the instruction to be displayed is not a CFV, CTU, TTU or TOU. Thus, the program will exit through the N branch into the next action block wherein Bit 00 will be cleared. The program now enters into the previously described action block and the appropriate bit corresponding to the particular light on the I&MM to be turned on will be set and X5 will be stored in location REMINX.

The next action to take place is a test to see if the Repeated Loop light on the I&MM is on by testing the contents of location RLOOPO. This test is performed to determine if the instruction currently being displayed resides in a repeated loop in the application program. If the Repeated Loop light is on (RLOOPO=1) the program merely branches back to State DF entering back into FIG. 51c. However, if the Repeated Loop light is out, the program branches through the N branch into an action block wherein the index light (X) at location INDO is set appropriately in accordance with the state of the index bit in location LOCC2.

Reference is now made back to FIG. 51c wherein subroutine FUNCTO now returns back into the first decision block of that figure. A test is now performed to see if the Delete light is on by testing location DELO. Assuming that the Delete light is not on, the program will then enter into the next decision block and Bit 00 is tested to see if that bit is set. If Bit 00 is not set it indicates that the current instruction to be displayed is not a CFV, CTU, TTU or TOU instruction. Assuming that Bit 00 is not set, the program exits through the N branch into another decision block wherein a test is performed to see if the current instruction to be displayed is a LOF or a LAF instruction. This test is performed by testing the status of output bits LOFO and LAFO in word PO as shown in the EQB listing. If either of these instructions is the current instruction, the program will then take the Y branch into an action block wherein the state of the two output status bits, STAT10 and STAT20 corresponding to the Open and Closed lights, respectively, on the I&MM are inverted. The reason for inverting these two status bits is because the LOF and LAF instructions are negating type instructions, thus, it is necessary to invert the status of these lights whereby the status of the Open and Closed lights on the I&MM will appear proper to the I&MM operator. If neither of the LOF or LAF instructions are currently being displayed, the program then branches through an N branch into a current operand = forced input decision block. In this decision block a test is performed to see if the current operand resides in one of the words in the FTAB table. If one of the operands does reside in the FTAB table it indicates that the input bit specified by the operand of the curret instruction is a forced input bit. If that bit is forced, the program exits through a Y branch into an action block wherein the output bit FORCO is set equal to a binary 1, whereby the Force light on the I&MM will be turned on during the exit routine. If that operand is not a forced bit, the program will exit through the N branch into an action block and the output bit location FORCO will be set to a binary 0, thus, the Force light will be turned out, if it had been turned on during the previous first IMMP pass.

The program now enters into a decision block TESTI and a test is performed to see if the Test button on the I&MM has been pressed by the I&MM operator. This is accomplished by testing the status of location TESTI in the EQB listing. If the operator has not pressed the Test button, the program enters into an LDPYLI decision block and a test is performed to see if the Logic Display button has been pressed by the I&MM operator. Location LDPLYI is that location in the EQB listing which corresponds to the Logic Display button on the I&MM. If it is assumed that the operator has previously pressed the Logic Display button, the program will exit through a Y branch into the next decision block PBI =PBI2. In this block a test is performed to see if the PLACE thumbwheels on the I&MM have been changed by the I&MM operator since the previous first pass into the IMMP. This is accomplished by testing to see if location PBI (the equivalent to the PLACE thumbwheel) is equal to location PBI2, which now contains the previous setting of the PLACE thumbwheels. Obviously on the first time through State D the PLACE thumbwheels will not have changed. Assuming this to be the condition, the program will thus exit through a Y branch into another decision block BUILO = 1. In this decision block a test is performed to see if the I&MM is in the Copy Mode by testing the contents of location BUILO. On the first pass through the IMMP, the I&MM would not be in the Copy Mode, thus the program will exit through the N branch entering into point DF10 of FIG. 51b. Upon entry into point DF10 of FIG. 51b, the IMMP enters into a decision block designated Trap in Position, Bit 01 set. The operation of the program from this point on will subsequently be described in connection with State PA.

Reference is now made back to the BUILO = 1 decision block in the left bottom portion of FIG. 51c. If it is assumed that the I&MM operator had previously pressed by Copy pushbutton BUILO will be set, indicating that the I&MM is in the Copy Mode. The program will, therefore, exit through the Y branch into an action block where the A register is set equal to State D6 and enter into point DF20 of FIG. 51d. In FIG. 51d the variable location STATE is now set equal to State D6 and the program proceeds to another action block wherein the A register is set equal to State Q. The program will now go to a point IN2 of the state dispatch table (FIG. 65) which will cause the program to branch directly to State Q. The operation of State Q will subsequently be described.

Reference if now made back to the PBI = PBI2 decision block of FIG. 51c. If the I&MM operator has changed the PLACE thumbwheels PBI will not be equal to PBI2 and the program will take the N branch into an action block wherein the A register will be set equal to State D3. The program will again enter into point DF20 of FIG. 51d and the variable STATE will now be set equal State D3. As previously described, the program will then enter into the next action block wherein the A register is set equal to State Q, and the program proceeds to point IN2 of the state dispatch table. Reference is again made back to FIG. 51c to the TESTI decision block. In that decision block if the I&MM operator has pressed the Test button, location TESTI will be set and the program will take the Y branch into an action and the A register will be set equal to State G. The program will then exit from that action block entering into point DF20 wherein the variable state STATE will be set equal to State G as previously described for other entries into point DF20.

Reference is again made to FIG. 51c to the decision block DELO=1. Let it now be assumed that the IMMP encounters a delete instruction as the current instruction to be displayed. In this case location DELO will be equal to a 1 and the program will take the Y branch into an action block and location DSPYO will be set equal to CMI. As shown in the EQL listing, location DSPYO is the output display word, the contents of which are sent to the I&MM during the exit routine to be displayed on the I&MM display 156. Since DSPYO is now all binary 1's, the I&MM will display FFFF, the op code of the delete instruction. The program will now leave the latter action block and enter into the next action block wherein the two bits STAT10 and STAT20 for controlling the operation of the Close and Open lights on the I&MM are each set to binary 0. Thus, the Open and Close lights on the I&MM will be turned out when the IMMP executes the exit routine. As soon as STAT10 and STAT20 are reset, the program proceeds into the FORCO=0 action block and location FORCO is set to a binary 0 to turn off the Force light during the exit routine. The operation of the program for this latter block is as previously described.

Reference is now made to the LDPLYI decision block of FIG. 51c. If the I&MM operator has not pressed the Logic Display button the program will proceed to point DF15 of FIG. 51c entering into a BSTORI decision block. In this latter decision block a test is performed to see if the I&MM operator has pressed the Copy Storage button on the I&MM. If location BSTORI is set, indicating that the I&MM operator has pressed the Copy Storage button, the program will exit through a Y branch entering into a TESTO=1 decision block. In this block location TESTO is tested to see if a copy of a logic string is being executed on-line as a part of the application program. If location TESTO is a binary 1, the program will exit through a Y branch entering into an error action block and location LOCC5 is set to the error code 5. From this latter action block the program proceeds to point DF7 of FIG. 51e entering into an action block wherein the A register is set equal to State N1, the error state. The program will now proceed to point DF20 of FIG. 51d wherein the location STATE is set equal to the A register, now containing State N1. The program further proceeds to the action block wherein the A register is set equal to State Q and goes to IN2 of the state dispatch table as previously described.

Reference is again made back to FIG. 51c to the TESTO=1 decision block. If location TESTO is not equal to a binary 1, indicating that copies are not on-line, the program will exit through an N branch entering into a BUILO=1 decision block. In this latter block the program is testing the contents of location BUILO to see if the I&MM is in the Copy Mode. If the I&MM is in the Copy Mode the program will exit through the Y branch into an action block and location SSTAT is set equal to State D6. However, if the I&MM is not in the Copy Mode, the program will exit through the N branch into an action block and the A register is set equal to State A2. The other input to this latter action block is from the SSTAT = D6 action block. The program will now proceed to point DF20 of FIG. 51d and location STATE is set to State A2. The program will then proceed to the action block wherein the A register is set to State Q as previously described.

Reference is now made to the Bit 00 set decision block of FIG. 51c. If Bit 00 is set it indicates that the current instruction is either a CFV, CTU, TTU or TOU. Assuming a positive test, the IMMP will exit through a Y branch into a Bit E set decision block. If Bit E is not set the program will proceed through the N branch into a LOCCI decision block wherein the status of location LOC1 is tested to see if the operator has pressed the Address button on the I&MM. If the operator has not pressed the Address button, the program will exit through the N branch entering into an action block and location VALO is set equal to a binary 1 for turning on the Value light on the I&MM during the exit routine. Also at this time location LOCO is set equal to a binary 0, so that the Address light on the I&MM will be turned out during the exit routine. The program now enters into the action block wherein STAT10 and STAT20 are reset as previously described.

Let it now be assumed that the operator has previously pressed the Address button. As a result, location LOC1 will be a binary 1 and the program will branch from the LOC1 decision block through the Y branch into an action block Set Bit E. Bit E is set in the present instance because it is desirable to display the address of either a timer or a counter residing in the application program or the IMMP copy region. The program now enters into the STAT10=0 action block as previously described.

Reference is now made back to the Bit E set decision block. If Bit E is set (Bit E would have been set on the previous sweep cycle through the IMMP) the program will exit through the Y branch entering into a VALi decision block. In that decision block location, VALI is tested to see if the I&MM operator has pressed the Value pushbutton on the I&MM. If he has not pressed the Value pushbutton, the program will exit through the N branch entering into the STAT10=0, action block as previously described. However, if the I&MM operator has depressed the Value pushbutton, indicating that he desires to display the value of either a timer or a counter instruction on the I&MM, the program will take the Y branch entering into an action block wherein Bit E is cleared. The program will then continue as previously described clearing STAT10 and STAT20.

Still referring to FIG. 51c reference is now made to point DF9. If the I&MM operator has not depressed the Copy Storage button, the program will proceed from the BSTORI decision block through the N branch entering into point DF9 of FIG. 51d. The program now enters into a decision block BUILO=1 wherein a test is again performed to see if the I&MM is in the Copy Mode. Assuming that the I&MM is not in the Copy Mode, the program exits through the N branch entering into a BUILI decision block. In this block a test is being performed to see if the I&MM operator has pressed the Copy button by testing the contents of location BUILI. If the I&MM operator has pressed the Copy button, the program will take the Y branch wherein the A register is set to State E and the program now proceeds to point DF20 exiting the manner as previously described. State E is the state subroutine which makes a copy of the present logic string or locates the current copy of a logic string, if it already exists. The description of State E will be subsequently described.

Let it now be assumed that BUILI is not set, thus the program will exit through the N branch entering into the next decision block LTI and LTO and LDLO. In this decision block the IMMP is testing to see if the I&MM operator has pressed the move left button (LTI) testing to see if the permission to move left light (LTO) is off and also that the current instruction is not an LDL instruction. In essence, this test is to see if it is necessary to search for an LDL instruction residing in the far left extremity of the current logic string. Assuming that the test in this latter decision block is negative, the program proceeds through the N branch into a TESTO=1 decision block. Again in this block a test is being performed to see if copies in the IMMP copy region are on-line. If copies are on-line, the program will exit through the Y branch wherein a test is performed to see if Bit D is set. If Bit D is set the program will exit to the Y branch into an action block wherein location COILO is set to a binary 0 to turn out the Coil State light on the I&MM during the exit routine. The reason for turning out the coil light at this time is because the current instruction being displayed is a logic string in the application program and not a copy, thus the Coil State light has no significance. However, if Bit D is not set the program will take the N branch and the present state of the Coil State light will be maintained, since it does have significance to the current logic string in the application program.

Reference is now made back to the TESTO=1 decision block of FIG. 51d. If location TESTO is not equal to a 1, indicating that copied versions of the application program are not on-line and being executed, the program will take the N branch and enter into a Trap in Position, Bit 01 set decision block. In this latter decision block a test is performed to see if a trap instruction exists in either the application program or the IMMP copy. State Q is a trap removing and placing subroutine wherein Bit 01 is either set or reset. The purpose of Bit 01 will be described in connection with the State Q subroutine. If it is assumed that the trap is not in position (Bit 01 reset) the program will take the N branch wherein the A register is set equal to Q and the program will branch directly to Q through the state dispatch table as previously described. However, if the trap is in position the program will exit the Y branch into an action block wherein the variable state STATE is set equal to State PA. The program will then go to Exit of FIG. 65.

Still referring to FIG. 51d, reference is now made back to the BUILO=1 decision block at the top of that figure. If the I&MM is in the Copy Mode, that is the Copy Mode light is on, the program will exit from that decision block through the Y branch entering into a second TESTO=1 decision block. In this block location TESTO is tested to see if any copies of logic strings are on-line and being tested as a part of the application program. If copies are being tested, the program will exit through the Y branch again entering into the Trap in Position, Bit 01 set decision block. However, if no copies exist, the program will then enter into an action block wherein the Coil State light will be turned out by resetting location COILO to 0. The program now enters into a Bit Set in Input Words, CI, O-CI, C decision block and a test is performed to see if any of the switches on the I&MM for modifying or building a particular type of instruction have been pushed by the I&MM operator.

By referring to the EQL listing of Appendix B it can be seen that each of those bits CI, O-CI, C corresponds to one of the switches on the I&MM, for example, LDL, LAT, LOF, etc. If, in this latter decision block, a binary 1 does not exist in any of those bits the program will exit through an N branch entering into point DF5 of FIG. 51f. On entry into FIG. 51f the program first test location DELI to see if the I&MM operator has pressed the Delete pushbutton. If he has pressed the Delete pushbutton, indicating that he desires to delete the current instruction, the program will take the Y branch entering into an SSTO decision block. In this block a test is performed to see if the current instruction is an SST by examining the contents of location SSTO. If that instruction is an SST, the program proceeds through the Y branch into the next decision block Other SST Adjac. .

The question being asked in this latter decision block is, does an SST instruction exist either ahead or in back of the current SST instruction. In logic diagram terminology this would be representative of two or more relay coils being connected in parallel terminating a logic string. If another SST instruction does exist adjacent to the current SST instruction, the program will exit through the Y branch entering into an action block wherein the current instruction (SST) based on the contents of the copy pointer RPTR is set equal to a delete instruction (all binary 1's). The program will now proceed to point DF10 of FIG. 51d wherein the actions performed are as previously described.

Referring back to the Other SST Adjac. decision block, if another SST instruction does not exist adjacent to the current instruction, the program will exit through the N branch into a "Set Complete Rung to DELS" action block. In this latter block the IMMP completely deletes all of the instructions in the current logic string by putting delete instructions in the place of each logic operator (LOT, LAT, etc.) instruction existing in that logic string. The program now proceeds again to point DF10 of FIG. 51d.

Figure 51E:
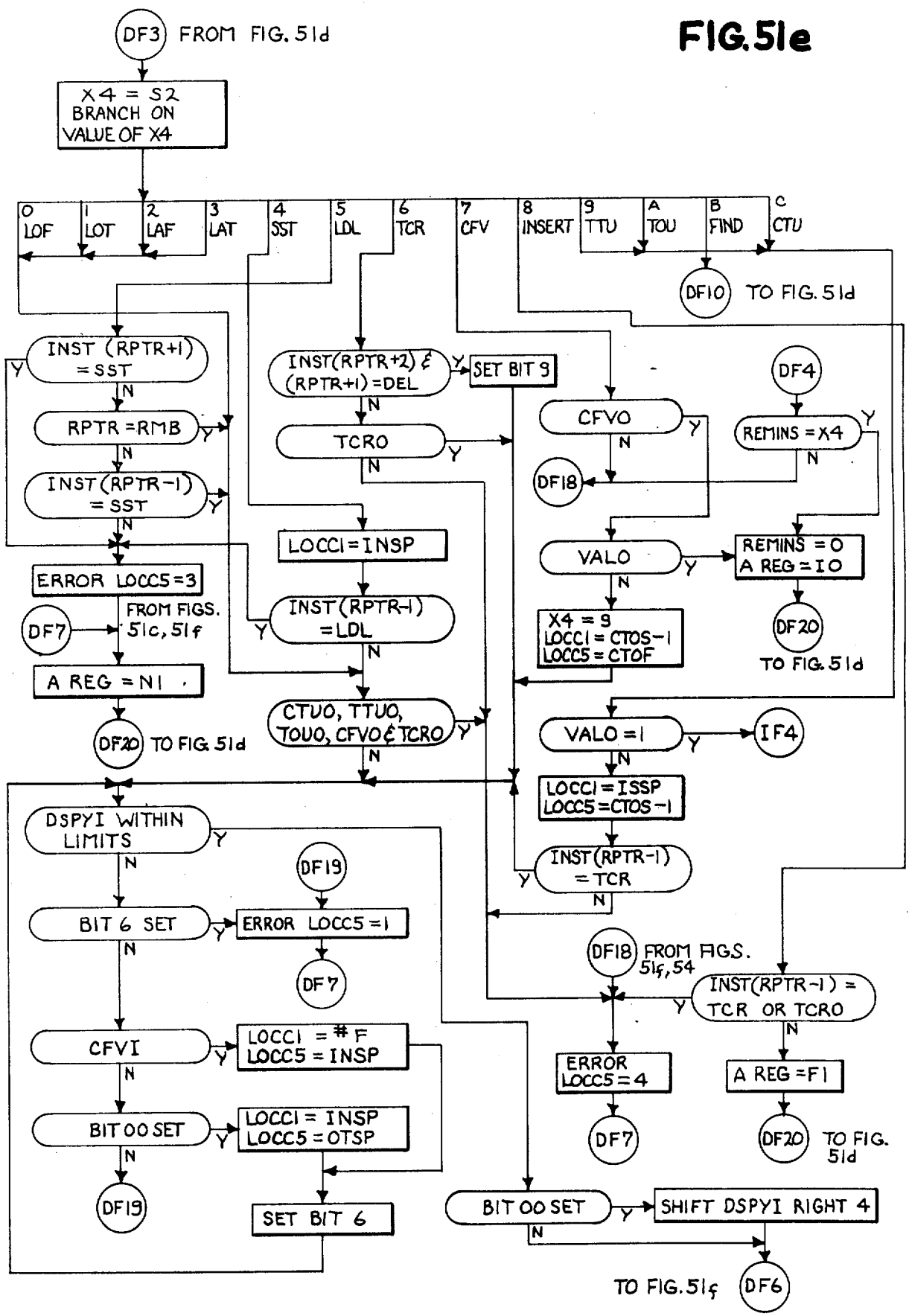
Figure 51F:
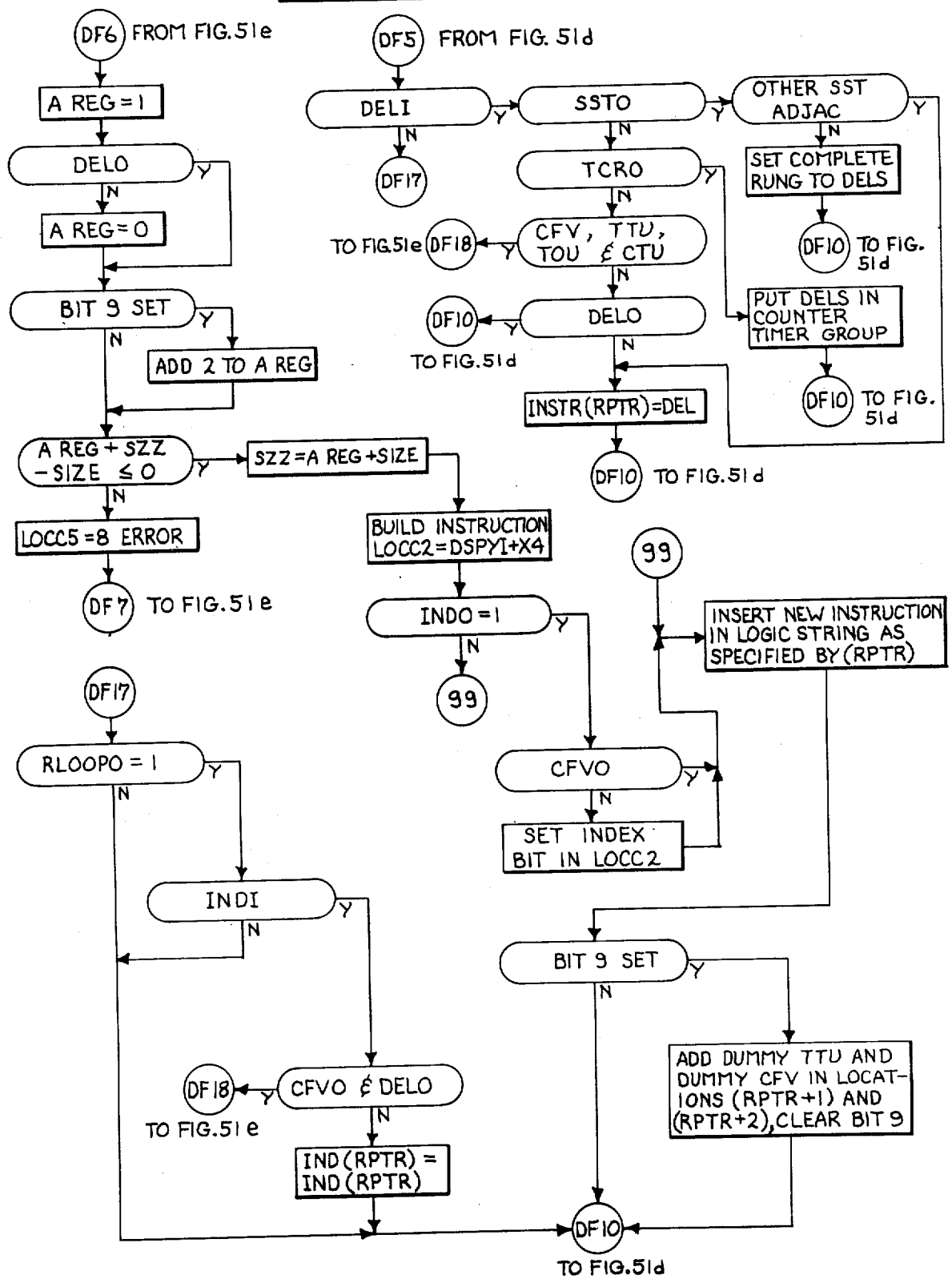

Reference is now made back to the SSTO decision block of FIG. 51f. If the current instruction is not an SST, the program takes an N branch into a TCRO decision block. In this decision block a test is performed to see if the present instruction is a timer or counter instruction. If TCRO is set, indicating that a timer or counter instruction is the current instruction, the program will take the Y branch entering into an action block and delete instructions are placed into the entire counter/timer group, i.e., in the three instructions comprising either a timer or a counter. Again the program proceeds to point DF10 of FIG. 51d. If neither a timer or counter instruction is the current instruction, the program proceeds through an N branch into the next decision block wherein a test is performed to see if the current instruction is either a CFV, TTU, TOU, or CTU by examining the Bit 00 previously set as a flag to indicate that one of these types of instructions is the current instruction. If the current instruction is one of these types, the program will exit through a Y branch entering into point DF18 of FIG. 51e into an error block wherein location LOCC5 is set equal to error code 4. The program then proceeds to point DF7 of FIG. 51e wherein the A register is set equal to State N1 and then goes to point DF20 wherein the operations following DF20 are as previously described.

Referring back to FIG. 51f, if none of the instructions is a CFV, TTU, TOU, or CTU, the program will take an N branch into a decision block wherein location DELO is tested to see if the current instruction is a delete instruction. If location DELO is a binary 1, indicating that the current instruction is a delete, no further action is required. Thus, the program exits through the Y branch reentering into point DF10 of FIG. 51d. However if the current instruction is not a delete, the program then takes the N branch into the next action block and the current instruction is deleted as previously described.

Still referring to FIG. 51f to DELI decision block, if the I&MM operator has not pressed the Delete button, indicating that he does not desire to delete the instruction, the program will take an N branch to point DF17 of FIG. 51f. Point DF17 enters into a decision block "RLOOPO=1". The question being asked in this decision block is, is the current instruction in a repeated loop. If it is not a repeated loop instruction no further action is required, thus the program will exit through the N branch re-entering again back into point DF10 of FIG. 51d. However, if the current instruction is an instruction residing in a repeated loop, the program will take a Y branch into a "INDI" decision block. Location INDI, as identified in the EQL listing, corresponds to the index button (X) on the I&MM, thus the question being asked is, has the I&MM operator depressed that button. If he has not depressed the X button, indicating that he does not want to change the index status bit in the current instruction, the program will take the N branch reentering back to point DF10 of FIG. 51d.

If the I&MM operator has pressed the X button, the program will exit the Y branch entering into the next decision block CFVO, DELO. The test performed in this block is to determine if the current instruction is either a CFV or a DEL. This is accomplished by examining the contents of locations CFVO and DELO. If either of these instructions exist, the program will exit the Y branch to point DF18 of FIG. 51e setting an error as previously described. However, if neither a CFV or DEL instruction exist, the program will take the N branch wherein the index bit of the current instruction is complimented based on the contents of the copy pointer RPTR. The program again re-enters back into point DF10 of FIG. 51d.

Still referring to FIG. 51d reference is now made to the LTI and $\overline{\text{LTO}}$ and $\overline{\text{LDLO}}$ decision block. In this latter decision block, if a positive response is detected, the program takes a Y branch entering into an action block and various parameters are set up for the IMMP to search upstream in the application program for the previous LDL instruction of the current logic string. In this action block location LOCC1 is set equal to the constant CLDL, LOCC2 is set equal to the constant CSST, LOCC3 is set equal to the application program pointer DPTR plus location STAPP (the start of the application program), LOCC4 is set equal to STAPP, and location SSSTAT is set equal to State M, the state that the IMMP will enter after it has gone through the search state, State L. In this latter block the A register is also set equal to State L and enters into point DE20 wherein the location STATE is set equal to the A register (State L) and the program branches through the state dispatch table to State Q as previously described. On the next first pass into the IMMP the program will branch to STATE L as previously described whereby State L will search upstream for the previous LDL instruction. This is accomplished as shown in FIG. 63 wherein location LOCC6 is set equal to minus 1.

Reference is now made to FIG. 51d to the "Bit Set Input Words CI, O-CI, C decision block. In that decision block, if one of the bits in word CI, O-CI, C contains a 1 the program will take the Y branch into the next action block. Entry into this latter action block indicates that the I&MM operator desires to build an instruction over an existing instruction now residing in the IMMP copy region. In preparation to building an instruction, provisional boundaries are set up by IMMP which specify the boundaries of the input, output and intermediate regions in the main store as shown in FIG. 2. These boundaries are established by the IMMP setting location LOCC1 equal to the constant#E from location MV of the CON listing and setting location LOCC5 equal to location ISSP as shown in the EQL listing. Additionally, Bits 6 and 9 in word 14 (EQB listing) are cleared. The IMMP now enters into point DF3 of FIG. 51e into an action block wherein location X4 is set equal to S2. Location S2 is set equal to the contents of location S1 during the exit routine. S2 now contains the bit address of one of the bits in location CI, O-CI, C and specifies one of the paths 0 through C of FIG. 51e. The program will now branch on the value of X4 to one of these paths (O-C). For example, if the I&MM operator has pressed either one of the LOF, LOT, LAF, or LAT pushbuttons on the I&MM, the program will take one of the branches 0-3, respectively, entering into a decision block asking the question, is the I&MM operator attempting to write one of the logic operator instructions (LOF, LOT, LAF, LAT, SST) over one of the timer/counter instructions as listed in that decision block. If the I&MM operator is attempting to write one of the logic operator instructions on top of a timer/counter instruction, it is considered an illegal operation. Thus, the program will take the Y branch entering into the error action block wherein location LOCC5 is set equal to code 4. The program now proceeds to point DF7 of FIG. 51e and the A register is set equal to State N1 and then proceeds to point DF20 as previously described.

If the I&MM operator is not attempting to write a logic operator instruction on top of a timer/counter instruction, the program will exit through the N branch into a decision block DSPYI Within Limits. In this decision block the IMMP is testing to see if the contents of location DSPYI, as specified by the value set into the BUILD thumbwheels by the I&MM operator, are within the input, output, and intermediate regions as specified by the boundaries setup in FIG. 51d. Assuming that the value in DSPYI is not within the specified limits, the program will exit through the N branch into a decision block wherein a test is performed to see if Bit 6 is set. Bit 6 will be in the reset state on the first entry into FIG. 51e, thus the program will take the N branch entering into a decision block testing the contents of location CFVI (i.e., has the I&MM operator depressed the FV (current or final value) button on the I&MM). If he has not pressed the FV pushbutton, the program will proceed through the N branch next testing to see if Bit 00 is set. Bit 00 will be set if the current instruction is a counter/timer instruction, such as a CFV, CTU, TTU, or TOU. If Bit 00 is not set, the program will exit through the N branch entering into point DF19 of FIG. 51e to an error action block wherein location LOCC5 is set equal to code 1.

The program will now proceed to point DF7 of FIG. 51e wherein the A register is set equal to State N1 and a return is made to point DF20 of FIG. 51d as previously described. Reference is now made back to the CFVI decision block of FIG. 51e. Assuming that the operator has depressed the FV button on the I&MM, the program will take the Y branch into an action block wherein location LOCC1 is set equal to the contents #F) of the constant in location C15 and location LOCC5 is set equal to location INSP as defined in the EQL listing. The program now proceeds into an action block wherein Bit 6 is set and returns from that last action block back into the DSPYI Within Limits decision block. Bit 6 is set at this time as a local flag to be used in FIG. 51e to determine if an error exists after the boundaries have been changed in the program as previously described in the LOCC1=#F, LOCC5=INSP action block. Let it still be assumed that DSPY Within Limits test is still negative. Thus, the program will enter into the Bit 6 set decision block wherein this time Bit 6 is set. The program will now exit through the Y branch again entering into the error action block wherein location LOCC5 is set equal to 1.

Let is now be assumed that the IMMP has just entered into the "DSPYI Within Limits" decision block for the first time. Further assume that the program proceeds through the N branch of all succeeding decision blocks into the Bit 00 decision block. Assuming at this time that Bit 00 is set, the program will exit through the Y branch into the action block wherein LOCC1 is set equal to INSP and LOCC5 is set equal to OTSP. The limits, as can be seen in FIG. 2, now define the output region of the memory. The program will proceed to set Bit 6 as previously described.

Still referring to FIG. 51e, reference is now made back to the DSPYI Within Limits decision block. Let it now be assumed that the value in location DSPYI, as previously dialed in by the I&MM operator in the BUILD thumbwheels, is within the limits of either the input region, the output region, or the intermediate region. As a result a program will exit through the Y branch and enter into the decision block wherein a test is performed to see if Bit 00 is set. As previously described, if Bit 00 is set it indicates that the current instruction is a counter/timer type such as a CFV, a TTU, etc. Assuming that Bit 0 is set, the program will take the Y branch entering into an action block wherein location DSPYI is shifted right four places to right-hand justified the contents of DSPYI for subsequent display on the I&MM display 156. However, if Bit 00 is not set, indicating that a counter/timer instruction is not being referenced by the BUILD thumbwheels, the program will exit through the N branch entering into point DF6 of FIG. 51f.

The first operation to take place in FIG. 51f at point DF6 is to set the A register equal to 1. The program then proceeds into a DELO decision block. In this decision block a test is being performed to see if Bit DELO is a 1 or a 0. If Bit DELO is a binary 1 it indicates that the I&MM operator is attempting to build an instruction on top of a delete instruction in the IMMP copy region. If that instruction is a delete (DEL), the program will exit through the Y branch into a Bit 9 set decision block. However, if that instruction is not a delete, the program will exit through the N branch wherein the A register will be set equal to 0 and then proceed to the Bit 9 set decision block.

If Bit 9 is set it indicates that the I&MM operator is building a timer/counter instruction. As previously described all timers and counters are built with three consecutive instructions located in memory. Assuming that Bit 9 is set the program will take the Y branch into an action block wherein two is added to the A register. The addition 2 to the A register is to take into account the need for two additional words when building a three-word timer or counter. If the I&MM operator is presently attempting to write over an existing TCR instruction in the IMMP copy region, Bit 9 will be reset. Thus, the program will exit through the N branch.

The program will enter from either the Bit 9 set decision block of the Add 2 to A Reg. action block into a decision block A Reg. + SZZ − SIZE ≤ 0. Location SZZ maintains a running total of the number of instructions added to the four possible logic string copies that can exist in the IMMP copy region. SZZ must always be less than SIZE, the latter defining the amount of words left in the expansion area for the application program. If SZZ is not less than SIZE it is an error, and the program will branch from the latter decision block through the N branch into an error action block wherein location LOCC5 will be set equal to code 8. From this latter action block the program will proceed to point DF7 of FIG. 51e in the manner as previously described.

If the incremented value of SZZ is less than SIZE the program will take the Y branch entering into an action block SZZ = A Reg. − SIZE. The program now proceeds into an action block wherein the instruction will be built. It will be recalled on entry into FIG. 51e that location X4 contains the bit position address in the input word (CI, O-CI, C) corresponding to the push-button (LAT, LOF, etc.) pressed on the I&MM console by the operator. It will also be recalled, as previously explained in subroutine FUNCTO, the arrangement of the bit position addresses of the bits in the output word PO were arranged to equate each output bit with the operation code of the instruction to which each output bit is utilized to turn on its associated light on the I&MM. A similar arrangement has been provided between the input switches, states of which are transferred to the input word CI, whereby those switches are each related to a corresponding instruction (such as LOT, LAT, SST, etc.), and the op code of the instruction to be built. In this latter action block location LOCC2 is set equal to the instruction being built by setting LOCC2 to DSPYI+X4. By referencing the coding in Appendix B it can be seen that to format that instruction properly, the A register is shifted right circular by four to position the value or the operation code represented by the contents of X4 into the four-most significant bit positions of the word and location DSPYI will be placed in the least significant bit positions of that word.

The program now proceeds to an "INDO=1 decision block wherein a test is performed to see if the index light (X) on the I&MM is on by examining the contents of location INDO. If the index light is not on, the program will take the N branch into point DF99 on FIG. 51f and the new instruction will be written into the logic string in the IMMP copy region at the location specified by the contents of location RPTR.

If the index light (X) is on the program will exit through the Y branch entering into a CFVO decision block. In this block the question being asked is, is the current instruction a current or final value instruction. If the FV light is not on, the program will exit through an N branch and the index bit in the LOCC2, which now contains the instruction just built, will be set. The program now proceeds into a Bit 9 set decision block. However, if the FV light is on, the program will take the Y branch entering into the Bit 9 set decision block. It will be recalled that Bit 9, when set, specifies that the I&MM operator is building a timer/counter instruction over a delete instruction. If Bit 9 is not set indicating that he is not building a timer/counter instruction over a delete instruction, the program will exit through the N branch entering back into point DF10 on FIG. 51b. The program, from point DF10, will subsequently be described.

If Bit 9 is set it is necessary to add dummy terms to the remaining two instructions of the timer/counter group. This is accomplished by the program exiting through the Y branch entering into an action block wherein a dummy TTU and a dummy CFV instruction, each having an operand of 8, are placed into locations RPTR+1 and RPTR+2. It will be recalled that RPTR is the pointer for the IMMP copy being placed in the IMMP copy region. Additionally in this action block Bit 9 is cleared and the program exits to point DF10 as previously described.

Reference is now made back to point DF3 of FIG. 51e. If the I&MM operator is attempting to build an SST instruction, the program will branch on the value of X4 to path 4, the SST path. The first action block in the SST path is to set location LOCC1 equal to INSP. The program then goes to a decision block wherein a test is performed to see if the current instruction minus 1, as specified by RPTR − 1 is equal to a LDL instruction. If the instruction is not a LDL the program will take the N branch entering into the next decision block where the operations performed from that block on are as previously described. However, if the instruction is an LDL, the program will take the Y branch entering into an error block and location LOCC5 is set equal to code 3. The program will continue to poing DF20 as previously described, first going through the action block wherein the A register is set equal to State N1.

If the I&MM operator is attempting to build a LDL instruction in FIG. 51e, the program will branch through path 5 (LDL) and enter into a decision block wherein a test is performed to see if the current instruction plus one as specified (RPTR+1) is an SST instruction. If that instruction is an SST the program will exit through the Y branch indicating an error by entering into the action block wherein location LOCC5 is set equal to a code 3 as previously described. If the current instruction is not an SST, the program proceeds through the N branch into an RPTR=RMB decision block. In this decision block a test is performed to see if the current instruction is the left most instruction in the current logic string being displayed. It will be recalled that location RMB always contains the address of the left most instruction of the current logic string being displayed. If the test is positive the program will exit through the Y branch, indicating that it is proper to insert an LDL instruction into the logic string. The operation of the program from this point is as previously described whereby the LDL instruction will be built and stored in the IMMP copy region. However, if it is detected that the current instruction is not the left most instruction in the logic string, the program will exit through the N branch entering into an INST (RPTR − 1) = SST decision block. In this block a test is performed to see if the instruction in the application program previous to the last instruction in the logic string is an SST instruction. If that instruction is not an SST, it is an error, because it is inappropriate to build an LDL instruction in the middle of a logic string. Thus, the program will exit through the N branch indicating an error by setting location LOCC5 equal to code 3 as previously described.

If the instruction at location RPTR-1 is an SST, it indicates that the current instruction is in fact the left most instruction of the current logic string to be displayed, and that the instruction previous to the left most instruction in the logic string is an SST instruction, the latter instruction terminating the previous logic string. Therefore, it is appropriate to insert an LDL into the current logic string. The program will thus take the Y branch into the CTUO, TTUO, TOUO, CFVO, TCRO decision block as previously described. From this point on the LDL instruction will be written into the IMMP copy region, modifying the current logic string as previously described.

Reference is now made to path 6 wherein the I&MM operator will be attempting to insert a TCR instruction into the IMMP copy region to modify an existing copy. In path 6 the first operation to take place is a test performed in an INST (RPTR+2) and (RPTR+1) = DEL decision block. In this decision block a test is being performed to determine if the two instructions following the current instruction are delete (DEL) instructions. If those two instructions are not delete instructions, indicating that a timer/counter does exist at the present time, or that some other instructions pertaining to a logic string exist in those locations, the program will take the N branch entering into a "TCRO" decision block. A test is now performed to see if the current instruction is a timer/counter reset instruction by testing the contents of location TCRO. If the current instruction is not a TCRO, indicating that a timer/counter does not exist, the program will go to the N branch and indicate an error by entering into the action block wherein location LOCC5 is equal to code 4 as previously described.

Reference is now made back to the first decision block in path 6 (TCR). If both of those instructions at locations RPTR+1 and RPTR+2 are deletes (DEL's) the program will take the Y branch and set Bit 9. Proceeding from the action block wherein Bit 9 is set entry is made to the DSPYI Within Limits decision block as previously described. Bit 9 being set at this time indicates that a timer/counter can be built in the IMMP copy region. In order to do this, it is necessary to put the dummy word TTU and CFV instructions in locations RPTR+1 and RPTR+2 as previously described in FIG. 51f. These dummy instructions will be inserted as previously described in connection with FIGS. 51e and 51f.

Reference is again made to the TCRO decision block in path 6 of FIG. 51e. In that decision block, if the current instruction is a TCR, indicating that the I&MM operator is attempting to modify an existing timer/counter instruction, the program will exit through the Y branch entering into the "DSPY Within Limits" decision block. From this point on the I&MM operator may then write another TCR instruction on top of the existing TCR instruction, to thus modify the current timer/counter instruction.

Reference is again made to the top of FIG. 51e to path 7 (CFV). If the I&MM operator desires to change the current value, i.e., the full word value of a location referred to by a CFV instruction, the program will enter into path 7 based on the operation code in location X4 as a result of the I&MM operator depressing the FV button on the I&MM. The first test performed in path 7 is to see if the final value (FV) light on the I&MM is on. This is performed by testing the contents of location CFVO. If the final value light is not on it is an error, thus the program goes to the N branch to point DF18 into an error action block wherein location LOCC5 is set equal to code 4 as previously described. However, it the FV light is on, indicating that the current instruction is referring to a final value word in a timer/counter group, the program will take the Y branch into a "VALO" decision block.

In the "VALO" decision block a test is performed to see if the I&MM operator has pressed the Value button on the I&MM by testing the contents of location VALO. If the Value light is on, indicating that the I&MM operator desires to change the value of the word referenced by the CFV instruction, the program will take the Y branch into an action block wherein location REMINS is set equal to 0 and the A register is set equal to State 10. The program will now proceed from this latter action block to point DF20 in FIG. 51d wherein the variable STATE is set equal to STATE 10. By setting location STATE equal to STATE 10 the IMMP, on the next first pass, will branch through the state dispatch table to State 10. State 10 will subsequently be described.

If the Value light is not on, indicating that the I&MM operator desires to build a new final value instruction over the current CFV instruction, the program will go through the N branch into the next action block. In this action block location X4 is set equal to the operation code 9 of the CFV instruction, location LOCC1 is set equal to location CTOS minus 1 and location LOCC5 is set equal to location CTOF. The reason for setting X4 equal to 9 in the present instance is because the CFV and TTU instructions each have the same op code. Op code 7 is used as a dummy op code in the program to effect proper entry into path 7 whenever a CFV instruction is to be entered into the IMMP copy region by the I&MM operator. It will be noted, by referring to FIG. 2, that the reason for setting LOCC1 and LOCC5 to CTOS minus 1 and CTOF, respectively, is to define the boundaries for the timer/counter region (final value). Location X4 now defines the instruction and locations LOCC1 and LOCC5 define the limits of which the operand of the CFV instruction can assume. The program will now enter into the DSPYI Within Limits decision block as previously described whereby the new CFV instruction will be built into the IMMP copy region.

Reference is again made to the top of FIG. 51e to paths 9, A and C (TTU, TOU and CTU, respectively). If the I&MM operator desires to build either one of these three instructions into a timer/counter group the program will branch to the appropriate path 9, A or C and enter into a VALO = 1 decision block. As previously described for the CFV instruction, if the Value light is on the program will take the Y branch to point DF4 of FIG. 51e into an REMINS=X4 decision block. In this latter decision block the IMMP is testing to see if location REMINS contains the same operation code as location X4. Normally location REMINS will be equal to X4, however if it is not, the program will exit as an error to point DF18 wherein location LOCC5 will be set equal to code 4 as previously described. Let it be assumed that REMINS is equal to X4, thus the program will take the Y branch entering again into the action block wherein REMINS is set equal to 0 and the A register is set equal to State 10 as previously described. The program will now enter into point DF20 to FIG. 51d.

Reference is now made back to the VALO=1 decision block in path C of FIG. 51e. Let it now be assumed that the Value light is not on, thus the program will exit through the N branch into an action block and location LOCC1 is set equal to ISSP and location LOCC5 is set equal to CTOS minus 1. The IMMP exiting through the N branch into the latter action block indicates that the I&MM operator desires to build either a TTU, TOU or CTU instruction on top of the existing current instruction. The program will now leave this latter action block entering into an INST (RPTR − 1) = TCR decision block. The question being asked in this latter decision block is, is the instruction immediately to the left of the current instruction (i.e., the instruction immediately preceding the current instruction) in memory equal to a TCR. If that instruction is not a TCR, indicating that he is attempting to build in an area outside of a timer/counter group, it is an error and the program will exit through the N branch entering into the action block wherein location LOCC5 is set equal to code 4. However, if that instruction at location RPTR - 1 is a TCR, it is appropriate to build a TTU, TOU, or CTU instruction in the location in memory immediately following a TCR instruction. Thus, the program will exit through the Y branch entering into the "DSPYI Within Limits" decision block as previously described.

Reference is now made to path B (FIND) of FIG. 51e. The IMMP should normally never enter into path B. Path B corresponds to the Logic Display Mode pushbutton being pressed on the I&MM. It will be recalled back in FIG. 51c that a test is performed in the left-hand bottom corner of that figure in an LDPLI decision block to see if the Logic Display button has been pressed. If the Logic Display button has been pressed, the program will never reach point DF3 of FIG. 51e. However, if the program does enter into path B, it indicates that there has been a malfunction of some type, such as a glitch in the program not caused by an operator error, therefore instead of indicating an error, the program branches to point DF10 of FIG. 51d whereby the IMMP will return back to its next state upon the next first pass through the IMMP. In this manner the program is not halted and it will continue to run.

Reference is again made back to the top of FIG. 51e to path 8 (insert). That path will be entered if the I&MM operator has depressed the Insert button, indicating that he desires to generate a space to the right of the current instruction in the current logic string. This is normally done so that the I&MM operator can interpose a new instruction in a logic string, thus providing the capability of adding instructions to the logic strings in the IMMP copy region. Upon entry into path 8 the IMMP enters into an INST (RPTR−1) = TCR or TCRO decision block. In this decision block the IMMP is testing to make sure that the I&MM operator is not trying to generate a space between two words of a counter/timer group. If he is attempting to generate a space between two words of a timer/counter group the program will exit through the Y branch into an error block where again location LOCC5 will be set equal to code 4. However, assuming that he is not trying to insert a space between a timer/ counter group, the program will exit into the next action block through the N branch and the A register is set equal to State F1. The program will now go to point DF20 of FIG. 51d wherein the variable STATE is set equal to the A register, thus setting STATE equal to F1. On the next first pass into the IMMP the program will branch to State F1. State F1 is the state that actually inserts the space into the application program copy.

Figure 57:
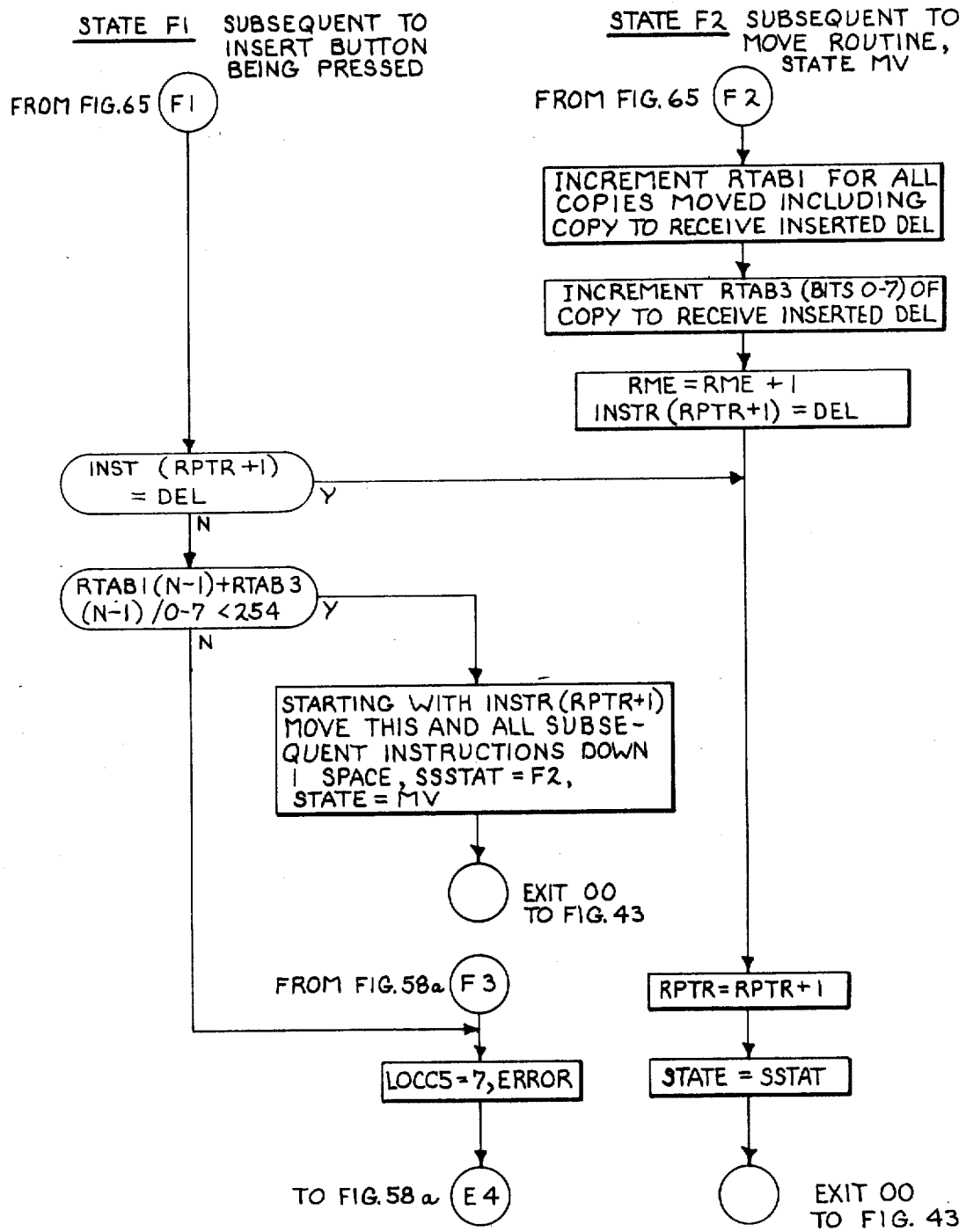

Reference is now made to FIG. 57 to State F1 which is entered from FIG. 65 the state dispatch routine. Upon entry into FIG. 57 the first decision block INST (RPTR+1) = DEL poses the question, is the instruction immediately following the current instruction a delete. That is, in logic diagram form, does a delete instruction exist immediately to the right of the current instruction, that instruction which the I&MM is pointing at. If that instruction is a delete, indicating that no modification need be done to the copy logic string, the program takes the Y branch into an action block wherein the pointer RPTR is set equal to RPTR+1, incrementing RPTR. The program now enters into the next action block wherein location STATE is set equal to SSTAT. Location SSTAT was set equal to State F upon entry into State DF as shown in FIG. 51a. It will be recalled as previously mentioned that State F is set whenever the I&MM is in the Copy Mode. Further it will be recalled that instructions can only be inserted into a logic string in the IMMP copy region when the I&MM is in the Copy Mode. Upon setting location STATE equal to State F the program will now go to Exit 00 of the exit routine of FIG. 43 returning back to the ISSP. On the next first pass into the IMMP the program will reenter back into State F of FIG. 51a whereby the operator may now insert an instruction directly on top of the delete instruction in the IMMP copy region.

Figure 66:
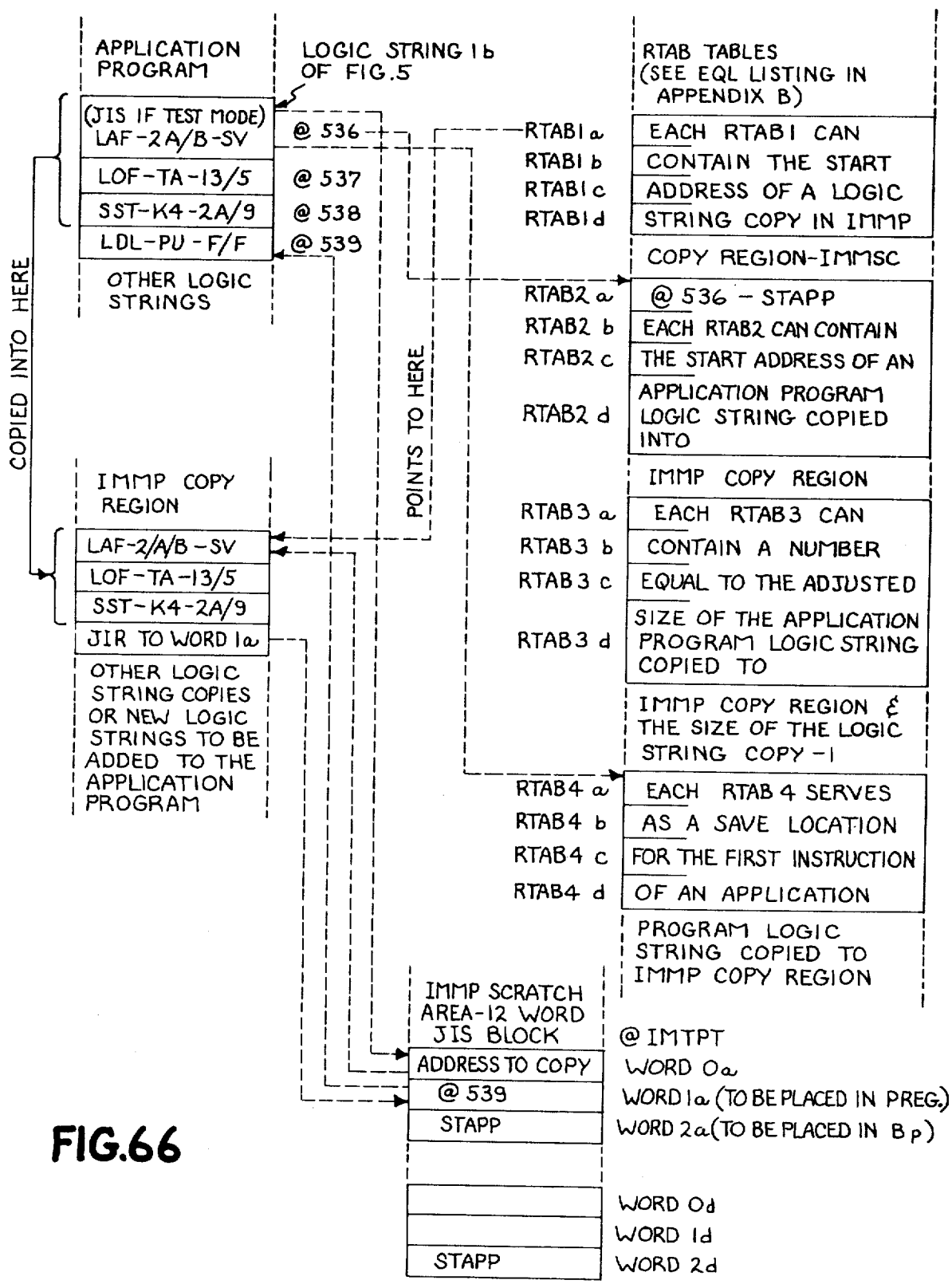

Reference is now made back to the first decision block in State F1 (FIG. 57). If the instruction immediately to the right of the current instruction is not a delete instruction a space will have to be created in the IMMP copy. In this case, the program will take the N branch entering into an RTAB1 (N − 1) + RTAB3 (N − 1)/0-7 < 254 decision block. Referring to FIG. 66 it can be seen that each of the RTAB1 words (RTAB1a − RTAB1d) can contain the start address of a logic string copy in the IMMP copy region. Also, it can be seen that each of the RTAB3 words (RTAB1a − RTAB1d) can contain the start address of a logic string copy in the IMMP copy region. Also it can be seen that each of the RTAB3 words (RTAB3a − RTAB3d) can contain a number in Bits 8 through F which defines the size of the application program logic string previously copied into the IMMP copy region and a number in Bits 0 through 7 defines the current size of a logic string. Bits 0 through 7 will be changed if the size of the particular logic string copy being worked on is changed. The test being performed in this latter decision block of FIG. 57 is to determine if there is enough room left in the IMMP copy region to add additional instructions or logic string to the application program. If there is not sufficient room to fit additional instructions or logic strings into the IMMP copy region it is an error, and the program takes the N branch into an action block wherein location LOCC5 is set equal to code 5. The program will leave this last action block entering in point E4 of FIG. 58a wherein location STATE is set equal to N1 the error state. Upon the next first pass the IMMP will enter into the error state.

If there is room to fit the additional instructions into the IMMP copy region the program will exit through the Y branch of the last mentioned decision block entering into an action block wherein various parameters are set up so that the IMMP will, starting with the current instruction plus 1 (RPTR + 1), move the instruction RPTR+1 and all subsequent instructions in the IMMP copy region down 1 space or memory location. In logic string electrical schematic terminology this would be the equivalent of moving all of the instructions in the current logic string, starting at RPTR+1, and all instructions in the logic string following current logic string, if any. Also in this latter block location SSSTAT is set equal to State F2 and the variable state STATE is set equal to state MV.

The program will now go to Exit 00 returning back to the ISSP. Upon the next first pass into the IMMP the program will enter into State MV the move routine. The move routine normally moves only a few instructions at a time, such as 20. However, it may be necessary to move a hundred or more instructions. As a result, in order to move the required number of instructions, it may be necessary to execute the move routine several times. Each execution is done on a separate first pass into the IMMP. After the move routine has completed moving all of the necessary instructions in the IMMP copy region, the program will enter into State F2 of FIG. 57. The move routine (State MV) to subsequently be described has now moved the required number of instructions in the IMMP copy region down one space. Because of this, it is now necessary to adjust the RTAB1 word corresponding to each copy moved in the IMMP copy region, with the exception of that RTAB1 word corresponding to the copy which is to receive the inserted DEL instruction. These operations are indicated in the first action block at point F2.

Further, it is necessary to increment the RTAB3 word (Bits 0 through 7) corresponding to the logic string copy which is to receive the inserted DEL instruction. This is shown where the program proceeds into the next action block. The program now proceeds into the next action block and location RME is set equal to RME+1. It will be recalled that location RME always points to the right most instruction (SST) of the current logic string. Since RME always defines the right most instruction in the current logic string copy and since all instructions in the current logic string copy have been moved down (right) one space in memory, it is necessary to increment RME by one. Additionally, in this latter action block, the current instruction plus 1 as defined by RPTR + 1 is set equal to a DEL instruction. The program now proceeds through the two subsequent action blocks as previously described and the program goes to Exit 00 returning back to the ISSP. As previously described, upon entry into the RPTR = RPTR+1 action block via the Y branch of the first block of FIG. 57, the IMMP program will be in condition to return back into State L, whereby the I&MM operator may build the desired instruction on top of the delete instruction just created.

Reference is now made back to FIG. 51e to the REMINS=0, A Reg.=10 action block. It will be recalled that this latter action block is entered when the I&MM operator desires to build either a CFV, TTU, TOU or CTU instruction when the Value light on the I&MM is on (VAL0=1). The program will proceed to point DF20 of FIG. 51d wherein the variable STATE is set equal to STATE 10. The program will then enter into the A Reg. = Q action block as previously described whereby State Q, to subsequently be described, will be executed.

After execution of State Q, the program will branch back to the ISSP in the manner as previously described. On the next first pass through the IMMP the program will enter into State 10 of FIG. 54. Entry into FIG. 54 is does when it is necessary to change a current or final value pertaining to a counter or timer. Upon entry into State 10 the program enters into a "Software check on DSPYI" decision block. In this block the program is testing to see if the value set into the BUILD thumbwheels on the I&MM is equal to or less 7999 and further to see that each of the digits set into the BUILD thumbwheels is equal to or less than a decimal number 0 through 9. If the test performed in this decision block is unsatisfactory it is considered an error and the program will exit to point DF18 of FIG. 51e where location LOCC5 is set equal to code 4 as previously described.

Assuming that the I&MM operator has dialed a proper number into the BUILD thumbwheels, the program will branch through a permissive branch entering into another decision block CFV0. In this decision block a test is performed to see if the current instruction is a CFV by testing the contents of location CFV0. If the current instruction is not a CFV, the program will exit through the N branch entering into an action block wherein the current or final value of the designated counter or timer is set equal to location DSPYI. This changes the value of the current or final value from its previous value to a newly designated value as specified by DSPYI (the thumbwheel switches). The program now proceeds into the next action block and location STATE is set equal to SSTAT which now contains State F. The program will now go to Exit of FIG. 65 of the state dispatch table turning back to the ISSP via the exit routine as previously described.

Reference is now made back to the CFV0 decision block of FIG. 54. If the current instruction is a CFV, the program will exit through a Y branch into an ADD (RPTR)>OTST decision block. Referring to FIG. 2 it can be seen that a test is being performed in the latter decision block to see if the operand of the current instruction is pointing to the input region or to some location higher in memory (i.e. physically below the input region in FIG. 2). If the operand, as specified by RPTR, is confined to the input region it is only necessary to change the current or final value in the input region. In this case the program will exit through the N branch entering into a previously described action block wherein the current or final value is set equal to the DSPYI. However, if the instruction is not confined to the input reqion, then RPTR must be pointing to the timer/counter region (final values).

It will be recalled from the previous description of the initialization and Two-Pass Forcing routine that various permanent constants were copied from the permanent constants for ISSP region into the timer/counter final value region. These final values reside presently in both of the last mentioned regions. As a result, if a final value is changed in the timer/counter region the corresponding final value must also be changed in the permanent constants for ISSP region. In some data processors the permanent constants may reside in a portion of memory which is a read only memory, thus a test must be performed to see if that permanent constants portion of the memory is a read only memory. The program will thus branch through the Y branch of the ADD (RPTR)>OTST decision block of FIG. 54 into the next decision block. In this decision block a test is performed to see if the permanent constants portion for the ISSP is in a read only portion of memory as indicated by ROM'd in that decision block. In the latter decision block and in the decision block immediately preceding that, ADD indicates that ADD is the operand of the current instruction being displayed. If the permanent constants portion of memory is ROM'd the program exits through a Y branch indicating an error wherein location LOCC5 is set equal to code 2. The program will now proceed and location STATE is set equal to N1 the error state and exit through the state dispatch back to the ISSP.

Assuming that the permanent constant region of memory is not ROM'd, the program will exit through an N branch into the next action block. In this latter action block the IMMP changes the final value in the permanent constants for ISSP region of memory. The program now continues into the next action block wherein the final value (current or final value) is now set equal to DSPYI in the timer/counter region (final values). As previously described, the program will now enter into the next action block and location STATE is set equal to State F and the program will exit through the state dispatch table back to the ISSP.

Reference is now made to FIG. 51c. Referring to the decision block BSTORI of that figure, if the I&MM operator has pressed the Copy Storage button, indicating that he desires to clear the IMMP copy region, the program will exit through the Y branch into the test block TESTO=1. Assuming that the I&MM is not in the Test Mode, the program will then proceed through the N branch into a BUILO=1 decision block. In that decision block a test is performed to see if the I&MM is in the Copy Mode. If it is not in the Copy Mode the I&MM must be in the Logic Display Mode. Thus, the program will exit through the N branch wherein the A register is set equal to State A2. The program will now proceed to point DF20 of FIG. 51d wherein location STATE is set equal to State A2 (the contents of the A register). The program will now proceed and the A register is set equal to Q and the program branches directly to State Q through the state dispatch table. State Q will subsequently be described.

After the execution of State Q the program will then branch back to the ISSP. On the next first pass entry into the IMMP the program will now branch directly to State A2 of FIG. 59. Reference is now made to FIG. 59 with the program entering into an action block wherein the IMMP clears out specified locations in the power security block. The power security block will not be discussed in detail since it does not comprise any portion of the invention disclosed herein. The program now proceeds into another test block TESTO=1. If the I&MM is not in the Test Mode the program will proceed through the N branch into the next action block and location X5 is set equal to 3 for decrementing to 0 in order to set RIAB2 based on the contents of X5 equal to a minus 1. In essence, in this latter action block, the program goes into a loop and initializes or resets the RTAB2 table (all four RTAB2 words) to a minus 1 which indicates to the I&MM that there are no copies existing in the IMMP copy region. This has the effect of actually going through the IMMP copy region and completely erasing each of the copies in that region. Initializing the RTAB2 table it saves a great deal of time in program execution. Also in this latter action block location N is set equal to 0, location SZZ is set equal to 0 and Bit D is cleared.

Location N contains the number of copies which exist in the IMMP copy region and location SZZ contains a running total of the number of instructions added to the logic strings copied into the IMMP copy region. Bit D is utilized to normally indicate that a current copy of a logic string exists in the IMMP copy region. The program will now proceed to the last action block of FIG. 59, and as previously described, the output words PO and PO+1 are cleared and Bit 8 is cleared. The program now proceeds to point E3 of FIG. 58b into an action block and location STATE is set equal to SSTAT, which now contains State D. The program will now exit through the exit routine back to the ISSP where upon the next first pass through the IMMP State D, the logic display state, will be entered.

Reference is now made back to FIG. 51c. In the bottom righthand corner of that figure, if the I&MM is in the Copy Mode (BUILO=1) the program will take the Y branch into an action block wherein SSTAT is equal to State D6 and the program proceeds to set the A register equal to State A2. The IMMP will now run State A2 as just described. After State A2 has run the program will reenter into point E3 of FIG. 58b wherein location STATE, at this time, will be set equal to the contents of location SSTAT which is State D6. Thus, the program will exit back to the ISSP and upon the next first pass entry into the IMMP the program will branch directly to State D6 of FIG. 50.

Upon entry into State D6 of FIG. 50 location DPTR, the application program pointer, is set equal to location DE, which contains the address of the right most instruction of the current logic string. The program then proceeds into the next action block wherein location LOC is set equal to 0, Bit E is cleared and location STATE is set equal to State D. Now, the program will exit back to the ISSP, and on the next first pass entry into the IMMP the program will branch to State D, the logic display state. The purpose of State D6 is to cause the IMMP to return the I&MM back to the Logic Display Mode from the Copy Mode.

Referring again back to FIG. 51c, State D6 is also entered from that figure by referring to the LDPYLI decision block in the left-hand bottom corner of FIG. 51c. If the I&MM operator has depressed the Logic Display button, the program will proceed through the Y branch into the PBI = PBI2 decision block. If PBI and PBI2 are equal, indicating that the I&MM operator has not changed the PLACE thumbwheels, the program will exit through the Y branch into the BUILO = 1 decision block. If the I&MM is in the Copy Mode (State F) the program will exit through the Y branch and the A register is set equal to State D6. The program will now proceed to FIG. 51d to point DF20 whereby location STATE is set equal to State D6. The program will now proceed to State Q for execution as previously described. Upon the next first pass back into the IMMP the program will go to State D6. It can now be seen that when State D6 is entered from FIG. 51c the I&MM always makes a transition from the Copy Mode back to the Logic Display Mode.

The operation of State Q of FIG. 53 will now be described. However prior to proceeding with a detailed description of that State it is considered advantageous to briefly describe the purpose of its existence in the IMMP. It will be recalled from the previous description that an application program can have several SST instructions, each of which references the same status bit location in memory, such as a status bit in the output region or the intermediate region. When displaying a given logic string, in order to determine the effects of that logic string on the status bit referred to by the SST instruction of that logic string, it is necessary to record the status of that referenced bit immediately following the execution of that logic string. If this were not done a logic string further downstream in the application program, when executed, could modify that status bit, thus resulting in an erroneous display of that status bit on the I&MM (i.e., for the current logic string). Basically this recording of the referenced status bit is accomplished by storing the SST instruction terminating the current logic string in a predetermined location. A branch instruction is placed into the application program over the previously stored SST instruction. This branch instruction effects a branch out of the application program while it is running. This branch effectively causes the SST instruction to be executed in its stored location. After execution of the SST instruction the IMMP is again entered which effects a branch to a State PA. State PA is an IMP subroutine which records the state of the status bit referenced by the SST instruction for display on the I&MM. After execution of State PA, that state will cause the IMMP to branch directly back to the application program to the branch instruction. location plus 1, thus picking up the next instruction in the application program for execution.

Figure 67:
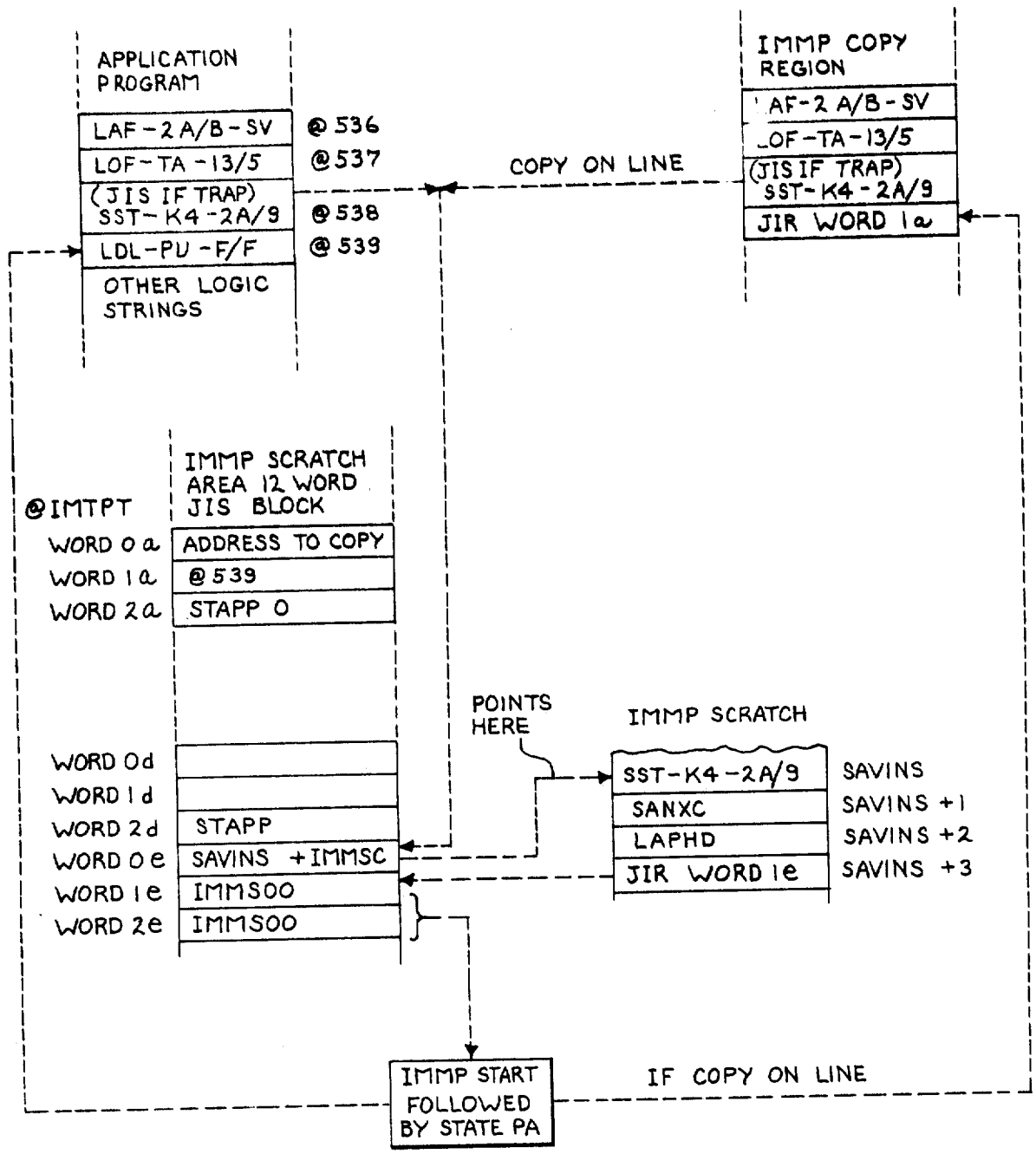

Reference is made to FIG. 67 which shows basically the flow of program control for controlling the previously described operation. FIG. 67 shows two basic examples of how State Q, after its execution, has placed a trap or a branch instruction into the application program or into a logic string in the IMMP copy region and where it has stored the SST instruction of the current logic string. Let it be assumed that the I&MM operator is presently displaying an application program logic string. When the I&MM operator presses the Logic Display button, placing the I&MM in Logic Display Mode, State Q is entered and a JIS instruction (JIS if trap) is placed in location @ 538 and the SST instruction from that location is stored in location SAVINS, thus saving the SST instruction. The JIS instruction at @538 points to word Oe which is a continuation of the 12 word JIS block. The contents of word Oe is a pointer to location SAVINS + IMMSC, the latter being the base address of the IMMP scratch area. As can be seen, this address is to location SAVINS shown by the dotted arrow line. Thus, as the application program is executed, when the JIS instruction is encountered at @538 the program will branch through word Oe to the SST instruction and the instruction is executed in location SAVINS.

The first instruction in the IMMP scratch area following location SAVINS (SAVINS+1) is utilized to store the contents of the A register to location XC. Location SAVINS + 2 contains a constant LAPHD which, when executed as an instruction, has the effect of loading the A register with the contents of location IMINFO. The program then proceeds to location SAVINS + 3 wherein a JIR instruction to word 1e is executed causing the program to branch through that location to IMMSOO, the IMMP start location. It will be recalled from the previous description of the JIR instruction that that instruction will store the contents of word 1e in the P counter and the contents of word 2e in the procedure base register. As previously, after the IMMP is entered it effects a branch to State PA. State PA will then cause a branch back to the application program to @ 539. Thus, it can be seen that the application program continues to be executed from the point where it left off.

Reference is now made to the IMMP copy region portion of FIG. 67. If the copy of the application program logic string has previously been placed in the IMMP copy region, and if that copy is being executed on-line as a part of the application program, the trap instruction (JIS) will be placed over the top of the SST instruction in the IMMP copy region. Thus, when the application program branches to the IMMP to execute that logic string copy, the JIS trap instruction will be encountered, causing a branch to word Oe as just described for the application program. The flow of control information when the trap is placed in the IMMP copy region is the same as that just described for the application program, with the exception that State PA effects a branch back to the instruction JIR word 1a in the IMMP copy region. This latter instruction will effect a branch to word 1a which causes a return back to @ 539 in the application program as previously described in connection with FIG. 66.

Reference is now made to FIGS. 51d and 53. State Q of FIG. 53 is entered from FIG. 51d via the state dispatch table As shown by the note on FIG. 53, State Q is a trap placing and removing state, indicating that the trap will be placed on one entry into State Q and removed upon the next entry (i.e. if Bit 01 is set). If Bit 01 is not set, the trap will be placed or set. Whenever State DF enters into point DF20 of FIG. 51d the trap will be removed in State Q. The only time that the trap can be placed in State Q is when the program is entered at point DF10. From that point a test is performed to see if the trap is in position by testing the contents of Bit 01 to see if it is set. Obviously upon the first pass into the IMMP the trap (Bit 01) will not be set or in position. Thus, the program will enter into the A Reg. = Q action block and the program will branch through the state dispatch table directly to State Q.

Referring now to FIG. 53, the first operation to take place upon entry into that figure is a test to see if the memory is ROM'd. A subroutine called ROMSUB can be found in the IMMP listings of Appendix B. This subroutine does not form any part of the present invention, thus it is not shown in flow chart form and will not be described herein. However if the memory is a read only memory (ROM'd), the program would exit through Y branch setting location LOCC5 equal to code 2 which is an error. The program would thus proceed into the next action block wherein a JIR X6 instruction is placed in the IMMP scratch location SAVINS + 1 (FIG. 67). This JIR instruction will effect a branch of the program, after execution of the SST instruction stored during the placement of a previous trap, back to the proper point in the application program (that is to the instruction immmediately following the SST instruction previously overwritten in either the application program or the IMMP copy region (e.g., to @ 539). The program now proceeds into an action block where location STATE is set equal to N1 and the program goes to Exit 00 of FIG. 43 and back to the ISSP as previously described.

If the memory is not ROM'd the program will exit through the N branch into a decision block Is trap in Position, Bit 01 set. If Bit 01 is not set, which will not be on the first time into State Q. an exit will be made through the N branch and Bit 01 will be set, thus indicating that it is proper to place the trap is either the application program or in the copy in the IMMP copy region. The program now enters into an LDPLYO=1 decision block. The remaining coding subsequent to this last decision block determines whether the trap instruction (JIS) is to be placed in the application program or in the copy logic string.

In the LDPLYO=1 decision block, if the I&MM is not in the Logic Display Mode, then it must be in the Copy Mode, thus the program will exit through the N branch into a TESTO+1 decision block. In this decision block, if the I&MM is not in the Test Mode, it indicates that the logic string being executed is in the application program, even though the I&MM is displaying a copy logic string. If it is not in the Test Mode, the program will exit through the N branch and the A register is set equal to 0. The program then proceeds into the next action block.

If the decision in the LDPLY0=1 decision block is positive, indicating that the I&MM is in the Logic Display Mode, the program will exit through the Y branch into a Bit D set (copy exists) decision block. If Bit D is not set, indicating that a copy does not exist, the program will take the N branch entering into an action block wherein the A register is set equal to location LOC. LOC at this time must be 0, because the I&MM is displaying an application program logic string. However, if Bit D is set, indicating that a copy does exist in the IMMP copy region, the program will take the Y branch entering into a TESTO=1 decision block. Again a test is being performed to see if a copy is on-line. If the I&MM is not in the Test Mode, it indicates that a copy is not on-line and that the I&MM is displaying a logic string in the application program. If the test is negative the program will exit through the N branch and the A register is set equal to LOC. Location LOC will be equal to 0 at this time.

If the I&MM is in the Test Mode it indicates that a copy is on-line and that the I&MM is present displaying at an application program logic string. If TESTO is a 1, the program will exit through the Y branch entering into an action block wherein the A register is set equal to 1. The program will now enter into the bottom action block of FIG. 53.

Reference is now made to the TESTO=1 decision block in the left part of FIG. 53. In that decision block if the I&MM is in Test Mode it indicates that a copy is on-line and that the I&MM is displaying that copy. Assuming this to be the case, the program will take the Y branch entering into the A Reg. = LOC action block. In this particular instance, since the I&MM is displaying a copy, LOC will be equal to a 1. Upon entry into the second to last action block at the bottom of FIG. 53, the A register will contain a 0 if the trap is to be placed in the application program or it will contain a 1 if the trap is to be placed in the IMMP copy region (i.e. in the logic string copy). As indicated in this latter action block, the trap is now placed in the proper place in either the application program or in the IMMP copy and the power security block is set to indicate the presence of the trap. Also, the pointer to the IMMP copy region or to the application program is formed at this time. The program now proceeds into the final action block at the bottom of FIG. 53 wherein location STATE is set equal to State PA and the program goes to Exit 00 returning back to the ISSP.

Upon the next first pass entry into the IMMP, the program reenters back into IMMP start at FIG. 41 whereby the program proceeds down through the N branches of the first two decision blocks entering into a State = PA (come from trap) decision block. The IMMP is now in State PA and the program exits from that decision block into an action block wherein the A register is set equal to State PA. The program now will branch directly to State PA through the state dispatch table. State PA will subsequently be described after the description of State Q.

Reference is now made back to FIG. 53. When the trap is in position upon entry into State Q, the program takes the Y branch of the Is Trap in Position, Bit 0 set decision block entering into an action block wherein Bit 01 is now cleared. Clearing Bit 01 indicates that the trap is to be removed. The program now enters into an action block wherein the trap is now removed from either the application program or the copy region by restoring the SST instruction from location SAVINS. The power security block is also reset in this action block. The program now goes to Exit 00 through FIG. 43 returning back to the ISSP as previously described.

Figure 52:
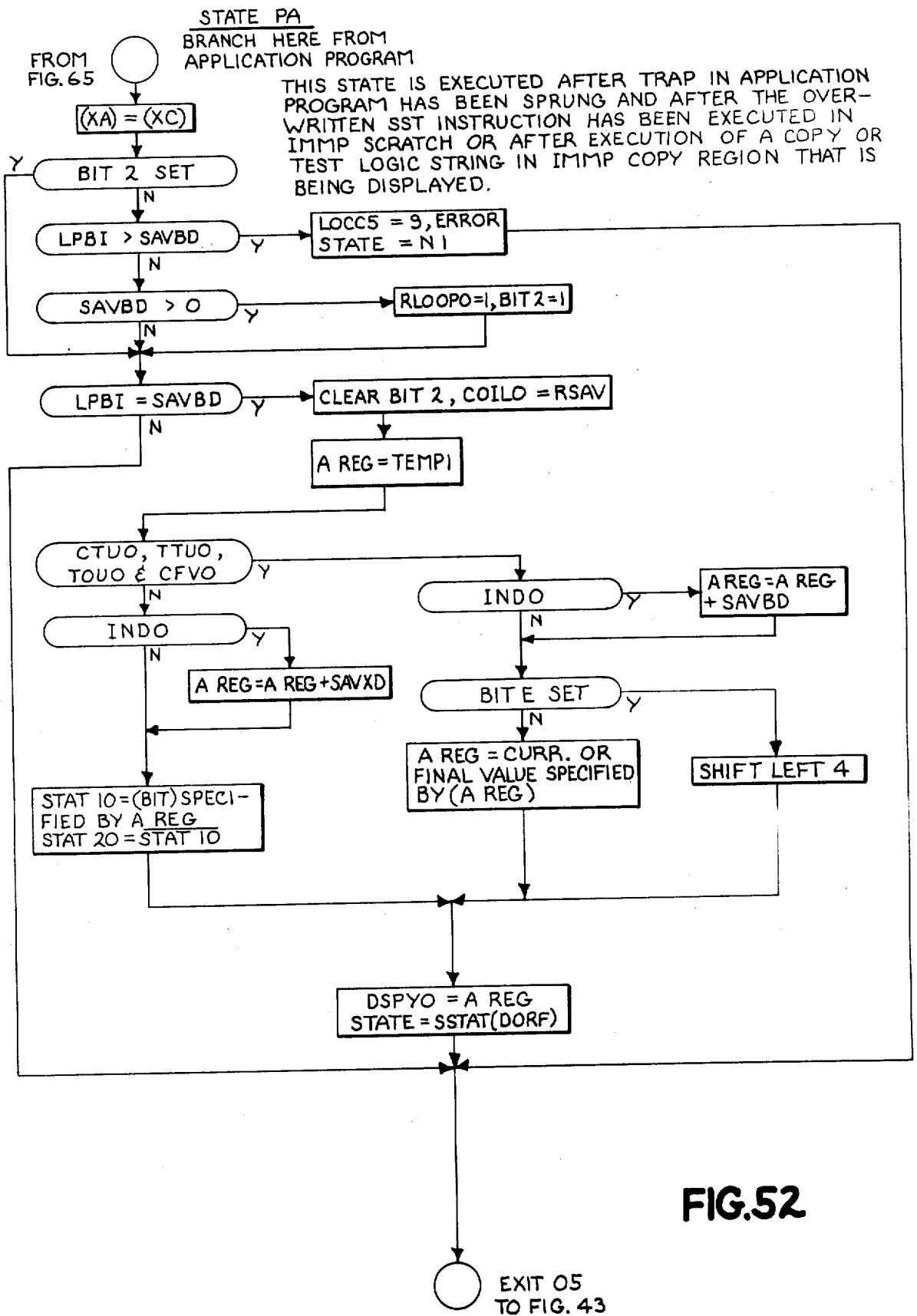

Reference is now made to State PA of FIG. 52. State PA is always executed after the proper JIS (trap) instruction has been executed (i.e., sprung) in either the application program or in the IMMP copy region. On entry into State PA, in the first action block, location XA is set equal to the contents of XC. The contents of XA are now equal to the contents of the A register before the trap was sprung. This is for restoring proper data into the A register upon return back to the application program.

The program now proceeds into the next decision block where a test is performed to see if Bit 2 is set. The purpose of Bit 2 is to determined whether the current instruction resides in a repeated loop. That is, is that instruction indexed or is it in a normal logic string not in a repeated loop. Upon first entry into State PA, Bit 2 will be in the reset state thus, the program will take the N branch entering into a LPBI>SAVBD decision block. Location SAVBD is a location for the save data base which is saved during the Initialization and Two-Pass Forcing routine when that routine is entered from trap. The save data base, SAVBD, is a measure of which repeated loop logic string drive the I&MM operator is interested in displaying. In this second decision block, if location LPBI, which corresponds to the Repeated Loop thumbwheel on the I&MM, contains a number greater than the contents of location SAVBD, it indicates that the I&MM operator has specified a non-existent drive to the IMMP. If this is the case, it is as an error and the program takes the Y branch entering into an action block wherein location LOCC5 is set equal to code 9. Also, STATE is set equal to State N1. The program will exit from this action block to Exit 05 of FIG. 43 returning back to the ISSP.

If the I&MM operator has specified in the Repeated Loop thumbwheel an existing drive in the application program, whether that drive be in a repeated loop or in a non-repeated loop, the program will exit through the N branch into an SAVBD>0 decision block. In this block a test is being performed to see if location SAVBD is greater than 0. If the contents of SAVBD are greater than 0, the program takes the Y branch entering into an action block wherein the Repeated Loop light is turned on by setting location RLOOPO=1. Also, Bit 2 is set to a 1. The program will now proceed into the next decision block LPBI=SAVBD. This decision block also is entered from the SAVBD>0 decision block if the question in that block is negative. Exiting the SAVBD>0 decision block through the N branch indicates that the current instruction is not in a repeated loop (i.e., it is a non-indexed instruction). The LPBI=SAVBD decision is also entered through the Y branch of the Bit 2 set decision block. Bit 2 will be set after the first time through State PA, bypassing the flowchart portions heretofore described.

If LPBI is not equal to SAVBD, it indicates that the IMMP has not located the desired drive and the program will take the N branch to Exit 05 of the exit routine. The program will branch from the exit routine back to the application program whereby the latter program will continue to execute from the point where it left off when the trap was sprung. If the trap was placed in the IMMP copy region the branch will be to the JIR to word 1a location will effect the branch back to the application program (see FIG. 67).

If LPBI is equal to SAVBD the program takes the Y branch into an action block wherein Bit 2 will be cleared and the Coil State light on the I&MM will be turned on or off in accordance with the state of location COILO which is set equal to location RSAV. Location RSAV is always set to the state of the R Bit in the Initialization and Two-Pass Forcing routine when the various registers are saved.

The program now proceeds into the next action block wherein the A register is set equal to location TEMP1. TEMP1 contains the operand of the current instruction being displayed on the I&MM. The program now proceeds into a CTUO, TTUO, TOUO, CFVO decision block. If the current instruction is a counter/timer instruction the program takes the Y branch entering into an INDO decision block. In that decision block a test is performed to see if the instruction is indexed. If the instruction is indexed the program proceeds through the Y branch into an action block where the A register is set equal to the A register plus location SAVBD, the save data base. This puts an address in the A register for displaying an instruction in a timer/counter group. The program now proceeds into a Bit E set decision block. In the "INDO" block, if the instruction is not indexed, the program proceeds through the N branch into the Bit E set decision block.

If Bit E is set it indicates that the I&MM operator desires to display the address of the timer/counter instruction. If this is the case, the program takes the Y branch entering into an action block wherein the A register is shifted left by four to left justify the address in the A register so that the address displayed on the I&MM will be a word address and not a bit address as is normally done in logic operator type instructions. If Bit E is not set, it indicates that the I&MM operator desired to display the value of a location referenced by the timer/counter instruction, that value being either the current or final value. If this be the case, the program proceeds from the N branch of the Bit E set decision block into an action block and the A register is set equal to the current or final value specified by the contents of the A register. Also in this action block Bit F of the A register is masked out. Bit F does not form part of a current or final value.

The program will now proceed from the latter action block, or from the Shift Left 4 action block into a DSPYO=A Reg., STATE=SSTAT (D or F) action block. In the present instance location DSPYO is now set equal to either the current or final value or to the effective address of the timer/counter instruction. Thus, the information in location DSPYO will be displayed on the I&MM when DSPYO is transferred to the I&MM during the exit routine. Location STATE is also set equal to location SSTAT at this time. The state will be either State D or F, depending upon whether State PA was entered from State D, the Logic Display state, or from State F, The Copy Mode state. The program will now exit through FIG. 43 back to the application program as previously described.

Still referring to FIG. 52, let it be assumed that the current instruction is not a timer/counter instruction as tested in the CTUO, TTUO, TOUO, CFVO block. As such, the program will then branch into the INDO decision. If the current instruction is indexed the program takes the Y branch into an action block wherein the A register is set equal to the A register plug location SAVXD. This operation indexes the operand of the current instruction, whereby the proper bit in the instruction to be displayed will be accessed. The program now proceeds into the next action block and the Close and Open lights are set appropriately by setting location STAT10 equal to the contents of the bit specified by the A register and setting location STAT20 equal to the compliment of location STAT10. The Close and Open lights will now be turned on or off appropriately during the exit routine. The program now proceeds into the previously described action block wherein DSPYO is set equal to the A register. In this particular instance, location DSPYO is set equal to the bit address of the instruction to be displayed on the I&MM. The program will now proceed as previously described to Exit 05 and then to the ISSP.

State E of FIG. 58 (FIGS. 58a and 58b) will now be described. In connection with FIG. 58b, reference is also made to FIG. 51d. It will be recalled in FIG. 51d, as shown at the top of that figure, that the A register was set equal to State E when it was detected that the I&MM operator had depressed the Copy Mode pushbutton by testing the state of location BUILI. This indicates to the IMMP that the I&MM operator desires to make a copy of the logic string (i.e. to copy a logic string from the application program into the IMMP copy region). If a previously made copy already exists in the IMMP copy region, the IMMP will also take this same route and the A register will be set equal to State E. As previously described, the program will proceed to point DF20 of FIG. 51d wherein location STATE is set equal to State E. The program will then branch directly to State Q, and the trap will be removed from either the application program of from the copy as previously described. After the execution of State Q the program exits directly back to the ISSP, leaving location STATE equal to STATE E. Thus, upon the next first pass into the IMMP, the program will branch to State E of FIG. 58 a entering into a Bit D set decision block. When Bit D is set it indicates that a copy of the current application program logic string exists in the IMMP copy region. If Bit D is set the Y branch is taken into an action block wherein location RMB is set equal to RTAB1 indexed by the contents of location I. I in this action block indicates an index which specifies the proper RTAB1 word of the four RTAB1 words shown in FIG. 66. The designation (I) will be used throughout the explanation of FIG. 58 to specify the proper RTAB word in a table corresponding to the RTAB table. Additionally, in this latter action block, location RME is set equal to RMB+ Bits 0 through 7 of RTAB3 (I). RMB now contains the address of the left most instruction of the copy logic string and location RME contains the address of the right most instruction of the copy logic string.

The program now proceeds to an action block at point E2 of FIG. 58b. In this latter action block location RPTR is set equal to DPTR, the application program pointer, minus DB, the left most address of the current application program logic string, plus RMB, the left most address of the copy logic string. RPTR now contains an address which is a pointer to the current instruction of the logic string copy. The program also sets location SSTAT equal to State F, location LOC equal to 1, clears Bit E, sets Bit D and sets BUILO equal to 1. The program now proceeds into the last action block of FIG. 58b wherein location STATE is set equal to State F, the contents of location SSTAT. Thus, upon the next first pass into the IMMP a branch will be made to State F, the Copy Mode state of FIG. 51a.

Referring to FIG. 51a, the program will enter into State DF (actually in State F) whereby the program will proceed down the left side of the figure exiting to point DF8 in FIG. 51b. The program will proceed down the left-hand side of FIG. 51b turning the Left and Right lights on appropriately and going to point DF1 of FIG. 51c. Subroutine FUNCTO will again run and the program will return back to FIG. 51c proceeding through that flow chart and going to point DF15, entering into the decision block BSTORI as shown in FIG. 51c. The results of the BSTORI test at this time will be negative, thus the program will proceed to point DF9 of FIG. 51d. The decision block at the top of FIG. 51d tests to see if the Copy light at location BUILI is equal to 1. At this time the I&MM is in the Copy Mode, thus the program will take the Y branch entering into the TESTO=1 decision block.

At this time the I&MM is not in the Test Mode, thus the program will proceed down the left of FIG. 51d into the Bit Set and Input Words CI, 0-CI, C decision block. At this time there will be no bits set in the input word, thus the program will take the N branch to point DF5 of FIG. 51f. In FIG. 51f the first test performed is to see if the I&MM operator has pressed the Delete pushbutton. Since he has not pressed it at this time, the program will proceed to the N branch to point DF17 of FIG. 51f entering into a decision block wherein a test is performed to see if the current instruction is in a repeated loop.

From this latter decision block, assuming that no error exists, the program will eventually exit through point DF10 entering into FIG. 51d into the Trap in Position, Bit 01 set decision block. Since the trap has been removed, the program will enter into the A Reg. = P action block. The program will now proceed as previously described to State Q and the trap will be set.

At this point State E has now located the existing copy in the IMMP copy region, the trap has been removed from the application program and then placed back into the same location in the application program. The I&MM operator has now confirmed that a copy of the current logic string in the application program does exist in the IMMP copy region. The logic string copy is present being displayed on the I&MM, however that copy is not being executed as a part of the application program. All indications on the I&MM at this time pertain to indications representing the logic string copy, with the exception of the Coil State light and the Open and Close lights. The Coil State light at this time will show the state of the relay coil (SST instruction) of the current logic string and the Open and Close lights will show the status of the bit referenced by that SST instruction if the SST instruction is being displayed.

The reason for displaying the application program logic string and the copy logic string in this fashion is because the operator may desire to press the Test button, at which time the trap would be directed to the IMMP copy, thus causing that copy to execute on-line in place of the application program logic string. When the Test button is pressed, the Coil State light and the Open and Close lights would not reflect the status of the SST instruction of the copy logic string. In this manner the I&MM operator can compare the operation of the application program logic string with the copy logic string. The latter logic string would most likely have been modified prior to this comparison.

Reference is now made back to FIG. 58b. Assume that State E has just been entered as previously described. If Bit D is not set it indicates that the I&MM operator desires to make a copy of the current application program logic string and that a copy of that current logic string does not exist. Thus, the program will take the N branch into a TESTO=1 decision block. It is considered illegal to make a copy if the I&MM is in the Test Mode. If this be the case, the program will take the Y branch and location LOCC5 is set equal to code 5. The program will proceed into the subsequent action block wherein location STATE is set equal to State N1. The program now goes to Exit 00 returning back to the ISSP as previously described.

If the I&MM is not in the Test Mode, the program will proceed through the N branch of the TESTO=1 block into the next decision block N<4. If N is greater than or equal to 4, indicating that the I&MM operator is attempting to build more copies into the IMMP region than it is capable of retaning, the program will take the N branch to point F3 of FIG. 57 entering into an action block wherein an error is set by setting location LOCC5 equal to code 7. From this latter action block the program will proceed back to FIG. 58a to point E4 wherein location STATE is set equal to State N1. The program will then go to Exit 00 for return back to the ISSP.

Referring now to FIG. 58a, let it now be assumed that N is less than 4. This signifies that the I&MM operator can transfer a copy of a logic string from the application program into the IMMP copy region. With this latter assumption the program will now take the Y branch entering into an action block and location LOCC1 is set equal to I. Location I is also set equal to N, the total number of logic string copies now residing in the IMMP copy region. Location N is set equal to N+1 and the program enters into a decision block N=1. If N is equal to 1 it indicates that this is the first copy that the I&MM operator is going to copy into the IMMP copy region. Thus, the first logic string copy can be placed directly at the beginning of the IMMP copy region. The program, taking the Y branch, enters into an action block wherein location TEMP1 is set equal to location BEGRAM. BEGRAM contains the pointer address to the beginning of the IMMP copy region. This location can be seen in the IMMP memory map as shown in FIG. 30.

The program now proceeds into a decision block (DE − DB) + TEMP1<254. In this decision block the IMMP is testing to see if the difference between the left and right most boundaries plus location TEMP1 are less than 254. This test tells the I&MM operator whether he has room to insert a new copy into the IMMP copy region. If he does not, the program will exit through the N branch into an action block wherein location N is set equal to N minus 1, thus returning N back to its original setting, and location I is set equal to LOCCI, returning I back to its original setting. The program will now proceed to FIG. 57 to point F3 and location LOCC5 is set equal to error code 7. From this latter action block the program will proceed to point E4 of FIG. 58a wherein location STATE is set equal to N1 and an exit is made back to the ISSP as previously described.

Reference is now made back to the N=1 decision block of FIG. 58a. In this decision block, if one or more logic string copies exist in the IMMP copy region, the program will take the N branch into the next action block and location TEMP1 is now set equal to RTAB1 (I-0) indexed by the value of I minus 1, plus Bits 0–7 of RTAB3 (I−1) plus 2. This entire addition which is placed in TEMP1 is utilized to establish whether there is sufficient room in the IMMP copy region to receive the current logic string. The test to see if there is sufficient room is performed in the succeeding decision block as previously described. Assuming that there is room in the IMMP copy region to receive the logic string from the application program, the Y branch is taken into the next action block wherein RTAB1 (I) is set equal to location TEMP1. Location RTAB1 (I) now contains the address of where the first instruction of the application program logic string will be copied into the IMMP copy region.

The program now proceeds into the bottom action block of FIG. 58a and location RMB, the pointer for the left most instruction of the copy logic string set equal to RTAB1 (I). RTAB2 (I) is set equal to the address of the first instruction in the current application program logic string as specified by DB. RTAB4 (I) is set equal to the contents of DB. Also this same instruction is stored in the power security block at PRSEC (+5). Location RTAB3 (I) is set equal to DE-DB, the number of instructions minus 1 in the current application program logic string. Location RME, the pointer for the right most instruction of the current copy logic string, is set equal to RTAB3 (I) + RMB. Also in this block the application program logic string is copied to the IMMP copy region to the location specified by the appropriate RTAB table. Additionally, the left eight most significant bits (Bits 8 through F) of the RTAB3 (I) table are set equal to the number of non-delete (non-DEL's) instructions in the application program logic string. The reason for this is, because delete instructions may exist in the application program logic string. These instructions would take up additional space in the IMMP copy region if they were transferred into that latter region. Thus, RTAB3 is adjusted to reflect the true number of instructions in the application program logic string minus the number of delete instructions so that these delete instructions will not be transferred into the copy region.

The program now proceeds to point E1 of FIG. 58b. In that action block (point D1) a JIR instruction is inserted after the last SST instruction of the logic string just copied into the IMMP copy region. The location of this instruction is shown in the example of FIG. 56 as the instruction JIR to work 1a. Additionally at this time, the appropriate words are formed for placement in word positions 1a and 2a as shown in FIG. 66. This is accomplished by the appropriate one of the words 1a, 1b, 1c, or 1d (1 word for each copy) being set equal to DE, the right most instruction of the current application program logic string + 1 + STAPP, the start of the application program.

It can be seen in FIG. 66, Word 1a, in that example, contains the @ 539. When the JIR instruction to word 1a is executed in the IMMP copy region, that instruction will branch through word 1a to address @ 539, thus returning the program back to the application program where it left off, after the execution of the logic string copy in the IMMP copy region. Also in the first action block of FIG. 58b the appropriate one of the words 2a, 2b, 2c, or 2d is set equal to STAPP. This can also be seen by referring to FIG. 66 wherein words 2a and 2d are set equal to STAPP. In the example of FIG. 66, when the JIR instruction to Word 1a is executed, the contents of word 1a are placed in the P register and the contents of word 2a (STAPP) are placed in the procedure base register. The program now proceeds into the next action block of FIG. 58b wherein the actions are as previously described. The program will now set STATE equal to State F (the contents of SSTAT) and the program will branch back to the ISSP as previously described.

The operation of State G (FIG. 60) will now be described. However, prior to going into a detailed description of State G reference is first made to FIGS. 51a and 51c. State G is entered whenever the I&MM operator presses either the Test button or turns the Enter key switch on the I&MM. Referring to FIG. 51a, it can be seen that, if the Enter key switch has been operated, the program will take the Y branch of the ENTRI decision block, thus entering into an action block where Bit 0 is set. The program then proceeds to point DF16 of FIG. 51c and the A register is set equal to State G. It can also be seen in FIG. 51c that another input to the A Reg. = G action block is from the Y branch of a TESTI decision block. In this decision block, if the I&MM operator has operated the Test pushbutton, the program will also set the A register equal to State G. The program will then proceed to point DF20 of FIG. 51d wherein location STATE is set equal to State G. The program will then proceed to State Q, the trap will be removed, and the IMMP will then branch back to the ISSP as previously described. Upon the next first pass entry into the IMMP, the program will branch through the state dispatch table entering into State G of FIG. 60.

A similar test is performed upon the first entry into State G, as previously described, to see if the memory is ROM'd at location STAPP or ENAPP. If that memory is ROM'd, it cannot be written into, thus the program will exit as an error to point Q4 of FIG. 53. In FIG. 53 location LOCC5 is set equal to code 2 and the program proceeds to set STATE equal to State N1 and exit back to the ISSP as previously described. Assuming that the memory is not ROM'd, the program will proceed through the N branch into a Bit 0 set decision block. It will be recalled that Bit 0 is set whenever the Enter key switch is operated. Let it be assumed however that the Enter key switch has not been operated, but the Test button has been pressed instead. Thus, the program will exit through the N branch entering into a N=0 decision block. In this decision block a test is being performed to see if any copies exist in the IMMP copy region. If no copies exist it indicates that the I&MM operator has operated the Enter switch in error, thus the program will exit to point E8 of FIG. 58a wherein the program will display an error by setting STATE equal to State N1 as previously described.

Let it now be assumed that copies do exist in the IMMP copy region. As a result, the program will take the N branch entering into the next decision block TESTO = 1. Let it be assumed that the I&MM Test light, as specified by location TESTO, is not on at this time. This indicates that the I&MM operator has just pressed the Test button but the I&MM has not yet gone into the Test Mode. Thus, the program will exit through the N branch entering into an action block and location X5 is set equal to N minus 1 and location LOCC2 is set equal to X5. The program then proceeds into the next action block wherein location X7 is set equal to RTAB1 (X5) plus IMMSC. Location X6 is set equal to RTAB2 (X5) plus STAPP and power security block is set. Location X7 now contains the starting address of the last application program copy in the IMMP region. Location X6 now contains the starting address of the application program logic string corresponding to that copy logic string in the application program.

The program now proceeds to the next action block wherein location X7 is stored to the appropriate one of the words in the 12 word JIS block (word 0a, 0b, 0c, or 0d). The address now in one of the words 0a through 0d will cause the JIS instruction inserted into the application program logic string to branch through the 12 word JIS block to the logic string copy corresponding to the application program copy. The program now proceeds into the next action block wherein the IMMP builds and stores a JIS instruction, which is stored in the first word of the current application program logic string. That JIS instruction will point to one of the words 0a, 0b, 0c or 0d as shown in FIG. 66. It can now be seen how the JIS instruction is inserted into the application program to cause a branch from the application program to the IMMP copy region so that the logic string in the IMMP copy region corresponding to the application program logic string can be executed.

Figure 60:
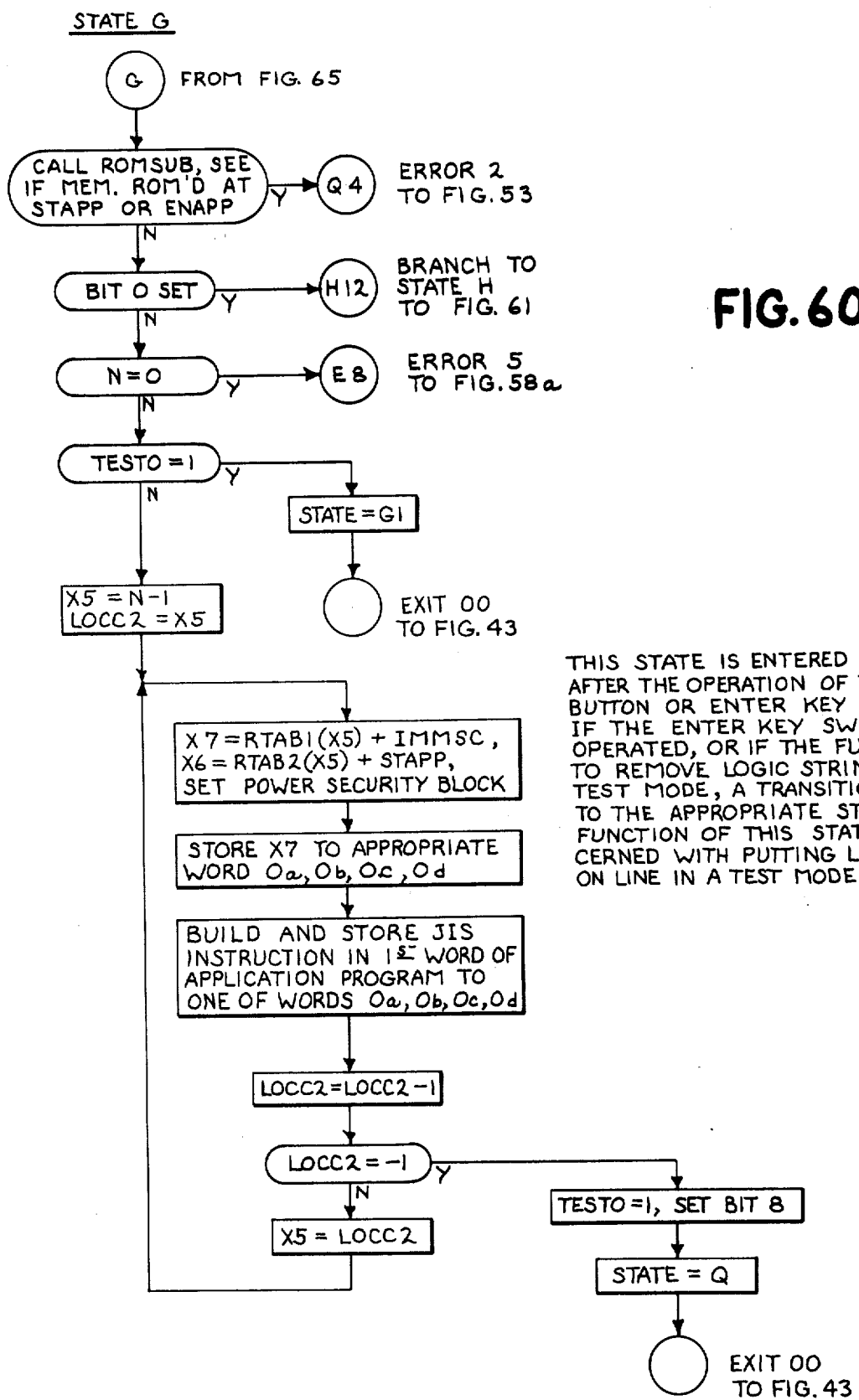

The program now proceeds into the next action block of FIG. 60 and the location LOCC2 is set equal to LOCC2 minus 1. From this last action block entry is into an LOCC2 = −1 decision block. In this decision block a question is being asked to see if all of the logic string copies in the IMMP copy region have been put on-line by the proper insertion of a JIS instruction into each of their corresponding application program logic strings and to see if the 12 word JIS block words have been properly set up for each logic string. If they have not all been put on line properly, the program will take the N branch and location X5 is set equal to LOCC2. The program will now go into a loop and execute as previously described until location LOCC2 is equal to a minus 1.

When LOCC2 is equal to a minus 1 it indicates that all of the IMMP copy logic strings are properly on-line. When this occurs, the program will take the Y branch from block LOCC-1 into an action block wherein the Test light on the I&MM is turned on by setting location TESTO equal to 1. Additionally in this action block Bit 8 is set. It will be recalled that Bit 8 is set whenever the IMMP goes into the Test Mode. The program will now enter into the next action block where location STATE is set equal to State Q and the program will return to FIG. 43 of the exit routine and from there back to the ISSP as previously described. On the next first pass into the IMMP the program will branch to State Q, and the trap will be set in the copy region because the I&MM is in the Test Mode as previously described.

Still referring to FIG. 60, reference is now made back to the TESTO = 1 decision block. Upon entry into State G, if the I&MM is in the Test Mode, it indicates that the I&MM operator desires to take the I&MM out of the Test Mode. Thus, the program will take the Y branch into an action block wherein location STATE is set equal to State G1. State G1 is basically referred to as an untest state, that state which removes the I&MM from the Test Mode. The program will now exit FIG. 60 through Exit 00 of FIG. 43 returning back to the IMMP as previously described.

On the next first pass back into the IMMP the program will now branch into State G1 of FIG. 59. On entry into the first action block of FIG. 59 the IMMP goes into an indexing loop operation whereby it overwrites the JIS instruction in each of the application program logic strings with the contents of the appropriate RTAB4 entry. It will be recalled that the various RTAB4 words each contain the original instruction previously replaced by the JIS instruction corresponding to that logic string. The program then proceeds into the next action block wherein the operations as previously described in connection with States A1 and A3 are performed.

Reference is now made back to FIG. 60 to the Bit 0 set decision block. In that decision block if Bit 0 is set it indicates that the I&MM operator has operated the Enter key switch, indicating that he desires to enter the logic string copies from the IMMP copy region into the application program. In response to the Bit 0 set, the program will take the Y branch directly to point H12 to State H of FIG. 61.

Upon entry into State H the IMMP first clears Bit 0 and proceeds to test location TESTO to see if that location is 0. If TESTO is equal to 0 it indicates that the I&MM is not in the Test Mode. Thus, it is inappropriate to enter the copies frm the IMMP copy region into the application program. If this be the case, the program sets location LOCC5 equal to code 6 and sets location STATE equal to State N1. The program will then go to Exit 00 of FIG. 43 as previously described. Assume now that the I&MM is in the Test Mode, thus the program will take the N branch entering into a decision block A11 RTAB2's = −1. In this decision block the IMMP is testing to see if all four of the RTAB2's are equal to minus 1. If they are, it indicates that all copies previously made in the IMMP copy region have been entered into the application program. Assuming that all copies have been made the program will exit through the Y branch to point C3 of FIG. 45 entering into a TESTO = 0 action block. This latter action block takes the I&MM out of the Test Mode and then proceeds into an action block wherein the A register is set equal to A2. The program now proceeds into the next decision block TESTO=1. Since TESTO is now equal to 0 the program will take the N branch to point C2 into the next action bock wherein location STATE is set equal to State A2 and location SSTAT is set equal to State B1. The program will now exit as previously described to Exit 00 returning back to the ISSP.

Upon the next first pass into the IMMP the program will branch to State A2, the memory cleanup state, and again return back to the ISSP. Upon the next first pass into the IMMP the program will then branch to State B1, as specified by location SSTAT, reentering back into the Bit Display Mode as previously described.

Figure 61:
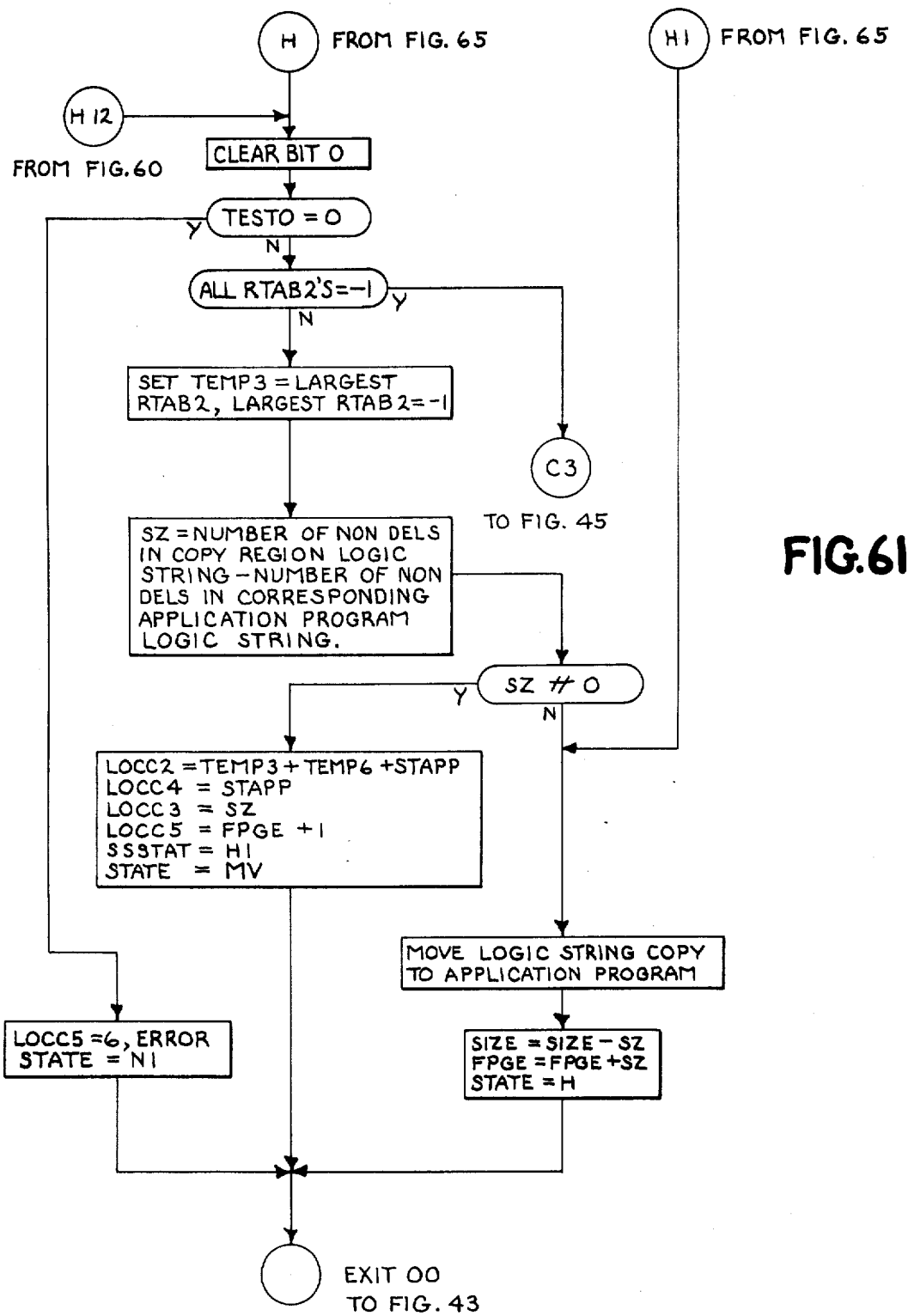

Reference is now made back to FIG. 61 to the A11 RTAB2's = −1 decision block. Let it now be assumed that at least one of the RTAB2 words is not equal to minus 1. This indicates that at least 1 copy in the IMMP copy region remains to be copied to the application program. Thus, the program will take the N branch entering into the next action block. In this latter action block location TEMP3 is set equal to the largest RTAB2. This is accomplished by the IMMP going into a search whereby it locates an RTAB2 which contains the starting address of an application program logic string which has been copied into the IMMP copy region. In each case upon entry into State H this search always locates the logic string in the application program which is highest in memory. Also at this time that largest or highest RTAB2 is set equal to a minus 1.

The program now proceeds into the next action block and location SZ is set equal to the number of non-delete (non-DEL's) instructions in the IMP copy region minus the number of non-delete instructions in the corresponding application program logic string. Location SZ now contains a number representing the number of instructions to either be added to or deleted from the application program logic string. The program now proceeds into a SZ ≠ 0 decision block. In that decision block, if SZ is equal to 0, the program will take the N branch into the next action block wherein the logic string copy is moved directly to the application program. The entry into this latter action block indicates that the size of the IMMP copy has not changed from the size of the corresponding original application program copy. Thus the logic string copy can be copied directly back into the application program without having to reallocate memory space for that logic string. Entry into this latter action block is State H1 which, if the memory allocation has a already been accomplished, will be from the move routine State MV to subsequently be described.

Reference is now made back to the "SZ ≠ 0 decision block. Assuming the SZ is not equal to 0, the program will take the Y branch entering into an action block wherein location LOCC2 is set equal to TEMP3 plus TEMP6 plus STAPP. TEMP3 was previously set equal to the largest RTAB2 word. Location TEMP6 was previously set equal to RTAB3 (Bits F 8, which contain a number representative of the number of non-delete instructions in the application program logic string previously copied to the IMMP copy region). Location LOCC4 is also set equal to STATE and location LOCC3 is set equal to SZ. Additionally in this latter action block, location LOCC5 is set equal to FPGE plus 1. As can be seen in FIG. 2 location LOCC5 now contains FPGE plus 1, which points to the actual end of the application program containing the JIS (STSTP) instruction. SSSTAT is also set equal to State H1 and location STATE is set equal to State MV and the program exits to the ISSP. Upon the next first pass entry into the IMMP the program will branch to State MV, the move state. It will also be noted that setting SSSTAT equal to State H1 will cause the IMMP to branch to State H1 immediately after State MV is executed. As will subsequently be described State MV may be executed several times, depending upon the number of instructions which have to be moved prior to entry into State H1.

Still referring to FIG. 61, let it now be assumed that the IMMP has previously executed the move routine (State MV) to allocate the proper amount of space for storage of a copy from the IMMP copy region into the application program. As a result the program will enter into State H1 and, as previously described, that logic string will be copied directly into the application program. The program will then proceed into the last action block of FIG. 61. In this action block location SIZE is set equal to SIZE minus SZ. Additionally location FPGE is set equal to FPGE plus SZ and loation STATE is set equal to State H. Setting location SIZE to the value as specified in this action block redefines the amount of expansion area remaining for the application program in memory. The setting of FPGE to FPGE plus SZ now redefines the end of the application program in accordance with the number of words either added to or substracted from the application program. The program will now exit to Exit 00 of FIG. 43 returning back to the ISSP as previously described.

On each first pass through the IMMP, after leaving State H1, the IMMP will continue to branch to State H whereby it will be reexecuted until all of the RTAB2 words are equal to minus 1. When this occurs the program will exit to point C3 of FIG. 45 as previously described. Still referring to FIG. 61, let it now be assumed that it is necessary to allocate space in the application program for the insertion therein of a logic string copy from the IMMP copy region. When this situation occurs the program will take the Y branch from the SZ ≠ 0 decision block into that branch action block which is executed returning to Exit 00 of FIG. 43.

Figure 62:
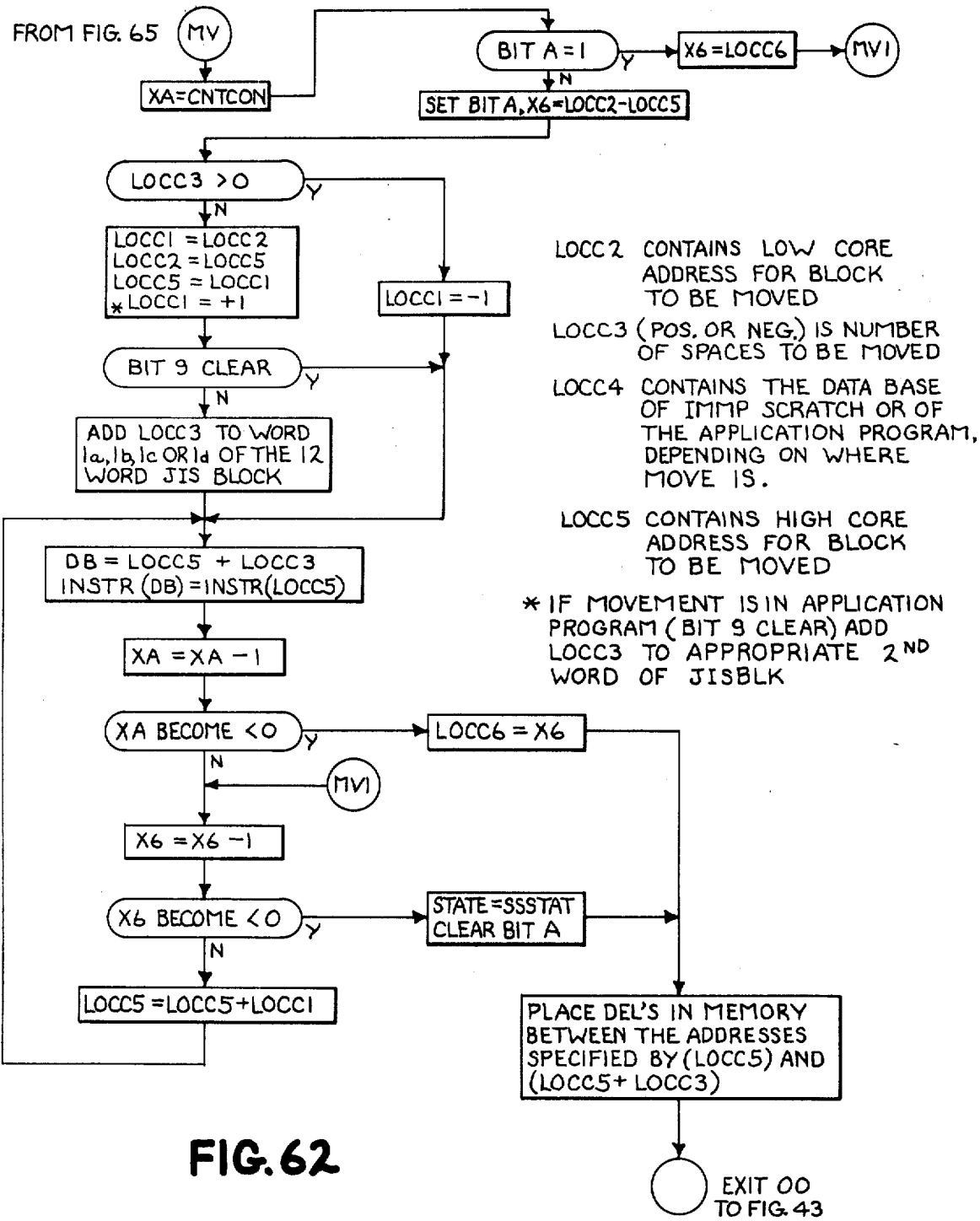

Upon the next first pass into the IMMP, the program will now branch to State MV of FIG. 62. The first operation to take place in State MV is Set XA equal to location CNTCON. Loction CNTCON is a count constant utilized to specify a maximum number of instructions to be moved in the application program during each execution of State MV. The program then proceeds into a Bit A = 1 decision block wherein a test is performed to see if the I&MM has completed moving the instructions in the application program. On the first time into State MV Bit A will be reset, thus the program will take the N branch, Bit A will be set and location X6 will be set equal to location LOCC2 minus LOCC5. Location X6 is now set equal to the number of total instructions which have to be moved in the application program.

The program will then proceed into a LOCC3>0 decision block. As shown in the notes in FIG. 62 location LOCC3 will be either positive or negative and contain a number representative of the number of instructions to be moved to create spaces in the application program. If LOCC3 is greater than 0 it indicates that the I&MM operator has modified the logic string copy in the IMMP copy region and has made that copy larger than its corresponding application program logic string. Assuming this to be the case, the application program region must be expanded to make room for the additional instructions added to the logic string in the IMMP copy region. The program will take the Y branch entering into an action block wherein location LOCC1 is set equal to a minus 1. Location LOCC1 is going to be utilized later in State MV to either increment or decrement location LOCC5.

If the I&MM operator has deleted some of the instructions in the application program logic string previously copied into the IMMP copy region, location LOCC3 will be less than 0. In this case, the program will exit through the N branch into the action block connected to that branch. Location LOCC1 will now be set equal to LOCC2, LOCC2 will be set equal to LOCC5, LOCC5 will be set equal to LOCC1, and location LOCC1 will be set equal to plus 1. In this latter action block locations LOCC2 and LOCC5 are merely exchanged to place the low memory address for the block to be moved in LOCC5, and to place the high memory address for the block to be moved to LOCC2. Reestablishing LOCC2 and LOCC5 in the manner just described allows the IMMP to now move blocks of data upstream in the application program to reduce the size of the area required for the now smaller logic string copy to be moved to the application program.

The program now proceeds from the latter action block into a Bit 9 Clear decision block. Bit 9 is used as a flag to tell the move subroutine, State MV whether it is moving data in the application program or in the IMMP copy region. If Bit 9 is clear it indicates that data is being moved in the application program. Assuming this to be the case, the program will take the N branch entering into the action block wherein the 12 word JIS block is adjusted by adding LOCC3 to the appropriate one of the words 1a, 1b, 1c, or 1d of that word block.

The program now proceeds into the next action block wherein location DB is set equal to LOCC3, establishing a new data base. The instruction at the location specified by the new data base, DB, is now set equal to the instruction specified by LOCC5. This in effect moves one instruction in the application program or in the IMMP copy region, whichever the case may be, by an amount equal to LOCC3. If entry to this latter block is via the N branch of the Bit 9 Clear decision block, that move is in the application program. However, if entry to this latter block is through the Y branch of the Bit 9 Clear decision block, that move is in the IMMP copy region. Additionally, if entry into the latter action block is from the LOCC1 = 1 action block it indicates that a block of data is to be moved downstream in the application program in either the application program or in the IMMP copy region. When entry is made to the latter action block from either the Bit 9 Clear (Y branch) decision block or from the LOCCL = −1 action block, it is not necessary to adjust the 12 and JIS block (i.e., words 1a, 1b, 1c, or 1d).

The program now proceeds into an action block where XA is set equal to XZ minus 1, thus decrementing the maximum number of words to be moved during this pass through State MV. A test is next performed to see if XA has become less than 0. Assuming that XA is not less than 0, the program will take the N branch and X6 is set equal to X6 minus 1. Decrementing X6 indicates that the IMMP now has one less instruction to move. The IMMP now tests to see if X6 has become less than 0. Assuming that X6 is not less than 0, the program takes the N branch and location LOCC5 is set equal to LOCC5 plus LOCC1.

The program now returns, in a loop, back into the action block wherein again DB is set equal to LOCC5 plus LOCC3, etc. The IMMP will continue in this loop until one of two situations exist. The first of these situations is when XA becomes less than 0. When XA is less than, it indicates that the maximum number of words have been transferred for this one entry into the move routine. When this occurs the program takes the Y branch into an action block and location LOCC5 is set equal to X6. From this latter action block the program will then enter into the final action block of FIG. 62. The other of these two situations is when X6 becomes less than 0, which indicates that the move is complete. When this occurs the program will exit through the Y branch into an action block wherein location STATE is set equal to SSSTAT and Bit A is cleared. If entry into State MV is frm State H, indicating that the move is to take place in the application program, location STATE will be set equal to State H1. However, if entry into State MV is from State F1, indicating that the move is to take place in the IMMP copy region, location STATE is set equal to State F2. From this latter action block the program now proceeds into the final action block of FIG. 62.

In this last action block the IMMP places delete (DEL'S) instructions in memory in the location (S) between the address as specified by the contents of LOCC5 and the contents of LOCC5 plus LOCC3. It can now be seen how the IMMP, utilizing the move routine, optimizes memory locations in the application program by expanding or contracting the memory space in the application program to accommodate logic string copies which either have been enlarged or made smaller than their corresponding application program logic strings.

Let it now be assumed that State MV has been entered for the first time (i.e., Bit A is clear). Also assume that location XA has become less than 0. Thus, the program will take the Y branch from the XA become LO decision block. Taking this path indicates that the maximum number of words have been moved for this pass through State MV. As previously described LOCC6 will be set equal to X6 and the program will go to the final action block of FIG. 62 to Exit 00 returning back to the ISSP. It should be noted that when State MV is exited from the "LOCC6=6 action block that location STATE is equal to State MV. STATE was set equal to State MV prior to entry into State MV. Thus, the program, upon the next first pass into the IMMP, will reenter back into State MV after having run through the Initialization and Two-Pass Forcing and Input subroutines.

Still referring to FIG. 62, let it now be assumed that State MV has again been entered and the subroutine is in the Bit A=1 decision block. Since State MV has been entered once before, Bit A will be set, thus the program will take the Y branch and location X6 is set equal to the LOCC6. It will be noted that X6 was saved in LOCC6 when the first exit was made from State MV. As a result, in this latter action block, X6 is just restored back to its original contents. The program will now go to point MV1, again entering into the previously described action block wherein X6 is set equal to X6 minus 1. The program will go into the previously described loop and continue cycleing through that loop and eventually exit from the State = SSSTAT, Clear Bit A action block. Reference is now made to FIG. 47 and 51a. In FIG. 51a it will be recalled that when the I&MM operator presses the Multi-Reference button on the I&MM, location MLSSTI is set to a binary 1. This indicates that the I&MM operator desires to look at a multi-references SST instruction located further downstream in the application program. The existence of such a multi-reference SST is indicated to the I&MM operator by the on state of the Multi-Reference light specified by location MLSSTO. It will also be recalled in the first action block of State DF of FIG. 51a that the Multi-Reference bit at location MLSSTO is set equal to Bit 5 upon entry into State DF. Thus, during the search routine (State L) if a multi-reference SST instruction is located, Bit MLSSTO is turned on at this time. It is the status of this latter bit which tells the I&MM operator that it is permissible to press the MULTI-REFERENCE button. If the I&MM operator has presssed the Multi-Reference pushbutton, the program will take the Y branch from MLSSTI decision block and the A register is set equal to State D4. The program will then proceed from FIG. 51a to point DF20 in FIG. 51d and STATE will be set equal to State DA. The program will now proceed as previously described through State Q returning back to the ISSP.

On the next first pass into the IMMP the program will branch to State D4 of FIG. 47 entering into the decision block MLSSTO=1. If the Multi-Reference light is on, indicating that a SST instruction referencing the same status bit as a previous SST instruction exists, the program will take the Y branch entering into point D31 of FIG. 48. It will be recalled that FIG. 48 is a set-up state to search for another downstream reference in the application program. Thus, it is necessary for the program to go to State L to accomplish this, the program goes into the last action block of FIG. 47 where location SSSTAT is set equal to State D5 and enters back into point D11 of FIG. 47. Entering into point D11, location STATE is set equal to State L, along with the previously described operations. The program will now turn off all of the lights on the I&MM by resetting locations P0 and P0+1 and proceed to Exit 00 returning to the ISSP.

Upon the next first pass through the IMMP the program will then branch to State L, and as previously described, the next reference is searched for. Upon completion of the search, the program will return back to the ISSP as previously described. On the next first pass into the IMMP the program will then branch to State D5 of FIG. 50 wherein the reference found in State MV will be displayed to the I&MM operator.

Reference is now made back to FIG. 47 to State D4. Assume that the Multi-Reference light is not on. The program will now take the N branch from the MLSSTO=1 decision block into the next action block where location SSSTAT is set equal to State D1 and loction LOCC3 is set equal to STAPP. Entry into this latter action block from the MLSSTO=1 decision block indicates that a reference does not exist downstream in the application program. The program will now proceed through the remainder of FIG. 47 as previously described returning back to the ISSP. On the next first pass into the IMMP, State D1 of FIG. 48 will be entered. In State D1, since the Multi-Reference light is not on, will cause the IMMP to display on the I&MM the first reference in the application program in the matter just described for all other Multi-References.

Figure 55:
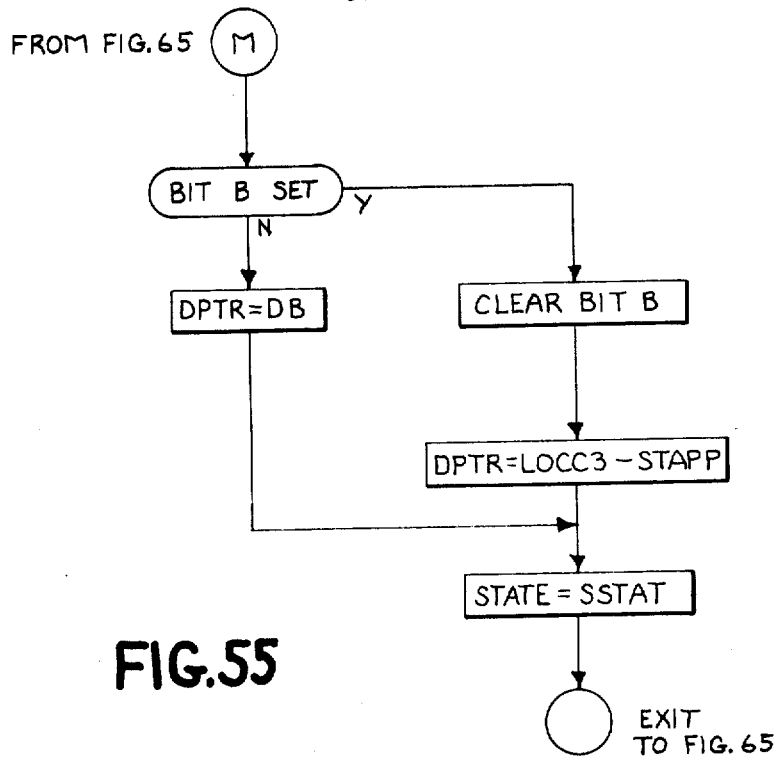

Reference is now made to FIGS. 51d and 55. Referring first to FIG. 51d, reference is made the LTI and LTO and LDLO decision block. It will be recalled that when the I&MM operator desires to locate an instruction in an application program logic string that he can do so by depressing the move left and move right buttons on the I&MM. The question being asked in this latter decision block is, is the I&MM operator currently positioned at the left most boundary (left most instruction) of the current logic string and is the instruction at that boundary something other than an LDL. If the answer is yes, it indicates that the I&MM operator desires to look further upstream for an LDL instruction preceding the current logic string. If this be the case, the program will take the Y branch entering into the action block wherein the actions as previously described will take place. Of significance at this time, is to note that location SSSTAT is set equal to State M and the A register is set equal to State L. The program will then go to point DF20 whereby location STATE is set equal to State L as previously described.

The program will now proceed to State Q, the trap will be placed and return back to the ISSP. On the next first pass through the IMMP the program will now branch to State L of FIG. 63. Reference is now made to FIG. 63. The operation of the search in State L is as previously described, with the exception that the I&MM will now search upstream in memory to find the previous LDL instruction associated with the current logic string. It will be noted in the LOCC4 - LOCC3 <0 decision block of FIG. 63, that the program will now take the Y branch designated Upstream Search whereby location LOCC6 will be set equal to minus 1. It is this setting of LOCC6 that allows the IMMP to now begin to search upstream for the LDL instruction. It should also be noted in FIG. 63 that location STATE is set equal to location SSSTAT. SSSTAT was previously set to State M back in FIG. 51d thus, upon the next first pass into the IMMP the program will enter into State M of FIG. 55.

Reference is now made to State M of FIG. 55. Entry is first made into a Bit B Set decision block. It will be recalled that Bit B is a flag utilized to tell the IMMP if an LDL instruction has been found. If the LDL instruction was not found the program will exit through the N branch into an action block wherein DPTR is set equal to DB. This sets the pointer for the application program to the left most instruction of the current logic string. Entry will now be made into the next action block where STATE is set to SSTAT, the latter currently being equal to State D. Thus, the program will return back to State DF of FIG. 51a in the Logic Display Mode.

Still referring to FIG. 55, let it now be assumed that Bit B is set, indicating that the LDL instruction was found. Thus, the program takes the y branch entering into an action block wherein Bit B is cleared and the next action block is entered wherein the application program pointer, DPTR, is set equal to LOCC3 minus STAPP. The application program is now set to point to the LDL instruction. The program continues to the last action block and location STATE is set equal to SSTAT which now contains State D. The program will return back to State DF of FIG. 51a in the Logic Display Mode as previously described.

While the principles of the invention have now been made clear in an illustrative embodiment, there will be immediately obvious to those skilled in the art many modifications of structure, arrangement, the elements, materials, and components used in the practice of the invention and otherwise, which are particularly adapted for specific environments and operating requirements without departing from those principles. The appended claims are, therefore, intended to cover and embrace any such modifications within the limits only of the true spirit and scope of the invention.

APPENDIX A
SYSTEM PROCEDURE ADDRESSES

| SYMBOLIC CODE | ADDRESS OR VALUE | DESCRIPTION |
| --- | --- | --- |
| SINIT | EQL @ 400 | STARTING ADDRESS OF SYSTEM INITIALIZATION AND STANDARD STATUS PROGRAM (ISSP) |

APPENDIX A
-continued

| | | | |
|---|---|---|---|
| STAPP | EQL | ● 530 | STARTING ADDRESS OF APPLI-CATION PROGRAM |
| IMM | EQL | ● 800 | STARTING ADDRESS OF IMMP |
| IMMSC | EQL | ● 1000 | STARTING ADDRESS OF IMMP SCRATCH AREA |
| KEY | EQL | # 0010 | ISSP/IMMP COMPATIBILITY PATTERN |

SYSTEM BLOCKS OF MEMORY TO BE INITIALIZED

| SYMBOLIC CODE | | ADDRESS | DESCRIPTION |
|---|---|---|---|
| STCLB | EQL | ● 40 | STARTING ADDRESS OF BLOCK TO BE CLEARED |
| ENCLB | EQL | ● 7F | ENDING ADDRESS OF BLOCK TO BE CLEARED |
| STCNP | EQL | USER DEFINED | STARTING ADDRESS OF BLOCK OF PERMANENT CONSTANTS |
| STCNB | EQL | ● 80 | STARTING ADDRESS OF BLOCK TO WHICH PERMANENT CONSTANTS ARE TRANSFERRED |
| ENCNB | EQL | ● AF | ADDRESS OF END OF BLOCK AFTER TRANSFER OF PERMANENT CONSTANTS |

INPUT/OUTPUT ASSIGNMENT

| SYMBOLIC CODE | | ADDRESS | DESCRIPTION |
|---|---|---|---|
| INST | EQL | ● 10 | STARTING ADDRESS OF INPUT REGION |
| INSP | EQL | ● 3F | LAST ADDRESS OF INPUT REGION |
| OTST | EQL | ● 40 | STARTING ADDRESS OF OUTPUT REGION |
| OTSP | EQL | ● 60 | LAST ADDRESS OF OUTPUT REGION |
| ISST | EQL | ● 61 | STARTING ADDRESS OF INTERMEDIATE REGION |
| ISSP | EQL | ● 70 | LAST ADDRESS OF INTERMEDIATE REGION |
| CTOS | EQL | ● 80 | STARTING ADDRESS OF COUNTERS/TIMERS (FINAL VALUES) |
| CTOF | EQL | ● 9E | LAST ADDRESS OF COUNTERS/TIMERS (FINAL VALUES) |
| SSSCS | EQL | ● BO | STARTING SCRATCH AREA ADDRESS FOR ISSP |
| ENAPP | EQL | ● 7FF | LAST PERMISSIBLE ADDRESS OF APPLICATION PROGRAM AVAILABLE FOR ALTERATION |

REPEATED LOOP LOGIC DEFINITIONS (MULTIPLE DRIVES)

| SYMBOLIC CODE | | VALUE | DESCRIPTION |
|---|---|---|---|
| NRPLP | EQL | 2 | TOTAL NUMBER OF REPEATED LOOPS. EACH LOOP REPRESENTS A GROUP OF SIMILAR TYPES OF EQUIPMENTS OR DRIVES. |
| NLP1 | EQL | 3 | NUMBER OF SIMILAR TYPES OF EQUIPMENTS OR DRIVES IN REPEATED LOOP LOGIC 1. |
| NLP2 | EQL | 2 | NUMBER OF SIMILAR TYPES OF EQUIPMENTS OR DRIVES IN REPEATED LOOP LOGIC 2. |

DEFINITIONS OF WORDS IN ISSP SCRATCH AREA

| SYMBOLIC CODE (SCRATCH LOCATION) | | SYMBOLIC CODE (ADDRESS) | DESCRIPTION |
|---|---|---|---|
| INITA | EQL | SSSCS | BASE ADDRESS OF ISSP |
| STSTP | EQL | INITA+1 | ENTRY POINTER TO ISSP |
| APPPT | EQL | STSTP+1 | ENTRY POINTER TO APPLICATION PROGRAM |
| IMMWD | EQL | APPPT+1 | ENTRY POINTER TO IMMP IN MEMORY |
| RPTLG | EQL | IMMWD+1 | ENTRY POINTER FOR REPEATED LOGIC |
| INZCT | EQL | RPTLG+2 | INITIALIZE COUNTER |
| DIAGF | EQL | INZCT+1 | DIAGNOSTIC FLAG WORD |
| IMTPT | EQL | DIAGF+1 | IMM TEST TRANSFER POINTERS |
| TWORD | EQL | IMTPT+15 | TEST POINTERS |
| LPBGP | EQL | TWORD | |
| DBCET | EQL | TWORD | DIAGNOSTIC TIMERS F |
| DBCLT | EQL | TWORD+1 | |
| TRAGN | EQL | DBCLT+1 | DIAGNOSTIC COUNTER FOR I/O ERRORS |
| NIOT | EQL | TRAGN+1 | COUNTER FOR I/O TRANSFERS |
| LPCNT | EQL | NIOT+1 | REPEATED LOOP COUNTER |

WORD DEFINITIONS FOR DBC RELATIVE TO BASE ADDRESS FFE0

| SYMBOLIC CODE | | CONTENTS | DESCRIPTION |
|---|---|---|---|
| DBCRG | EQL | 0 | DBC CONTROL REGISTER |

-continued
APPENDIX A

| | | | |
|---|---|---|---|
| DBSRG | EQL | 0 | DBC STATUS REGISTER |
| DBXAD | EQL | 3 | DBC EXTERNAL ADDRESS REGISTER |
| DBDRG | EQL | 4 | DBC DATA REGISTER |
| DBOFS | EQL | 20 | VALUE TO OFFSET DBC BASE TO 0 |
| STAT | EQL | 1F | ADDRESS OF CONTROLLER STATUS WORD |

BIT DEFINITIONS FOR DBC STATUS

| SYMBOLIC CODE | | CONTENTS | DESCRIPTION |
|---|---|---|---|
| DBBSY | EQB | DBSRG, #F | BUSY |
| DBSEN | EQB | DBSRG, #E | STROBE ENABLED |
| DBSTL | EQB | DBSRG, #D | DISABLE STALL |
| IMMNI | EQB | DBSRG, #C | INSTALLATION & MAINT. MOD. NOT IN |

BIT DEFINITIONS FOR INSTR. DIAG. TEST

| SYMBOLIC CODE | | CONTENTS | DESCRIPTION |
|---|---|---|---|
| TBTF | EQB | 0, #0 | FIXED TEST PATTERN |
| TBTI | EQB | 0, #3 | |
| TBTJ | EQB | 0, #6 | |
| TBTK | EQB | 0, #9 | |
| TBTL | EQB | 0, #C | |

RESULT PATTERN

| SYMBOLIC CODE | | CONTENTS | DESCRIPTION |
|---|---|---|---|
| TBTOF | EQB | 1, #3 | |
| TBTOT | EQB | 1, #6 | |
| TBTAF | EQB | 1, #9 | |
| TBTAT | EQB | 1, #C | |

DIAGNOSTIC INDICATORS

| SYMBOLIC CODE | | CONTENTS | DESCRIPTION |
|---|---|---|---|
| ICMP | EQB | INZCT, #F | INIZ COMPLETE FLAG |
| INOF | EQB | DIAGT, #F | INITIAL OUTPUT NOT COMPLETE |
| INIMM | EQB | DIAGF, #E | INITIALIZE FLAG FOR IMM |

ESTABLISH PROCEDURE BASE
STEP A1

| LOCATION | INSTRUCTION OP CODE | LOCATION OR VALUE | DESCRIPTION |
|---|---|---|---|
| SINIT | LAN | 0 | |
| | SAN | 1 | |
| | DMR | 1 | |

INITIALIZE SCRATCH STORAGE FOR ISSP
STEP A2

| LOCATION | INSTRUCTION OP CODE | LOCATION OR VALUE | DESCRIPTION |
|---|---|---|---|
| | LAP | NSV | NUMBER OF SCRATCH VALUES |
| | SAN | 4 | |
| | SAN | 5 | |
| TRFPT | LAP | ISSP,X | TRANSFER POINTERS |
| | SAN | SSSCS,X | |
| | DMR | 4 | |
| | DMR | 5 | |
| | BRS | TRFPT | |

CLEAR SPECIFIED BLOCK OF SCRATCH STORAGE
STEP A3

| LOCATION | INSTRUCTION OP CODE | LOCATION OR VALUE | DESCRIPTION |
|---|---|---|---|
| | LAP | NWTCL | NUMBER WORDS TO CLEAR-1 |
| | SAN | 5 | |
| | LAP | ZERO | |
| CLRLP | SAN | STCLG,X | STARTING ADDRESS OF BLO |
| | DMR | 5 | |
| | BRS | CLRLP | REPEAT LOOP |

TRANSFER BLOCK OF CONSTANTS
STEP A4

| LOCATION | INSTRUCTION OP CODE | LOCATION OR VALUE | DESCRIPTION |
|---|---|---|---|
| | LAP | NCTT | NUMBER OF CONSTANTS TO TRANSFER-1 |

APPENDIX A -continued

|  | | | |
|---|---|---|---|
|  | SAN | 5 | |
|  | LAP | PMCAD | PERMANENT CONSTANT ADDRESS |
|  | SAN | 2 | SET DATA BASE |
| CBKLP | LAD | 0,X | |
|  | SAN | STCNB,X | SCRATCH CONSTANT ADDRESS |
|  | DMR | 5 | |
|  | BRS | CBKLP | REPEAT LOOP |
|  | LAP | FOUR | |
|  | SAN | 4 | |
|  | LAP | PRSC | |
|  | SAN | 2 | |
| STR | LAD | 4 | GET ADDRESS TO BE RESTORED |
|  | SAN | 5 | |
|  | LAD | 9 | GET CONTENTS |
|  | SAN | 0,X | RESTORE |
|  | LAP | EIGHT | |
|  | SAD | 4 | SET ADDRESS TO 8 |
|  | DMR | 2 | |
|  | DMR | 4 | |
|  | BRS | STR | |

CHECK INITIAL STATUS OF DBC
STEP A5

| LOCATION | INSTRUCTION OP CODE | LOCATION OR VALUE | DESCRIPTION |
|---|---|---|---|
|  | LAP | DBCAD | |
|  | SAN | 2 | SET DATA BASE TO DBC |
|  | SAN | 3 | SET BIT BASE TO DBC |
|  | LAP | SWIN | SET STRING SATISFIED AND LBIT |
|  | SAD | STAT | |
|  | LAT | DBBSY | IS DBC BUSY |
|  | LOT | DBSEN | OR STROBE ENABLED |
|  | BRC | +2 | NO, PROCEED |
| IERR | DMR | 0 | ERROR HANG SYSTEM |
|  | BRU | DGCK | DIAGNOSTIC CHECK |

RESET PROCEDURE BASE TO START OF ISSP
STEP A38

| LOCATION | INSTRUCTION OP CODE | LOCATION OR VALUE | DESCRIPTION |
|---|---|---|---|
| EPAPP | LAN | INITA | ENTRY IS MADE HERE TO ISSP ON APPLICATION |
|  | SAN | 1 | PROGRAM COMPLETION |

TEST FOR SYSTEM STALL SINCE LAST ENTRY
STEP A39

| LOCATION | INSTRUCTION OP CODE | LOCATION OR VALUE | DESCRIPTION |
|---|---|---|---|
|  | LAP | DBCAD | |
|  | SAN | 3 | |
|  | SAN | 2 | |
|  | LAP | SWIN1 | |
|  | SAD | STAT | |
|  | LAT | DBSEN | TEST STROBE ENABLED |
|  | BRS | +2 | |
| STERR | DMR | 0 | HANG SYSTEM IN STALL |

EXECUTE LOGIC DIAGNOSTIC TEST
STEP A6

| LOCATION | INSTRUCTION OP CODE | LOCATION OR VALUE | DESCRIPTION |
|---|---|---|---|
| DGCK | LAP | TWRDP | |
|  | SAN | TWORD | |
|  | SAN | TWORD+1 | |
|  | LAP | TWO | |
|  | SAN | 5 | |
|  | LAP | BRFT | |
|  | SAN | 3 | |
|  | LAP | ZERO | |
|  | SAN | 2 | |
| DGRP | LDL | TBTF,X,B | DETECTED |
|  | LOF | TBTI,X,B | |
|  | SST | TBOF,X,B | |
|  | LOT | TBTJ,X,B | |
|  | SST | TBTOT,X,B | |
|  | LAF | TBTK,X,B | |
|  | SST | TBTAF,X,B | |
|  | LAT | TBTL,X,B | |
|  | SST | TBTAT,X,B | |
|  | DMR | 5 | |
|  | BRS | DGRP | REPEAT LOOP TWICE |
|  | LAP | TWRDR | RESULT PATTERN |
|  | ERA | TWORD+1 | COMPARE |
|  | TEQ | | |
|  | BRS | LSMCK | |
| LIERR | DMR | 0 | HANG UP, FAILED |

-continued

APPENDIX A

TEST LOGIC SUMMATION OF R BIT
STEP A7

| LOCATION | INSTRUCTION OP CODE | LOCATION OR VALUE | DESCRIPTION |
|---|---|---|---|
| LSMCK | LAT | TBTOF,B | |
| | LOT | TBTOT,B | |
| | BRS | +2 | |
| LSERR | DMR | 0 | HANG ON FAILURE |
| | LAF | TBTAF,B | |
| | LAT | TBTAT+1,B | |
| | BRC | +2 | BRANCH TO START I/O |
| | DMR | 0 | HANG ON FAILURE |

SET UP TO DO INPUTS FIRST
STEP A8

| LOCATION | INSTRUCTION OP CODE | LOCATION OR VALUE | DESCRIPTION |
|---|---|---|---|
| | LAP | ONE | |
| | SAN | 4 | ONE INTO ● 4 (XP) |

SET UP NUMBER OF TRIES THROUGH LOOP 1
STEP A9

| LOCATION | INSTRUCTION OP CODE | LOCATION OR VALUE | DESCRIPTION |
|---|---|---|---|
| IOLP | LAP | NTRY | |
| | SAN | TRAGN | |

SET UP CONSTANTS FOR INPUT OR OUTPUT
STEP A10

| LOCATION | INSTRUCTION OP CODE | LOCATION OR VALUE | DESCRIPTION |
|---|---|---|---|
| STLP | LAP | DBCAD (FFEO) | LOAD A REGISTER WITH DBC BASE ADDRESS |
| | SAN | 2 | ESTABLISH DATA BASE (STORE A FFEO) TO BD, DATA BASE REGISTER |
| | SAN | 3 | ESTABLISH BIT BASE (STORE A FFEO) TO BD, BIT BASE REGISTER |
| | LAT | DBBSY,B | TEST DBC BUSY |
| | BRS | −1 | |
| | LAP | ADRCT,X(BP) | LOAD A WITH # OF INPUTS OR OUTPUT CYCLES |
| | SAN | NIOT | NUMBER OF INPUT OR OUTPUT TRANSFERS |
| | LAP | ADRST,X(BP) | LOAD A WITH STARTING EXT. ADDRESS |
| | SAD | DBXAD | STORE A TO STARTING EXTERNAL ADDRESS REG. |
| | SAN | 5 | STORE A TO STARTING INTERNAL ADDRESS |

REQUEST DBC TO INPUT OR OUTPUT
STEP A11

| LOCATION | INSTRUCTION OP CODE | LOCATION OR VALUE | DESCRIPTION |
|---|---|---|---|
| | LAP | RWCNT,X(BP) | LOAD A WITH DBC CONTROL WORD (WRITE 1ST TIME, READ 2ND TIME) |
| | SAD | DBCRG | STORE A (DBC CONTROL WORD) TO DBC CONTROL REGISTER (FESO) |

TEXT IF INPUT OR OUTPUT
STEP A12

| LOCATION | INSTRUCTION OP CODE | LOCATION OR VALUE | DESCRIPTION |
|---|---|---|---|
| INPRG | EQB | 4, #0 (XP) | (BIT 0) |
| | LAT | INPRG | SET R IF INPUT |
| | BRS | PRST | |

TRANSFER OUTPUT TO DBC I/O DATA REGISTER
STEP A13

| LOCATION | INSTRUCTION OP CODE | LOCATION OR VALUE | DESCRIPTION |
|---|---|---|---|
| RPTO | LAN | 0,X | |
| | SAD | DBDRG | TRANSFER FROM SCRATCH |

UPDATE DATA INDEX & DECREMENT I/O TRANSFER COUNTER
STEP A14
INSTRUCTION

APPENDIX A

| LOCATION | OP CODE | LOCATION OR VALUE | DESCRIPTION |
|---|---|---|---|
| RPTI | LAP | ONE | INPUT MODE |
| | ADD | 5+DBOFS | |
| | SAN | 5 | |
| | DMR | NIOT | DECREMENT I/O TRANSFER COUNTER |

IS THIS THE LAST INPUT OR OUTPUT
STEP A15
INSTRUCTION

| LOCATION | OP CODE | LOCATION OR VALUE | DESCRIPTION |
|---|---|---|---|
| | BRC | OCMPC | YES |

PRESET DBC LATE TIMER
STEP A16
INSTRUCTION

| LOCATION | OP CODE | LOCATION OR VALUE | DESCRIPTION |
|---|---|---|---|
| PRST | LAP | LTPRS | |
| | SAN | DBCLT | |

IS DBC BUSY?
STEP A17
INSTRUCTION

| LOCATION | OP CODE | LOCATION OR VALUE | DESCRIPTION |
|---|---|---|---|
| BSYT | LAT | DBBSY | |
| | BRC | CONTN | |

DECREMENT DBC LATE TIMER
STEP A18
INSTRUCTION

| LOCATION | OP CODE | LOCATION OR VALUE | DESCRIPTION |
|---|---|---|---|
| | DMR | DBCLT | |

HAS DBC LATE TIMER EXPIRED?
STEP A19
INSTRUCTION

| LOCATION | OP CODE | LOCATION OR VALUE | DESCRIPTION |
|---|---|---|---|
| | BRS | BSYT | |

IS THIS THE FIRST ERROR?
STEP A20
INSTRUCTION

| LOCATION | OP CODE | LOCATION OR VALUE | DESCRIPTION |
|---|---|---|---|
| ERRCT | DMR | TRAGN | IS THIS THE FIRST ERROR |
| | BRS | STLP | YES TRY AGAIN |
| DBCER | DMR | 0 | NO HANG SYSTEM |

SUCCESSFUL I/O CYCLE COMPLETED
STEP A21
INSTRUCTION

| LOCATION | OP CODE | LOCATION OR VALUE | DESCRIPTION |
|---|---|---|---|
| CONTN | LAT | INPRG | INPUT MODE |
| | BRC | RPTO | NO |

NEXT TWO INSTRUCTIONS FOR INPUT ONLY
STEP A22
INSTRUCTION

| LOCATION | OP CODE | LOCATION OR VALUE | DESCRIPTION |
|---|---|---|---|
| | LAD | DBDRG | LOAD A FROM FFE4 (DBC DATA) |
| | SAN | O,X | TRANSFER FROM DBC DATA STORE DATA TO INPUT LOCATION SPECIFIED BY P COUNTER |
| | BRU | RPTI | INPUT MODE |

DECREMENT I/O MODE FLAG
STEP A23
INSTRUCTION

| LOCATION | OP CODE | LOCATION OR VALUE | DESCRIPTION |
|---|---|---|---|
| OCMPC | DMR | 4 | |

WAS THIS COMPLETION OF OUTPUTS
STEP A24
INSTRUCTION

| LOCATION | OP CODE | LOCATION OR VALUE | DESCRIPTION |
|---|---|---|---|

APPENDIX A

BRC IMM2E

INITIALIZATION COUNT COMPLETED?
STEP A25

| LOCATION | INSTRUCTION OP CODE | LOCATION OR VALUE | DESCRIPTION |
|---|---|---|---|
| | LAN | INZCT | |
| | TAM | | INIZ COUNT COMPLETED |
| | BRC | +4 | NO |

SET NORMAL RUN FLAGS IN PUDO
STEP A28

| LOCATION | INSTRUCTION OP CODE | LOCATION OR VALUE | DESCRIPTION |
|---|---|---|---|
| | LAP | PUDO2 | YES |
| | SAN | F | SET APPRV. FLAGS |
| | BRU | +3 | |

DECREMENT INIT COUNTER
STEP A26

| LOCATION | INSTRUCTION OP CODE | LOCATION OR VALUE | DESCRIPTION |
|---|---|---|---|
| | DMR | INZCT | |

INITIALIZATION COUNT COMPLETED
STEP A27

| LOCATION | INSTRUCTION OP CODE | LOCATION OR VALUE | DESCRIPTION |
|---|---|---|---|
| | BRS | FTCK | BRANCH IF FIRST TIME CHECK NOT COMPLETED |

SET INFORMATION POINTER & CALL IMMP
STEP A29

| LOCATION | INSTRUCTION OP CODE | LOCATION OR VALUE | DESCRIPTION |
|---|---|---|---|
| | LAP | INFPT | SET INFORMATION POINTER FOR IMMP |
| IMCJ1 | JIS | IMMWD | RUN IMMP (BRANCH TO I&MM POINTER) |

GO SEND OUTPUTS
PART OF STEP A9

| LOCATION | INSTRUCTION OP CODE | OR VALUE | DESCRIPTION |
|---|---|---|---|
| IMMP1 RETURNSBRU | | IOLP | PART OF STEP A9 |

IS FIRST TIME FLAG SET?
STEP A30

| LOCATION | INSTRUCTION OP CODE | LOCATION OR VALUE | DESCRIPTION |
|---|---|---|---|
| FTCK | LAP | FBAS | SET BIT REGISTER TO TEST DIAGF |
| | SAN | 3 | |
| INOFB | EQB | 0, #F | |
| | LAF | INOFB | INITIAL OUTPUT COMPLETE |
| | BRS | APPSU-2 | YES, SKIP OUTPUT PHASE (INTERMEDIATE, NOT 1st TIME) |

RESET FIRST TIME FLAG
STEP A32

| LOCATION | INSTRUCTION OP CODE | LOCATION OR VALUE | DESCRIPTION |
|---|---|---|---|
| | SST | INOFB | NO, RESET INITIAL OUTPUT FLAG |

SET FIRST PASS MODE
STEP A33

| LOCATION | INSTRUCTION OP CODE | LOCATION OR VALUE | DESCRIPTION |
|---|---|---|---|
| | LAP | PUDO | |
| | SAN | F | SET APPR. FLAGS |
| | BRU | APPSU | NO OUTPUTS FIRST TIME |

INITIALIZATION COUNT COMPLETE
STEP A40

INSTRUCTION
OP LOCATION

-continued
APPENDIX A

| LOCATION | CODE | OR VALUE | DESCRIPTION |
|---|---|---|---|
| IMM2E | LAN | INZCT | |
| | TAM | | TEST BIT E AND SET/RESET R ACCORDINGLY |
| | BRC | APPSU | INACT NOT COMPLETE GO TO APPSU |

SET INFORMATION POINTER & CALL IMMP
STEP A41
INSTRUCTION

| LOCATION | OP CODE | LOCATION OR VALUE | DESCRIPTION |
|---|---|---|---|
| IMCJ2 | LAP | INFPT | |
| | JIS | IMMWD | |

INITIALIZE COMPUTER STATUS WORD
STEP A34
INSTRUCTION

| LOCATION | OP CODE | LOCATION OR VALUE | DESCRIPTION |
|---|---|---|---|
| IMMP RETURNS | BRU | APPSU | |
| APPSU-2 | LAP | PUDO1 | |
| | SAN | F | SET APPR. FLAGS |
| APPSU | BSS | 0 | |
| | LAP | DBCAD | DBC ADDRESS FFE0 |
| | SAN | 2 | REESTABLISH DATA BASE |
| | LAP | SWIN | STATUS WORD INITIAL PRESET |
| | SAD | STAT | CONTROLLER STATUS WORD LOCATION |

INITIALIZE BASE & INDEX REGISTERS
STEP A35
INSTRUCTION

| LOCATION | OP CODE | LOCATION OR VALUE | DESCRIPTION |
|---|---|---|---|
| | LAP | ZERO | |
| | SAN | 2 | DATA BASE |
| | SAN | 5 | DATA INDEX |
| | LAP | BRBS | |
| | SAN | 3 | BIT BASE |

SET UP REPEATED LOGIC CONTROL
STEP A36
INSTRUCTION

| LOCATION | OP CODE | LOCATION OR VALUE | DESCRIPTION |
|---|---|---|---|
| | LAP | NLOOP | |
| | SAN | LPCNT | |
| | LAP | MIN1 | |
| | SAN | 4 | |

TURN ON APPLICATION PROGRAM
STEP A37
INSTRUCTION

| LOCATION | OP CODE | LOCATION OR VALUE | DESCRIPTION |
|---|---|---|---|
| | JIS | APPPT | |

ESTABLISH PROCEDURE BASE
STEP A42
INSTRUCTION

| LOCATION | OP CODE | LOCATION OR VALUE | DESCRIPTION |
|---|---|---|---|
| LPCTL | LAN | INITA | |
| | SAN | 1 | ESTABLISH PROCEDURE BASE REGISTER |

SAVE RETURN ADDRESS
STEP A43
INSTRUCTION

| LOCATION | OP CODE | LOCATION OR VALUE | DESCRIPTION |
|---|---|---|---|
| | LAN | 6 | |
| | SAN | LPBGP | |
| | LAN | 7 | |
| | SAN | LPBGP+1 | |

DECREMENT NUMBER OF LOOPS COUNT
STEP A44
INSTRUCTION

| LOCATION | OP CODE | LOCATION OR VALUE | DESCRIPTION |
|---|---|---|---|
| | DMR | LPCNT | DECREMENT REPEATED LOOP COUNTER |

MORE LOOPS THAN SPECIFIED
STEP A45
INSTRUCTION

APPENDIX A

| LOCATION | OP CODE | LOCATION OR VALUE | DESCRIPTION |
|---|---|---|---|
| RPTER | BRS<br>DMR | +2<br>0 | YES |

INCREMENT LOOP REPEAT POINTER
STEP A46

| LOCATION | INSTRUCTION OP CODE | LOCATION OR VALUE | DESCRIPTION |
|---|---|---|---|
| | LAP<br>ADD<br>SAN | ONE<br>4<br>4 | INCREMENT LOOP REPEAT POINTER |

PRESET DATA BASE & INDEX POINTER
STEP A47

| LOCATION | INSTRUCTION OP CODE | LOCATION OR VALUE | DESCRIPTION |
|---|---|---|---|
| SNBI | LAP<br>SAN<br>LAN<br>SRC<br>SAN | BNDX,X<br>2<br>2<br>12<br>5 | PRESET DATA BASE<br><br>FOR BIT INDEX<br>DECREMENT DATA INDEX |

RETURN TO BEGINNING OF LOGIC LOOP
STEP A48

| LOCATION | INSTRUCTION OP CODE | LOCATION OR VALUE | DESCRIPTION |
|---|---|---|---|
| | JIR | LPBGP | |

ESTABLISH PROCEDURE BASE
STEP A49

| LOCATION | INSTRUCTION OP CODE | LOCATION OR VALUE | DESCRIPTION |
|---|---|---|---|
| LPRP | LAN<br>SAN | INITA<br>1 | |

DECREMENT DATA BASE
STEP A50

| LOCATION | INSTRUCTION OP CODE | LOCATION OR VALUE | DESCRIPTION |
|---|---|---|---|
| | DMR | 2 | |

LOOP SATISFIED?
STEP A51

| LOCATION | INSTRUCTION OP CODE | LOCATION OR VALUE | DESCRIPTION |
|---|---|---|---|
| | BRS | SNBI | |

CLEAR DATA BASE & RETURN TO NEXT SEQUENTIAL INSTRUCTION
STEP A52

| LOCATION | INSTRUCTION OP CODE | LOCATION OR VALUE | DESCRIPTION |
|---|---|---|---|
| | LAP<br>SAN<br>JIR | ZERO<br>2<br>6 | YES |

PROGRAM CONSTANTS AND PRESETS
INITIALIZATION VALUES

| LOCATION | SYMBOLIC CODE (CONTENTS) | DESCRIPTION |
|---|---|---|
| ISSP | CON SINIT | ISSP START ADDRESS |
| | CON SINIT+EPAPP | APPLICATION PROG. ENTRY POINT |
| | CON STAPP | APP. PROG. START ADDRESS |
| | CON IMMM | IMMP START ADDRESS IN MEMORY |
| | CON SINIT+LPCTL | REPEAT LOGIC ENTRY ENTRY POINT |
| | CON SINIT+LPRP | |
| | CON 6 | INITIALIZATION COUNT PRESET |
| | CON #C000 | INITIAL FLAG WORD |
| NSV | CON —ISSP—1 | NUMBER OF INITIAL VA |
| NWTCL | CON ENCLB-STCLB | NUMBER OF WORDS TO CLEAR |
| NCTT | CON ENCNB-STCNB | NUMBER OF CONSTANTS TO TRANSFER |
| PMCAD | CON STCNP | STARTING ADDRESS OF PER |

APPENDIX A

| | | | |
|---|---|---|---|
| DBCAD | CON | FFE0 | DBC ADDRESS |
| SWIN | CON | #811 | STATUS WORD INITIAL PRESENT |
| BRBS | CON | 0040 | |
| PUDO | CON | #8000+KEY | INITIAL PASS FLAGS IN BITS 1 & 2 |
| PUDO1 | CON | #8002+KEY | |
| PUDO2 | CON | #8006+KEY | |
| BRFT | CON | TWORD | |
| FBAS | CON | DIAGF | |

NUMERICS

| LOCATION | | SYMBOLIC CODE (CONTENTS) | DESCRIPTION |
|---|---|---|---|
| ZERO | CON | 0 | |
| ONE | CON | 1 | |
| TWO | CON | 2 | |
| FOUR | CON | 4 | |
| EIGHT | CON | 8 | |
| MIN1 | CON | −1 | |

DBC DIAGNOSTICS

| LOCATION | | SYMBOLIC CODE (CONTENTS) | DESCRIPTION |
|---|---|---|---|
| NTRY | CON | 1 | NUMBER OF RETRYS AFTER DBC ERROR |
| LTPRS | CON | 12 | LATE TIMER PRESET |

LOGIC INSTRUCTION DIAGNOSTICS

| LOCATION | | SYMBOLIC CODE (CONTENTS) | DESCRIPTION |
|---|---|---|---|
| TWRDP | CON | #534B | |
| TWRDR | CON | #1453 | |

DBC CONTROL

| LOCATION | | SYMBOLIC CODE (CONTENTS) | DESCRIPTION |
|---|---|---|---|
| RWCNT | CON | #4800+DBRFT | BDC WRITE CONTROL WORD |
| RWCNT+1 | CON | #4000+DBRFT | DBC READ CONTROL WORD |

APPLICATION PROGRAM I/O STATUS INFORMATION

| LOCATION | | SYMBOLIC CODE (CON- TENTS) | DESCRIPTION |
|---|---|---|---|
| ADRCT | CON | OTSP-OTST | NUMBER OF OUTPUT ADDRESSES |
| | CON | INSP-INST | NUMBER OF INPUT ADDRESSES |
| ADRST | CON | OTST | STARTING OUTPUT ADDRESS |
| | CON | INST | STARTING INPUT ADDRESS |

APPLICATION PROGRAM LOOP CONTROL

| LOCATION | | SYMBOLIC CODE (CON- TENTS) | DESCRIPTION |
|---|---|---|---|
| NLOOP | CON | NRPLP | |
| BNDX | CON | NLP1-1 | |
| | CON | NLP2-1 | |
| | CON | NLP3-1 | |
| | CON | NLP4-1 | |
| | CON | NLP5-1 | |
| | CON | NLP6-1 | |
| | CON | NLP7-1 | |
| | CON | NLP8-1 | |

ABSOLUTE ADDRESS OF PREVIOUS LOCATION

| LOCATION | | SYMBOLIC CODE (CON- TENTS) | DESCRIPTION |
|---|---|---|---|
| INFPT | CON | SINIT-1 | |

CONSTANTS REQUIRED BY IMMP

| LOCATION | | SYMBOLIC CODE (CONTENTS) | DESCRIPTION |
|---|---|---|---|
| PRSC | CON | PRSEC | BASE OF POWER SECURITY BLOCK |
| | CON | IMTPT | |
| | JIS | STSTP | |
| | CON | ENAPP | |
| | CON | INSP | |
| | CON | OTSP | |
| | CON | ISSP | |

APPENDIX A

|       | CON | CTOS      |                       |
|-------|-----|-----------|-----------------------|
|       | CON | CTOF      |                       |
|       | CON | STCNP-STCNB |                     |
|       | CON | STAPP     |                       |
|       | CON | IMMSC     | IMMP SCRATCH LOCATION |
| ENSST | BSS | 0         | END STANDARD STATUS PROGRAM |
|       | EOF |           | END-MADE BY ASSEMBLER |

APPENDIX B

SCRATCH LOCATIONS REQUIRED

| SYMBOLIC CODE LOCATION | | VARIABLE CONTENTS | DESCRIPTION |
|---|---|---|---|
| DUMMYB | EQB | 0 | DUMMY WORD BIT ADDRESS |
| CRI | EQL | 0 | CURRENT INPUT WORDS CRI AND CRI+1 FROM I&MM |
| CRI+1 | EQL | 1 | |
| PBI | EQL | 2 | 3 RIGHTMOST DIGITS FROM I&MM PLACE THUMBWHEELS |
| DSPYI | EQL | 3 | VALUE FROM I&MM THUMBWHEELS |
| CO | EQL | 4 | OUTPUT WORDS CO,CO+1 TO I&MM |
| CO+1 | EQL | 5 | |
| DSPYO | EQL | 6 | OUTPUT DISPLAY TO I&MM |
| PRI | EQL | 7 | |
| PRI+1 | EQL | 8 | |
| CI | EQL | 9 | |
| CI+1 | EQL | A | |
| PO | EQL | B | |
| LOCC1 TO LOCC 6 ARE SCRATCH VARIABLES | | | |
| LOCC1 | EQL | D | |
| LOCC2 | EQL | E | |
| LOCC3 | EQL | F | |
| LOCC4 | EQL | 10 | |
| LOCC5 | EQL | 11 | |
| LOCC6 | EQL | 12 | |
| TWO LOCATIONS HERE, WORDS 13 AND 14, ARE FLAG WORDS | | | |
| FTAB | EQL | 15 | 1ST OF 16 WD BLK OF FORCED ADDRS |
| FTBB | EQB | 25,0 | THIS WORD CONTAINS STATES OF FORCED ADDRS |
| RTAB1 | EQL | 26 | 1ST OF 4 WD BLK, START OF RAM LOGIC STRING |
| RTAB2 | EQL | 2A | 1ST OF 4 WD BLK, START OF APPL PROG LOGIC STRING |
| RTAB3 | EQL | 2E | 1ST OF 4 WD BLK,SIZE INFO ON RUNG |
| RTAB4 | EQL | 32 | 1ST OF 4 WD BLK,1ST INSTR APPL PROG LOGIC STRING |
| FTBC | EQB | 36,0 | RECORDS NATURAL STATE OF FORCED OUTPUTS |
| FOUR LOCATIONS HERE, WORDS 37,38,39,3A RESERVED FOR EXECUTION AS PART OF TRAP IN APPLICATION PROGRAM | | | |
| SAVINS | EQL | 37 | LOCATION FOR SAVED CAT.1 INSTR |
| PRSEC | EQL | 3B | ADDRESS OF 10 WD POWER SEC BLOCK |
| IMTPT | EQL | 3C | POINTER TO 12 WD JIS BLK |
| STSTP | EQL | 3D | MASK FOR JIS TO ISSP FROM APPL PROG |
| ENAPP | EQL | 3E | END PERMISSIBLE APPL PROG LOCATION |
| INSP | EQL | 3F | END INPUTS (INCL THIS ADDRESS) |
| OTSP | EQL | 40 | END OUPUTS (INCL THIS ADDRESS) |
| ISSP | EQL | 41 | END INTERM (INCL THIS ADDRESS) |
| CTOS | EQL | 42 | START FINAL VALUE |
| CTOF | EQL | 43 | END FINAL VALUE(INCL THIS ADDRESS) |
| STMNS | EQL | 44 | DIFF BETWEEN FINAL VAL LOCATIONS |
| STAPP | EQL | 45 | START APPLICATION PROGRAM |
| IMMSC | EQL | 46 | BASE TO IMM SCRATCH AREA |
| LOCC7 | EQL | 47 | SCRATCH VARIABLE,ENTER&EXIT STATES ONLY |
| PBI1 | EQL | 48 | REMEMBERS PREV VALUE OF PLACE THUMBWHEELS |
| TEMP1 TO TEMP7 ARE SCRATCH VARIABLES | | | |
| TEMP1 | EQL | 49 | |
| TEMP2 | EQL | 4A | |
| TEMP3 | EQL | 4B | |
| TEMP4 | EQL | 4C | |
| TEMP5 | EQL | 4D | |
| TEMP6 | EQL | 4E | |
| TEMP7 | EQL | 4F | |
| SSTAT | EQL | 50 | |
| STATE | EQL | 51 | |
| FPGE | EQL | 52 | POINTS TO LAST INSTR IN APPL PROG |
| I | EQL | 53 | POINTS TO INFO TABLE FOR CURRENT LOGIC STRING |
| DB | EQL | 54 | LIFT LIMIT OF APPL PROG LOGIC STRING |
| RMB | EQL | 55 | LEFT LIMIT OF RAM LOGIC STRING |
| DX | EQL | 56 | RECORDS ABS ADDRESS OF HIGHEST CORE CURRENT SST |
| SZZ | EQL | 57 | RUNNING TOTAL OF ADDITIONS TO LOGIC STRINGS |
| SSSTAT | EQL | 58 | STATE REMEMBER FOR TIME SHARED SEARCH AND MOVE ROUTINES |
| REMINS | EQL | 59 | REMEMBERS WHICH FUNCTIONAL I&MM LIGHT LIT LAST TIME |
| S1 | EQL | 5A | SET AT LOWEST INDEX FOR SOME CRI, CRI+1 SET |
| S2 | EQL | 5B | SET AT LOWEST INDEX FOR SOME PRI,PRI+1 SET |
| SIZE | EQL | 5C | SIZE OF FREE AREA FOLLOWING APPL PROG |

APPENDIX B-continued

| | | | |
|---|---|---|---|
| LOC | EQL | 5D | =0 OR 1 DEP ON WHETHER LOGIC STRING IS IN APPL PROG OR RAM |
| DE | EQL | 5E | END OF CURRENT APPL PROG LOGIC STRING |
| RME | EQL | 5F | END OF CURRENT RAM LOGIC STRING |
| PB12 | EQL | 60 | REMEMBER SETTING OF PLACE THUMBWHEELS |
| N | EQL | 61 | NUMBER OF LOGIC STRINGS COPIED IN TO RAM |
| SZ | EQL | 62 | DIFF BETWEEN APPL PROG LOGIC STRING SIZE & COPY SIZE |

SZ ALSO USED IN BIT DISPLAY TO INDICATE IF BIT EXAMINED. SZ ALSO USED IN LOGIC DISPLAY TO REMEMBER STATE.

| | | | |
|---|---|---|---|
| SEG1 | EQL | 63 | POINTER TO SEGMENT 1 |
| DPTR | EQL | 64 | INSTR POINTER APPL PROG |
| RPTR | EQL | 65 | INSTR POINTER, RAM LOGIC STRING |
| IMINFO | EQL | 66 | SAVED A REGISTER |
| SAVBD | EQL | 67 | |
| SAVBB | EQL | 68 | |
| SAVXP | EQL | 69 | |
| SAVXD | EQL | 6A | |
| SAVEP | EQL | 6B | |
| SAVEBP | EQL | 6C | |
| SAVSTT | EQL | 6D | SAVED STATUS WORD |
| LPBI | EQL | 6E | INDEX WHEEL OF PLACE THUMBWHEELS |
| INDXBT | EQB | LOCC2 | |
| STATBB | EQB | 0,F | BUSY BIT,DBC STATUS WORD |
| BIT00 | EWB | 13,0 | CURR. INSTR. IS CFV,CTU,TTU,TOU |
| BIT01 | EQB | 13,1 | SET WHEN TRAP PLACED |
| BIT0 | EQB | 14,0 | SET WHEN ENTER KEY FIRST ACT. & REL. |
| BIT1 | EQB | 14,1 | SET IF CRI, CRI+1 HAS 0 1's TOTAL |
| BIT2 | EQB | 14,2 | SET WHILE IN REPEATED LOOP & NOT AT APPROPRIATE DRIVE |
| BIT3 | EQB | 14,3 | SET IF PRI,PRI+1 HAS 0 1's TOTAL |
| BIT4 | EQB | 14,4 | SET WHEN CRI,CRI+1 HAS 1 1's TOTAL |
| BIT5 | EQB | 14,5 | SET WHEN DOWNSTREAM SST REFERENCE FOUND |
| BIT6 | EQB | 14,6 | USED IN INITIALIZATION & COUNTER/TIMER BUILD ROUTINES |
| BIT7 | EQB | 14,7 | USED IN INITIALIZATION & LOGIC STRING DISPLAY ROUTINES |
| BIT8 | EQB | 14,8 | TEST MODE |
| BIT9 | EQB | 14,9 | FLAG TO REMEMBER TCR +2 DELS WHEN BUILDING OR WHEN MOVE REQUIRED IN IMMP SCRATCH |
| BITA | EWB | 14,A | SET IF SEARCH OR MOVE INCOMPL(STATS L & MV) |
| BITB | EQB | 14,B | SET IF SUCCESSFUL SEARCH IN STATL |
| BITC | EQB | 14,C | RECORDS ENTRY FOR IMMSP2-PASS |
| BITD | EQB | 14,D | SET IF COPY VERSION OF CURR APPL PROG LOGIC STRING EXISTS. ALSO USED AS LOCAL FLAG, STATE D5 |
| BITE | EQB | 14,E | SET IF PBI OUTSIDE FORCE REGION,(BIT DISPLAY) |

ALSO SET WHEN DISPLAYING COUNTER/TIMER ADDRESSES

| | | | |
|---|---|---|---|
| RSAV | EQB | 14,F | SAVES R BIT ON IMMP ENTRY |

THE FOLLOWING FOUR LOCATIONS DEFINE BITS IN WORD FOR ISSP-IMMP COMPATIBILITY CHECK

| | | | |
|---|---|---|---|
| EFF4 | EQB | F,4 | SET FOR SCM IMM VERSION |
| EFF5 | EQB | F,5 | |
| EFF6 | EQB | F,6 | |
| EFF7 | EQB | F,7 | |
| PUIMM | EQB | F,F | ALWAYS A 1 |
| BITS | EQB | F,2 | FIRST TIME BIT,IMMP |
| PLGI | EQB | 1,D | POWER BUS BIT,I&MM PLUGGED IN |
| COE | EQB | CO+1,E | |
| DSTL | EQB | 0,D | KEY BIT, DBC STATUS WORD |
| LOFI | EQB | CI,0 | LOGIC OR FALSE INPUT BUTTON |
| LOTI | EQB | CI,1 | LOGIC OR TRUE INPUT BUTTON |
| LAFI | EQB | CI,2 | LOGIC AND FALSE INPUT BUTTON |
| LATI | EQB | CI,3 | LOGIC AND TRUE INPUT BUTTON |
| SSTI | EQB | CI,4 | STORE STATUS INPUT BUTTON (K) |
| LDLI | EQB | CI,5 | LOAD L BUS INPUT BUTTON (L) |
| TCRI | EQB | CI,6 | TIMER COUNTER RESET INPUT BUTTON (RESET) |
| CFVI | EQB | CI,7 | COMPARE FINAL VALUE INPUT BUTTON (FV) |
| ISRTI | EQB | CI,8 | INSERT SPACE INPUT BUTTON |
| TTUI | EQB | CI,9 | INCREMENTAL TIMER INPUT BUTTON(0.1 SEC TIMER) |
| TOUI | EQB | CI,A | INCREMENTAL TIMER INPUT BUTTON(1 SEC TIMER) |
| LDPLYI | EQB | CI,B | LOGIC DISPLAY INPUT BUTTON |
| CTUI | EQB | CI,C | COUNTER INPUT BUTTON |
| BUILI | EQB | CI,D | COPY INPUT BUTTON (BUILI MEANS I&MM OPERATOR CAN BUILD LOGIC) |
| INDI | EQB | CI,E | INDEX INPUT BUTTON (X) |
| LTI | EQB | CI,F | MOVE LEFT INPUT BUTTON 158 |
| DELI | EQB | CI+1,0 | DELETE INPUT BUTTON |
| STDBI | EQB | CI+1,1 | STANDBY INPUT BUTTON |
| RTI | EQB | CI+1,2 | MOVE RIGHT INPUT BUTTON 160 |
| ERRI | EQB | CI+1,3 | ERROR INPUT BUTTON |
| STAT1I | EQB | CI+1,4 | CLOSE INPUT BUTTON |
| STAT2I | EQB | CI+1,5 | OPEN INPUT BUTTON |
| FORCI | EQB | CI+1,6 | FORCE INPUT BUTTON |
| TESTI | EQB | CI+1,7 | TEST INPUT BUTTON |
| LOCI | EQB | CI+1,8 | ADDRESS INPUT BUTTON (LOCI MEANS LOCATE) |
| BDPLYI | EQB | CI+1,9 | BIT DISPLAY INPUT BUTTON |
| VALI | EQB | CI+1,A | VALUE INPUT BUTTON |
| MLSSTI | EQB | CI+1,B | MULTI REF INPUT BUTTON (SST) |
| BSTORI | EQB | CI+1,C | COPY STORAGE CLEAR INPUT BUTTON (WHEN PRESSED OPERATION CAN NO LONGER BUID LOGIC) |

APPENDIX B-continued

| | | | |
|---|---|---|---|
| ENTRI | EQB | CI+1,E | ENTER KEY, INPUT ONLY |
| LOFO | EQB | PO,0 | |
| LOTO | EQB | PO,1 | LOGIC OR TRUE OUTPUT LIGHT |
| LAFO | EQB | PO,2 | LOGIC AND FALSE OUTPUT LIGHT |
| LATO | EQB | PO,3 | LOGIC AND TRUE OUTPUT LIGHT |
| SSTO | EQB | PO,4 | STORE STATUS OUTPUT LIGHT |
| LDLO | EQB | PO,5 | LOAD L BUS OUTPUT LIGHT (L) |
| TCRO | EQB | PO,6 | TIMER COUNTER RESET OUTPUT LIGHT |
| CFVO | EQB | PO,7 | COMPARE FINAL VALUE OUTPUT LIGHT |
| ISRTO | EQB | PO,8 | INSERT OUTPUT LIGHT |
| TTUO | EQB | PO,9 | INCREMENTAL TIMER (0.1 SEC) OUTPUT LIGHT |
| TOUO | EQB | PO,A | INCREMENTAL TIMER (1.0 SEC) OUTPUT LIGHT |
| LDPLYO | EQB | PO,B | LOGIC DISPLAY OUTPUT LIGHT |
| CTUO | EQB | PO,C | COUNTER OUTPUT LIGHT |
| BUILO | EQB | PO,D | COPY OUTPUT LIGHT (WHEN LIT OPERATOR CAN BUILD LOGIC) |
| INDO | EQB | PO,E | INDEX OUTPUT LIGHT |
| LTO | EQB | PO,F | MOVE LEFT OUTPUT LIGHT (158) |
| DELO | EQB | PO+1,0 | DELETE OUTPUT LIGHT |
| STDBO | EQB | PO+1,1 | STANDBY OUTPUT LIGHT |
| RTO | EQB | PO+1,2 | MOVE RIGHT OUTPUT LIGHT (160) |
| ERRO | EQB | PO+1,3 | ERROR OUTPUT LIGHT |
| STAT1O | EQB | PO+1,4 | CLOSE OUTPUT LIGHT |
| STAT2O | EQB | PO+1,5 | OPEN OUTPUT LIGHT |
| FORCO | EQB | PO+1,6 | FORCE OUTPUT LIGHT |
| TESTO | EQB | PO+1,7 | TEST OUTPUT LIGHT |
| LOCO | EQB | PO+1,8 | ADDRESS OUTPUT LIGHT (LOCO MEANS LOCATION IS DISPLAYED) |
| BDPLYO | EQB | PO+1,9 | BIT DISPLAY MODE LIGHT |
| VALO | EQB | PO+1,A | VALUE OUTPUT LIGHT |
| MLSSTO | EQB | PO+1,B | MULTI REFERENCE OUTPUT LIGHT (SST) |
| BSTORO | EQB | PO+1,C | COPY (BSTORP MEANS BUILD STORAGE HAS COPY IN IT) |
| COILO | EQB | PO+1,D | COIL STATE LIGHT |
| RLOOPO | EQB | PO+1,E | REPEATED LOOP LIGHT |
| POO | EQB | PO,0 | |
| CQQ | EQB | CQ,0 | |
| CRII | EQB | CRI,0 | |
| PRII | EQB | PRI,0 | |
| CII | EQB | CI,0 | |
| P | EQL | 0 | PLACE COUNTER REGISTER |
| BP | EQL | 1 | BASE REGISTER, PROCEDURE REFERENCE |
| BD | EQL | 2 | BASE REGISTER, DATA REFERENCE |
| BB | EQL | 3 | BASE REGISTER, BIT REFERENCE |
| X4 | EQL | 4 | INDEX REGISTER, PROCEDURE REFERENCE |
| X5 | EQL | 5 | INDEX REGISTER, DATA AND BIT REFERENCE |
| X6 | EQL | 6 | REGISTER 6 |
| X7 | EQL | 7 | REGISTER 7 |
| X8 | EQL | 8 | |
| X9 | EQL | 9 | |
| XA | EQL | A | |
| XB | EQL | B | |
| XC | EQL | C | |

PERMANENT CONSTANTS FOR IMMP

| SYMBOLIC CODE LOCATION | | VALUES | DESCRIPTION |
|---|---|---|---|
| | ORG | STIMMP,A | |
| IMMSOO | BRU | INIFOR | |
| C | CON | #0 | |
| A1 | CON | #1 | |
| B | CON | #2 | |
| F1 | CON | #3 | |
| D3 | CON | #4 | |
| D1 | CON | #5 | |
| A2 | CON | #6 | |
| D5 | CON | #7 | |
| E | CON | #8 | |
| G1 | XON | #9 | |
| B1 | CON | #A | |
| H | CON | #B | |
| G | CON | #C | |
| PA | CON | #D | |
| MV | CON | #E | |
| D2 | CON | #F | |
| Q | CON | #10 | |
| D4 | CON | #11 | |
| D6 | CON | #12 | |
| F2 | CON | #13 | |
| H1 | CON | #14 | |
| EX2 | CON | #15 | |
| EX | CON | #16 | |
| N1 | CON | #17 | |
| D | CON | #18 | |
| F | CON | #19 | |
| I0 | CON | #1A | |

APPENDIX B-continued

| | | |
|---|---|---|
| M | CON | #1B |
| A | CON | #1C |
| L | CON | #1D |
| ZERO | CON | 0 |
| ITU | CON | 8 |
| CX7800 | CON | #7800 |
| CX7000 | CON | #7000 |
| TH31 | CON | #1F |
| C254 | CON | 254 |
| BEGRAM | CON | LPBI+1 |
| CXEE00 | CON | #EE00 |
| EIGHT | CON | 8 |
| CJIRM1 | CON | #D801 |
| STREM | CON | RPTR |
| CSSTA | CON | #07FF |
| CM1 | CON | −1 |
| THREE | CON | 3 |
| OTUC | CON | #C |
| SIX | CON | 6 |
| CNTCON | CON | 20 |
| C15 | CON | 15 |
| FIVE | CON | 5 |
| NINE | CON | 9 |
| TWO | CON | 2 |
| ONE | CON | 1 |
| MSK1 | CON | #00FF |
| MSK2 | CON | #0FFF |
| CSST | CON | #F000 |
| CSST8 | CON | #F800 |
| CSSTM | CON | #4000 |
| CCTU | CON | #C000 |
| CCFV | CON | #9000 |
| CTCR | CON | #6000 |
| CLDL | CON | #5000 |
| CFFE0 | CON | #FFE0 |
| CJISM | CON | #C800 |
| JSJRCV | CON | #D80D |
| JISCV | CON | #C80C |
| SANXC | CON | #800C |
| LAPHD | CON | #A82F |
| CTRTMR | CON | #9008 |
| JISCON | CON | SAVINS |
| CXM400 | CON | −#400 |

INIFOR — INITIALIZATION AND FORCE STATES (See Fig. 41)

| SYMBOLIC LOCATION | OP CODE | ADDRESS OR VALUE | DESCRIPTION |
|---|---|---|---|
| INIFOR | SAN | XA | |
| | LAN | BD | |
| | SAN | XB | |
| | LAN | XA | |
| | SAN | BD | |
| | LAD | 10 | |
| | SAN | BD | |
| | LAN | XB | |
| | SAD | SAVBD | |
| | LAN | BB | |
| | SAD | SAVBB | |
| | LAN | X4 | |
| | SAD | SAVXP | |
| | LAN | X5 | |
| | SAD | SAVXD | |
| | LAN | BD | |
| | SAN | BB | |
| | LAP | CM1 | |
| | SAN | X5 | |
| | LAN | 0,X | GET STATUS REGISTER |
| | SAD | SAVSTT | SAVE STATUS REGISTER |
| | LDL | PUIMM | ALWAYS A1 |
| | SST | RSAV,B | SAVE R BIT |
| | LAF | BITS | FIRST TIME BIT, IMMP |
| | BRS | IN | FIRST TIME INTO IMMP |
| | LOT | BITC | FIRST OR 2ND IMMP PASS |
| | BRS | IN | |
| | LAP | PA | |
| | SUB | STATE | IS THIS ENTRY FROM APPL PROG |
| | TEQ | | |
| | LAP | PA | |
| | BRS | ST10 | BRANCH THRU STATE DISPATCH TO STATE PA |
| IN | LAN | XA | |
| | SAD | IMINFO | SAVE A REGISTER |
| | LAN | X6 | |
| | SAD | SAVE P | |
| | LAN | X7 | |
| | SAD | SAVE BP | |
| COMPATIBILITY WITH ISSP CHECK | | | |
| | CON | #20F4+ WHERE | SET TO LAT IF SCM VERSION |
| | LAF | EFF5 | |
| | LAF | EFF6 | |
| | SAF | EFF7 | |

APPENDIX B-continued

|     |     |     |     |
| --- | --- | --- | --- |
|  | BRC | EXIT04 | COMPATIBILITY CHECK OK - IF NOT EXIT 04 |
|  | LAF | BITS | IS THIS FIRST TIME IN |
|  | BRC | FORC00 | NOT ABSOLUTE FIRST TIME IN |
|  | LAP | STREM |  |
|  | SAN | X5 |  |
|  | LAP | ZERO |  |
| IN3 | SAD | CRI,X |  |
|  | SST | BITC | SET BITC,2 PASS FLAG |
|  | DMR | X5 |  |
|  | BRS | IN3 |  |
|  | LAP | H | #B |
|  | SAN | X5 |  |
|  | LAD | IMINF0 | GET SAVED A REGISTER |
| IN2 | SAN | BD |  |
|  | LAD | 5,X | PICK UP INFO BLOCK |
|  | SAN | X4 |  |
|  | LAN | BB | GET IMMP DATA BASE |
|  | SAN | BD |  |
|  | LAN | X4 |  |
|  | SAD | PRSEC,X | TRANSFER IMFORMATION BLOCK |
|  | LAD | IMINFO |  |
|  | DMR | X5 |  |
|  | BRS | IN2 |  |
|  | LAP | CSM400 |  |
|  |  | − #400 |  |
|  | SAD | SEG1 |  |

GOING TO SET UP BLOCK IN IMMP SCRATCH WHICH WILL BE EXECUTED IN LOGIC STRING DISPLAY MODES

|     |     |     |     |
| --- | --- | --- | --- |
|  | SAP | SANXC |  |
|  | SAD | SAVINS+1 |  |
|  | LAP | LAPHD | CON #A20F, EQUIV TO A LAP +20 |
|  | SAD | SAVINS+2 |  |
|  | LAP | JSJRCV |  |
|  |  | #D80D |  |
|  | ADD | IMTPT | POINTS TO LOWER MEMORY IMMP WORDS |
|  | SAD | SAVINS+3 |  |
|  | LAP | CSSTA |  |
|  |  | #07FF |  |
|  | ANA | SAVINS+3 |  |
|  | SAN | X5 |  |
|  | DMR | X5 |  |
|  | LAP | JISCON | REL POINTER TO IMMP SCR |
|  | ADD | IMMSC |  |
|  | SAN | 0,X | FIX UP INDIRECT WORD FOR JIS TO IMM SCR. |
|  | LAN | 1 | LOAD PROCEDURE BASE |
|  | SAN | 1 | FIX UP INDIRECT WORDS FOR JIR FROM IMM SCR TO PR |
|  | SAN 2,X |  |  |
|  |  |  | PROCEDURE FROM IMM SCRATCH |
|  | SUB | SEG1 |  |
|  | SAD | SEG1 | POINTER TO NEXT SEGMENT |
|  | LAD | STSTP | GOING TO SET UP SEARCH FOR STSTP |
|  | SAD | LOCC1 |  |
|  | LAP | CM1 | INTERESTED IN ALL BITS |
|  | SAD | LOCC2 |  |
|  | LAD | STAPP |  |
|  | SAD | LOCC3 |  |
|  | LAD | ENAPP |  |
|  | SAD | LOCC4 |  |
|  | LAP | D2 |  |
|  | SAD | SSSTAT |  |
|  | LAP | L |  |
|  | BRU | DIS1 | SET STATE AND EXIT |
| FORC00 | LAP | C15 |  |
|  | SAN | X6 |  |
| IN9 | SAN | X5 |  |
|  | LAP | ZERO |  |
|  | SUB | FTAB,X |  |
|  | TEQ |  |  |
|  | BRS | IN8 |  |
|  | LOT | FTBB,X |  |
|  | SST | BIT6 | REMEMBER FORCED STATE |
|  | LOT | FTBC,X |  |
|  | SST | BIT7 | REMEMBER PHOTO STATE |
|  | LAD | FTAB,X |  |
|  | SAN | X5 |  |
|  | CLR |  |  |
|  | SRR | 4 |  |
|  | SUB | INSP |  |
|  | TGR |  |  |
|  | BRC | IN6 | OUTSIDE OUTPUT BIT REGION |
|  | LOT | BITC | FIRST OR SECOND TIME INTO IMMP |
|  | BRS | IN7 |  |
|  | LOT | DUMMY B,X |  |
|  | SST | BIT7 | SAVE A NEW PHOTO STATE |
|  | BRU | IN6 |  |
| IN7 | LAT | BIT7 |  |
|  | SST | DUMMY,B,X | UNFORCE OUTPUT, RESTORE PHOTO |
|  | BRU | IN8 |  |
|  | LOT | BIT6 |  |
|  | SST | DUMMYB,X | FORCE BIT APPROPRIATELY |
|  | LAN | X6 |  |

APPENDIX B-continued

|  | SAN | X5 |  |
|---|---|---|---|
|  | LOT | BIT7 |  |
|  | SST | FTBC | SAVE PHOTO OF STATE IN TABLE |
| IN8 | DMR | X6 |  |
|  | LAN | X6 |  |
|  | BRS | IN9 |  |
|  | LOT | BITC | IS THIS SECOND IMMP PASS |
|  | BRS | EXIT04 | DBC NOT TO BE KICKED THIS EXIT |
|  | LAD | REMINS |  |
|  | SAN | X5 |  |
|  | SST | LOFO,X | TURN OFF PREV I&MM LIGHT |
|  |  |  | ENTR00 -- INPUT ROUTINE |
|  |  |  | (See FIG. 42) |

| SYMBOLIC CODE LOCATION | OP CODE | ADDRESS OR VALUE | DESCRIPTION |
|---|---|---|---|
| ENTR00 | LAP | THREE |  |
|  | SAD | LOCC7 |  |
|  | LAP | CFFE0 |  |
|  | SAN | X5 | INDEX REGISTER POINTING TO DBC |
|  | SAN | BB |  |
| ENTR02 | LAT | STATBB | IS DBC BUSY |
|  | BRS | ENTR02 |  |
|  | LAP | ITU8 |  |
|  | SAN | 3,X | SET EXTERNAL ADDRESS FOR DBC |
|  | LAP | CX7000 |  |
|  | SAN | 0,X | SET DBC STATUS REGISTER, RO,FOR READ |
| ENTR03 | LAT | STATBB | IS DBC BUSY |
|  | BRS | ENTR03 |  |
|  | LAN | 4,X | GET DATA WORD |
|  | SAN | X4 |  |
|  | LAP | THREE |  |
|  | SUB | LOCC7 |  |
|  | SAN | X5 |  |
|  | LAN | X4 |  |
|  | SAD | CRI,X | STORE INPUT WORD TO DATA |
|  | LAP | CM1 |  |
|  | ADD | LOCC7 |  |
|  | SAD | LOCC& |  |
|  | TAM |  |  |
|  | LAP | CFFE0 |  |
|  | SAN | X5 |  |
|  | BRC | ENTR03 |  |
|  | LAD | IMMSC |  |
|  | SAN | BB | RESTORE BIT BASE |
|  | LOF | PLGI,B | IS POWER BUS BIT SET |
|  | BRC | ENTR15 |  |
|  | LAP | A1 |  |
|  | BRU | ST10 |  |
| ENTR15 | SST | PLGI,B | CLEAR POWER BUS BIT |
|  | LAP | CSST | CON #F000 |
|  | ANA | PBI | PBI IS NOW COMPLETE (PLACE THUMBWHEELS) |
|  | SRR | 12 |  |
|  | SAD | LPBI | INDEX WHEEL (PLACE THUMBWHEELS) |
|  | LAP | MSK2 |  |
|  | ANA | PBI |  |
|  | SAD | PBI |  |
|  | LAP | ZERO |  |
|  | SAD | CI |  |
|  | SAD | CI+1 | CLEAR EFFECTIVE INPUT WORDS CI,CI+1 |
|  | LAD | CRI |  |
|  | SAD | CO |  |
|  | LAD | CRI+1 |  |
|  | SAD | CO+1 | WRITE CRI,CRI+1, TO CO,CO+1 |
|  | SST | COE | CLEAR BIT E OF CO |
|  | LAP | TH31 | #1F |
|  | SAN | X5 |  |
|  | SAN | X6 | GOING TO BE NUMBER OF 1's IN CRI,CRI+1 |
|  | DMR | X5 |  |
| ENTR08 | LAT | CRII,X |  |
|  | BRC | ENTR11 |  |
|  | LAN | X5 |  |
|  | SAD | S1 |  |
|  | BRU | ENTR12 |  |
| ENTR11 | DMR | X6 |  |
| ENTR12 | DMR | X5 |  |
|  | BRS | ENTR08 |  |
|  | LAN | X6 |  |
|  | SAD | LOCC7 |  |
|  | LOT | BIT4 | DID PREV INPUT HAVE 1 1's |
|  | BRC | ENTR23 |  |
|  | LAP | ZERO |  |
|  | SUB | LOCC7 | DOES CRI,CRI+1 HAVE 0 1's |
|  | TEQ |  |  |
|  | BRC | ENTR24 |  |
| T2 | SST | BIT1 |  |
|  | CLR |  |  |
|  | BRU | ENTR07 |  |
| ENTR24 | STR |  |  |
| ENTR07 | SST | BIT4 |  |
|  | BRU | ENTR14 |  |
| ENTR23 | LAP | ONE |  |

APPENDIX B-continued

```
              SUB  LOCC7
              TAM              DOES CURRENT INPUT HAVE 1 1's
              BRS  ENTR24      YES
              SST  BIT4        CLEAR BIT 4
              LAP  ZERO
              SUB  LOCC7
              TEQ              DOES CURRENT INPUT HAVE 0 1's
              BRS  ENTR06      YES
    ENTR14    LAP  C254
              SAD  S2
              BRU  ENTR01
    ENTR06    SST  BIT1,B
              LAF  BIT3,B
              BRC  ENTR14
              LAD  PRI
              SAD  CI
              LAD  PRI+1
              SAD  CI+1
              LAP  CFFE0
              SAN  BB
              LOT  DSTL        IS KEY SWITCH IN RUN (DBC STATUS WORD)
              LAD  IMMSC
              SAN  BB
              LAT  TESTI
              SST  TESTI       TESTI AND DSTL
              LAP  CFFE0
              SAN  BB
              LOT  DSTL        IS KEY SWITCH IN RUN (DBC STATUS WORD)
              LAD  IMMSC
              SAN  BB
              LAT  ENTRI
              SST  ENTRI       AND ENTRI AND DSTL
    ENTR01    LAD  CRI
              SAD  PRI
              LAD  CRI+1
              SAD  PRI+1
              LOT  BIT1
              SST  BIT3
              CLR
              SST  BIT1
                               STATE DISPATCH TABLE
                               (SEE FIG. 65)
```

| CODE LOCATION | OP CODE | ADDRESS OR VALUE | DESCRIPTION |
|---|---|---|---|
| STDISP | LAP | EX | |
| | SAD | LOCC7 | |
| | LAD | STATE | |
| | SAN | X4 | |
| | BRU | P,X | |
| | BRU | STATN1 | |
| | BRU | STATDT | |
| | BRU | STATDF | |
| | BRU | STATIO | |
| | BRU | STATM | |
| | BRU | STATA | |
| | BRU | STATL | |
| EXIT01 | LAP | EX | |
| ST10 | SAN | X4 | |
| | BRU | EXCG1 | BRANCH TO EXIT ROUTINE, SEG 1 |
| EXIT04 | LAP | EX2 | |
| | BRU | ST10 | |

STATE DF
(See FIGS. 51a-51f)

| SUMBOLIC CODE LOCATION | OP CODE | ADDRESS OR VALUE | DESCRIPTION |
|---|---|---|---|
| STATDF | SSF | BIT6 | SET FLAG BIT 6 |
| | SST | LOCO | LIGHT ADDRESS LIGHT |
| | CLR | | |
| | SST | VALO | TURN VALUE LIGHT OFF |
| | LAT | BIT8 | |
| | SST | TESTO | SET TEST MODE LIGHT APPROP. |
| | LAT | BIT5 | |
| | SST | MLSSTO,B | SET MULTI REF LIGHT APPROP. |
| | LAP | ZERO | |
| | SUB | N | |
| | TAM | | |
| | SST | BSTORO | SET COPY STORAGE USE LIGHT APPROP. |
| | LAP | F | |
| | SUB | STATE | |
| | TEQ | | |
| | SST | BUILO | SET COPY MODE LIGHT APPROP. |
| | LOF | BUILO | |
| | SST | LDPLYO,B | SET LOGIC DISPLAY LIGHT APPROP |
| | LAD | STATE | |
| | SAD | SSTAT | JUST IN CASE OF FUTURE EXITS |
| | SAD | SZ | JUST IN CASE OF FUTURE EXITS |
| | LAT | STDBI | HAS STANDBY BUTTON BEEN PRESSED |
| | BRC | +S(P) | NO-JUMP |
| | LAF | TESTO | STANDBY OK IF NOT IN TEST MODE |
| | LAP | A1 | |

APPENDIX B-continued

```
              BRS   DISB00
              BRU   DISB47        ERROR
              LOT   BDPLYI
              BRS   DISB01
              LOT   MLSSTI        HAS MULTI REF BUTTON BEEN PRESSED
              LAP   D4
              BRS   DISB00
DISB73        LOT   ENTRI
              BRC   DISB58
              SST   BIT0          SET WHEN ENTER KEY ACTUATED
              BRU   DISB72
DISB58        LAP   CSSTA
              SAD   TEMP3         MASK LEAVES ADDRESS ONLY
              LAP   ONE
              SAD   TEMP7
              LAP   CSST
              SAD   TEMP6
              LAD   LOC           =0 IF LOGIC DISPLAY, =1 IF COPY MODE
                                  OR COPY/TEST
              SAN
              X5
FOLLOWING CODE SAVES OP CODE & OPERAND OF CURRENT INSTR. & OP CODE
OF PREVIOUS INSTR.
              LAD   DB,X          GET APPROPR LEFT EXTREMITY
              ADD   STAPP,X
              SAD   LOCC4
              LAD   DPTR,X        GET CURRENT INSTR POINTER
              ADD   STAPP,X
              SAN   X5
DISB23        LAN   0,X           GET CURR INSTR
DISB26        SAD   LOCC5
              ANA   TEMP6         MASK LEAVES OP CODE ONLY
              SAD   LOCC6
              LAP   CCTU          FIRST 4 BITS SAME AS JIS OP CODE
              SUB   LOCC6
              TEQ
              BRC   DISB27
              LAN   X5            GET CURRENT INSTR POINTER
              SUB   LOCC4         IS IT LEFT LIMIT OF LOGIC STRING
              TEQ
              BRS   YES
              DISB46
              LOF   BIT6          FINISHED
              BRS   DISB60        YES
              LOF   RTO
              BRC   DISB27+2
              LAD   SAVINS        GET INSTR WHICH WAS OVERWRITTEN
              BRU   DISB26
DISB27        LOF   BIT6
              BRS   DISB60        FINISHED
              SST   BIT6          CLEAR BIT6
              LAD   LOCC6
              SAD   TEMP2         SAVE OP CODE OF CURR INSTR
              LAD   LOCC5
              SAD   LOCC2
              ANA   TEMP3
              SAD   TEMP1         SAVE ADDR OF CURRENT INSTR
              DMR   X5            SET POINTER AT PREV INSTR
              BRU   DISB23
DISB46        LAD   I
              SAN   X5
              LAD   RTAB4,X       GET SAVED INSTR.
              BRU   DKSB26
DISB60        LAD   LOC
              SAN   X5
              LAD   DPTR,X
              SUB   DE,X
              TAM
              SST   RTO,B
              LAD   DPTR,X
              SUB   DB,X
              TGR
              SST   LTO
              BRS   DISB03
              TAM   IS B GT
                    PTR
              BRC   DISB03
              LOT   BUILO
              BRC   DISB03
              LAD   RMB
              SAD   RPTR
DISB57        CLR
              SST   BITE          CLEAR BIT E
              BRU   DISB33
DON'T SET TRAP THIS TIME BECAUSE POINTER CHANGED
DISB03        LOT   LTI           MOVE LEFT INPUT BUTTON (158)
              BRS   DISB02
              LOT   RTI           MOVE RIGHT INPUT BUTTON (160)
              BRC   DISB19
              LOT   LDPLYO
              BRS   DISB04
DISB05        LOF   RTO           MOVE RIGHT OUTPUT LIGHT (160)
              BRS   DISB33        SET UP BRANCH TO STATE Q IF NECESSARY
```

APPENDIX B-continued

```
                LAD   DPTR,X
                ADD   TEMP7
                SAD   DPTR,X
                BRU   DISB57
DISB04          LAD   DPTR
                SUB   DB
                TNL
                BRS   DISB05
                LAP   CLDL
                SUB   TEMP2     IS INSTR (DPTR) EQ. LDL
                TEQ
                BRC   DKSB05
                LAD   DB
                SAD   DPTR
                BRU   DISB57
DIS1            SAD   STATE
                BRU   EXIT01
DISB01          LAP   ZERO
                SAD   PO
                SAD   PO+1
                LAP   B1
                BRU   DISB00
DISB02          LAT   LTO       MOVE LEFT OUTPUT LIGHT (158)
                BRC   DISB19
                LAD   DPTR,X
                SUB   TEMP7
                SAD   DPTR,X
                BRU   DISB57
DISB19          LAP   P+2
                BRU   FUNCTO
                CON   P+1
                CLR
                LOT   DELO
                BRC   DISB20
                LAP   CM1
                SAD   DSPYO
                BRU   DISB65
DISB20          LAD   TEMP1     DSPYO=ADD(PTR)
                SAN   X5
                SRR   4
                LOT   BIT00     CFVO,CTUO,TTUO,TOUO
                BRS   DISB13
                LOT   LOFO
                BRS   DISB43
                LOT   LAFO
                BRC   DISB25
DISB43          LOF   STAT10
                SST   STAT10    FOR LOF OR LAF STAT10 INVERTED
                LOF   STAT20
                SST   STAT20    INVERT STAT10, STAT20
DISB25          SUB   TEMP7     SUBTRACT 1
                SUB   INSP      END OF INPUTS
                TAM             IS CURRENT OPERAND IN INPUT REG
                BRC   DISB44    NO
                LAP   C15
                SAN   X5
DISB45          LAD   TEMP1
                SUB   FTAB,X
                TEQ
                BRS   DISB44    YES, IT IS A FORCED INPUT
                DMR   X5
                BRS   DISB45
DISB44          SST   FORCO     SET FORCE LIGHT APPROPR
                BRU   DISB64
DISB13          LOT   BITE
                BRS   DISB75
                LOT   LOCI
                BRS   DISB63
                SST   LOCO      CLEAR LOCO
                STR
                SST   VALO
DISB65          CLR
                SST   STAT10
                SST   STAT20    TURN OFF STAT10, STAT20
                BRU   DISB44
DISB75          LOF   VALI      HAS VALUE PB BEEN PRESSED
                BRS   DISB65
DISB63          SST   BITE      SET BITE
                BRU   DISB65
DISB64          LOT   TESTI
                BRC   DISB16
DISB72          LAP   G
                BRU   DISB00
DISB16          LOT   LDPLY1
                BRC   DISB37
                LAD   PB1
                SUB   PB12
                TEQ
                LAP   D3
                BRC   DISB00
                LAT   BUIL0
                BRC   DISB33
                LAP   D6
```

APPENDIX B-continued

```
           BRU  DISB00
DISB37     LOT  BSTOR1    HAS COPY STORAGE CLEAR BUTTON BEEN PRESSED
           BRC  DISB18
           LAT  TESTO
           BRS  DISB47
           LOT  BUILO
           BRC  DISB22
DISB21     LAP  D6
           SAD  SSTAT
DISB22     LAP  A2
           BRU  DISB00
DISB47     LAP  FIVE      ERROR
           BRU  DISB69
DISB18     LOT  BUILO
           BRS  DISB17
           LOT  BUIL1
           BRC  DISB24
           LAP  E
           BRU  DISB00
DISB24     LOT  LTO
           LOT  LDLO
           LOF  LTI
           BRS  DISB66
           LAP  CLDL      SET UP TO CALL SEARCH STATE
           SAD  LOCC1
           LAP  CSST
           SAD  LOCC2
           LAD  STAPP
           SAD  LOCC4     FINISH ADDRESS FOR SEARCH STATE
           ADD  DPTR
           SAD  LOCC3     START ADDRESS
           LAP  M
           SAD  SSSTAT
           LAP  L
           BRU  DISB00
DISB24     LOT  LTO
           LOT  LDLO
           LOF  LTI
           BRS
           DISB66
           LAP  CLDL      SET UP TO CALL SEARCH STATE
           SAD  LOCC1
           LAP  CSST
           SAD  LOCC2
           LAD  STAPP
           SAD  LOCC4     FINISH ADDRESS FOR SEARCH STATE
           ADD  DPTR
           SAD  LOCC3     START ADDRESS
           LAP  M
           SAD  SSSTAT
           LAP  L
           BRU  DISB00
DISB66     LOT  TESTO     ARE WE IN TEST MODE
           BRC  DISB33
           LAF  BITD      DOES A COPY OF THIS LOGIC STRING EXIST
           BRS  DISB33    NO
           SST  COILO     CLEAR COIL STATE LIGHT
           BRU  DISB33
DISB17     LAT  TESTO
           BRS  DISB33
           SST  COILO     CLEAR COIL STATE LIGHT
           LAP  OTUC      # C
           SUB  S2        AT THIS TIME, S2=NTH BIT SET IN CI
           TAM
           BRS  DISB29
           LAD  S2
           SAN  X4
           LAP  MV
           SAD  LOCC1
           LAD  ISSP
           SAD  LOCC5     SET UP GENERAL BOUNDS PROVISIONALLY
           SST  BIT6      CLEAR BIT6
           SST  BIT9      CLEAR BIT9
           BRU  +1,X      BRANCH ON VALUE OF OP CODE
           BRU  DISB10    OP CODE IS LOF
           BRU  DISB10    OP CODE(TO BE BUILT)IS LOT
           BRU  DISB10    OP CODE IS LAF
           BRU  DISB10    OP CODE IS LAT
           BRU  DISB06    OP CODE IS SST
           BRU  DISB59    OP CODE IS LDL
           BRU  DISB31    OP CODE IS TCR
           BRU  RISB28    OP CODE IS CFV
           BRU  DISB30    INSERT
           BRU  DISB32    OP CODE IS TTU
           BRU  DISB32    OP CODE IS TOU
           BRU  EXIT01    FIND
           BRU  DISB32    OP CODE IS CTU
DISB06     LAD  INSP
           SAD  LOCC1     SET SST BOUND
           LAP  CLDL
           SUB  LOCC6     IS INSTR(RPTR-1) EQ LDL
           TEQ
           BRC  DKSB10
```

APPENDIX B-continued

```
         BRU  DISB09    ERROR
DISB59   LAP  ONE
         ADD  RPTR
         SAN  X5
         LAP  CSSTM
         SAD  TEMP5
         LAP  CSST
         ANA  O,X       LEAVE ONLY OP CODE OF INSTR(RPTR+1)
         SUB  TEMP5     IS
         TEQ
         BRS  DISB09    ERROR
         LAP  CSSTM
         SUB  LOCC6     IS INSTR(RPTR-1)EQ SST
         TEQ
         BRS  DISB10
         LAD  RPTR
         SUB  RMB
         TEQ
         BRC  DISB09
DISB10   LOT  BIT00     CFVO,CTUO,TTUO,TOUO
         BRS  DISB76
         LOF  TCRO
         BRU  DISB14
DISB76   LAP  D3        HEX 4
         BRU  DISB69
DISB32   LOT  VALO
         BRC  DISB11
         LAN  X4
         SUB  REMINS    DOES BUTTON PRESSED CORRESP WITH LIGHT ON
         TEQ
         BRC  DISB76    ERROR
         BRU  DISB49    GO AND CHANGE CURRENT VALUE
DISB11   LAD  ISSP
         SAD  LOCC1
         LAP  CM1
         ADD  CTOS
         SAD  LOCC5     SET BOUNDS FOR CURRENT VAL INSTRUCTIONS
         LAP  CTCR
         SUB  LOCC6
         TEQ
         BRU  DISB14
RISB28   LOT  CFVO      IS CURR INSTR A CFV
         BRC  DISB76    ERROR
         LOT  VALO      YES, IS VALUE LIGHT ON
         BRC  RISB29
DISB49   LAP  ZERO
         SAD  REMINS    THIS STOPS LIGHT FROM BEING TURNED OFF
         LAP  IO
         BRU  DISB00
RISB29   LAP  NINE
         SAN  X4
         LAP  CM1
         ADD  CTOS
         SAD  LOCC1
         LAD  CTOF
         SAD  LOCC5     SET CFV BOUNDS
         BRU  DISB28
DISB31   LAD  RPTR
         SAN  X5
         LAP  CM1
         SUB  2,X
         TEQ
         BRC  DISB12
         LAP  CM1
         SUB  1,X
         TEQ
         SST  BIT9      SET IF BUILDING A SET OVER DELS
         BRS  DISB28
DISB12   LOT  TCRO
DISB14   BRC  DISB76    ERROR
DISB28   LAD  DSPYI
         CLR
         SRR  4
         SAD  LOCC3
         SUB  LOCC1     UPPER BOUND
         TGR
         BRC  DISB34
         LAD  LOCC5     LOWER BOUND
         SUB  LOCC3
         TNL
         BRS  DISB38
DISB34   LOF  BIT6
DISB77   LAP  ONE       ERROR
         BRC  DISB69
         LAT  CFVI
         BRC  DISB67
         LAP  C15       F, TRY DIFFERENT BOUNDARIES
         SAD  LOCC1
         LAD  INSP
         SAD  LOCC5
DISB68   STR
         SST  BIT6,B
         BRU  DISB28
```

APPENDIX B-continued

| | | | |
|---|---|---|---|
| DISB67 | LOT | BIT00,B | CFVO,CTOU,TTOU,TOUO |
| | BRC | DISB77 | ERROR |
| | LAD | INSP | |
| | SAD | LOCC1 | TRY DIFFERENT BOUNDARIES |
| | LAD | OTSP | |
| | SAD | LOCC5 | |
| | BRU | DISB68 | |
| DISB09 | LAP | THREE | ERROR |
| DISB69 | SAD | LOCC5 | |
| | LAP | N1 | |
| | BRU | DISB00 | |
| DISB38 | LOT | BIT00 | CFVO,CTUO,TTUO,TOUO |
| | BRC | DISB40 | |
| | LAD | LOCC3 | |
| | SAD | DSPYI | |
| DISB40 | LAP | ONE | |
| | LOT | DEL0 | ARE WE BUILDING OVER A DEL |
| | BRC | DISB07 | NO |
| DISB62 | LOT | BIT9 | DO WE HAVE DUMMY CFV, TTU TO ADD |
| | BRS | DISB41 | YES |
| DISB53 | ADD | SZZ | RUNNING TOTAL OF ADDITIONS TO COPIES |
| | SUB | SIZE | SIZE OF FREE AREA FOLLOWING APPL PROG |
| | TGR | | |
| | BRC | DISB48 | PERMISSION TO BUILD |
| | BRU | DISB76 | ERROR |
| DISB07 | LAP | ZERO | |
| | BRU | DISB62 | |
| DISB41 | ADD | TEMP7 | ADD1 |
| | ADD | TEMP7 | ADD1 |
| | BRU | DISB53 | |
| DISB48 | ADD | SIZE | |
| | SAD | SZZ | |
| | LAN | X4 | |
| | SCR | 4 | |
| | ADD | DSPTI | |
| | SAD | LOCC2 | |
| | LOT | INDO | |
| | BRC | DISB35 | |
| | LAF | CFVO | |
| | BRC | DISB35 | |
| | SST | INDXBT | |
| DISB35 | LAD | RPTR | |
| | SAN | X5 | |
| | LAD | LOCC2 | |
| | SAD | 0,X | INSERT COMPLETE INSTR IN LOGIC STRING |
| | LOF | BIT9 | |
| | BRS | DISB33 | WE DON'T HAVE TO PUT IN DUMMIES |
| | LAP | TWO | |
| | ADD | RPTR | |
| | SAN | X5 | |
| | LAP | CTRTMR | DUMMY TTU OR CFV |
| | SAD | 0,X | PUT IN DUMMY CFV |
| | DMR | X5 | |
| | SAD | 0,X | PUT IN DUMMY TTU |
| | BRU | DISB33 | SET UP BRANCH FOR STATE Q |
| DISB29 | LAD | RPTR | |
| | SAN | X5 | |
| | LOT | DEL1 | |
| | BRC | DISB39 | GO CHECK FOR INDEX BUTTON |
| | LAT | SSTO | |
| | BRS | DISB5 | |
| | LOT | TCRO | |
| | BRS | DISB61 | |
| | LOT | BIT00 | CFVO,CTUO,TTUO,TOUO |
| | BRS | DISB76 | ERROR |
| DISB52 | LAP | CM1 | |
| DISB42 | SAD | 0,X | DELETE INSTRUCTION |
| | BRU | DISB33 | |
| DISB61 | LAP | CM1 | |
| | SAD | 2,X | |
| | SAD | 1,X | |
| | BRU | DISB42 | |
| DISB51 | LAD | 1,X | |
| | ANA | TEMP6 | OP CODE ONLY REMAINING |
| | SAD | LOCC3 | SAVE INSTR |
| | LAP | CSSTM | LOAD MASK FOR SST |
| | SUB | LOCC3 | |
| DISB54 | TEQ | | |
| | BRS | DISB52 | |
| | LAP | CSSTM | |
| | SUB | LOCC6 | IS INSTR(RPTR-1)=SST |
| | TEQ | | |
| | BRS | DISB52 | |
| | LAD | 1 | |
| | SAN | X5 | |
| | LAP | MSK1 | |
| | ANA | RTAB3,X | CLEAR LEFT 8 BITS TO 0's |
| | SAN | X4 | |
| | ADD | RTAB1,X | |
| | SAN | X5 | |
| DISB55 | LAP | CM1 | |
| | SAD | 0,X | PUT DELS IN COLLAPSED LOGIC STRING |

APPENDIX B-continued

|  |  |  |  |
|---|---|---|---|
|  | DMR | X5 |  |
|  | DMR | X4 |  |
|  | BRS | DISB55 |  |
|  | BRU | DISB33 | SET UP BRANCH FOR STATE Q |
| DISB39 | LOT | RLOOPO | ARE WE IN REP LOOP |
|  | BRC | DISB33 |  |
|  | LOT | INDI |  |
|  | BRC | DISB33 |  |
|  | LOT | CFVO |  |
|  | BRS | DISB76 | ERROR |
|  | LOT | DELO | DON'T INDEX A DEL |
|  | BRS | DISB76 | ERROR |
|  | LAD | RPTR |  |
|  | SAN | X5 |  |
|  | LAD | O,X |  |
|  | SAD | LOCC2 |  |
|  | LOF | INDO |  |
|  | SST | INDSBT |  |
|  | LAD | LOCC2 |  |
|  | SAD | O,X |  |
|  | BRU | DISB33 |  |
| DISB30 | LOT | TCRO |  |
|  | BRS | DISB76 | ERROR |
|  | LAP | CTCR |  |
|  | SUB | LOCC6 | IS INSTR(RPTR-1)=TCR |
|  | TEQ |  |  |
|  | BRS | DISB76 | ERROR |
|  | LAP | F1 |  |
| DISB00 | SAD | STATE |  |
|  | BRU | DIB79 |  |
| DISB33 | LOT | BIT01 | TRAP ALREADY IN POSITION |
|  | BRS | DIS1 | YES-SET STATE PA & EXIT |
| DISB79 | LAP | Q |  |
|  | BRU | ST10 |  |

STATE L
(See FIG. 63)
SPECIAL SEARCH ROUTINE LOOKS DOWNSTREAM OR UPSTREAM FOR A PARTICULAR MASHED PATTERN

| SYMBOLIC CODE LOCATION | OP CODE | ADDRESS OR VALUE | DESCRIPTION |
|---|---|---|---|
| STATL | LAP | CNTCON | DETERMINES NO OF SEARCHES AT A TIME |
|  | SAN | XA |  |
|  | LOF | BITA | HAVE WE BEEN IN PREVIOUSLY |
|  | BRS | ST6 |  |
|  | LAD | LOCC4 |  |
|  | SAN | XB |  |
|  | BRU | ST4 |  |
| ST6 | SST | BITA |  |
|  | LAD | LOCC4 |  |
|  | SUB | LOCC3 |  |
|  | TAM |  |  |
|  | BRS | ST2 | HAVE TO LOOK UPSTREAM |
|  | SAN | B |  |
|  | LAP | ONE |  |
|  | BRU | ST3 |  |
| ST2 | LAD | LOCC3 |  |
|  | SUB | LOCC4 |  |
|  | SAN | B |  |
|  | LAP | CM1 |  |
| ST3 | SAD | LOCC6 |  |
|  | LAD | LOCC3 | STARTING ADDRESS |
| ST7 | SAN | X5 |  |
|  | SAD | DSPYO |  |
|  | LAN | O,X |  |
|  | ANA | LOCC2 |  |
|  | SUB | LOCC1 |  |
|  | TEQ |  |  |
|  | BRS | ST5 |  |
|  | DMR | XA |  |
|  | BRC | ST8 | HAVE FINISHED INTERNAL NO OF SEARCHES |
| ST4 | DMR | XB |  |
|  | BRC | ST5 | SEARCH OVER, UNSUCCESSFUL |
|  | LAD | LOCC3 |  |
|  | ADD | LOCC6 |  |
|  | SAD | LOCC3 |  |
|  | BRU | ST7 |  |
| ST5 | SST | BITB |  |
|  | CLR |  |  |
|  | SST | BITA | CLEAR BITA |
|  | LAD | SSSTAT |  |
|  | BRU | DIS1 | SET STATE & EXIT |
| ST8 | LAN | XB |  |
|  | SAD | LOCC4 |  |
|  | BRU | EXIT01 |  |

STATE 10
(See FIG. 54)

| SYMBOLIC CODE LOCATION | OP CODE | ADDRESS OR VALUE | DESCRIPTION |
|---|---|---|---|
| STAT10 | LAP | TWO |  |

APPENDIX B-continued

```
            SAN  X5
            LAD  DSPTI
            TAM
            BRS  TS3       DSPY17999
TS1         SCR  12
            SAD  LOCC1
            LAP  CTCR         6000
            ADD  LOCC1
            BRS  DISB76    ERROR, DSPYI NON DECIMAL
            DMR  X5
            BRC  TS2
            LAD  LOCC1
            BRU  TS1
TS2         LAT  CFVO      IS THE VALUE REFERRED TO BY A CFV INSTR
            BRC  TS6
            LAD  TEMP1
            SUB  INSP      IS THE FINAL VALUE DEFINED BY INPUT
                           THUMBWHEELS
            TRG
TS6         LAD  TEMP1     GET OP CODE OF CFV
            BRC  TS5
            ADD  STMNS
            SAN  X5
            STR
            LAP  ZERO
            SAN  O,X
DMR         O,X
BRS         TS3  PERM
                 CONSTANT
                 AREA
                 ROM'D
            LAD  DSPYI
            SAN  O,X       CHANGE PERM CONSTANT AREA
            LAN  X5
            SUB  STMNS     DIFF BETWEEN FINAL VALUE REGIONS
TS5         SAN  X5
            LAD  DSPYI
            SAN  O,X       CHANGE IN LOWER CORE
TS4         LAD  SSTAT
            BRU  DIS1      SET STATE & EXIT
TS3         LAP  TWO       ERROR
            SAD  LOCC5
            LAP  N1
            BRU  DIS1
```

STATE M
(See FIG. 55)

SUBSEQUENT TO LOOKING FOR A PREV LDL

| SYMBOLIC CODE LOCATION | OP CODE | ADDRESS OR VALUE | DESCRIPTION |
|---|---|---|---|
| STATM | LOF | BITB | |
| | BRS | M1 | NO PREV LDL FOUND |
| | SST | BITB | CLEAR BITB |
| | LAD | LOCC3 | |
| | SUB | STAPP | FOUND PREV LDL |
| M2 | SAD | DPTR | |
| | BRU | TS4 | SET STATE = SSTAT & EXIT |
| M1 | LAD | DB | NO PREV LDL |
| | BRU | M2 | |

STATE A
(See FIG. 44)

| SYMBOLIC CODE LOCATION | OP CODE | ADDRESS OR VALUE | DESCRIPTION |
|---|---|---|---|
| STATA | LAD | SIZE | |
| | SAD | DSPYO | |
| | LOF | BDPLYI | CHECK FOR BIT DISPLAY BUTTON ON |
| | BRC | A01 | |
| | LAF | LDPLYI | |
| | SST | STDBO | |
| | BRS | EXIT01 | |
| | LAP | A | |
| | SAD | SSTAT | |
| | LAP | D3 | |
| A02 | SST | STDBO | CLEAR STANDBY LIGHT |
| | BRU | DIS1 | |
| A01 | LAP | B1 | |
| | BRU | A02 | |

STATE N1
(See FIG. 49)

ERROR STATE, DISPLAYS APPROPRIATE ERROR CODE, TURNS OFF ALL LIGHTS EXCEPT ERROR LIGHT

| SYMBOLIC CODE LOCATION | OP CODE | ADDRESS OR VALUE | DESCRIPTION |
|---|---|---|---|
| STATN1 | LAP | CXEEOO | |
| | ADD | LOCC5 | FORM ERROR CODE |
| | SAD | DSPYO | |
| | LAP | ZERO | |

APPENDIX B-continued

```
            SAD  P0
            SAD  P0+1
            LOF  ERR1         HAS ERROR BUTTON BEEN PRESSED
            SST  ERR0         SET ERROR LIGHT APPROPRIATELY
            BRC  TS4
            BRU  EXIT01
```

SUBROUTINE FUNCT0
(See FIG. 64)

SUBROUTINE TO LIGHT APPROPRIATE FUNCTIONAL LIGHTS, I.E. LOF, LOT, LAF, LAT, SST, LDL, RESET, FV, OIL & 1 SEC TIMERS, X, INSERT SPACE, DELETE AND COUNTER. DATA AND BIT BASES SHOULD CONTAIN RAM AND THE INSTRUCTION ITSELF SHOULD BE SAVED IN LOCATION LOCC2. PREVIOUS INSTRUCTION OP CODE TO BE SAVED IN LOCATION, LOCC6. BIT00 (WORD 13, BIT 0, IMM SCRATCH) SET IF INSTR (PTR) IS CFV, CTU, TTU, TOU.

| SYMBOLIC CODE LOCATION | OP CODE | ADDRESS OR VALUE | COMMENTS |
|---|---|---|---|
| FUNCT0 | SAN | X4 | |
|  | LAP | CM1 | |
|  | SUB | LOCC2 | IS THE INSTR A DEL |
|  | TEQ | | |
|  | SAD | LOCC3 | |
|  | BRC | ENTR25 | |
|  | SAD | LOCC2 | CLEAR INDEX BIT IN LOCC2 |
|  | LAP | Q | #10 |
|  | BRU | ENTR31 | |
| ENTR25 | LAD | LOCC2 | LOAD CURR INSTR |
|  | SRR | #C | SHIFT RIGHT 12 BITS |
|  | SAD | LOCC3 | |
| ENTR31 | SAN | X5 | |
|  | LAP | EIGHT | |
|  | SUB | LOCC3 | INSTR=CFV OR TTU1 |
|  | TAM | | |
|  | SST | BIT00 | CFV0,CTU0,TTU0,TOU0 |
|  | BRC | ENTR26 | |
|  | LAP | CTCR | |
|  | SUB | LOCC6 | IS PREV INSTR A TCR |
|  | TEQ | | |
|  | BRS | ENTR26 | |
| ENTR30 | STR | | |
|  | SST | INDXBT | SET INDEX BIT FOR CFV |
|  | LAP | D5 | #7 |
|  | SAN | X5 | |
| ENTR26 | STR | | |
|  | SST | LOF0,X | LIGHT APPROPRIATE LIGHT |
|  | LAN | X5 | |
|  | SAD | REMINS | REMEMBER BIT SET |
| ENTR27 | LOT | RLOOP0 | IS THIS A REPEATED LOOP |
|  | BRC | IMMS00,X | |
|  | LAT | INDXBT | |
|  | SST | IND0 | SET INDEX LIGHT APPROP. |
|  | BRU | IMMS00,X | |

POINTER TABLE FOR ENTRY TO SEG1
(See FIG. 65)

| SYMBOLIC CODE LOCATION | OP CODE | ADDRESS | COMMENTS |
|---|---|---|---|
| IMMS01 | BRU | +1,X | |
|  | BRU | STATC | |
|  | BRU | STATA1 | |
|  | BRU | STATB | |
|  | BRU | STATF1 | |
|  | BRU | STATD3 | |
|  | BRU | STATD1 | |
|  | BRU | STATA2 | |
|  | BRU | STATD5 | |
|  | BRU | STATEE | |
|  | BRU | STATG1 | |
|  | BRU | STATB1 | |
|  | BRU | STATH | |
|  | BRU | | STATG |
|  | BRU | STATPA | |
|  | BRU | STATMV | |
|  | BRU | STATD2 | |
|  | BRU | STATQ | |
|  | BRU | STATD4 | |
|  | BRU | STATD6 | |
|  | BRU | STATF2 | |
|  | BRU | STATH1 | |
|  | BRU | EXIT03 | |
|  | BRU | EXIT02 | |

STATE C
(See FIG. 46)

| SYMBOLIC CODE LOCATION | OP CODE | ADDRESS OR VALUE | COMMENTS |
|---|---|---|---|
| STATC | SAN | X4 | |
|  | LAP | C15,X | |
|  | SAN | X5 | |
| FOCE01 | LAP | ZERO,X | |

APPENDIX B-continued

|  | SUB | FTAB,X | |
|---|---|---|---|
|  | TEQ | | |
|  | BRS | FOCE00 | FOUND A ZERO ENTRY IN FTAB |
|  | DMR | X5 | |
|  | BRS | FOCE01 | LOOK AT NEXT ENTRY |
|  | LAP. | ERROR,7 | |
|  | D5,X | | |
| FOCE02 | SAD | LOCC5 | |
|  | LAP | N1,X | |
|  | BRU | DIS12 | |
| FOCE00 | LAN | X5 | |
|  | SAD | SZ | |
|  | SST | FORC0 | |
|  | LAD | PBI | |
|  | SAD | FTAB | MAKE ENTRY IN TABLE |
|  | SAN | X5 | |
|  | LOT | DUMMY,X | GET CURRENT STATUS |
|  | LAD | SZ | |
|  | SAN | X5 | |
|  | SST | FTBB,X | SAVE CURRENT STATUS |
|  | LAP | B,X | |
|  | BRU | DIS12 | |

STATE B
(See FIG. 45)

| SYMBOLIC CODE LOCATION | OP CODE | ADDRESS OR VALUE | COMMENTS |
|---|---|---|---|
| STATB | SAN | X4 | SAVE OFFSET CONSTANT |
|  | STR | | |
|  | SST | BDPLY0 | |
|  | LAT | BIT8 | TEST BIT |
|  | SST | TEST0 | |
|  | LAP | ZERO,X | |
|  | SUB | N | |
|  | TAM | | |
|  | SST | BSTOR0 | SET COPY STORAGE LIGHT |
|  | LAD | PBI | |
|  | SAN | X5 | |
|  | LAT | DUMMYB | |
|  | SST | STAT10 | |
|  | LOF | STAT10 | |
|  | SST | STAT20 | SET CLOSE & OPEN LIGHTS |
|  | SUB | PBI1 | HAS PLACE INPUT CHANGED |
|  | TEQ | | |
|  | LAP | B1,X | |
|  | BRC | DIS12 | |
|  | LAT | ENTR1 | |
|  | BRC | DPLY12 | |
|  | SST | BIT0 | SET WHEN ENTER KEY ACTUATED |
|  | BRU | DPLY14 | |
| DPLY12 | LOT | TEST1 | |
|  | BRC | DPLY00 | |
| DPLY14 | LAP | G,X | |
| DPLY15 | SAD | STATE | |
|  | LAP | B1,X | |
|  | SAD | SSTAT | |
|  | BRU | EXIT00 | |
| DPLY00 | LOT | LDPLY1 | |
|  | BRS | DPLY01 | YES |
|  | LOT | STDB1 | HAS STDB1 BUTTON BEEN PRESSED |
|  | LAP | A1,X | LOAD IN CASE ABOUT TO SET STATE |
|  | BRS | DPLY22 | |
|  | LOT | BSTOR1 | HAS COPY STORAGE CLEAR BUTTON BEEN PRESSED |
|  | BRC | DPLY13 | NO |
| DPLY23 | LAP | A2,X | LOAD IN CASE ABOUT TO SET STATE |
| DPLY22 | LAT | TEST0 | ARE WE IN TEST MODE |
|  | BRC | DPLY15 | NO-OK |
|  | LAP | FIVE,X | ERROR |
|  | BRU | DPLY06 | |

JUMP TO DPLY21 FROM STATE H AT COMPLETION OF ENTER ROUTINE

| DPLY21 | CLR | | |
|---|---|---|---|
|  | SST | TEST0 | CLEAR TEST LIGHT |
|  | BRU | DPLY23 | |
| DPLY13 | LOT | BITE | |
|  | BRS | EXIT00 | |
|  | LAD | SZ | |
|  | SAN | X5 | |
|  | LAT | FORC1 | |
|  | LAP | ONE,X | |
|  | BRS | DPLY04 | YES |
|  | ADD | SZ | |
|  | BRS | EXIT00 | |
|  | LAT | STAT11 | CLOSE BUTTON |
|  | BRC | DPLY16 | |
| DPLY18 | SST | FTBB,X | SET FORCE STATE APPROP. |
|  | BRU | EXIT00 | |
| DPLY16 | LAF | STAT21 | OPEN BUTTON |
|  | BRC | DPLY18 | |
|  | BRU | EXIT00 | |
| DPLY04 | ADD | SZ | |
|  | BRS | DPLY07 | |

APPENDIX B-continued

|  | LAP | | |
|---|---|---|---|
|  | ZERO,X | | |
|  | SAD | FTAB,X | |
|  | BRU | DPLY03 | |
| DPLY07 | LAP | C,X | SET STATE C |
|  | BRU | DPLY15 | |
| DPLY01 | LAP | D3,X | |
|  | BRU | DPLY15 | |

STATE B1
(See FIG. 45)
A CHANGE HAS OCCURRED IN THE PLACE THUMBWHEEL INPUT, OR IN THIS STATE PRIOR TO STATE B

| SYMBOLIC CODE LOCATION | OP CODE | ADDRESS OR VALUE | COMMENTS |
|---|---|---|---|
| STATB1 | SAN | X4 | |
|  | LAP | B,X | |
|  | SAD | STATE | |
|  | LAD | PBI | |
|  | SRR | 4 | |
|  | SAD | LOCC3 | |
|  | SUB | ISSP | END INTERMEDIATE REGION |
|  | TGR | | |
|  | BRS | DPLY OUTSIDE EXAMIN REGION | |
|  | LAP | C15,X | START BIT EXAMIN REGION |
|  | SAN | X5 | |
|  | SUB | LOCC3 | |
|  | TGR | | |
|  | BRS | DPLY17 | OUTSIDE EXAMIN REGION |
|  | TAM | | |
|  | BRC | DPLY19 | OUTSIDE FORCE, WITHIN EXAMIN REGION |
|  | LAD | LOCC3 | |
|  | SUB | OTSP | |
|  | TGR | | |
| DPLY20 | SST | BITE | CLEAR IF PBI IN FORCIBLE REGION |
|  | BRS | DPLY03 | OUTSIDE FORCE, WITHIN EXAMIN REGION |
| DPLY10 | LAD | FTAB,X | |
|  | SUB | PBI | |
|  | TEQ | | |
|  | BRS | DPLY09 | A FORCED ENTRY HAS BEEN FOUND |
|  | DMR | X5 | ENTRY NOT FOUND |
|  | BRS | DPLY10 | LOOK AT NEXT ENTRY |
| DPLY03 | CLR | | |
|  | LAP | CM1,X | |
|  | BRU | DPLY11 | |
| DPLY09 | LAN | X5 | A FORCED ENTRY HAS BEEN FOUND |
| DPLY11 | SAD | SZ | |
|  | SST | FORCO | |
|  | LAD | PBI | |
|  | SAD | DSPYO | |
|  | BRU | EXIT00 | |
| DPLY19 | STR | | |
|  | BRU | DPLY20 | |
| DPLY17 | LAP | ZERO,X | ERROR |
| DPLY06 | SAD | LOCC5 | |
|  | LAP | N1,X | |
|  | BRU | DPLY15 | |

STATE F1
(See FIG. 57)
THIS STATE IS IMMEDIATELY SUBSEQUENT TO INSERT BUTTON BEING PRESSED.

| SYMBOLIC CODE LOCATION | OP CODE | ADDRESS OR VALUE | COMMENTS |
|---|---|---|---|
| STATF1 | SAN | X4 | |
|  | LAP | ONE,X | |
|  | SAD | LOCC3 | SAVE IN CASE NEEDED FOR STATMV |
|  | ADD | RPTR | |
|  | SAN | X5 | |
|  | ADD | IMMSC | |
|  | SAD | LOCC2 | SAVE IN CASE NEEDED FOR STATMV |
|  | LAP | CM1,X | |
|  | SUB | O,X | IS INSTR EQ TO NOP |
|  | TEQ | | |
|  | BRS | STAF10 | |
|  | LAP | CM1,X | |
|  | ADD | N | |
|  | SAN | X5 | |
|  | SAD | TEMP5 | |
|  | LAP | MSK1,X | |
|  | ANA | RTAB3,X | LEAVE BITS 0–7 |
|  | ADD | RTAB1,X | |
|  | SAD | TEMP3 | |
|  | LAP | C254,X | |
|  | SUB | TEMP3 | |
|  | TGR | | |
|  | BRS | STAF13 | |
| STAF16 | LAP | D5,X | ERROR,7 |

APPENDIX B-continued

| Symbolic Location | OP Code | Address or Value | Comments |
|---|---|---|---|
| | BRU | ET3 | SET STATE N1 & EXIT |
| STAF13 | SST | BIT9 | SET BIT9 TO IND. MOVE IN IMM SCRATCH |
| | LAP | ONE,X | |
| | ADD | TEMP3 | |
| | ADD | IMMSC | |
| | SAD | LOCC5 | HIGHEST CORE ADDRESS FOR MOVE ROUTINE |
| | LAP | F2,X | |
| | SAD | SSSTAT | RETURN STATE AFTER MOVE ROUTINE |
| | LAP | MV,X | |
| DIS12 | SAD | STATE | |
| | BRU | EXIT00 | |

STATE F2
(See FIG. 57)
SUBSEQUENT TO MOVE ROUTINE FOR MAKE SPACE PURPOSES

| SYMBOLIC CODE LOCATION | OP CODE | ADDRESS OR VALUE | COMMENTS |
|---|---|---|---|
| STATF2 | SAN | X4 | SAVE OFFSET CONSTANT |
| | LAD | TEMP5 | LOAD N-1 |
| | SAN | X5 | |
| STAF14 | SUB | 1 | |
| | TGR | | |
| | BRC | STAF11 | |
| | LAP | ONE,X | X |
| | ADD | RTAB1,X | |
| | SAD | RTAB1,X | |
| | LAN | X5 | |
| | DMR | X5 | |
| | BRU | STAF14 | |
| STAF11 | LAP | ONE,X | |
| | ADD | RTAB3,X | |
| | SAD | RTAB3,X | |
| | LAP | ONE,X | |
| | ADD | RME | |
| | SAD | RME | |
| STAF10 | LAP | ONE,X | |
| | ADD | RPTR | |
| | SAD | RPTR | RPTR=RPTR+1 |
| STAF15 | LAD | SSTAT | |
| | BRU | DIS12 | SET STATE & EXIT |

STATE D1
(See FIG. 48)
RETURN HERE AFTER FIRST SEARCH FOR SST REFERENCE

| SYMBOLIC CODE LOCATION | OP CODE | ADDRESS OR VALUE | COMMENTS |
|---|---|---|---|
| STATD2 | SAN | X4 | SAVE OFFSET CONSTANT |
| | LOF | BITB | R ALREADY CLEAR |
| | BRS | D11 | NO REFERENCE |
| | SST | BITB | YES, REFERENCE, & CLEAR BITB |
| | LAD | LOCC3 | |
| | SAD | DX | SET DX=REF POINTER |
| D34 | LAD | DX | |
| | SUB | STAPP | |
| | SAD | DPTR | SET NEW CURRENT INSTR POINTER |
| | LAD | DX | |
| | SUB | FPGE | |
| | TEQ | | |
| | LAP | D5,X | |
| | BRS | DIS12 | SET STATE & EXIT |
| | SAD | SSSTAT | SPECIAL RETURN FOR SEARCH & MOVE STATES |
| | LAP | ONE,X | |
| | ADD | DX | |
| | SAD | LOCC3 | SET UP TO CALL SEARCH STATE L AGAIN |
| | BRU | D37 | |
| D11 | LAP | ONE,X | ERROR |
| | BRU | ET3 | SET STATE N1 & EXIT |

STATE D3
(See FIG. 47)
SUBSEQUENT TO LOGIC DISPLAY BUTTON PRESSED

| SYMBOLIC CODE LOCATION | OP CODE | ADDRESS OR VALUE | COMMENTS |
|---|---|---|---|
| STATD3 | SAN | X4 | SAVE OFFSET CONSTANT |
| | LAD | PBI | |
| | SAD | PBI2 | REMEMBER REFERENCE USED FOR FIND |
| D33 | LAP | D1,X | SET UP TO CALL SEARCH STATE L |
| | SAD | SSSTAT | |
| | LAD | STAPP | START SEARCH POINT |
| | SAD | LOCC3 | |
| D37 | LAP | CSSTM,X | |
| | ADD | PBI2 | |
| | SAD | LOCC1 | PATTERN TO SEARCH FOR |
| | LAP | CM1,X | −1 |
| | SAD | LOCC2 | |
| | CLR | | |
| | SST | INDXBT | CLEAR INDEX BIT OF LOCC2 |
| | LAD | FPGE | |
| | SAD | LOCC4 | |
| | LAP | ZERO,X | |

|  | SAD | PO | SET STATE OF ALL OUTPUTS TO ZERO |
|---|---|---|---|
|  | SAD | PO+1 |  |
|  | LAP | L,X |  |
|  | BRU | DIS12 |  |

STATE D4
(See FIG. 47)
SUBSEQUENT TO MULTI-REFERENCE BUTTON BEING PRESSED.

| SYMBOLIC CODE LOCATION | OP CODE | ADDRESS OR VALUE | COMMENTS |
|---|---|---|---|
| STATD4 | SAN | X4 | SAVE OFFSET CONSTANT |
|  | LAF | MLSSTO | IS MULTI REF LIGHT ON |
|  | BRS | D33 | NO |
|  | BRU | D34 |  |

STATE D5
(See FIG. 50)

| SYMBOLIC CODE LOCATION | OP CODE | ADDRESS OR VALUE | COMMENTS |
|---|---|---|---|
| STATD5 | SAN | X4 | SAVE OFFSET CONSTANT |
|  | SST | BIT6 | CLEAR BIT6 |
|  | SST | BIT7 | CLEAR BIT7 |
|  | SST | BITD | CLEAR FLAG BITD |
|  | LOT | BITB |  |
|  | SST | BIT5 | SET DOWNSTREAM REF BIT APPROPR. |
|  | BRC | DPIN01 |  |
|  | CLR |  |  |
|  | SST | BITB | CLEAR BITB |
|  | LAD | LOCC3 |  |
|  | SAD | DX | REMEMBER WHERE FOUND |
| DPIN01 | LAP | ONE,X |  |
|  | SAD | TEMP1 |  |
|  | LAP | CSST,X |  |
|  | SAD | TEMP3 |  |
|  | LAP | CSSTM,X |  |
|  | SAD | TEMP4 |  |
|  | LAP | CSST8,X |  |
|  | SAD | LOCC1 |  |
|  | LAP | CTCR,X |  |
|  | SAD | LOCC2 |  |
|  | LAP | ZERO,X |  |
|  | SAD | LOCC6 |  |
|  | SAD | LOCC5 |  |
|  | LAD | DPTR |  |
|  | ADD | STAPP |  |
|  | ADD | TEMP1 |  |
|  | SAN | X5 |  |
| DPIN14 | LAN | O,X |  |
|  | ANA | TEMP3 | SAVE OP CODE ONLY |
|  | SUB | TEMP4 | SEARCH FOR SST |
|  | TEQ |  |  |
|  | BRS | DPIN13 | SST FOUND |
|  | DMR | X5 |  |
|  | LAN | X5 |  |
|  | SUB | STAPP |  |
|  | SAD | DE |  |
|  | LAD | DPTR |  |
|  | ADD | STAPP |  |
|  | SUB | TEMP1 |  |
|  | SAN | X5 |  |
| DPIN19 | LAN | O,X |  |
|  | ANA | LOCC1 | SAVE 5 BITS |
|  | SAD | TEMP7 |  |
|  | ANA | TEMP3 |  |
|  | SUB | TEMP4 |  |
| DPIN21 | TEQ |  |  |
|  | BRS | DPIN15 | SST FOUND |
|  | STR |  |  |
|  | SST | BIT7 | SET BIT7 |
|  | LAP | CCFV,X | LOAD #9000,OP CODE FOR CFV |
|  | SUB | TEMP7 |  |
|  | TEQ |  |  |
|  | BRC | DPIN26 |  |
|  | SST | BIT6 | SET BIT6 IF ENCOUNTER A CFV |
| DPIN26 | LAN | O,X |  |
|  | SUB | LOCC6 | INST EQ O |
|  | TEQ |  |  |
|  | BRS | DPIN22 |  |
|  | LAP | CJISM,X |  |
|  | SUB | TEMP7 |  |
|  | TEQ |  |  |
|  | LAN | X5 |  |
| BRS | DPIN23 |  |  |
|  | SUB | STAPP |  |
|  | TEQ |  |  |
|  | BRS | DPIN02 |  |
| DPIN20 | DMR | X5 |  |
|  | BRU | DPIN19 |  |
| DPIN23 | LOF | BIT6 | WAS PREV INSTR A CFV? IF SO, PRESENT INSTR. IS INDEXED. CTU LOOKS LIKE A JIS. |
|  | BRS | DPIN25 |  |

APPENDIX B-continued

```
                SST  BIT6        CLEAR BIT6
                BRU  DPIN20
DPIN25          SST  BITD        FILTERED THRU A JIS TO SET BITD
                BRU  DPIN24
DPIN13          LAN  X5
                ADD  TEMP1
                SAN  X5
                BRU  DPIN14
DPIN15          LOT  BIT7
                BRC  DPIN20
DPIN22          LAN  X5
                ADD  TEMP1
DPIN24          SUB  STAPP
DPIN02          SAD  DB
                LAD  N
                SAN  X5
D54             DMR  X5
BRC             D52
                LAD  RTAB2,X
                SUB  DB          SEARCH RTAB2 FOR DB
                TEQ
                BRC  D54
                SST  BITD        SET FLAG TO INDICATE PRESENT LOGIC
                                 STRING BUILT
                LAN  X5
                SAD  I           ESTABLISH I FOR USE IN STATE
D55             LAP  ZERO,X
                SAD  LOC
                CLR
                SST  BITE        CLEAR BITE
                LAP  D,X
                BRU  DIS12       SET STATE & EXIT
D52             LOF  BITD        DID WE FILTER THRU JIS PATH
                BRS  D55
                SST  BITD        CLEAR BITD, LOGIC STRING NOT BUILT
                LAP  ONE,X
                ADD  DB
                BRU  DPIN02
```

STATE D6
(See FIG. 50)
SUBSEQUENT TO COPY STORAGE BUTTON PRESSED AND AFTER
EXECUTION OF STATES A2 and RESPECTIVELY, OR
SUBSEQUENT TO LOGIC DISPLAY BUTTON PRESSED (PBI=PBI2)
IN STATE DF.

| SYMBOLIC CODE LOCATION | OP CODE | ADDRESS OR VALUE | COMMENTS |
|---|---|---|---|
| STATD6 | SAN | X4 | |
|  | LAD | DE | |
|  | SAD | DPTR | |
|  | BRU | D55 | |

STATE E
(See FIGS. 58a, 58b)
SUBSEQUENT TO COPY BUTTON PRESSED IN STATE D6

| SYMBOLIC CODE LOCATION | OP CODE | ADDRESS OR VALUE | COMMENTS |
|---|---|---|---|
| STATEE | SAN | X4 | SAVE OFFSET CONSTANT |
|  | LAP | ONE,X | |
|  | SAD | LOCC2 | |
|  | LAP | CM1,X | |
|  | SAD | LOCC4 | |
|  | LOT | BITD | DOES A LOGIC STRING COPY ALREADY EXIST |
|  | BRS | ET1 | |
|  | LOT | TEST0 | ARE WE IN TEST MODE |
|  | BRC | ET2 | |
| ET11 | LAP | FIVE,X | ERROR |
|  | BRU | ET3 | |
| ET2 | LAP | THREE,X | |
|  | SUB | N | |
|  | TAM | | |
| ET10 | BRS | STAF16 | ERROR |
|  | LAD | I | |
|  | SAD | LOCC1 | |
|  | LAD | DE | |
|  | SUB | DB | |
|  | SAD | LOCC3 | |
|  | SAN | XB | SAVE FOR FUTURE REFERENCE |
|  | ADD | LOCC2 | ADD 1 |
|  | SAN | XA | SAVE FOR FUTURE REFERENCE |
|  | LAD | N | |
|  | SAD | I | |
|  | SAN | X5 | |
|  | ADD | LOCC2 | ADD 1 |
|  | SAD | N | |
|  | SUB | LOCC2 | SUBTRACT 1 |
|  | TEQ | | |
|  | BRC | ET4 | N IS NOT EQUAL TO 1 |

APPENDIX B-continued

```
                LAP  BEGRAM,X
                SAD  TEMP1
BRU             ET5
ET4             DMR  X5
                LAP  MSK1,X
                ANA  RTAB3,X     LEAVE BITS 0-7
                ADD  RTAB1,X     ADD RTAB1)I-1)
                SAD  TEMP1
                LAP  TWO,X
                ADD  TEMP1
                ADD  TEMP1
                SAD  TEMP1
ET5             LAP  C254,X
                SUB  TEMP1
                SUB  LOCC3       SUB (DE-DB)
                TGR
                BRC  ET9         NO ROOM IN IMMP SCRATCH FOR LOGIC STRING
                LAD  I
                SAN  X5
                LAD  TEMP1
                SAD  RTAB1,X     RTAB1(I)=TEMP1
                SAD  RMB
                LAD  DB
                SAD  RTAB2,X
                LAD  LOCC3       (DE-DB)
                SAD  RTAB3,X     RTAB3(I)=DE-DB AT THIS STAGE
                ADD  RMB
                SAD  RME
                ADD  IMMSC
                SAN  X5          STARTING ABSOLUTE ADDRESS FOR MOVE
                                 TO IMMP SCRATCH
                LAD  DE
                ADD  STAPP       ABSOLUTE START OF APPL PROG
                SAN  BD
ET7             LAP  CM1,X
                SUB  0
                TEQ
                BRC  ET6
                DMR  XA          GOING TO BE NUMBER OF NON DELS
ET6             LAD  0
                SAN  0,X
                DMR  BD
                DMR  X5
                DMR  XB          ARE WE FINISHED MOVING
                BRS  ET7
                SAN  X6          A REG CONTAINS (DB),SAVE IN X6
                LAN  BB          RESTORE IMMP DATA BASE
                SAN  BD
                LAD  I
                ADD  PRSEC       BASE OF POWER SECURITY BLOCK
                SAN  X5
                LAN  X6
                SAN  5,X         FIX UP CONTENTS PART OF BLOCK IN ADVANCE
                LAD  I
                SAN  X5
                LAN  X6
                SAD  RTAB4,X
                LAN  XA
                SWB
                ADD  RTAB3,X
                SAD  RTAB3,X     RTAB3(I)F-8=NUMBER OF NON DELS
                LAP  ONE,X
                ADD  RME
                SAN  X5
                LAP  CJIRM1,X    D801
                SAD  LOCC5
                ADD  I
                ADD  I
                ADD  I
                ADD  IMTPT       BASE OF 12 WD BLOCK
                SAD  0,X         PUT JIR INSTR AFTER LOGIC STRING IN RAM
                SUB  LOCC5       GET RID OF JIR OP CODE
                SAN  X5
                LAD  STAPP       START APPL PROG
                SAN  2,X         FORM APPROPR '3RD WORD' IN 12 WD JISBLK
                LAP  ONE,X
                ADD  DE
                ADD  STAPP
                SAN  1,X         FORM APPROPR '2ND WORD' IN 12 WD JISBLK
ET8             LAD  DPTR
                SUB  DB
                ADD  RMB
                SAD  RPTR
                LAP  ONE,X
                SAD  LOC
                STR
                SST  BUILO       REALLY A FLAG FOR STATPA
                SST  BITD        BUILD COPY NOW EXISTS
                CLR
                SST  BITE
                LAP  F,X
                BRU  DIS12       SET STATE AND EXIT
ET1             LAD  I
```

APPENDIX B-continued

|  |  |  |  |
|---|---|---|---|
|  | SAN | X5 |  |
|  | LAD | RTAB1,X |  |
|  | SAD | RMB |  |
|  | LAP | MSK1,X |  |
|  | ANA | RTAB3,X | LEAVE BITS 0–7 |
|  | ADD | RMB |  |
|  | SAD | RME |  |
|  | BRU | ET8 |  |
| ET3 | SAD | LOCC5 |  |
|  | LAP | N1,X |  |
|  | BRU | DIS12 | SET STATE AND EXIT |
| ET9 | LAP | CM1,X |  |
|  | ADD | N |  |
|  | SAD | N |  |
|  | SAD | LOCC1 |  |
|  | SAD | I |  |
|  | BRU | STAF16 | ERROR |

STATE H
(See FIG. 61)
SUBSEQUENT TO ENTER BUTTON PRESSED WITH TEST LIGHT ON

| SYMBOLIC CODE LOCATION | OP CODE | ADDRESS OR VALUE | COMMENTS |
|---|---|---|---|
| STATH | SAN | X4 | SAVE OFFSET CONSTANT |
| STAH | SST | BIT0 | CLEAR BIT0 |
|  | LOT | TEST0 | ARE WE IN TEST MODE |
|  | BRS | ENTE01 |  |
|  | LAP | SIX,X | ERROR |
|  | BRU | ET3 | STORE IN LOCC5, SET STATE N1 & EXIT |

GOING TO ISOLATE LARGEST RTAB2 OR DISCOVER THEY ARE ALL EQUAL TO −1.

| | | | |
|---|---|---|---|
| ENTE01 | LAP | CM1,X |  |
|  | ADD | N |  |
|  | SAN | X5 |  |
| ENTE06 | SAN | X7 |  |
| ENTE03 | LAD | RTAB2,X |  |
|  | SAD | TEMP3 |  |
| ENTE05 | DMR | X5 |  |
|  | BRC | ENTE02 |  |
|  | SUB | RTAB2,X |  |
|  | TEQ |  | ARE BOTH RTAB2'S EQUAL TO −1 |
|  | BRS | ENTE03 |  |
|  | TAM |  |  |
|  | BRS | ENTE04 | HAVE FOUND A LARGER RTAB2 |
|  | LAD | TEMP3 |  |
|  | BRU | ENTE05 |  |
| ENTE04 | LAN | X5 |  |
|  | BRU | ENTE06 |  |
| ENTE02 | TAM |  | A REGISTER CONTAINS LARGEST RTAB2 |
|  | BRS | DPLY21 | A REG=−SO ENTERING IS FINISHED. DPLY21 SETS SSTAT=B1 & STATE=A2 |
|  | LAN | X7 |  |
|  | SAN | X5 |  |
|  | LAP | CM1,X |  |
|  | SAD | RTAB2,X |  |
|  | LAD | RTAB3,X |  |
|  | SRR | 8 |  |
|  | SAD | TEMP6 | SET TEMP6=RTAB3(I)/F-8 |
|  | LAP | MSK1,X |  |
|  | ANA | RTAB3,X |  |
|  | SAN | XA | GOING TO BE COUNTER FOR INSPECTING LOGIC STRING |
|  | SAN | X6 | GOING TO CONTAIN ACTUAL COUNT OF NON DELS |
|  | ADD | RTAB1,X |  |
|  | SAD | TEMP7 | SAVE IN CASE NEEDED FOR STATMV |
|  | SAN | X5 | CHECK RAM LOGIC STRING OUT FOR NO. OF NON DELS |
|  | ADD | IMMSC | BASE OF IMMP SCRATCH |
|  | SAD | TEMP1 | ABSOLUTE ADDR, RIGHTMOST INSTR, RAM LOGIC STRING |
| ENTE09 | LAP | CM1,X |  |
|  | SUB | 0,X |  |
|  | TEQ |  |  |
|  | BRC | ENTE08 |  |
|  | DMR | X6 |  |
| ENTE08 | DMR | X5 |  |
|  | DMR | XA |  |
|  | BRS | ENTE09 |  |
|  | LAP | ONE,X |  |
|  | SAD | TEMP2 |  |
|  | LAN | X6 |  |
|  | ADD | TEMP2 | TEMP2 EQUALS 1 PRESENTLY |
|  | SAD | TEMP4 |  |
|  | SUB | TEMP6 |  |
|  | TEQ |  |  |
|  | SST | BIT6 | SET FLAG BIT6 |
|  | SAD | SZ | SZ EQ 0 MEANS NO MOVE NECESSARY |
|  | SAD | LOCC3 | SAVE JUST IN CASE NEED TO MOVE |
|  | LAD | STAPP |  |
|  | ADD | TEMP3 | RTAB2(I) FOR THIS LOGIC STRING |
|  | ADD | TEMP6 | RTAB3(I)/F-8 FOR THIS LOGIC STRING |
|  | SAD | LOCC2 |  |
|  | ADD | SZ |  |

|  |  |  |
|---|---|---|
|  | SAD TEMP2 | SAVE FOR FUTURE REFERENCE |
|  | LOT BIT6 |  |
|  | BRS ENTE10 | NO MOVE NECESSARY |
|  | SST BIT9 | CLEAR BIT9 TO IND. MOVE IN APPL PROG |
|  | LAP ONE,X |  |
|  | ADD FPGE |  |
|  | SAD LOCC5 |  |
|  | LAP H1,X |  |
|  | SAD SSSTAT |  |
|  | LAP MV,X |  |
|  | BRU DIS12 | SET STATE & EXIT |

STATE H1
(See FIG. 61)
SUBSEQUENT TO MOVING A LOGIC STRING TO APPLICATION
PROGRAM (STATE MV) IF A MOVE IS REQUIRED.

| SYMBOLIC CODE LOCATION | OP CODE | ADDRESS OR VALUE | COMMENTS |
|---|---|---|---|
| STATH1 | SAN | X4 | SAVE OFFSET CONSTANT |
| ENTE10 | LAP | CM1,X |  |
|  | ADD | TEMP2 | PREPARE TO TRANSFER RAM LOGIC STRING TO APPL PROG |
|  | SAN | X5 | ABSOLUTE ADDRESS OF LAST INSTR IN APPL PROG LOGIC STRING |
|  | LAD | TEMP4 |  |
|  | SAN | XA |  |
|  | LAD | TEMP1 | ADDRESS OF RIGHTMOST INSTR, RAM LOGIC STRING |
|  | SAN | BD |  |
| ENTE13 | LAP | CM1,X |  |
|  | SUB | 0 |  |
|  | TEQ |  |  |
|  | BRS | ENTE12 |  |
|  | DMR | XA |  |
|  | BRC | ENTE11 | FINISHED MOVING INSTR |
|  | LAD | 0 |  |
|  | SAN | 0,X | TRANSFER INSTR TO APPL PROG |
|  | DMR | X5 |  |
| ENTE12 | DMR | BD |  |
|  | BRU | ENTE13 |  |
| ENTE11 | LAN | BB | RESTORE IMMP DATA BASE |
|  | SAN | BD |  |
|  | LAD | SIZE |  |
|  | SUB | SZ |  |
|  | SAD | SIZE | ADJUST SIZE OF EXPANSION AREA FOLLOWING APPL PROG |
|  | LAD | FPGE |  |
|  | ADD | SZ | ADJUST END POINTER,APPL PROG |
|  | SAD | FPGE |  |
|  | LAP | H,X |  |
|  | BRU | DIS12 | SET STATE & EXIT |

STATE MV
(See FIG. 62)
TIME SHARED MOVING OR CORE STRETCHING ROUTINE

| SYMBOLIC CODE LOCATION | OP CODE | ADDRESS OR VALUE | COMMENTS |
|---|---|---|---|
| STATMV | SAN | X4 | SAVE OFFSET CONSTANT |
|  | LAP | CNTCON,X | MOVES NOT MORE THAN THIS MUCH AT A TIME |
|  | SAN | XA | SET COUNTER |
|  | LOF | BITA | HAVE WE BEEN IN BEFORE |
|  | BRS | MV1 | HAVE NOT BEEN IN BEFORE |
|  | LAD | LOCC6 | RESTORE OVERALL COUNTER |
|  | SAN | X6 |  |
|  | BRU | MV8 |  |
| MV1 | SST | BITA | SET BITA TO REM HAVE BEEN IN ROUTINE |
|  | LAD | LOCC5 |  |
|  | SUB | LOCC2 | HIGHER ADDRESS-LOWER ADDRESS |
|  | SAN | X6 |  |
|  | LAD | LOCC3 |  |
|  | TAM |  |  |
|  | BRC | MV3 | +VE SO MOVING DOWN |
|  | LAD | LOCC2 |  |
|  | SAD | LOCC1 | GOING TO INTERCHANGE LOCC2 & LOCC5 |
|  | LAD | LOCC5 |  |
|  | SAD | LOCC2 |  |
|  | LAD | LOCC1 |  |
|  | SAD | LOCCE5 |  |
|  | LOT | BIT9 | ARE WE MOVING IN IMMP SCRATCH |
|  | BRS | MV12 | YES |
|  | LAD | TEMP7 | REL ADDR, RIGHTMOST INSTR RAM LOGIC STRING |
|  | SAN | X5 |  |
|  | LAP | CSSTA,X |  |
|  | ANA | 1,X | #07FF |
|  | SAN | X5 | PICK UP JIR INSTR AFTER RAM LOGIC STRING |
|  | LAN | 0,X | ALTER APPROPR 2ND WORD OF JISBLK |
|  | ADD | LOCC3 |  |
|  | SAN | 0,X |  |
| MV12 | LAP | ONE,X |  |
|  | BRU | MV4 |  |
| MV3 | LAP | CM1,X |  |

APPENDIX B-continued

| Symbolic Location | OP Code | Address or Value | Comments |
|---|---|---|---|
| MV4 | SAD | LOCC1 | |
| | LAD | LOCC5 | |
| MV7 | SAN | X5 | TAKING INSTR FROM HERE |
| | ADD | LOCC3 | |
| | SAD | DSPY0 | |
| | SAN | BD | |
| | LAN | 0,X | GET INSTR |
| | SAD | 0 | MOVE INSTR |
| | LAN | BB | |
| | SAN | BD | RESTORE SCRATCH DATA BASE |
| | DMR | XA | |
| | BRC | MV5 | |
| MV8 | DMR | X6 | |
| | BRC | MV6 | |
| | LAD | LOCC5 | |
| | ADD | LOCC1 | |
| | SAD | LOCC5 | |
| | BRU | MV7 | |
| MV6 | SST | BITA | FINISHED MOVING SO CLEAR BITA |
| | LAD | SSSTAT | |
| | SAD | STATE | |
| MV5 | LAN | X6 | |
| | SAD | LOCC6 | REMEMBER TOTAL MOVE COUNT |
| | LAD | LOCC3 | |
| | TAM | | |
| | BRC | MV11 | |
| | LAP | ZERO,X | |
| | SUB | LOCC3 | |
| MV11 | SAN | XB | |
| | LAD | LOCC5 | |
| | SAD | TEMP6 | |
| MV10 | SAN | X5 | |
| | DMR | XB | |
| | BRC | EXIT00 | |
| | LAP | CM1,X | |
| | SAN | 0,X | PUT DELS IN GAP CREATED |
| | LAD | TEMP6 | |
| | SUB | LOCC1 | |
| | SAD | TEMP6 | |
| | BRU | MV10 | |

STATES A1, A2 and G1
(See FIG. 59)
STATA1, SUBSEQUENT TO OFF
STATA2, SUBSEQUENT TO ENTER STATE H, OR COPY STORAGE BUTTON PRESSED
STATG1, UNTEST STATE

| SYMBOLIC CODE LOCATION | OP CODE | ADDRESS OR VALUE | COMMENTS |
|---|---|---|---|
| STATA1 | SAN | X4 | SAVE OFFSET CONSTANT |
| | LAP | A,X | |
| | SAD | SSTAT | |
| | LAP | C15,X | |
| | SAN | X5 | |
| | LAP | ZERO,X | |
| A11 | SAD | FTAB,X | SET FORCE TABLE TO ZERO |
| | DMR | X5 | |
| | BRS | A11 | |
| | BRU | A12 | |
| STATG1 | SAN | X4 | SAVE OFFSET CONSTANT |
| | LAD | N | |
| | SAN | X6 | |
| A14 | DMR | X6 | |
| | BRC | A13 | |
| | LAN | X6 | |
| | SAN | X5 | |
| | LAD | RTAB4,X | GET SAVED APPL PROG INSTR |
| | SAN | X7 | |
| | LAD | RTAB2,X | |
| | ADD | STAPP | |
| | SAN | X5 | ABSOLUTE ADDRESS OF JIS TO IMMP SCRATCH |
| | LAN | X7 | |
| | SAN | 0,X | REPLACE APPL PROG INSTR |
| | BRU | A14 | |
| STATA2 | SAN | X4 | SAVE OFFSET CONSTANT |
| A13 | LAD | N | |
| | SAN | X6 | |
| A19 | DMR | X6 | |
| | BRC | A16 | |
| | LAN | X6 | |
| | ADD | PRSEC | |
| | SAN | X5 | |
| | LAP | EIGHT,X | |
| | SAN | 0,X | (SAVBLK+X)=8 |
| | BRU | A19 | |
| A16 | LAF | TEST0 | |
| | BRC | A15 | |
| A12 | LAP | THREE,X | |
| | SAN | X5 | |
| | LAP | CM1,X | |
| A17 | SAD | RTAB2,X | RTAB2(I)=−1 |
| | DMR | X5 | |
| | BRS | A17 | |

APPENDIX B-continued

|  | SST | BITD | CLEAR BITD, NO BUILD COPY NOW |
|---|---|---|---|
|  | LAP | ZERO,X | |
|  | SAD | N | |
|  | SAD | SZZ | |
| A15 | LAP | ZERO,X | |
|  | SAD | PO | |
|  | SAD | PO+1 | |
|  | SST | BIT8 | CLEAR TEST MODE BIT |
|  | BRU | STAF15 | |

STATE PA
(See FIG. 52)
TRAP IN APPLICATION PROGRAM CAUSES A JUMP TO THIS STATE

| SYMBOLIC CODE LOCATION | OP CODE | ADDRESS OR VALUE | COMMENTS |
|---|---|---|---|
| STATPA | SAN | X4 | SAVE OFFSET CONSTANT |
|  | LAN | XC | |
|  | SAN | XA | RESTORE APPL PROG'S A REG TO XA |
|  | LOT | BIT2 | HAVE WE BEEN THRU BEFORE IN A REP LOOP |
|  | BRS | P1 | YES |
|  | LAD | SAVBD | |
|  | SUB | LPBI | |
|  | TNL | | |
|  | BRC | P2 | ERROR,PBI SPECIFIES TOO MANY LOOP EXECS |
|  | LAP | ZERO,X | |
|  | SUB | SAVBD | |
|  | TAM | | |
|  | SST | RLOOPO | SET ON REPEATED LOOP LIGHT |
|  | SST | BIT2 | |
|  | BRU | P1 | |
| P2 | LAP | G1,X | ERROR,9 |
|  | SAD | LOCC5 | |
|  | LAP | N1,X | |
|  | SAD | SSTAT | |
|  | BRU | P10 | |
| P1 | LAD | LPBI | |
|  | SUB | SAVBD | |
|  | TEQ | | |
|  | BRC | EXIT05 | |
|  | CLR | | |
|  | SST | BIT2 | CLEAR BIT2 |
|  | LOT | RSAV | |
|  | SST | COIL0 | SET COIL STATM |
|  | LAD | TEMP1 | |
|  | LOT | BIT00 | CFVO,CTUO,TTUO,TOUO |
|  | BRS | P4 | |
|  | LOT | INDO | IS THE INSTR INDEXED |
|  | BRC | P7 | No |
|  | ADD | SAVXD | |
| P7 | SAN | X5 | |
|  | LOT | DUMMYB,X | GET STATUS OF BIT |
|  | SST | STAT10 | SET CLOSE LIGHT APPROPR |
|  | LOF | STAT10 | |
|  | SST | STAT20 | SET OPEN LIGHT APPROPR |
| P9 | SAD | DSPYO | DISPLAY EFFECTIVE ADDRESS |
|  | LAD | SSTAT | |
| P10 | SAD | STATE | |
|  | BRU | EXIT05 | |
| P4 | LOT | INDO | |
|  | BRC | P6 | |
|  | ADD | SAVBD | |
| P6 | LOT | BITE | SET IF CONTENTS OF ADDR TO BE DISPLAYED |
|  | BRS | P8 | |
|  | SAN | X5 | |
|  | LAN | 0,X | GET CONTENTS |
|  | BRU | P9 | |
| P8 | SRC | 12 | SHIFT LEFT 4 |
|  | BRU | P9 | |

STATE G
(See Fig. 60)
THIS STATE SETS UP THE BRANCH SYSTEM FROM APPLICATION PROGRAM TO
LOGIC STRING IN RAM. THE TEST BUTTON HAS PREVIOUSLY BEEN PRESSED.

| SYMBOLIC CODE LOCATION | OP CODE | ADDRESS OR VALUE | COMMENTS |
|---|---|---|---|
| STATG | SAN | X4 | |
|  | LAP | +2 | |
|  | BRU | ROMSUB | CALL SUBR TO SEE IF ROM'D AT STAPP OR ENAPP |
|  | CON | +1 | |
|  | LAD | LOCC5 | RESTORE OFFSET CONSTANT |
|  | SAN | X4 | |
|  | BRC | GT3 | NOT ROM'D |
|  | BRU | Q11 | |
| GT3 | LOF | BIT0 | IS THIS STATE H |
|  | BRC | STAH | YES, EXIT |
|  | LAP | CM1,X | |
|  | ADD | N | |
|  | TAM | | IS N ZERO |
|  | BRS | ET11 | ERROR |
|  | LOT | TEST0 | ARE WE IN TEST MODE |
|  | BRC | GT1 | |

APPENDIX B-continued

```
            LAP   G1,X
            BRU   DIS12
GT1         SAN   X5
            SAD   LOCC2
            LAD   IMMSC
            ADD   RTAB1,X
            SAN   X7
            LAD   RTAB2,X    LOAD A WITH DATA BASE FOR LOGIC STRING
            ADD   STAPP
            SAN   X6
            LAD   LOCC2
            ADD   PRSEC      BASE OF POWER SECURITY BLOCK
            SAN   X5
            LAD   X6
            SAN   0,X        FIX UP ADDR PORTION OF PRSEC BLOCK
            LAD   IMTPT      POINTER TO 12 WORD JISBLOCK
            ADD   LOCC2
            ADD   LOCC2
            ADD   LOCC2      FORM JISBLK+31
            SAD   LOCC4
            SAN   X5
            LAN   X7
            SAN   0,X
            LAN   X6
            SAN   X5
            LAP   CJISM,X
            ADD   LOCC4
            SAN   0,X        PUT JIS IN APPL PROG
            LAP   CM1,X
            ADD   LOCC2
            TAM
            BRC   GT1
            SST   TEST0
            SST   BIT8       THIS BIT INDICATES TEST MODE
            LAD   SSTAT
            BRU   DIS12
```

STATE D2
(See FIG. 56)
SUBSEQUENT TO SEARCHING FOR STSTP AFTER FIRST
TIME ENTRY INTO IMMP CODE

| SYMBOLIC<br>CODE<br>LOCATION | OP<br>CODE | ADDRESS<br>OR VALUE | COMMENTS |
|---|---|---|---|
| STATD2 | SAN | X4 | |
|  | LAT | BITB | DID SEARCH FIND A STSTP |
|  | BRC | D21 | NO |
|  | LAP | CM1,X | |
|  | ADD | LOCC3 | |
| D22 | SAD | FPGE | FORM POINTER TO END OF APPL |
|  | LAD | ENAPP | |
|  | SUB | FPGE | |
|  | SAD | SIZE | FORM SIZE OF EXPANSION AREA AT<br>END OF APPL PROG |
| DPLY02 | LAP | A1,X | |
|  | BRU | DIS12 | SET STATE & EXIT |
| D21 | LAD | STAPP | |
|  | BRU | D22 | |

STATE Q
(See Fig. 53)
TRAP SETTING & REMOVING STATE. SETS TRAP IF NEXT
STATE IS D OR F & REMOVES TRAP WHEN APPROPRIATE.

| SYMBOLIC<br>CODE<br>LOCATION | OP<br>CODE | ADDRESS<br>OR VALUE | COMMENTS |
|---|---|---|---|
| STATQ | SAN | X4 | |
|  | LAP | P+2 | |
|  | BRU | ROMSUB | |
|  | CON | P+1 | |
|  | LAD | LOCC5 | |
|  | SAN | X4 | RESTORE OFFSET CONSTANT |
|  | BRS | Q11 | ROM'D |
|  | LOF | BIT01 | PLACING OR REMOVING |
|  | SST | BIT01 | |
|  | BRC | Q12 | REMOVING |
|  | LOT | LDPLY0 | WAS PREVIOUS STATE EQ STATE D |
|  | BRS | Q1 | |
| Q2 | LAT | TEST0 | ARE WE IN TEST MODE |
|  | BRS | Q7 | |
|  | LAP | ZERO,X | |
|  | BRU | Q8 | |
| Q1 | LAT | BITD | DOES COPY EXIST |
|  | BRC | Q7 | NO |
|  | LAT | TEST0 | ARE WE IN TEST MODE |
|  | BRC | Q7 | NO |
|  | LAP | ONE,X | |
| Q8 | SAN | X5 | |
|  | BRU | Q5 | |
| Q7 | LAD | LOC | |
|  | BRU | Q8 | |
| Q5 | LAD | DE,X | GET RETURN ADDRESS OF APPROPRIATE<br>LOGIC STRING |

|          |     |         |                                    |
|----------|-----|---------|------------------------------------|
|          | ADD | STAPP,X |                                    |
|          | SAN | X5      |                                    |
|          | SAN | X6      |                                    |
|          | LAN | 0,X     |                                    |
|          | SAD | SAVINS  | PUT(TRAP ADDRESS) IN IMMP SCRATCH  |
|          | LAP | JISCV,X | # C80C                             |
|          | ADD | IMTPT   | FOR JIS TO IMMP SCRATCH            |
|          | SAN | 0,X     | PLACE TRAP                         |
|          | LAD | PRSEC   | BASE OF POWER SECURITY BLOCK       |
|          | SAN | X5      |                                    |
|          | LAN | X6      |                                    |
|          | SAN | 4,X     | SAVE TRAP ADDRESS                  |
|          | LAD | SAVINS  |                                    |
|          | SAN | 9,X     | SAVE TRAP ADDRESS CONTENTS         |
| Q13      | LAP | PA,X    |                                    |
|          | BRU | DIS12   | SET STATE & EXIT                   |
| Q11      | LAP | TWO,X   |                                    |
|          | SAD | LOCC5   | ERROR CODE FOR STATE N1            |
|          | LAP | JRCON   |                                    |
|          | SAD | SAVINS+1| PUT JIR X6 IN SAVINS+1             |
|          | LAP | N1,X    |                                    |
|          | BRC | DIS12   | SET STATE & EXIT                   |
|          | SAD | SSTAT   | ARRANGE FOR PA TO JUMP TO N1, FUTURE |
|          | BRU | Q13     |                                    |
| Q12      | LAD | PRSEC   | REMOVE TRAP                        |
|          | SAN | X5      |                                    |
|          | LAN | 4,X     | GET ADDRESS OF OVERWRITTEN INSTR   |
|          | SAN | XB      |                                    |
|          | LAP | EIGHT,X |                                    |
|          | SAN | 4,X     | RESTORE 8 TO PRSEC BLOCK           |
|          | LAN | XB      |                                    |
|          | SAN | X5      |                                    |
|          | LAD | SAVINS  |                                    |
|          | SAN | 0,X     | RESTORE INSTR TO APPL PROG         |
|          | BRU | EXIT00  |                                    |

ROMSUB
(See Figs. 53 & 60)
SUBROUTINE TO CHECK IF LOCATIONS STAPP & ENAPP
ARE ROM'D. FR IS SET IF ROM'D. IF NOT ROM'D FR
IS CLEARED.

| SYMBOLIC CODE LOCATION | OP CODE | ADDRESS OR VALUE | COMMENTS |
|------------------------|---------|------------------|----------|
| ROMSUB | SAD | LOCC6    | SAVE P COUNT                       |
|        | LAP | ONE,X    |                                    |
|        | SAN | X6       |                                    |
|        | LAD | STAPP    |                                    |
| R3     | SAN | X5       |                                    |
|        | LAN | 0,X      | GET CONTENTS OF APPL PROG LOCATION |
|        | SAD | LOCC5    |                                    |
|        | DMR | 0,X      |                                    |
|        | LAN | 0,X      | READ WHAT WE WROTE                 |
|        | SUB | LOCC5    |                                    |
|        | TEQ |          |                                    |
|        | BRS | R1       | ROM'D                              |
|        | LAD | LOCC5    |                                    |
|        | SAN | 0,X      |                                    |
|        | DMR | X6       |                                    |
|        | BRC | R1       | NOT ROM'D                          |
|        | LAD | ENAPP    |                                    |
|        | BRU | R3       |                                    |
| R1     | LAN | X4       | LOAD OFFSET CONSTANT               |
|        | SAD | LOCC5    | SAVE                               |
|        | LAD | LOCC6    |                                    |
|        | SAN | X4       |                                    |
|        | BRU | IMMS01,X | RETURN                             |

EXIT ROUTINE
(See Fig. 43)
BRANCH TO THIS ROUTINE AFTER EXIT FROM A STATE ROUTINE.

| SYMBOLIC CODE LOCATION | OP CODE | ADDRESS OR VALUE | COMMENTS |
|------------------------|---------|------------------|----------|
| EXIT02 | SAN | X4      | SAVE OFFSET CONSTANT |
| EXIT00 | LAP | ONE,X   |                      |
|        | SAN | X5      |                      |
| ENTR18 | LAD | P0,X    |                      |
|        | ANA | C0,X    |                      |
|        | SAD | LOCC7   |                      |
|        | LAD | P0,X    |                      |
|        | ERA | C0,X    |                      |
|        | ERA | LOCC7   |                      |
|        | SAD | C0,X    |                      |
|        | DMR | X5      |                      |
|        | BRS | ENTR18  |                      |
|        | LAD | PBI     |                      |
|        | SAD | PB11    |                      |
|        | LAD | S1      |                      |
|        | SAD | S2      |                      |
|        | LAP | TWO,X   |                      |
|        | SAD | LOCC7   |                      |
| ENTR20 | SUB | LOCC7   |                      |

APPENDIX B-continued

```
            SAN  X5SET
                 DATA
                 INDEX
                 REGISTER
            SAM  X7
            LAD  C0,X
            SAN  X6
            LAP  CXFFE0,X
            SAN  X5         INDEX REGISTER POINTING TO DBC
            SAN  BB
ENT18       LAT  STABB      IS DBC BUSY
            BRS  ENT18
            DMR  X7
            BRS  ENTR22
            LAP  OTUC,X
            SAN  3,X        SET EXTERNAL ADDRESS FOR DBC
ENTR22      LAP  CX7800,X
            SAN  0,X
            LAN  X6
            SAN  4,X
            LAP  CM1,X
            ADD  LOCC7
            SAD  LOCC7
            TAM
            LAP  TWO,X
            BRS  ENTR13
            BRU  ENTR20
EXIT03      SAN  X4         SAVE OFFSET CONSTANT
ENTR13      LAD  IMMSC
            SAN  BB         RESTORE BIT BASE
            LOF  BITC
            SST  BITC       CHANGE STATE OF BITC
            LAD  IMINFO     LOAD SAVED A REG
            SAN  XA
            LAD  SAVEP
            SAN  X6
            LAD  SAVEBP
            SAN  X7
EXIT05      LAP  CM1,X
            SAN  X5
            LAD  SAVSTT     LOAD SAVED STATUS WORD
            SAN  0,X        RESTORE STATUS WORD (A REG PART WRONG
                            AS YET)
            LAD  SAVXP
            SAN  X4
            LAD  SAVXD
            SAN  X5         RESTORE XD
            LAD  SAVBB
            SAN  BB
            LAD  SAVBD
            SAN  BD
            LAN  XA
JRCON       JIR  X6
            END
```

What is claimed is:

1. An operator console for communicating with a computer, said computer including a memory having an executive program stored therein for directing communication between said computer and said console and for simulating an equipment control circuit having a format comprised of a plurality of logic strings each including logic elements, at least one of which is a switch element having a logical condition and another of which is a continuity status means having a conducting condition controlled by the conditions of the switch elements of its associated logic string, said continuity status means serving to effect output control signals from said controller to equipment external thereto, said operator console comprising:

a. means to specify a logic string and a logic element in said string;
   b. means to communicate to said computer the specified string and element whereby said computer can retrieve data relative thereto from said memory for communication to said console;
   c. display means responsive to said data for displaying indicia identifying the specified logic element and its condition; and
   d. means for communicating indexing signals to said computer to direct said computer to retrieve data relative to additional logic elements in the specified logic string from said memory for communication to said console for display by said display means.

2. The invention in accordance with claim 1 wherein the means to specify the logic string and logic element is manually settable.

3. The invention in accordance with claim 2 wherein the means to specify a logic string and a logic element need only be set once for a specified logic string with said means for communicating the indexing signals specifying all other logic elements in the specified string for the display of data relative thereto.

4. The invention in accordance with claim 2 further including means to inhibit communication with the computer if other than a continuity status means is specified by the manually settable means.

5. The invention in accordance with claim 4 further including means to indicate an error upon the inhibiting of communication.

6. The invention in accordance with claim 1 wherein said display means includes a first portion for displaying indicia relative to the position of the logic element in the string and additional portions for providing indicia representing logic element types and conditions.

7. The invention in accordance with claim 1 wherein said means for communicating the indexing signals comprises first and second manually operable means, each generating an indexing signal when operated, said first and second manually operable means effecting the display of data relative to the logic elements in first and second directions along said logic string whereby an operator of said console can interrogate each logic element of a string.

8. The invention in accordance with claim 7 wherein said first and second manually operable means each includes a indicator which, in a first stage indicates permission to an operator of said console that the operable means corresponding to that indicator can be operated and each indicator corresponding to said first and second operable means, when in a second state, indicates to the operator the beginning and the end, respectively, of the specified logic string.

9. In a computer system of the type including an operator console for communicating with a computer, a method of effecting the display of specified program data comprising the steps:
 a. storing in a store of said computer a program serving to,
  1. direct communications between said computer and said console,
  2. simulate a control circuit having a format comprised of left and right buses defining left and right boundaries respectively and a plurality of logic strings connected between said buses, each of said logic strings including a plurality of logic elements at least one of which is a switch element of definable type and condition and another of which is a continuity status element, the condition of which is indicative of the condition of the switch elements of its associated logic string, and
  3. direct the additional storing of data respecting the instantaneous conditions of the logic elements of each of the logic strings; and
 b. employing said console to,
  1. specify to said computer the identity of a desired logic element to cause said computer to access said store to retrieve information therefrom with respect to the identified logic element for transmittal to said console, said information defining the type of element specified and the then existing condition of that element,
  2. display a representation of the identity of the specified element in conjunction with representations defining the type and instantaneous condition of that element, and
  3. selectively displaying similar representations of other logic elements of a logic string by the actuation of operable means associated with the console, which means, with each actuation, changes the identity of the logic element specified to the computer by stepping to define another logic element of the string, the direction of stepping being determined by the operable means.

10. The invention in accordance with claim 9 wherein the initial step of employing the console to specify the identity of a desired logic element is limited to the specifying of continuity status elements.

11. The invention in accordance with claim 10 further including the step of inhibiting all communication between the console and the computer if other than a continuity status element is initially specified.

12. The invention in accordance with claim 11 further including the step of providing an indication that the inhibiting action has occurred.

13. The invention in accordance with claim 9 further including the step, with each actuation of the operable means, of interrogating the content of a location in said store adjacent that defining the type of logic element to which the display is then directed to determine if an additional logic element exists between the then displayed logic element and the boundary lying in the direction of stepping.

14. The invention in accordance with claim 13 further including the step of providing an indication as to the existence of additional logic elements.

15. In a control system of the type including a programmable controller and an operator console, a method of displaying program data and control information on said console provided thereto from said controller comprising the steps:
 a. storing in a memory of said controller a program serving to,
  1. direct communication between said controller and said console,
  2. simulate an electrical circuit having a format of at least one series connected string of control elements, at least one of said control elements being a switch element having a logical condition and another being a relay having a conducting condition controlled by the states of the control elements connected in series therewith, said relay serving to effect the generation of output control signals from said controller to equipment external thereto, and
  3. store data related to the instantaneous states of the control elements in each string of control elements; and
 b. utilizing said console for,
  1. specifying a string and a relay in said string,
  2. communicating to said controller the specified string and relay whereby said controller retrieves information relative thereto from said memory and communicates said information to said console,
  3. displaying said information on said console in the form of indicia identifying the specified relay and its condition;
  4. directing said controller to retrieve information relative to selected ones of the other control elements of the specified string from said memory by stepping along the elements of the specified string while changing the identity of each control element at each step whereby the controller communicates the information related to each element to said console for display.

16. The invention in accordance with claim 15 wherein the step of displaying said information on said console includes the step of indicating an error to an operator of the console and inhibiting all communications between the console and the controller if other than a relay is initially specified.

17. The invention in accordance with claim 16 further including the step of clearing the error indication subsequent to specifying a relay in a string restoring communication between the console and the controller.

18. A method of locating and displaying data in a data processing system of the type including a programmable controller and an operator console comprising the steps:
 a. storing in a memory of said controller a program serving to,
  1. direct communication between said controller and said operator console, 2. simulate a control circuit having a format comprised of a plurality of logic strings having left and right boundaries, each logic string comprised of at least one switch element of an identifiable type and condition and a continuity status means the condition of which is controlled by the condition of the switch elements of its associated logic string; and b. utilizing said operator console for,
 1. specifying to said computer a continuity status means defining the right boundary of a selected logic string,
 2. displaying the condition and type of logic element represented by said continuity status means in conjunction with indication to an operator of said console of the right boundary and the existence of switch elements in the selected logic string residing between the left boundary and said continuity status means,
 3. directing said controller to step across the selected logic string toward the left boundary switch element by switch element by the actuation of operable means on said console,
 4. displaying representation of the identity, condition and type of each switch element in the specified logic string as it is stepped to while providing indication to the operator of said console of the existence of switch elements residing between the right boundary and the switch element presently being displayed and further providing indication of the left boundary of the specified logic string when the left most switch element of that string is stepped to.

19. A method of communicating with a computer from an operator console comprising the steps:

a. storing in a memory of said computer a program serving to,
 1. direct communication between said computer and said console,
 2. simulate an equipment control circuit having the format of an electrical ladder type diagram, the diagram being comprised of a plurality of strings of control elements, at least one of which is a switch element having a logical condition and another of which is a continuity status means having a condition controlled by the conditions of the switch elements of its associated string, said continuity status means serving to effect output control signals from said computer to equipment external thereto, and
 3. store data related to the instantaneous conditions of the control elements in each of the strings; and b. utilizing said console for,
 1. specifying a string and a control element in said string,
 2. communicating to said computer the specified string and control element whereby said computer retrieves information relative thereto from said memory and communicates said information to said console,
 3. displaying said information in the form of indicia identifying the specified control element and its condition, and
 4. selectively communicating indexing signals to said commputer whereby said computer retrieves information relative to additional control elements in the specified string from said memory and communicates information relative thereto to said console for display thereon.

* * * * *

UNITED STATES PATENT AND TRADEMARK OFFICE
CERTIFICATE OF CORRECTION

PATENT NO. : 3,969,722
DATED : July 13, 1976
INVENTOR(S) : William J. Danco and Arthur P. Given It is certified that error appears in the above-identified patent and that said Letters Patent are hereby corrected as shown below:

Column 1, line 44, after "to" insert --the--.
Column 2, line 27, cancel "tape" and substitute --type--.
Column 3, line 67, after "plurality" insert --of--.
Column 4, line 66, cancel "20" and substitute --22--.
Column 6, line 14, cancel "mans" and substitute --means--.
  line 44, cancel "reference" (first occurrence) and substitute --procedure--.
  line 50, cancel "and" and substitute --or--.
Column 7, line 31, cancel "I" and substitute --1--.
Column 8, line 28, cancel "[(Y/y)+($X_d$)$I_B$)]" and substitute --[(Y/y+($X_d$)$I_B$)/16]--.
  line 38, cancel "[(Y/y+)$X_d \cdot I_B$)]" and substitute --[(Y/y+($X_d$)$\cdot I_B$)/16]--.
  line 40, cancel "(Z/z)" and substitute --($\overline{Z/z}$)--.
  line 42, cancel "(Z/z)" and substitute --($\overline{Z/z}$)--.
  line 47, cancel "[Y/y+($X_d$)$\cdot I_B$)]" and substitute --[(Y/y+($X_d$)$\cdot I_B$)/16]--.
Column 9, line 13, cancel "Substract" and substitute --Subtract--.
  line 16, cancel "Substract" and substitute --Subtract--.
Column 12, line 40, cancel "2a" and substitute --1a--.
Column 13, line 22, cancel "in" and substitute --is the--.
  line 28, cancel "2AA" and substitute --2A/A--.
  line 33, cancel "12A" and substitute --12/A--.
Column 16, line 15, delete "round by".
  line 44, cancel "and" and substitute --as--.
  line 54, cancel "or" and substitute --of--.
Column 19, line 3, cancel "refere" and substitute --refer--.
Column 25, line 35, cancel "To interrogate the controller the" and substitute --The--.
Column 30, line 24, after "EXECUTIVE" insert --PROGRAM--.
Column 33, line 13, after "will" insert --not--.
  line 63, cancel "(Bd)" (second occurrence) and substitute --(Bb)--.

UNITED STATES PATENT AND TRADEMARK OFFICE
CERTIFICATE OF CORRECTION

PATENT NO. : 3,969,722

DATED : July 13, 1976

INVENTOR(S) : William J. Danco and Arthur P. Given

It is certified that error appears in the above-identified patent and that said Letters Patent are hereby corrected as shown below:

Column 34, line 8, delete "location NIOT,".
Column 35, line 23, cancel "plur" and substitute --plus--.
line 50, cancel "to 0" and substitute --from 0 to -1--.
Column 43, line 32, cancel "8" and substitute --28--.
Column 54, line 39, cancel "is" and substitute --as--.
Column 67, Step 10c, line 1, cancel "05D0" and substitute --06D0--.
Column 69, line 48, after "background" insert a comma --,--.
line 49, after "(IMMP" insert a parenthesis --)--.
line 50, after "detail" remove the parenthesis.
Column 70, Step 10i, line 2, cancel "8" and substitute --81--.
Column 74, line 50, cancel "qual" and substitute --equal--.
Column 79, line 60, cancel "contains more than one bit total" and substitute --contain one one respectively--.
line 61, cancel "in these two words".
Column 89, line 39, cancel "stored" and substitute --sorted--.
Column 96, line 19, cancel "Test" and substitute --Enter--.
Column 104, line 33, cancel "SV2/AB" and substitute --SV2A/B--.
Column 118, line 12, after "is" insert --part of--.
line 13, cancel "and not" and substitute --which is not being executed, but is instead--.
line 13, after "copy" cancel ", thus" and substitute --. Thus,--.

Signed and Sealed this

Thirtieth Day of May 1978

[SEAL]

Attest:

RUTH C. MASON
Attesting Officer

LUTRELLE F. PARKER
Acting Commissioner of Patents and Trademarks